Jan. 30, 1951 F. E. HAMILTON ET AL 2,540,030

SELECTIVELY CONTROLLED RECORDING APPARATUS

Filed May 12, 1948 47 Sheets-Sheet 1

INVENTORS
F. E. HAMILTON
M. F. HAYES
J. D. WOLFE
BY George D Hicks
ATTORNEY

INVENTORS
F.E.HAMILTON
M.F.HAYES
J.D.WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 3

INVENTORS
F. E. HAMILTON
M. F. HAYES
J. D. WOLFE
BY George D Hicks
ATTORNEY

INVENTORS
F. E. HAMILTON
M.F. HAYES
J.D. WOLFE
BY George D. Hicks
ATTORNEY

SELECTIVELY CONTROLLED RECORDING APPARATUS

Filed May 12, 1948 47 Sheets-Sheet 5

INVENTORS
F. F. HAMILTON
M. F. HAYES
J. D. WOLFE
BY George D Hicks
ATTORNEY

INVENTORS
F.E. HAMILTON
M.F. HAYES
J.D. WOLFE
BY George D. Hicks
ATTORNEY

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 8

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D Hiles
ATTORNEY

SELECTIVELY CONTROLLED RECORDING APPARATUS

INVENTORS
F. E. HAMILTON
M. F. HAYES
J. D. WOLFE
BY George D. Hicks
ATTORNEY

SELECTIVELY CONTROLLED RECORDING APPARATUS

Filed May 12, 1948 47 Sheets-Sheet 11

INVENTORS
F. E. HAMILTON
M. F. HAYES
J. D. WOLFE
BY George D. Hicks
ATTORNEY

SELECTIVELY CONTROLLED RECORDING APPARATUS

Filed May 12, 1948 47 Sheets-Sheet 12

INVENTORS
F. E. HAMILTON
M. F. HAYES
J. D. WOLFE
BY George D Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 13

INVENTORS
F. E. HAMILTON
M. F. HAYES
J. D. WOLFE
BY George D. Nickel
ATTORNEY

SELECTIVELY CONTROLLED RECORDING APPARATUS

Filed May 12, 1948 47 Sheets-Sheet 14

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 15

INVENTORS
F. E. HAMILTON
M. F. HAYES
J. D. WOLFE
BY George D. Nielsen
ATTORNEY

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

SELECTIVELY CONTROLLED RECORDING APPARATUS

Filed May 12, 1948 47 Sheets-Sheet 18

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 19

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D Hicks
ATTORNEY

SELECTIVELY CONTROLLED RECORDING APPARATUS

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 22

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 23

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

SELECTIVELY CONTROLLED RECORDING APPARATUS

FIG. 45

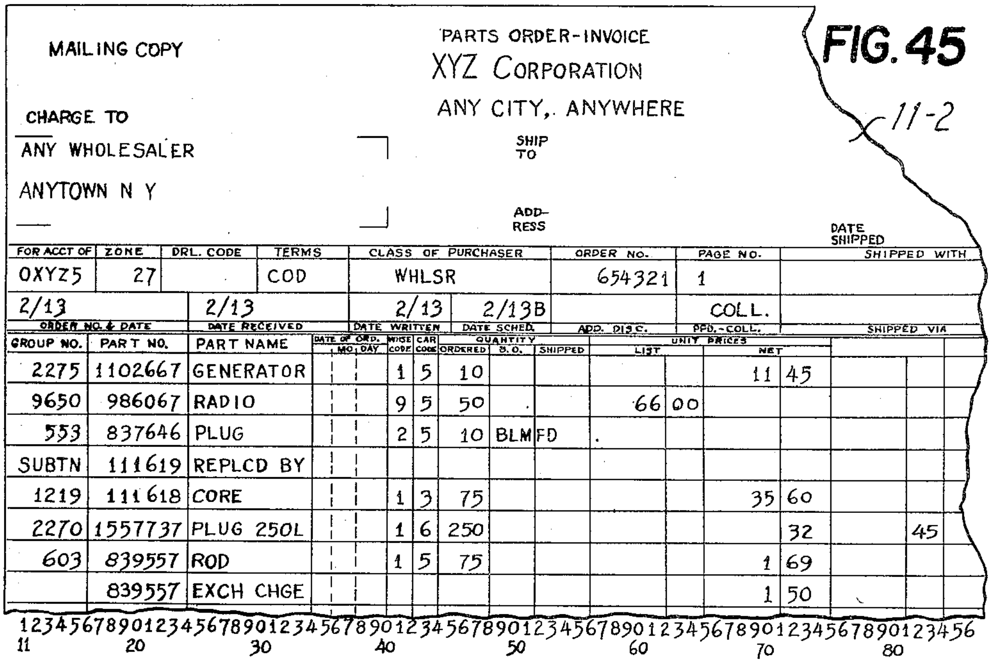

MAILING COPY

PARTS ORDER-INVOICE
XYZ CORPORATION
ANY CITY, ANYWHERE

CHARGE TO
ANY WHOLESALER
ANYTOWN N Y

SHIP TO ADDRESS

DATE SHIPPED

| FOR ACCT OF | ZONE | DRL. CODE | TERMS | CLASS OF PURCHASER | ORDER NO. | PAGE NO. | SHIPPED WITH |
|---|---|---|---|---|---|---|---|
| OXYZ5 | 27 | | COD | WHLSR | 654321 | 1 | |

| ORDER NO. & DATE | DATE RECEIVED | DATE WRITTEN | DATE SCHED. | ADD. DISC. | PPD.-COLL. | SHIPPED VIA |
|---|---|---|---|---|---|---|
| 2/13 | 2/13 | 2/13 | 2/13B | | COLL. | |

| GROUP NO. | PART NO. | PART NAME | DATE OF ORD. MO. DAY | WHSE CODE | CAR CODE | ORDERED | B.O. | SHIPPED | LIST | NET | | |
|---|---|---|---|---|---|---|---|---|---|---|---|---|
| 2275 | 1102667 | GENERATOR | | 1 | 5 | 10 | | | | 11 45 | | |
| 9650 | 986067 | RADIO | | 9 | 5 | 50 | | | 66 00 | | | |
| 553 | 837646 | PLUG | | 2 | 5 | 10 | BLM | FD | | | | |
| SUBTN | 111619 | REPLCD BY | | | | | | | | | | |
| 1219 | 111618 | CORE | | 1 | 3 | 75 | | | | 35 60 | | |
| 2270 | 1557737 | PLUG 250L | | 1 | 6 | 250 | | | | 32 | | 45 |
| 603 | 839557 | ROD | | 1 | 5 | 75 | | | | 1 69 | | |
| | 839557 | EXCH CHGE | | | | | | | | 1 50 | | |

1234567890123456789012345678901234567890123456789012345678901234567890123456
11 20 30 40 50 60 70 80

11-2

FIG. 46

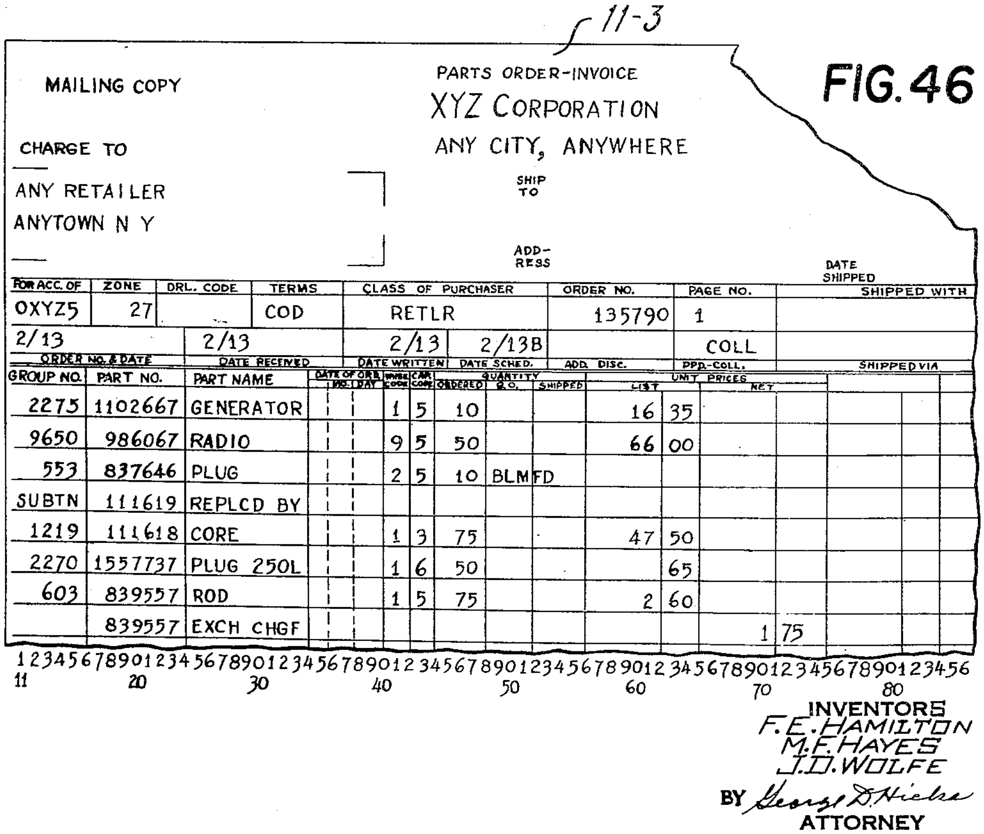

MAILING COPY

PARTS ORDER-INVOICE
XYZ CORPORATION
ANY CITY, ANYWHERE

CHARGE TO
ANY RETAILER
ANYTOWN N Y

SHIP TO ADDRESS

DATE SHIPPED

| FOR ACC. OF | ZONE | DRL. CODE | TERMS | CLASS OF PURCHASER | ORDER NO. | PAGE NO. | SHIPPED WITH |
|---|---|---|---|---|---|---|---|
| OXYZ5 | 27 | | COD | RETLR | 135790 | 1 | |

| ORDER NO. & DATE | DATE RECEIVED | DATE WRITTEN | DATE SCHED. | ADD. DISC. | PPD.-COLL. | SHIPPED VIA |
|---|---|---|---|---|---|---|
| 2/13 | 2/13 | 2/13 | 2/13B | | COLL | |

| GROUP NO. | PART NO. | PART NAME | DATE OF ORD. MO. DAY | WHSE CODE | CAR CODE | ORDERED | B.O. | SHIPPED | LIST | NET | | |
|---|---|---|---|---|---|---|---|---|---|---|---|---|
| 2275 | 1102667 | GENERATOR | | 1 | 5 | 10 | | | 16 35 | | | |
| 9650 | 986067 | RADIO | | 9 | 5 | 50 | | | 66 00 | | | |
| 553 | 837646 | PLUG | | 2 | 5 | 10 | BLM | FD | | | | |
| SUBTN | 111619 | REPLCD BY | | | | | | | | | | |
| 1219 | 111618 | CORE | | 1 | 3 | 75 | | | 47 50 | | | |
| 2270 | 1557737 | PLUG 250L | | 1 | 6 | 50 | | | 65 | | | |
| 603 | 839557 | ROD | | 1 | 5 | 75 | | | 2 60 | | | |
| | 839557 | EXCH CHGF | | | | | | | | 1 75 | | |

1234567890123456789012345678901234567890123456789012345678901234567890123456
11 20 30 40 50 60 70 80

11-3

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE

BY George D. Hicks

ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 27

INVENTORS
F. E. HAMILTON
M. E. HAYES
J. D. WOLFE
BY
ATTORNEY

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 30

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 31

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

SELECTIVELY CONTROLLED RECORDING APPARATUS

Filed May 12, 1948

INVENTORS
F. E. HAMILTON
M. F. HAYES
J. J. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 34

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 39

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 40

INVENTORS
F. E. HAMILTON
M. E. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 41

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 42

INVENTORS
F. E. HAMILTON
M. E. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 43

INVENTORS
F. E. HAMILTON
M. E. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 44

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 45

INVENTORS
F. E. HAMILTON
M. F. HAYES
J. D. WOLFE
BY George D. Hicks
ATTORNEY

Jan. 30, 1951 F. E. HAMILTON ET AL 2,540,030

SELECTIVELY CONTROLLED RECORDING APPARATUS

Filed May 12, 1948 47 Sheets-Sheet 46

INVENTORS
F. E. HAMILTON
M. E. HAYES
J. D. WOLFE
BY George D. Hicks
ATTORNEY

SELECTIVELY CONTROLLED RECORDING APPARATUS

INVENTORS
F. E. HAMILTON
M. F. HAYES
J. D. WOLFE
BY George D. Hicks
ATTORNEY

Patented Jan. 30, 1951 2,540,030

UNITED STATES PATENT OFFICE 2,540,030

SELECTIVELY CONTROLLED RECORDING APPARATUS

Francis E. Hamilton, Endicott, Maxwell F. Hayes, Poughkeepsie, and John D. Wolfe, Johnson City, N. Y., assignors to International Business Machines Corporation, New York, N. Y., a corporation of New York Application May 12, 1948, Serial No. 26,624

22 Claims. (Cl. 197—20)

This invention relates to new and useful improvements in record controlled recording apparatus of the type disclosed in our copending application, Serial No. 6,664, filed February 6, 1948.

Like the apparatus disclosed in our copending application, the preferred embodiment of the present invention which is disclosed herein, provides for automatically recording selected data in a predetermined fashion on one or more copy sheets, which data has been previously recorded in source records and which has been previously stored in a manually operable data storage unit. As will presently appear, the source records are disclosed herein as being conventional statistical record cards used in the electric accounting machine art. Both alphabetic and numeric data are recorded in record columns of the cards as code designations in accordance with a well known 12-position code system. The source record cards may also contain data designations calling for certain functional operations of the apparatus such, for example, as carriage return and skipping operations. The storage unit is a relay storage unit in which numeric data is stored by the manipulation of a keyboard. The recording part of the apparatus is shown as comprising a first and a second typewriter and a 5-position tape punch. The overall control of the apparatus is effected by a program sequencing means which comprises generally an endless program tape having columns containing program designations for effecting selective operations of the several units of the apparatus according to a predetermined plan.

Also, like the apparatus disclosed in the copending application referred to, the preferred embodiment of the present invention may be used in a wide variety of ways. Herein, the preferred embodiment is described as being used as a part of a composite billing and stock control system wherein the statistical record cards bear code designations identifying customers and their respective accounts and designations representing stocked items or parts ordered by customers and also bear designations representing different types of price data relating to the parts ordered. The data identifying a customer and his account is recorded in a master or heading card, and the data relating to each ordered item or part is recorded in a separate price or detail card. In the operation of the apparatus comprising the preferred embodiment, an invoice is prepared by the first typewriter, and the invoice includes in addition to the name and address of the customer and other data identifying the customer and his account, a listing of the individual parts ordered which may include the part serial number, number of parts ordered, and the price of each part. At the same time, a stock picker tag is prepared by the second typewriter which identifies the customer's order number, the serial number of each ordered part, the location of such part in the seller's warehouse, and the number of such parts ordered. The picker tag may be used by a stock room clerk in withdrawing the parts from stock for filling the customer's order as is common in systems of the type disclosed. Concomitantly with the foregoing, a tape code punch may be operated to record selected portions of the data in a tape. The details of construction and operation of the tape punch are omitted from the present application. The selective control of the apparatus to provide the foregoing operation is effected jointly by predetermined code designations recorded in a program tape and by code designations recorded in the record cards.

A general object of the present invention is to provide apparatus of the general type disclosed in our copending application, which is of improved construction and arrangement of parts and which is capable of being used in a greater variety of applications.

A further object is to provide a new and improved read unit for reading and feeding the source record cards and the program tape.

A further object is to provide a new and more flexible program sequencing means.

A further object is to provide for an improved and more flexible control of the skipping operations of the source record and of the program tape.

A further object is to provide a new and improved class control means which makes possible a greater variety of operating controls for the apparatus which may be used when sensing different classes of source records.

A further object is to provide for the ejecting of one class of source record from the read unit at one preselected point in the program and for the ejecting of a different class of source record at a different and preselected point in the program.

A further object is to provide for stopping the skipping operation of one class of source record in response to one skip-off designation in the program tape and for stopping the skipping operation of another class of record in response to a different skip-off designation in the program tape.

A still further object is to provide control apparatus which, when a skipping operation of the source record and program tape is initiated, provides for stopping the source record at one predetermined point in the program and provides for stopping the program tape at a subsequent predetermined point in the program.

Other objects of the invention will be pointed out in the following description and claims and illustrated in the accompanying drawings, which disclose, by way of example, the principle of the invention and the best mode, which has been contemplated, of applying that principle.

Figure 1:
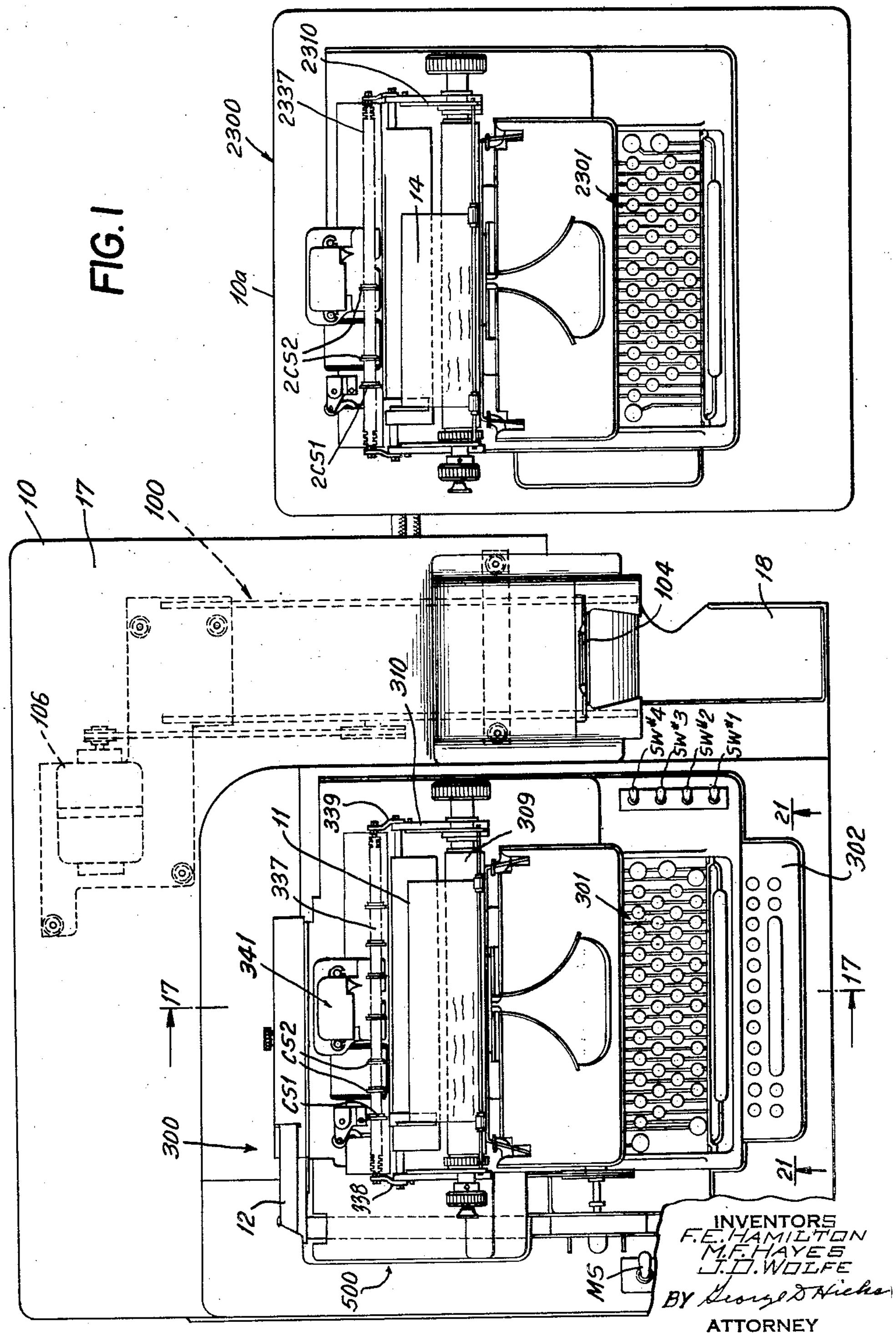
Fig. 1 is a plan view indicating generally the several units forming one preferred embodiment of the present invention.
Figure 2:
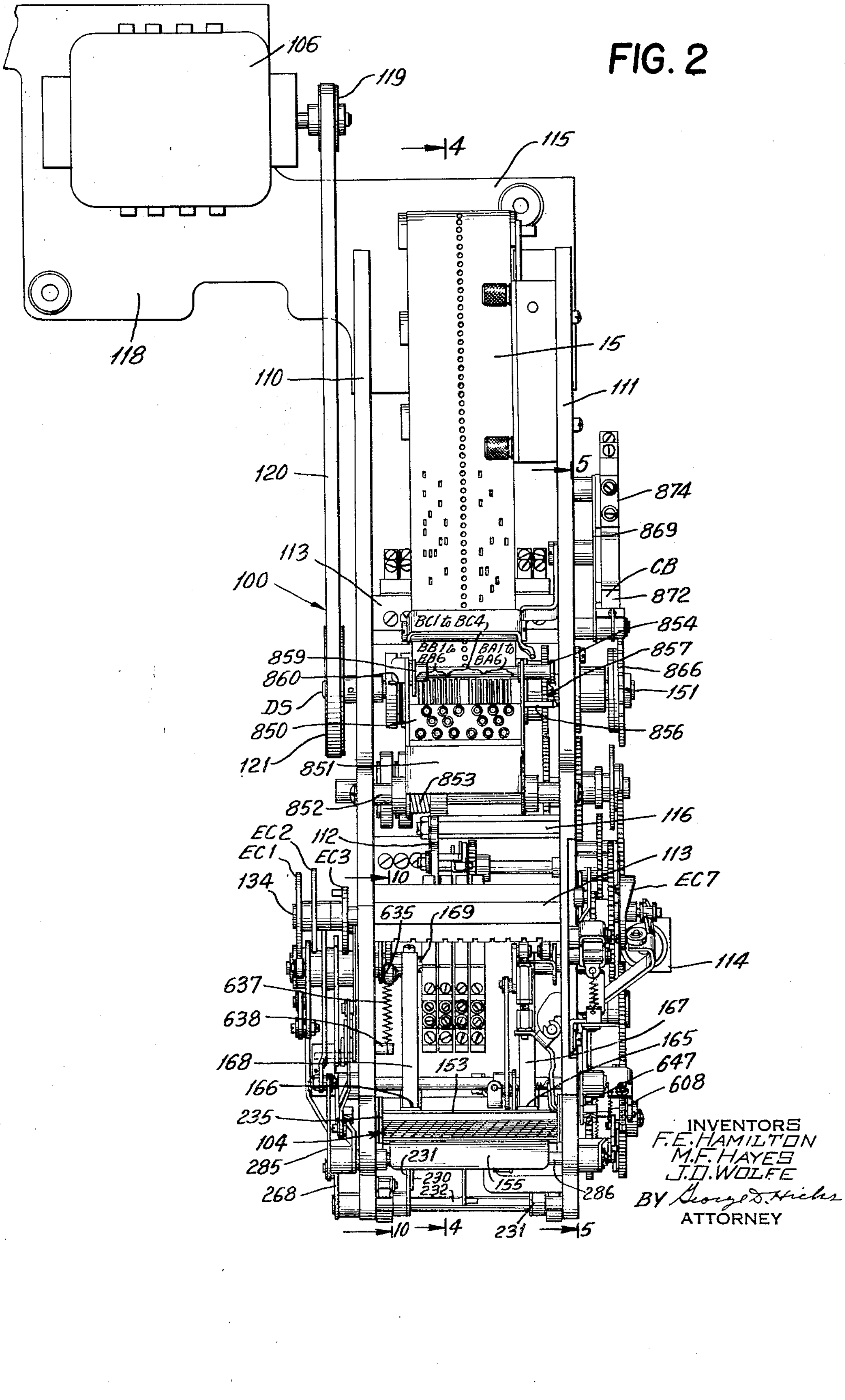
Fig. 2 is a plan view showing the read unit as removed from its supporting desk.
Figure 4A:
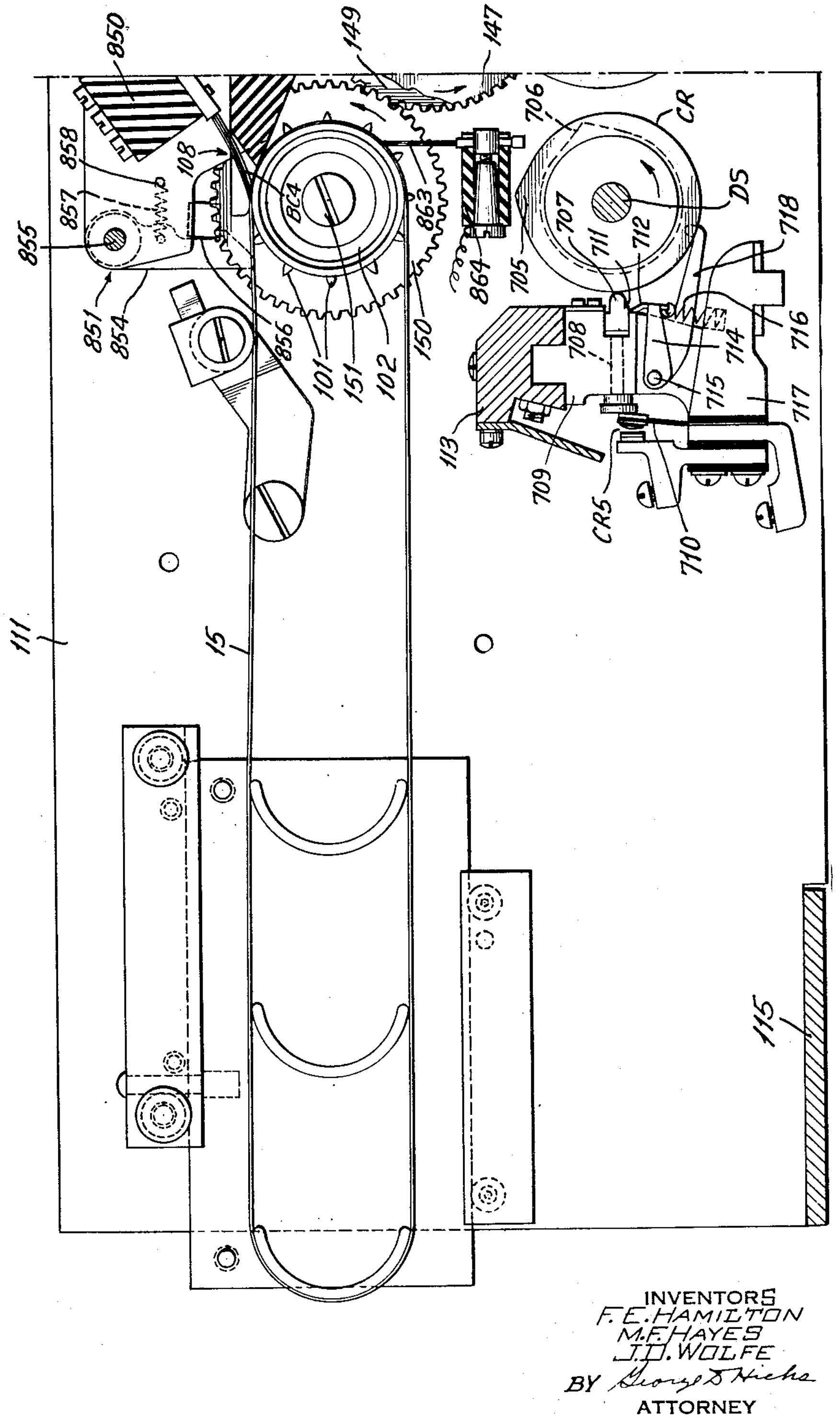
Figure 4B:
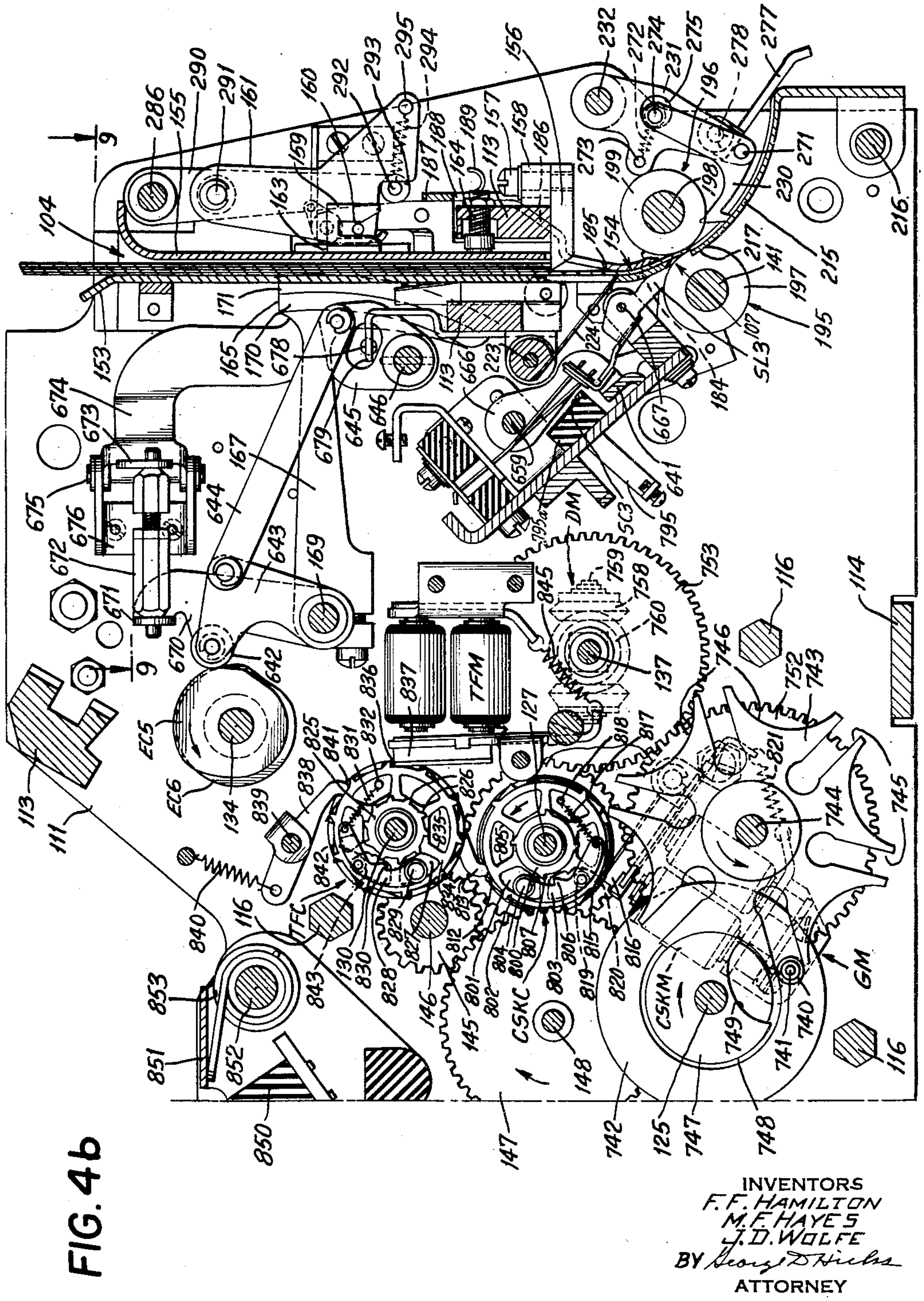
Figure 5:
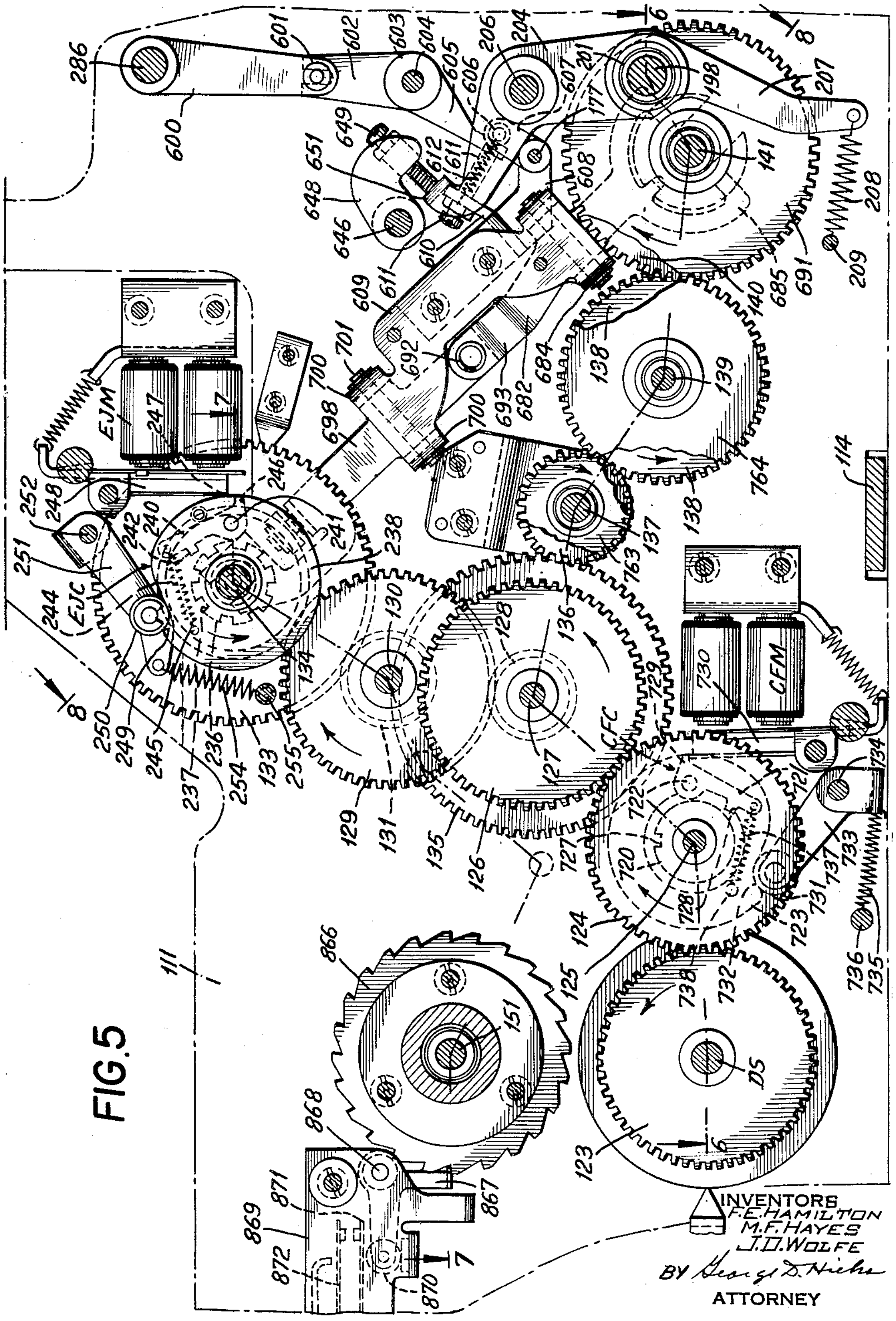
Figure 6:
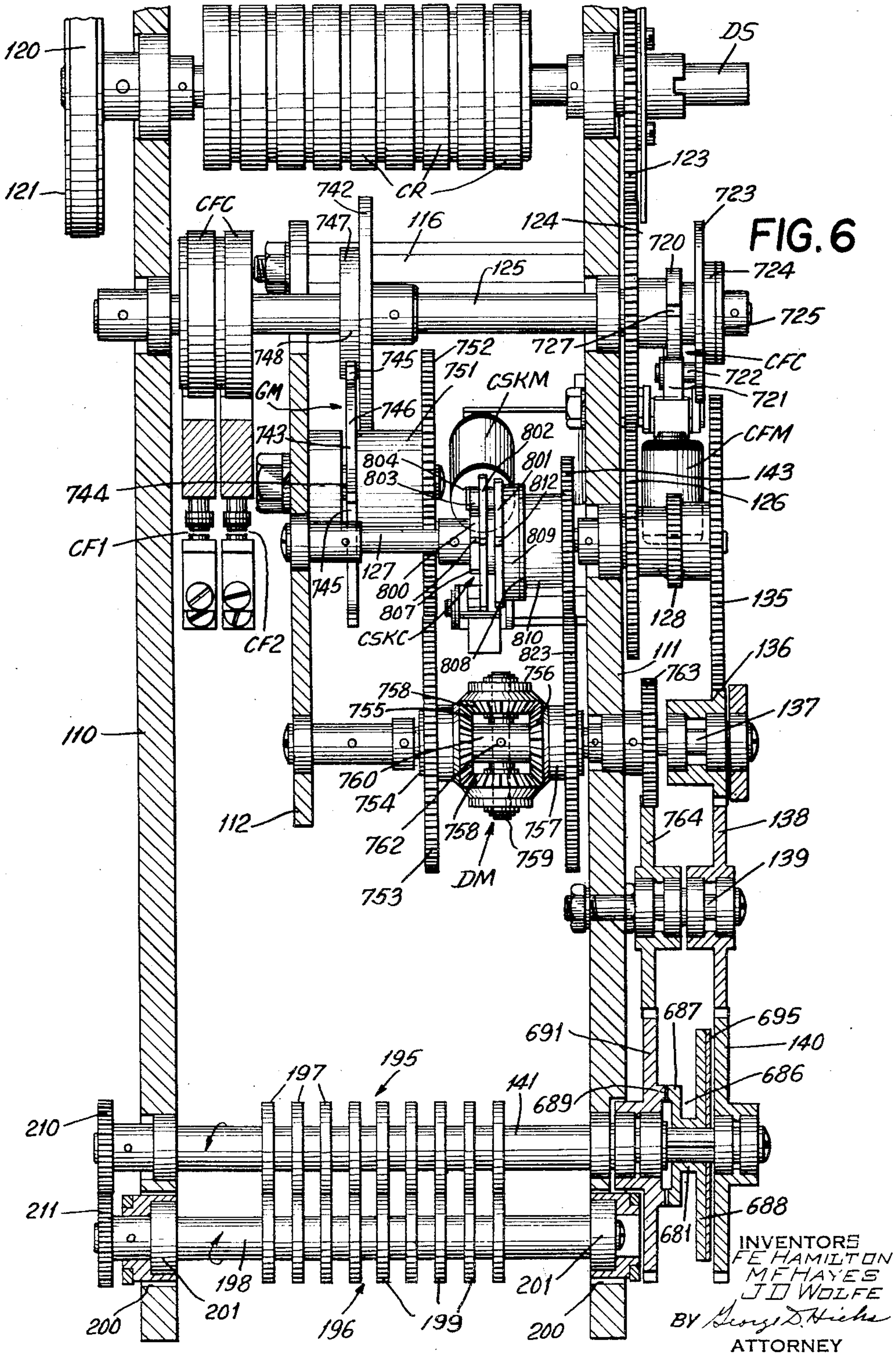
Figure 7:
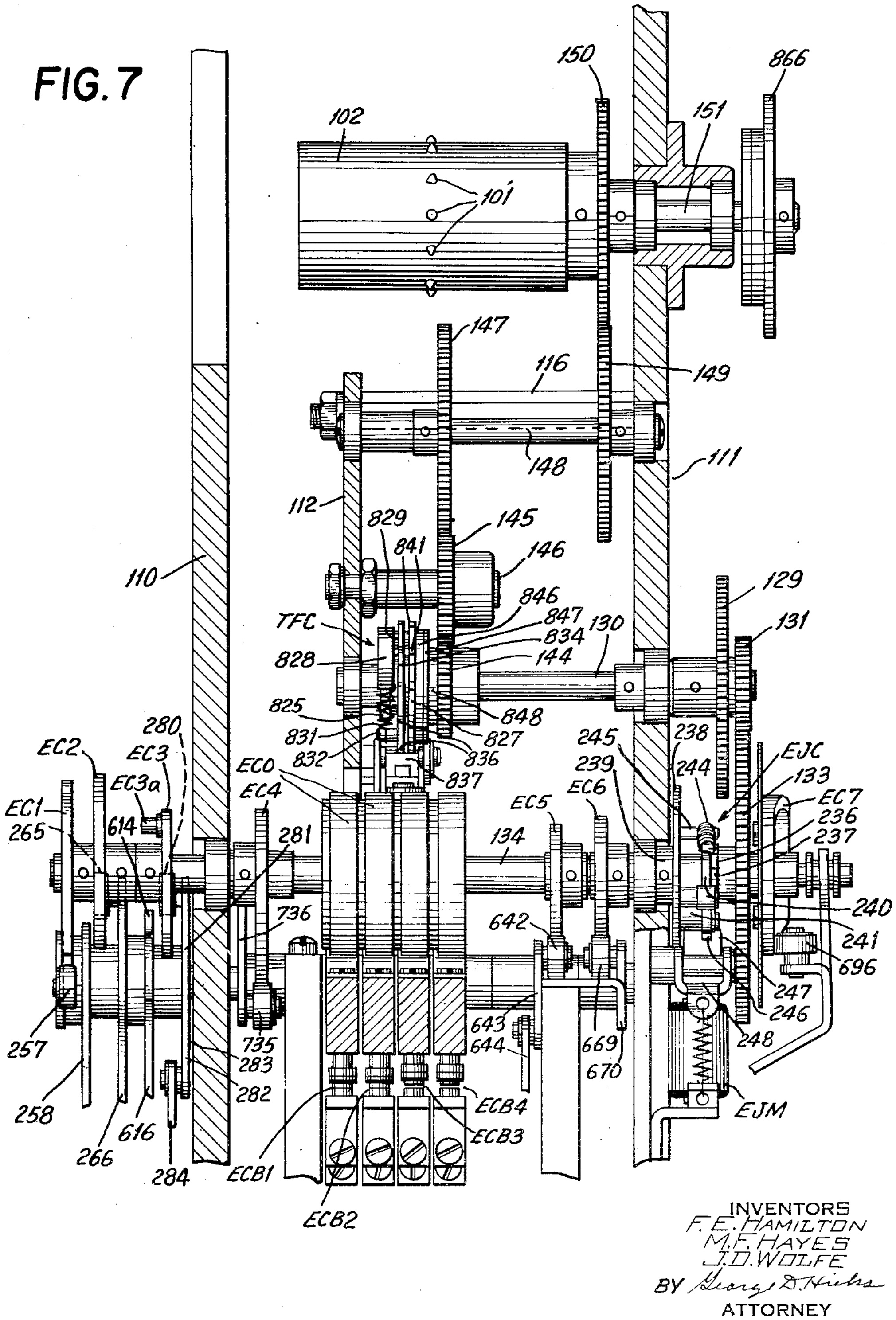
Figures 8, 9:
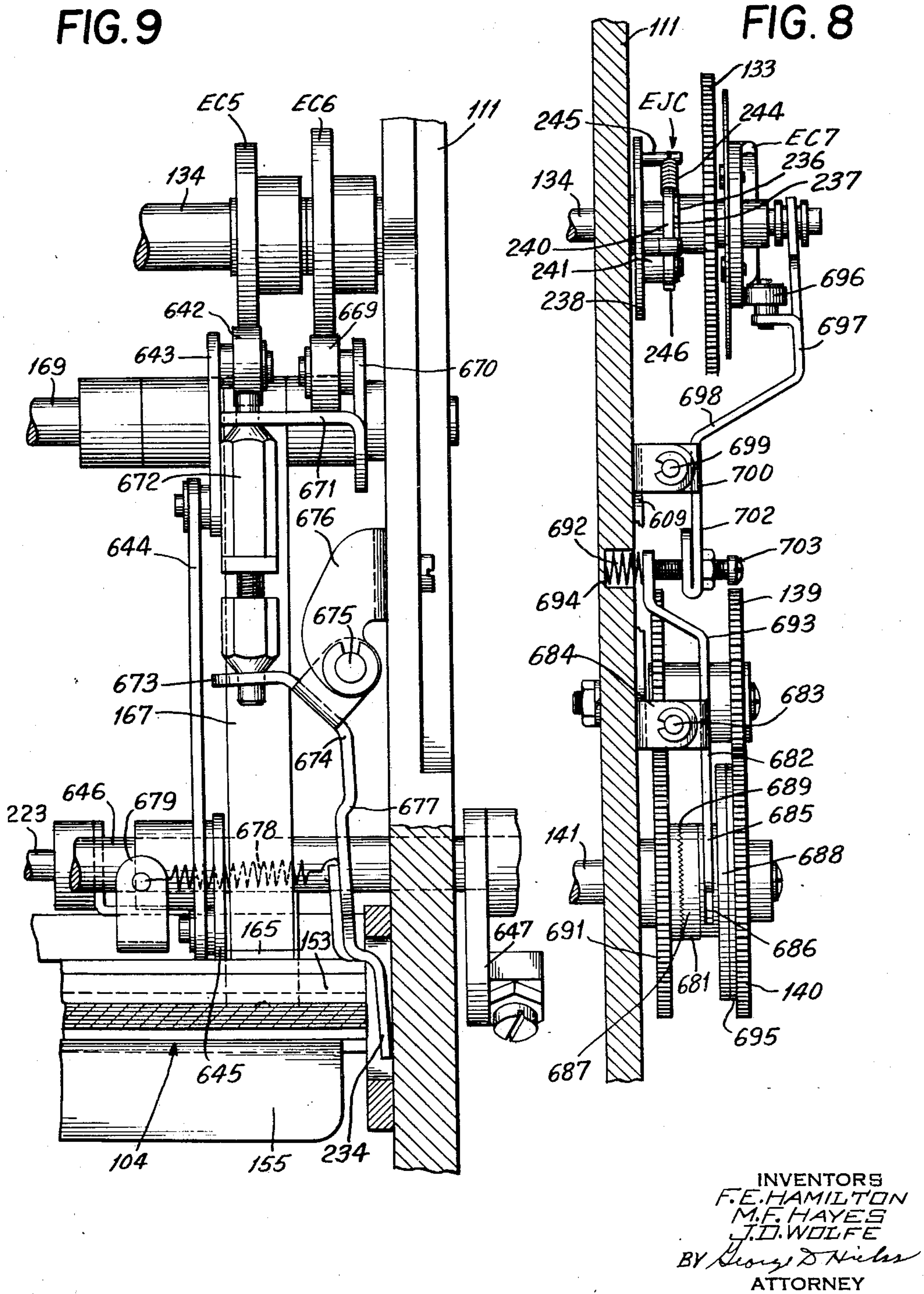
Figures 10, 11:
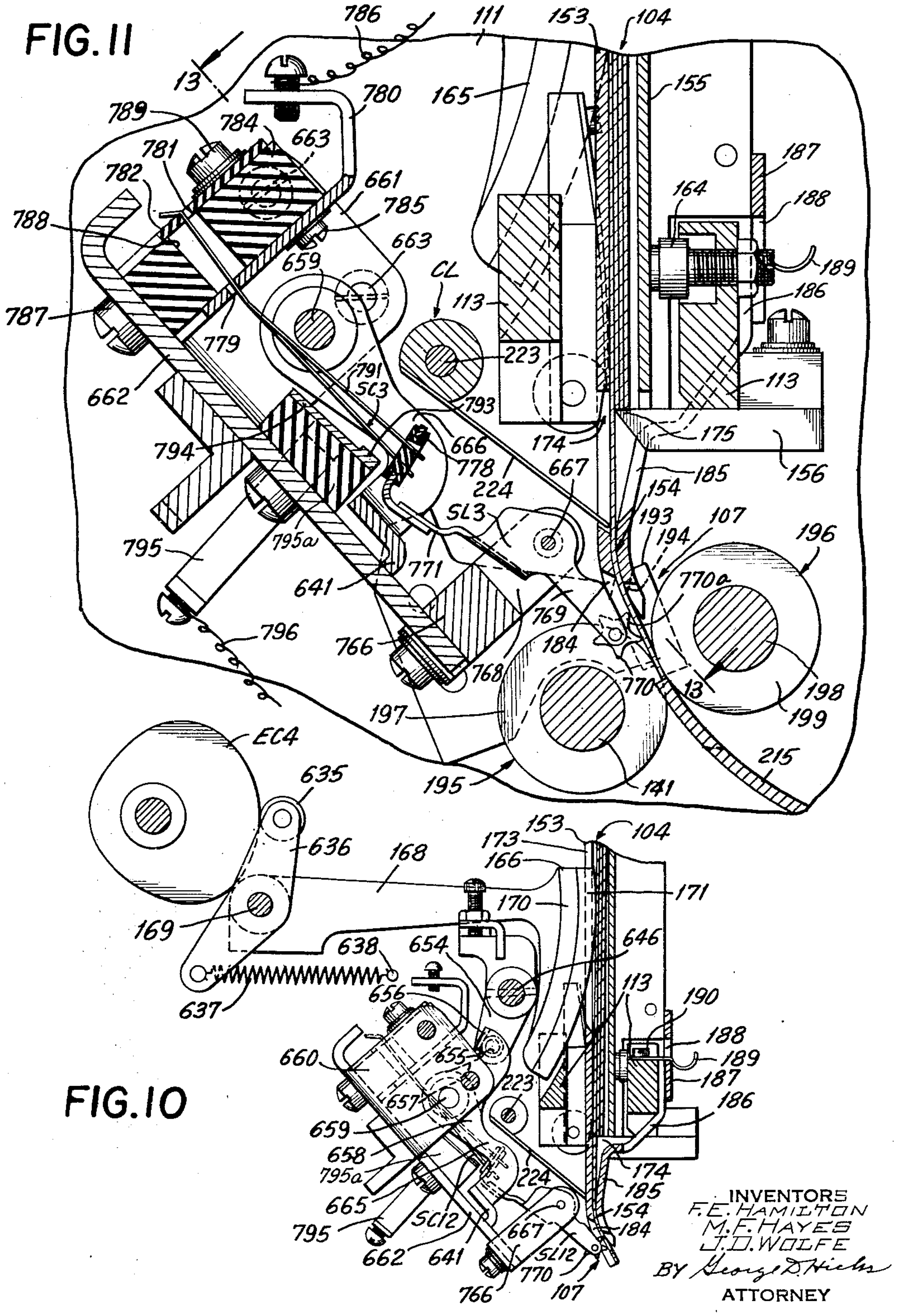
Figures 12, 13:
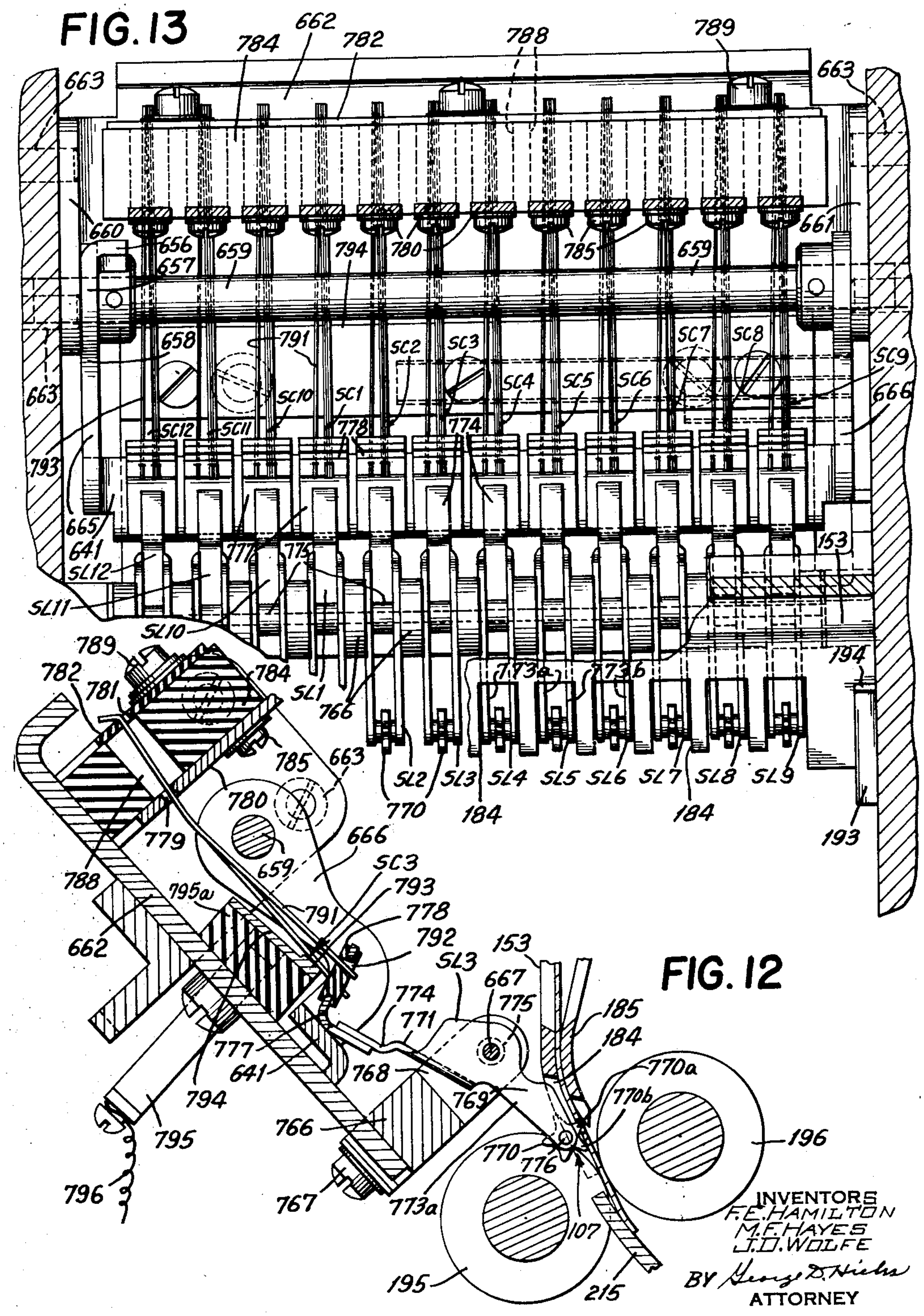
Figures 14, 15:
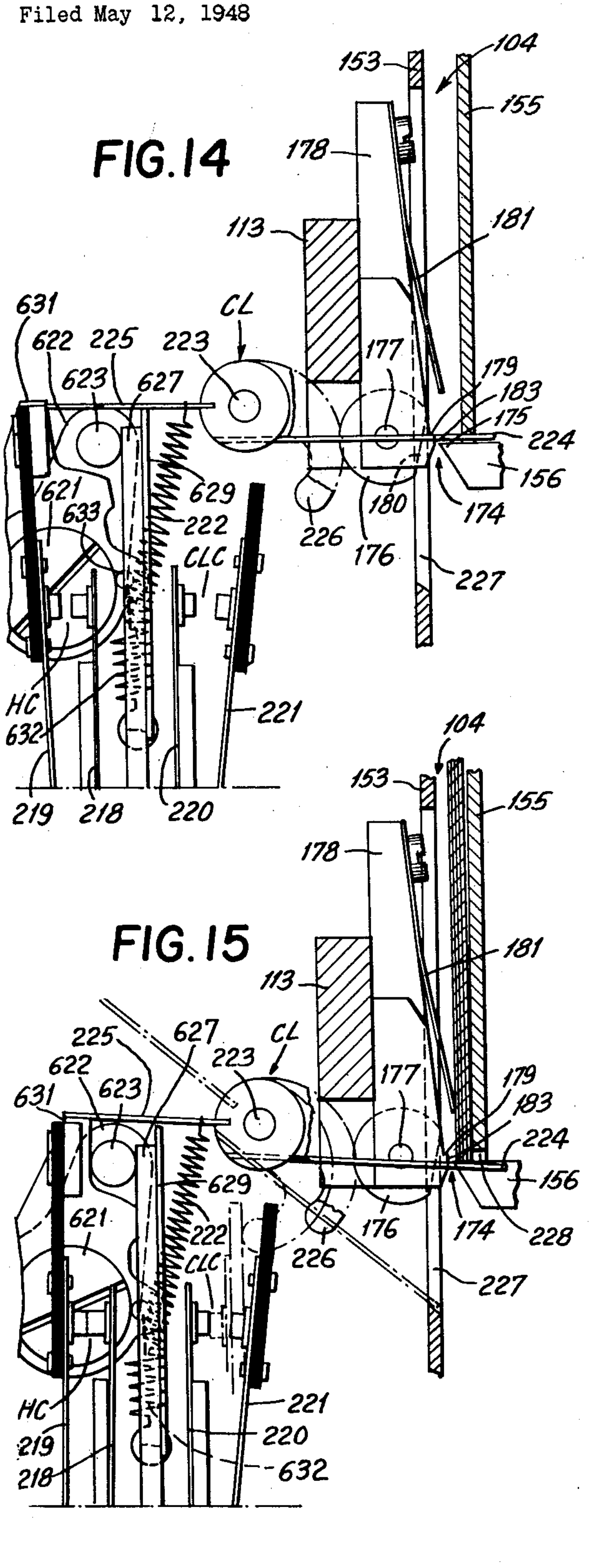
Figure 16:
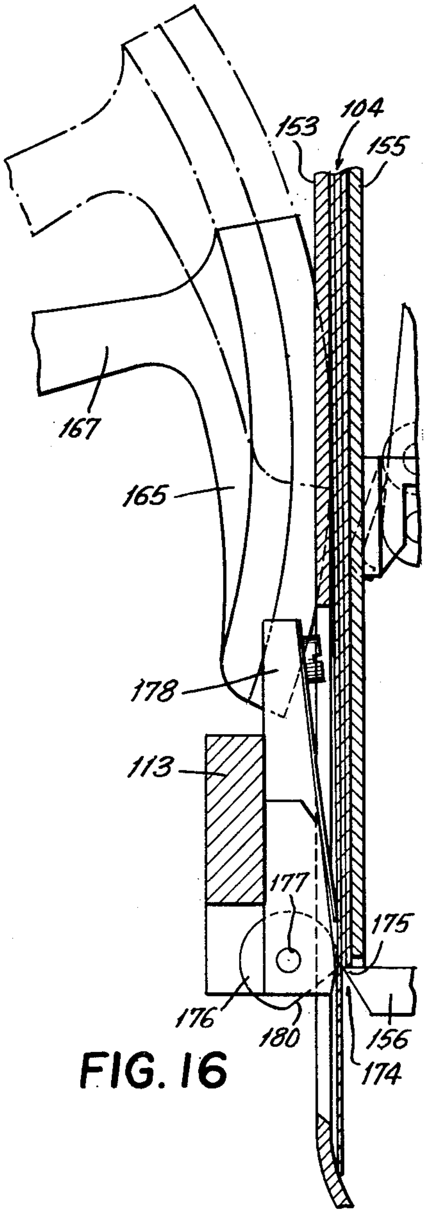
Figure 17:
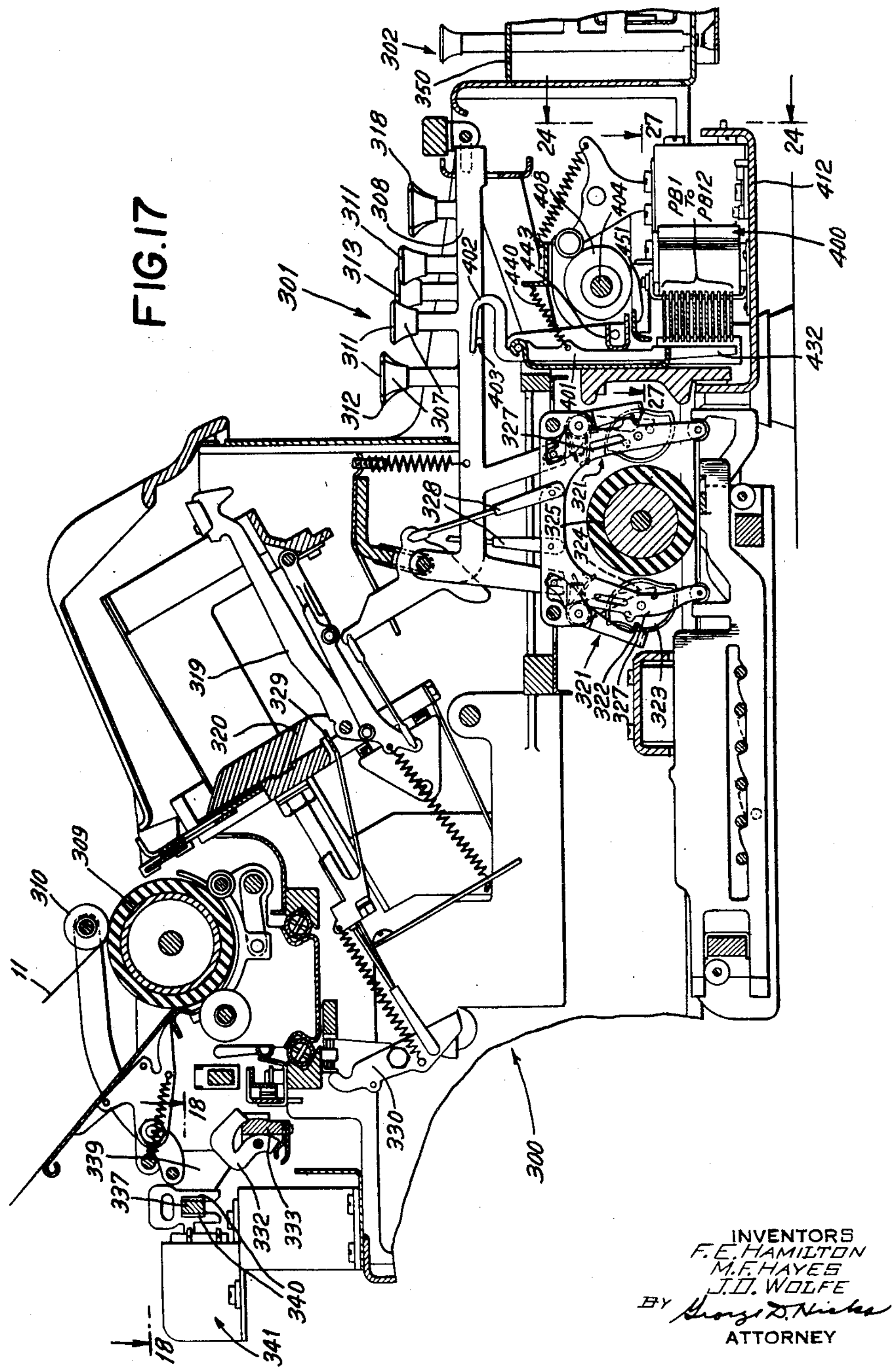
Figures 18, 19:
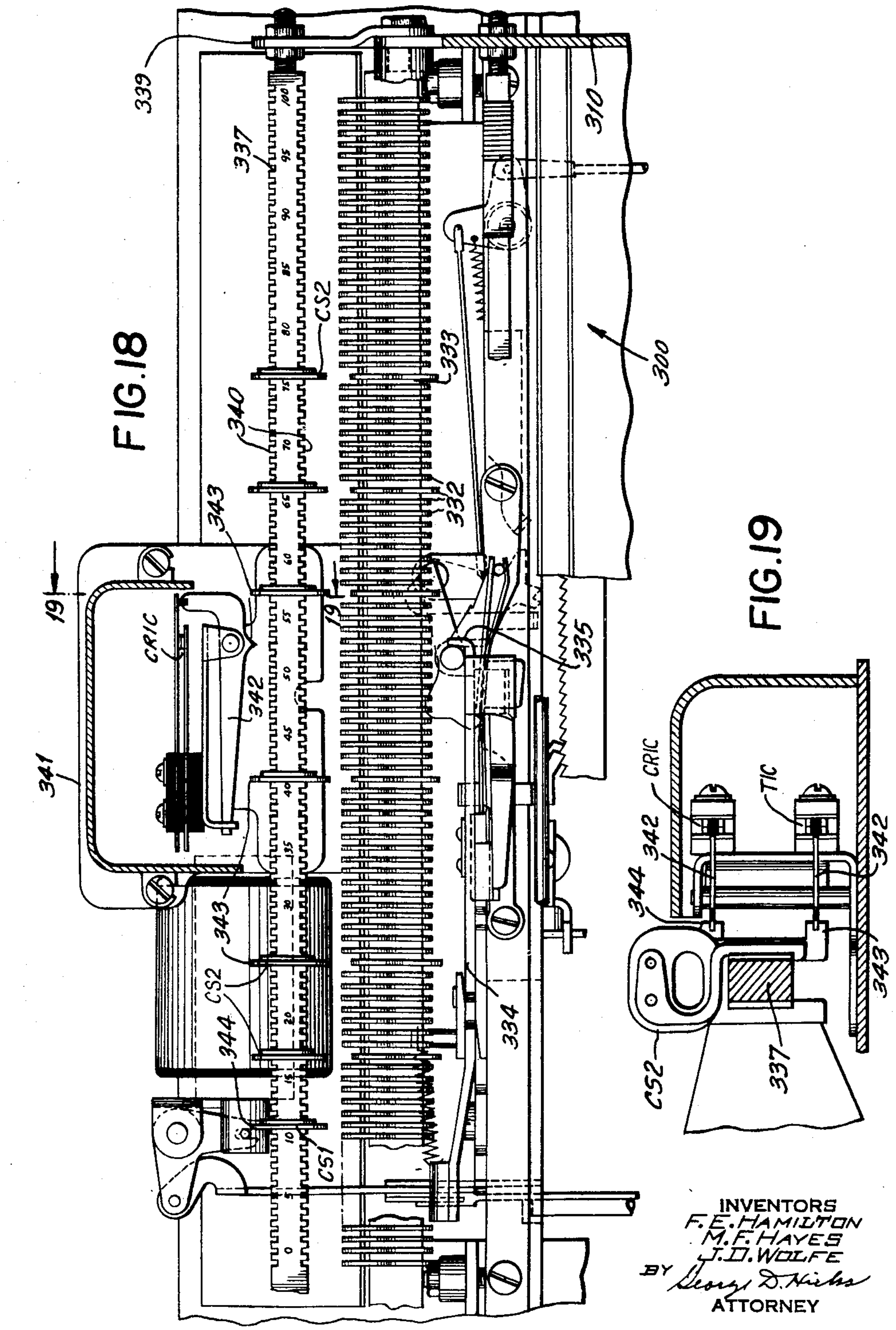
Figure 20:
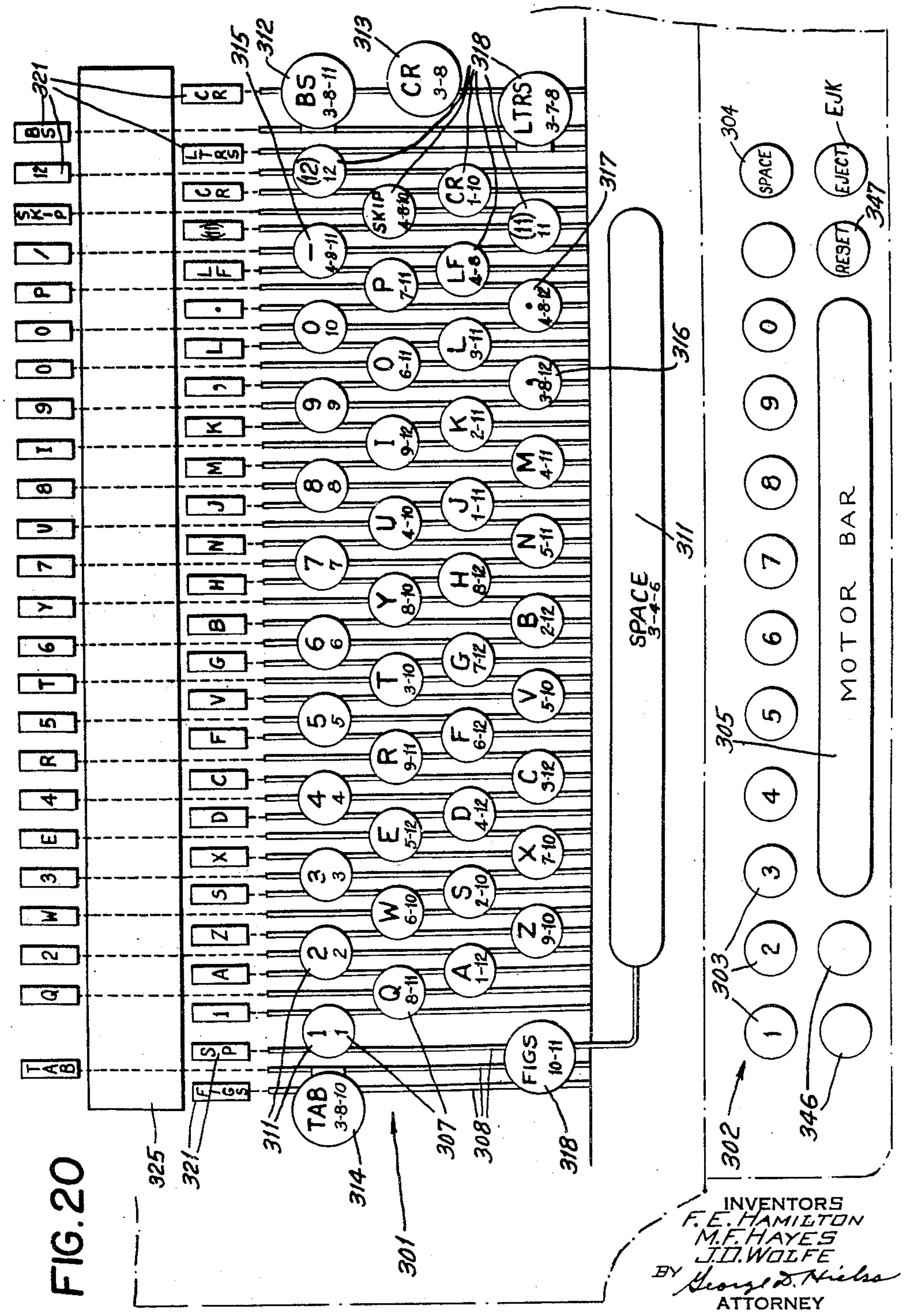
Figures 21, 22, 23:
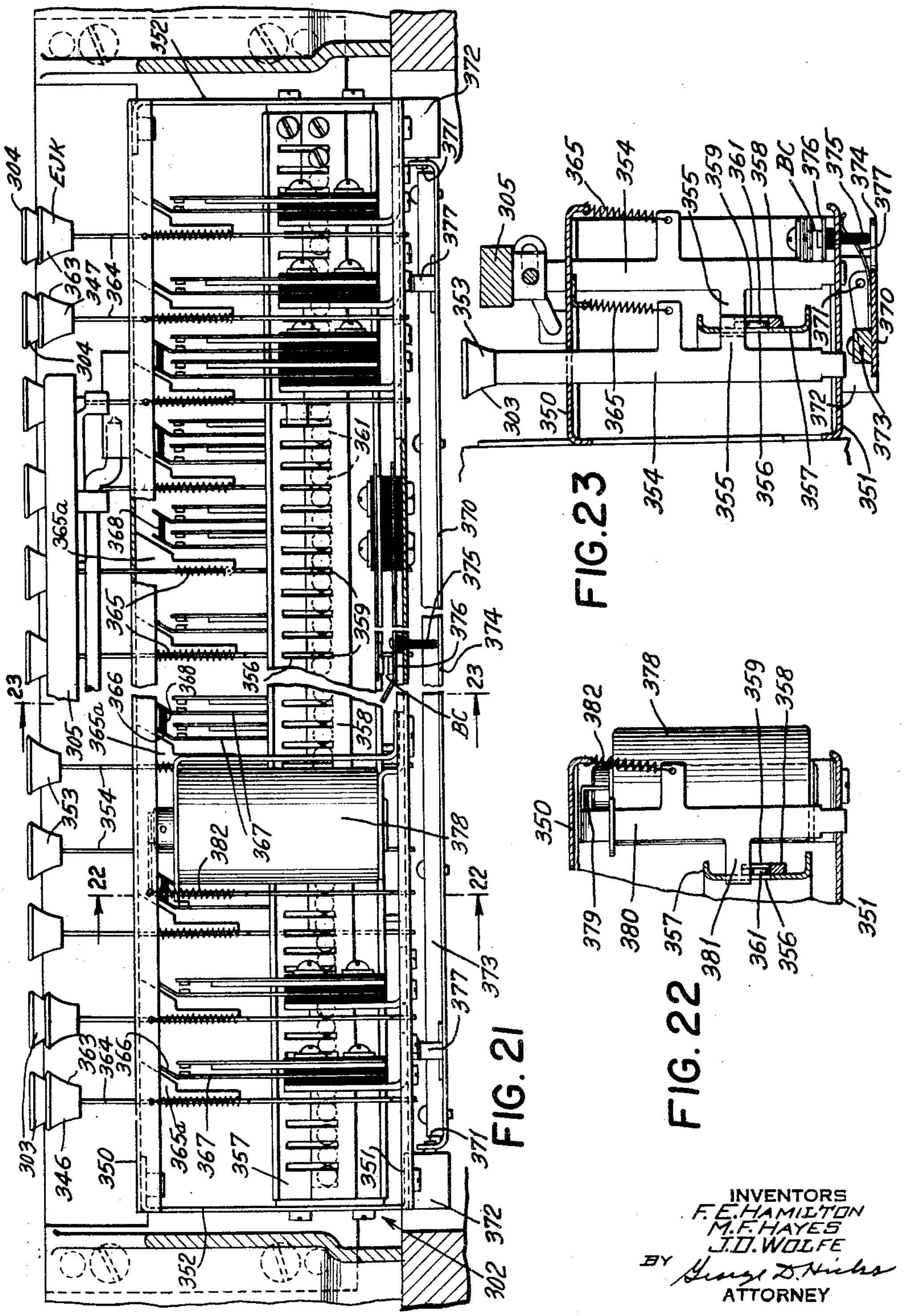
Figure 24:
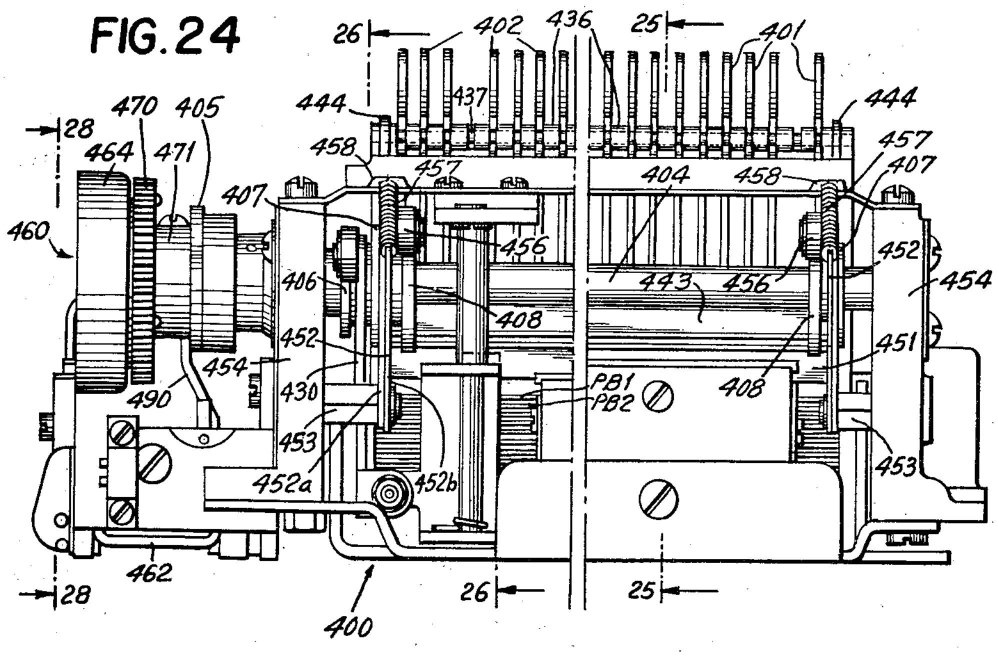
Figures 25, 26:
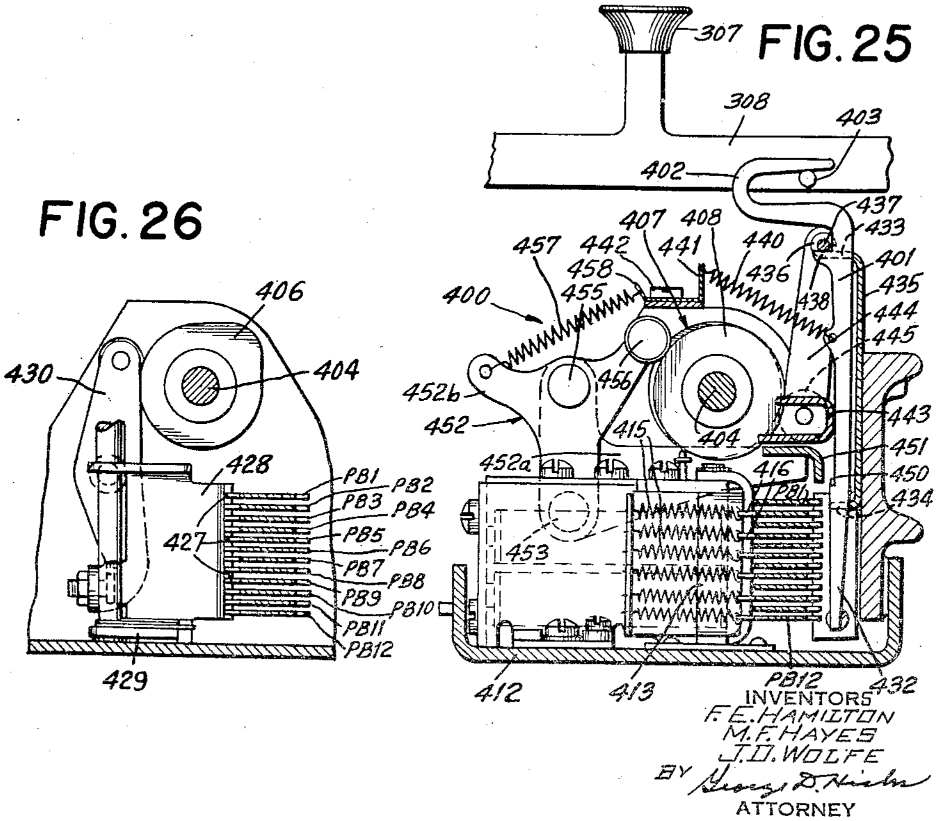
Figures 27, 28:
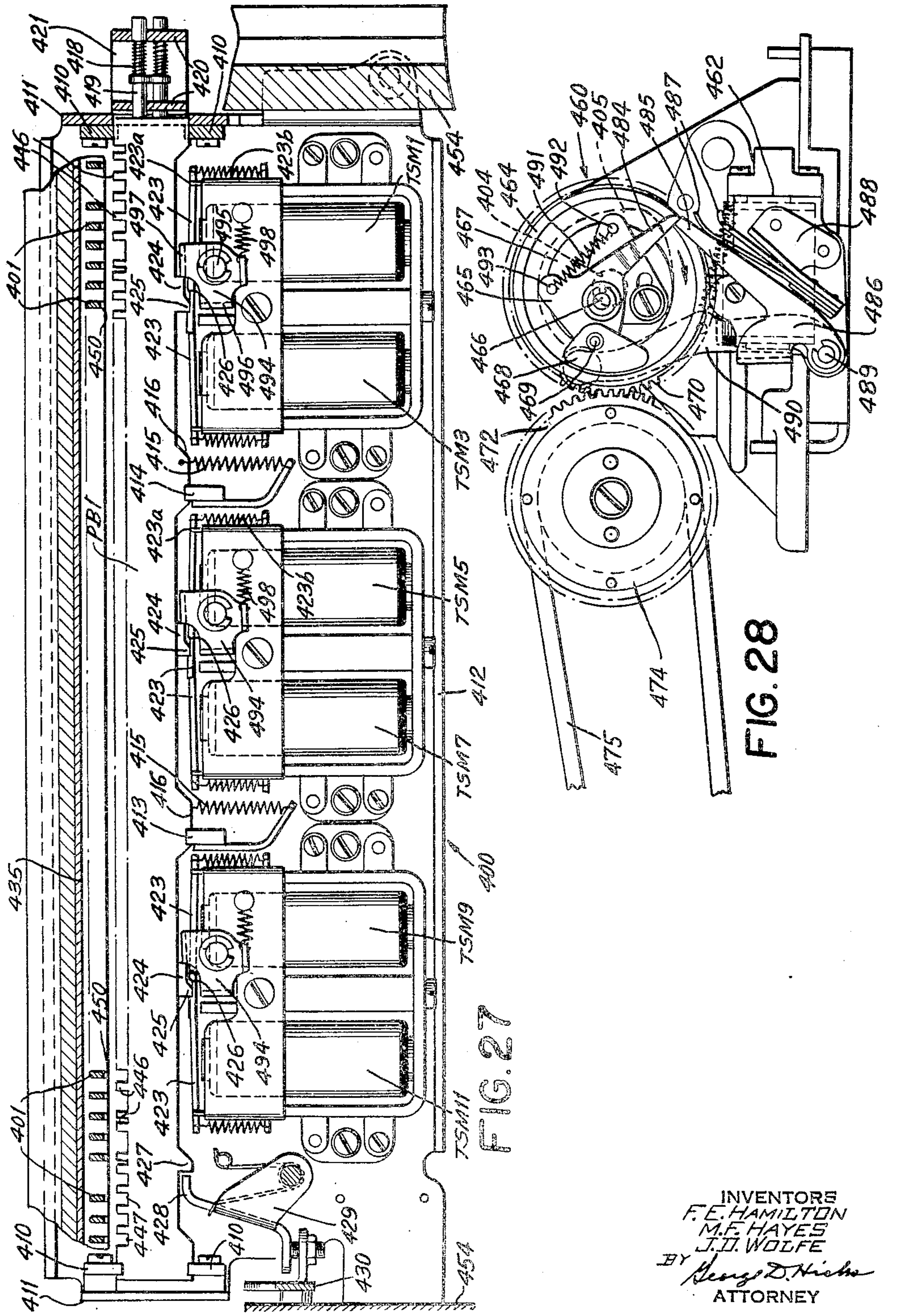
Figures 29, 30:
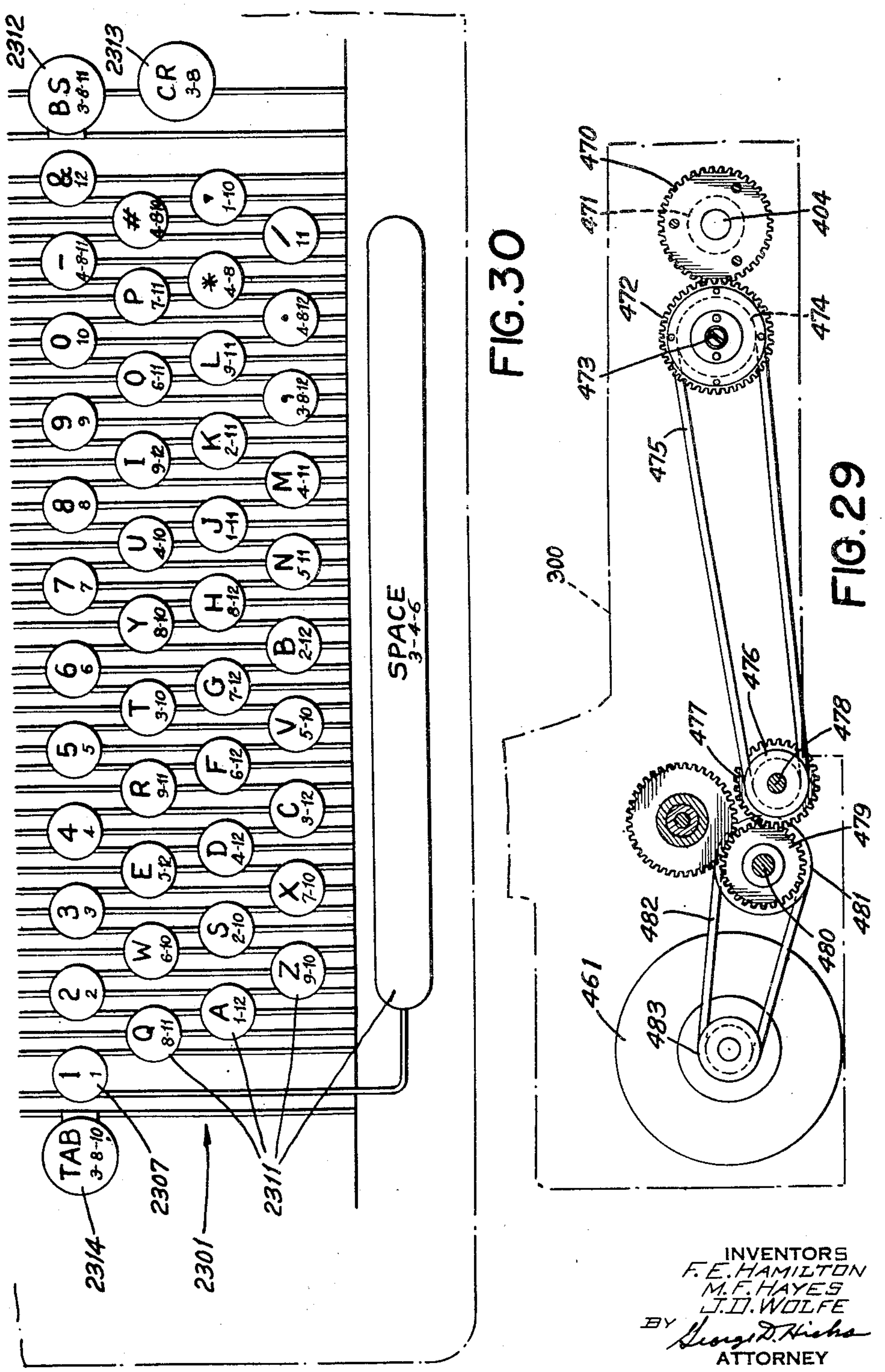
Figure 42:
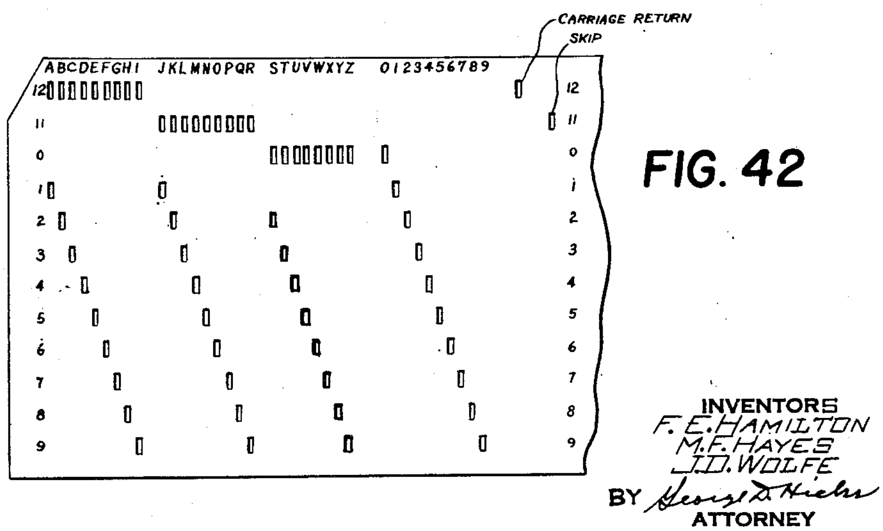
Figure 43:
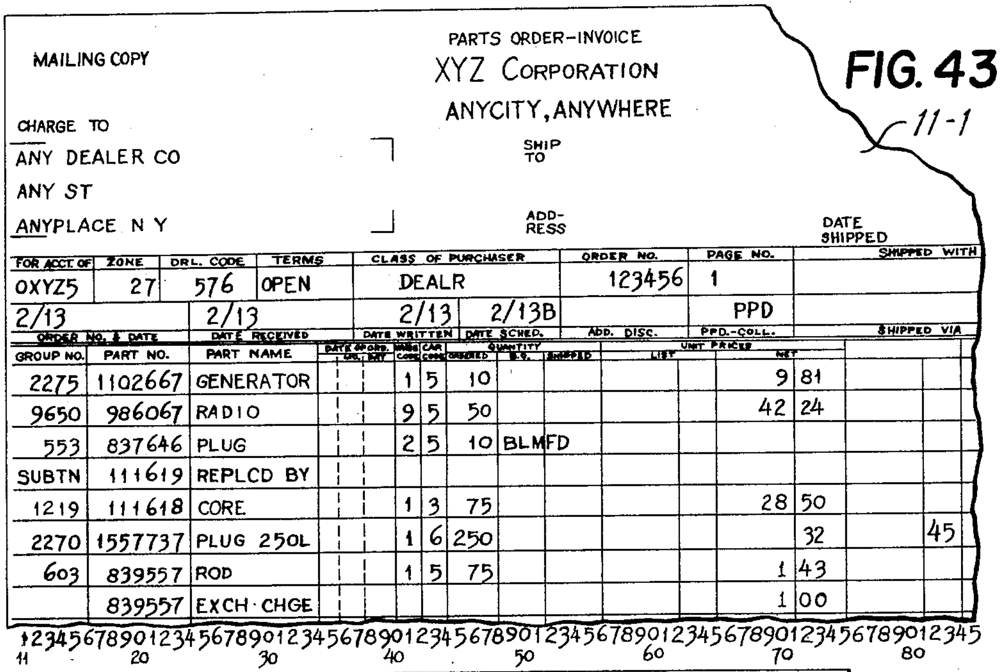
Figure 44:
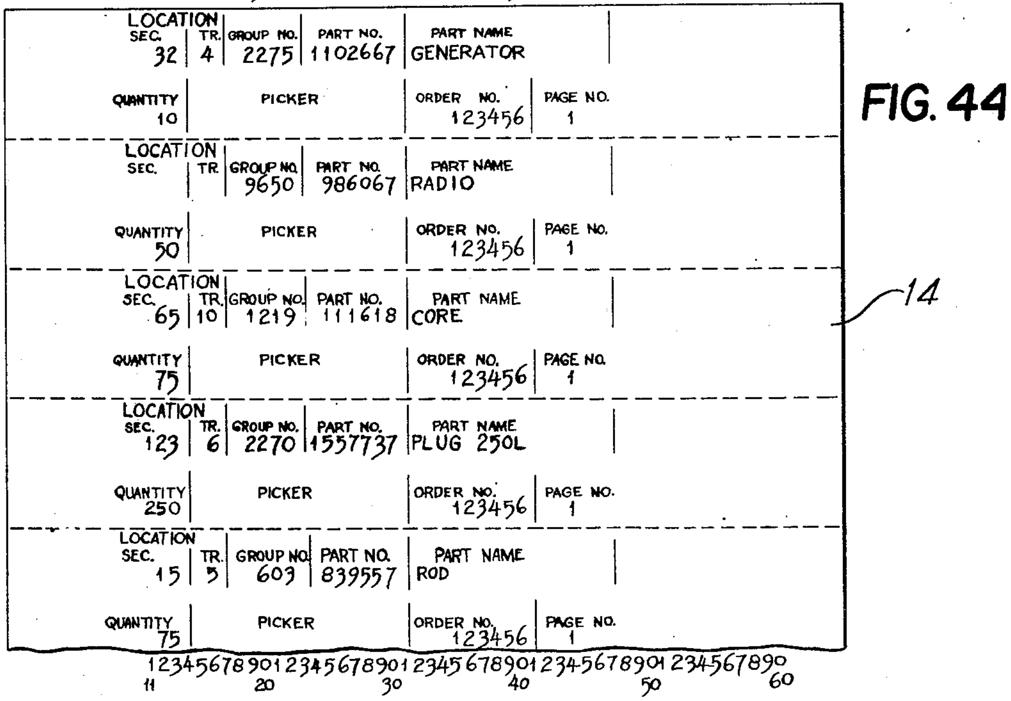
Figure 47:
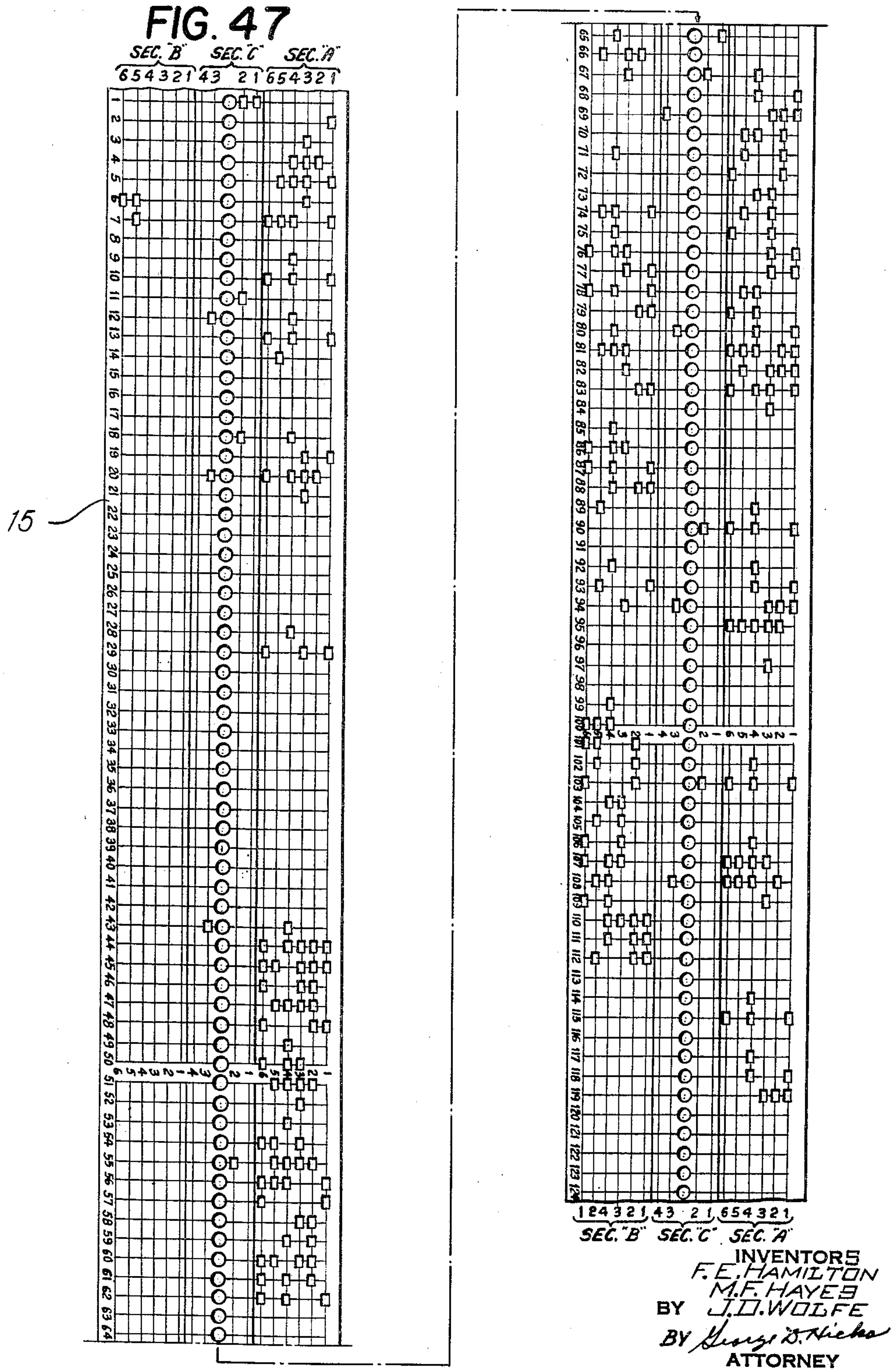
Figure 48:
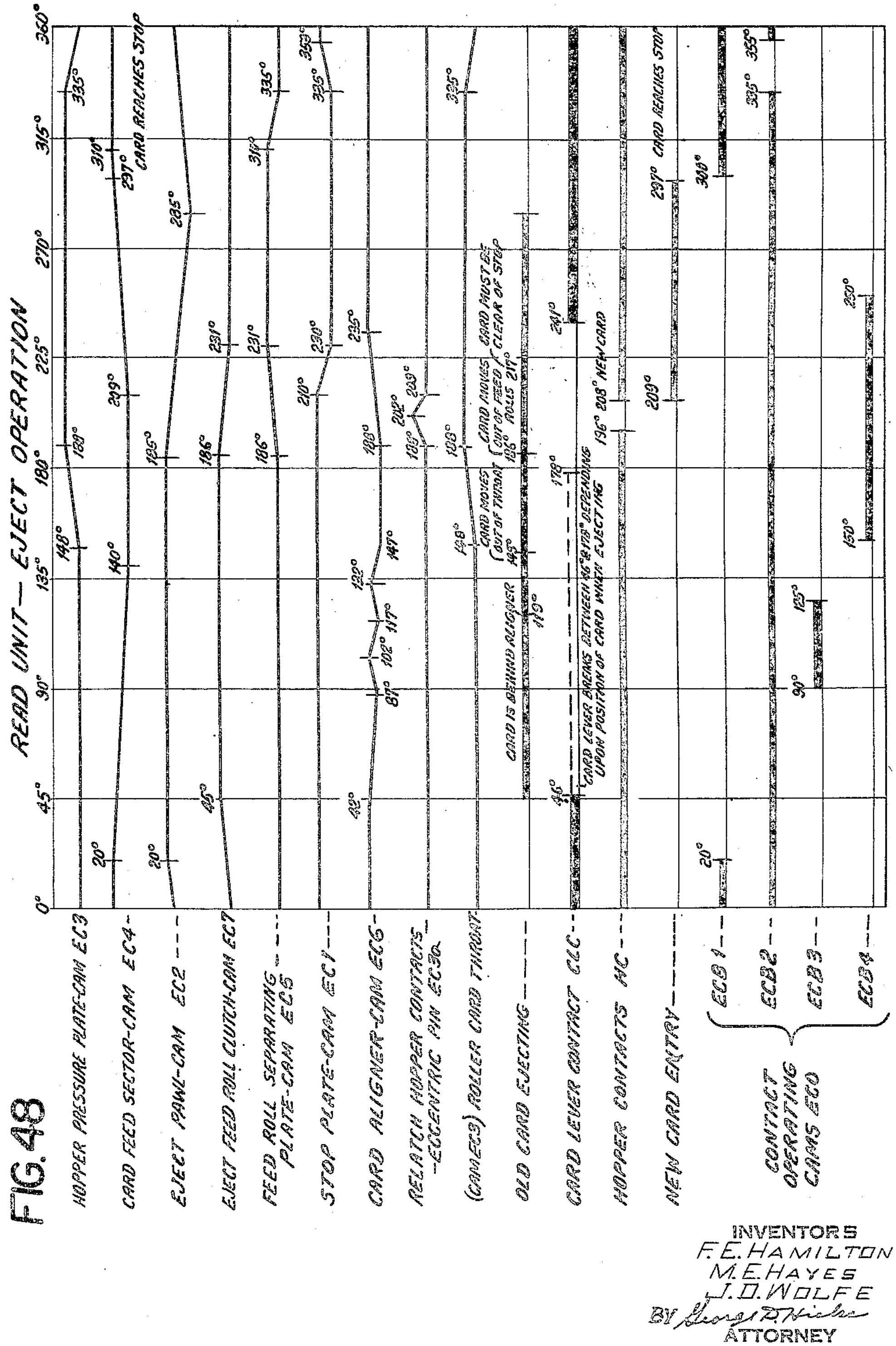
Figure 49:
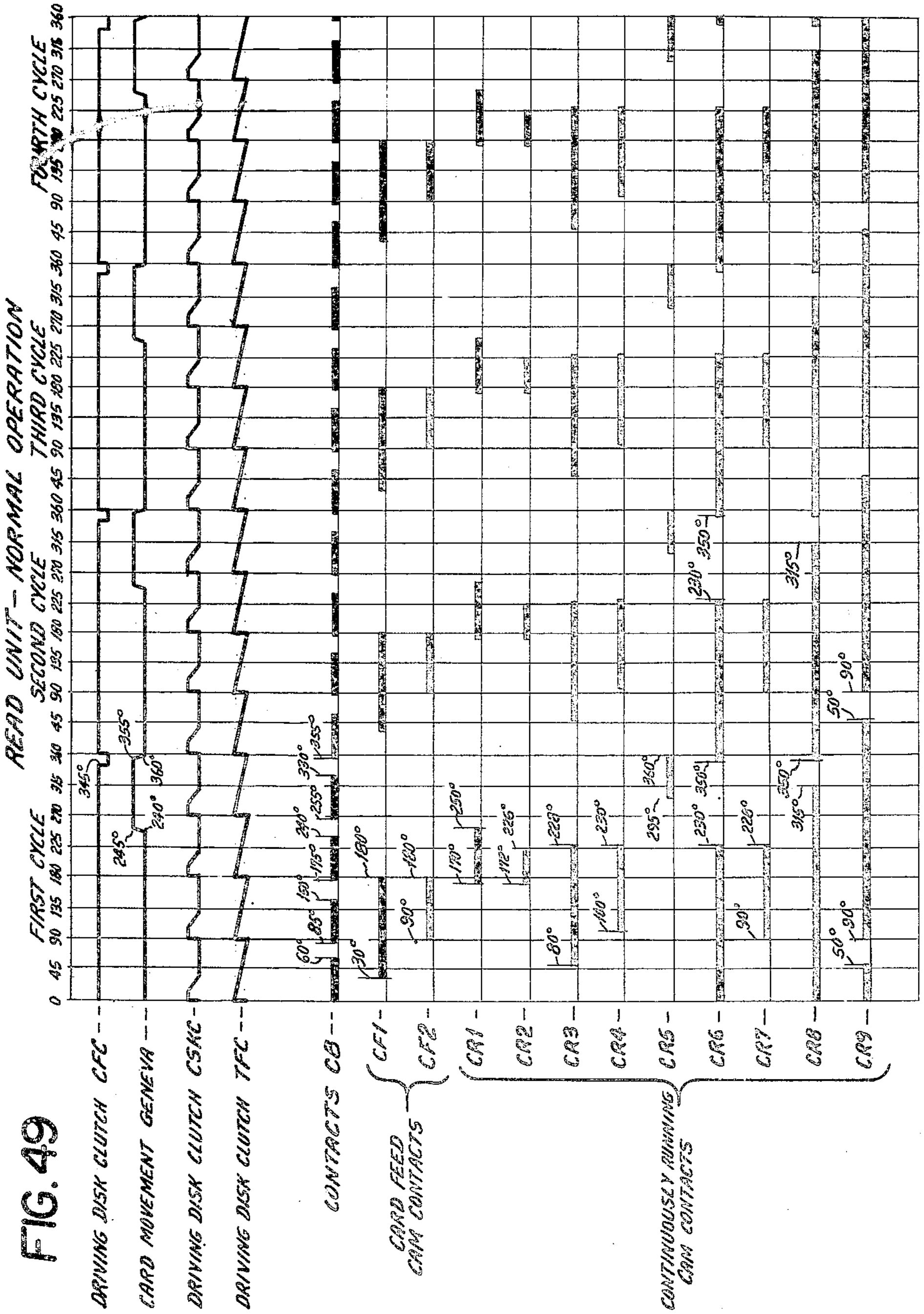
Figure 50A:
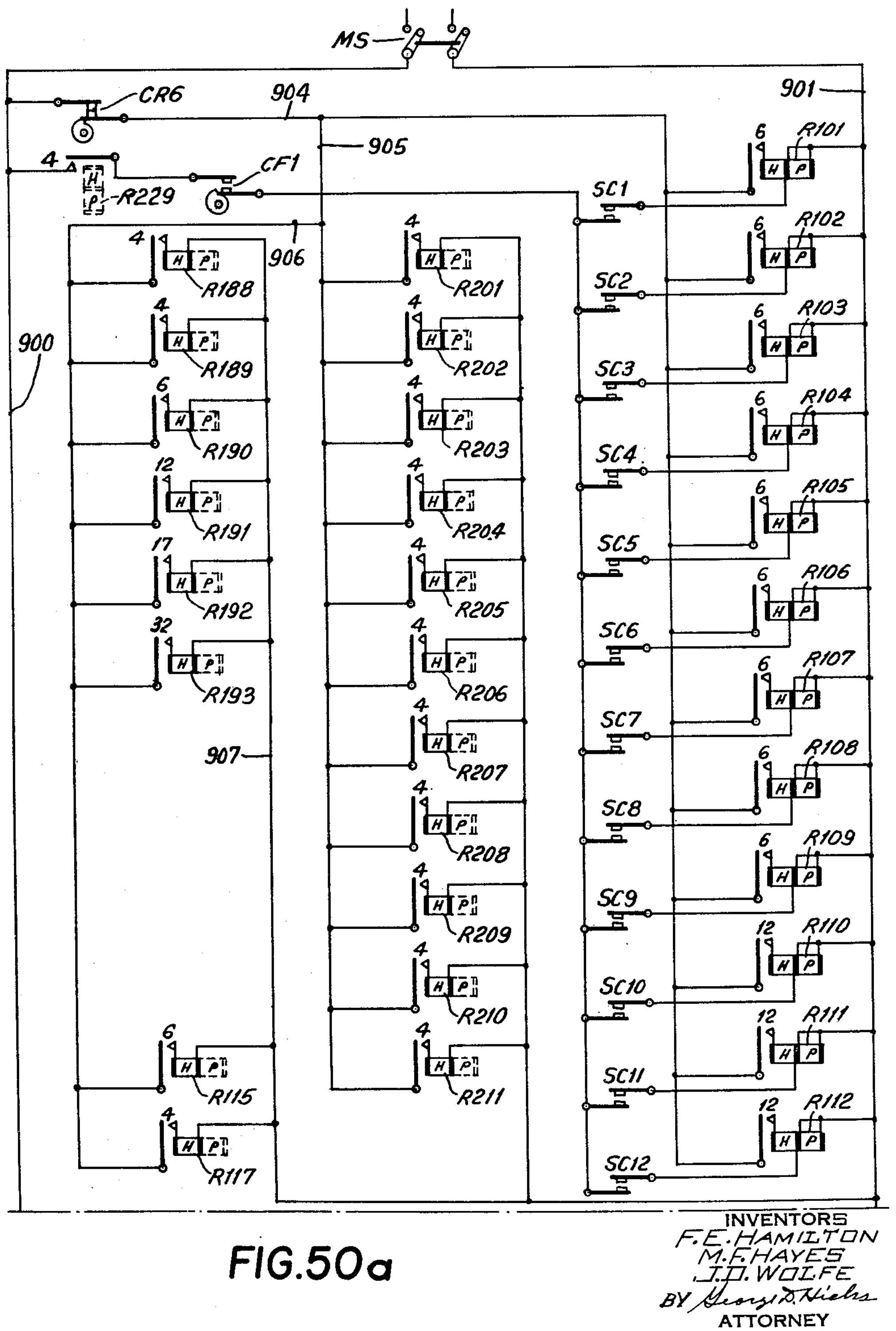
Figure 50B:
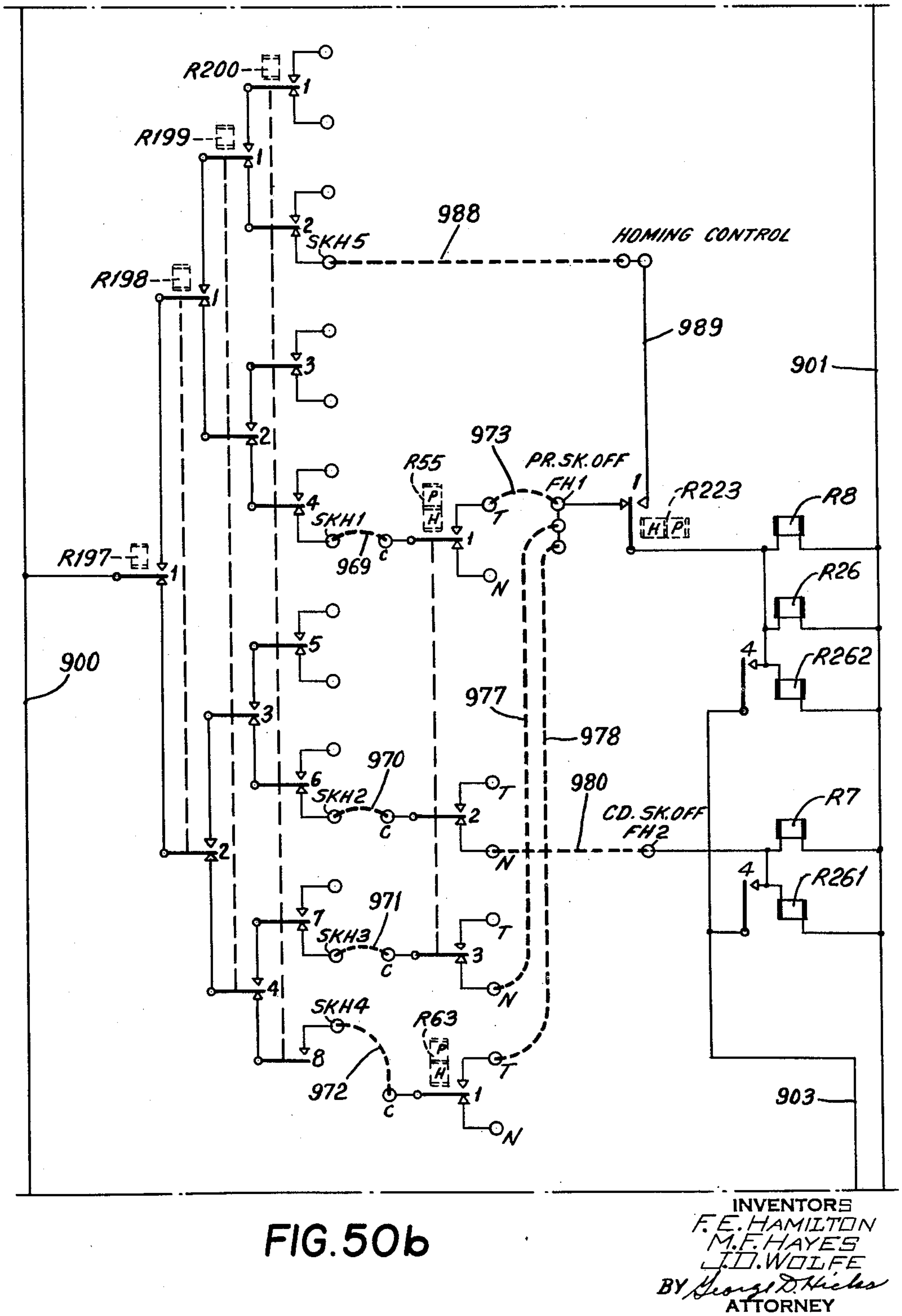
Figure 50C:
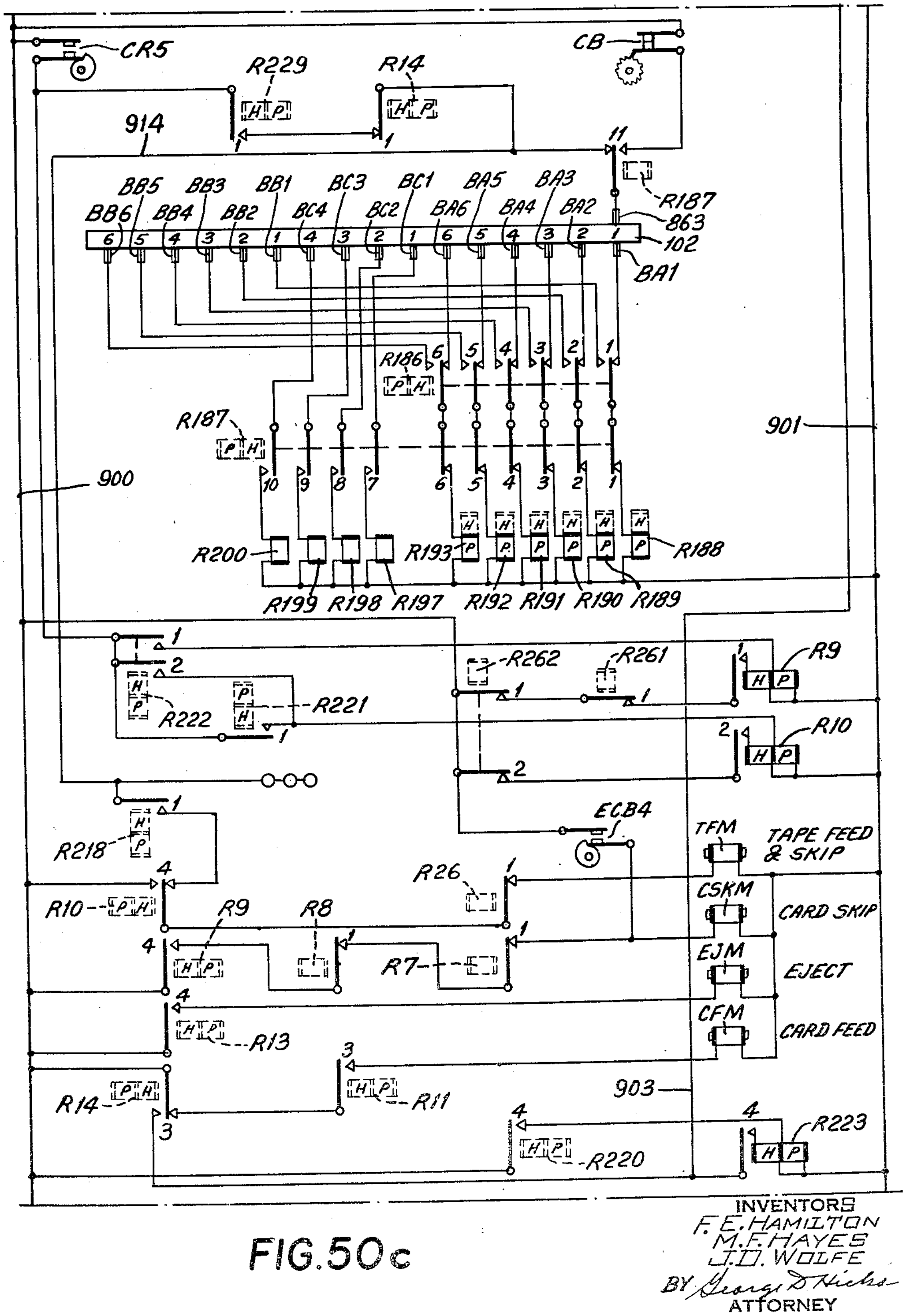
Figure 50D:
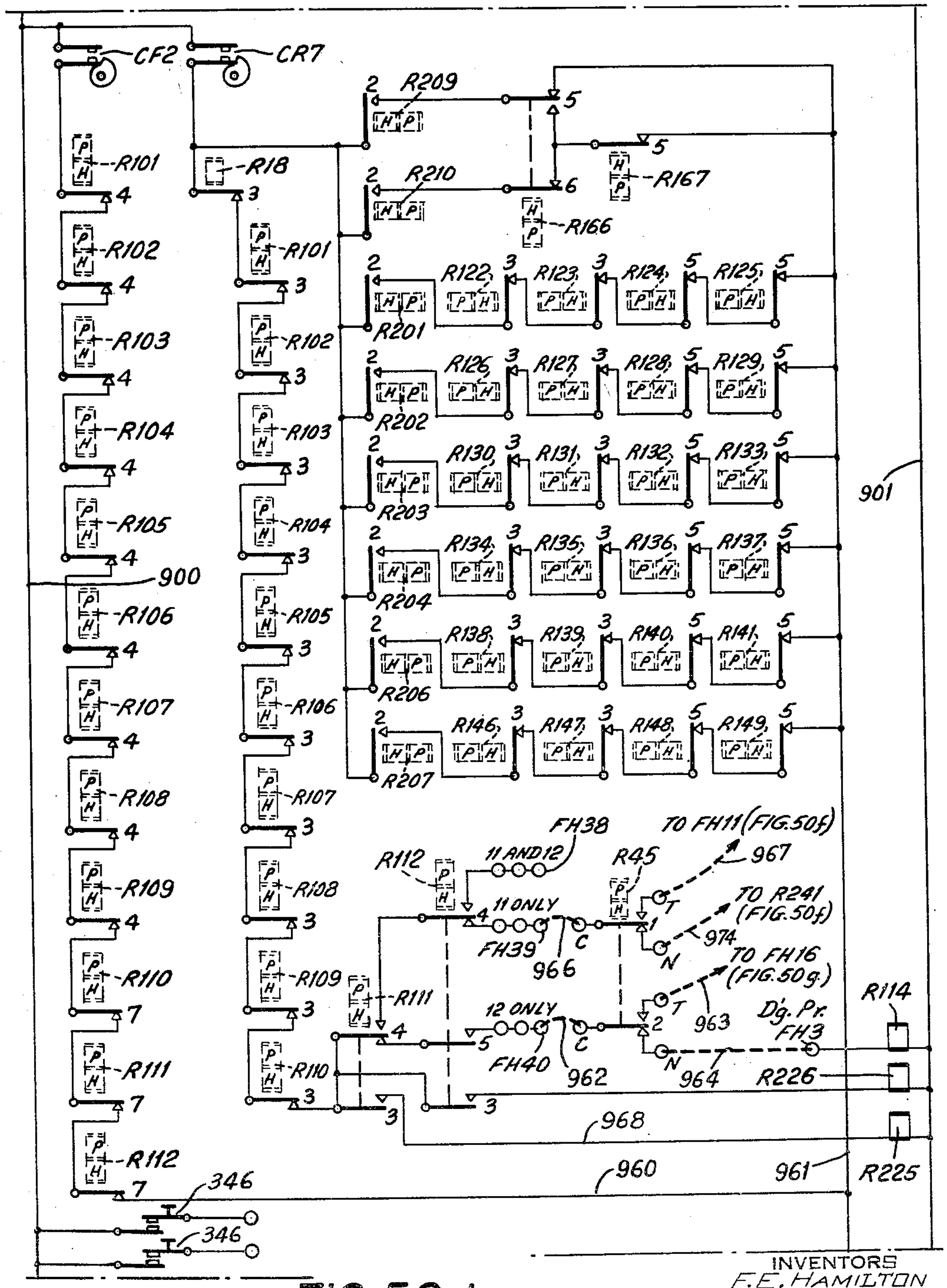
Figure 50E:
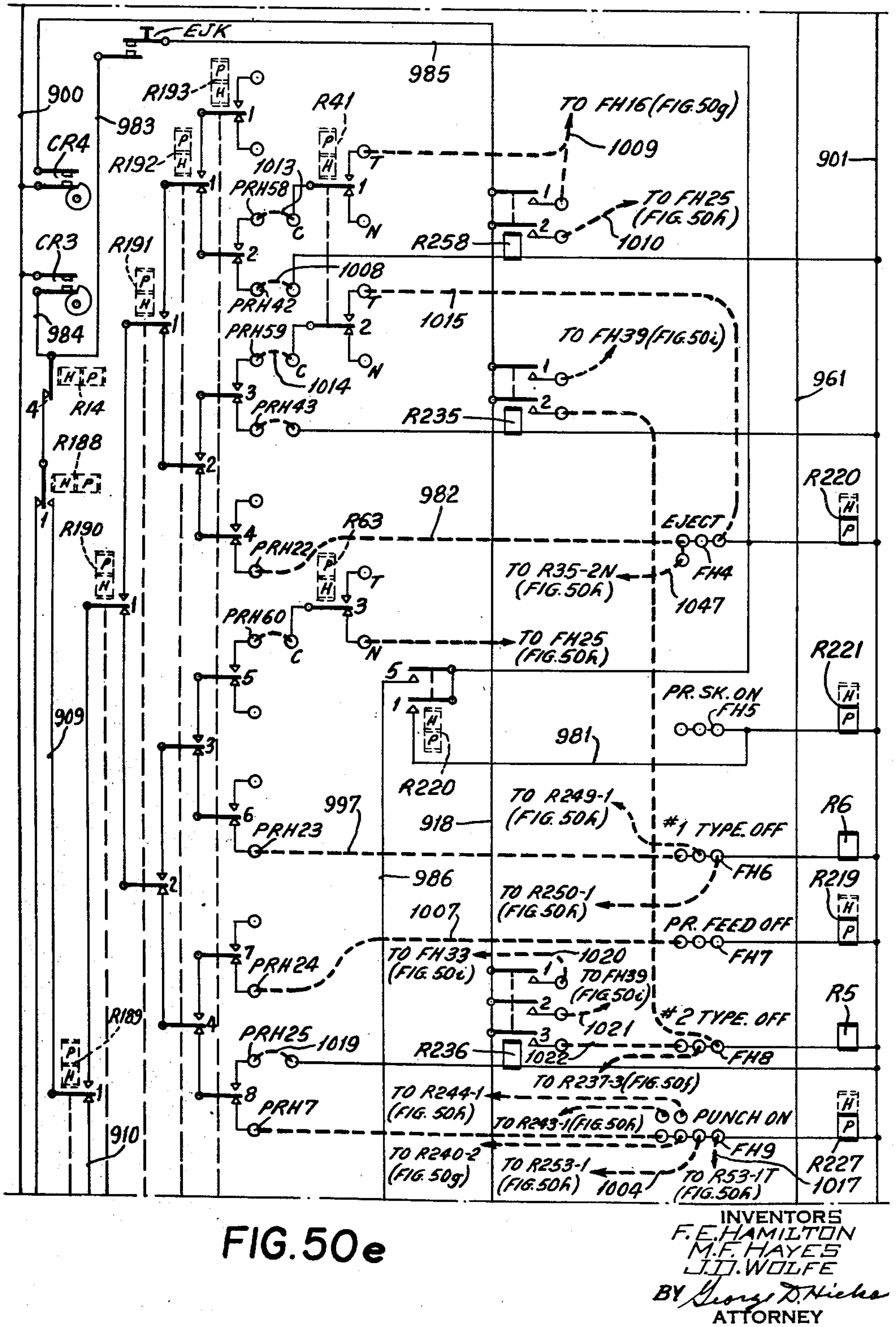
Figure 50F:
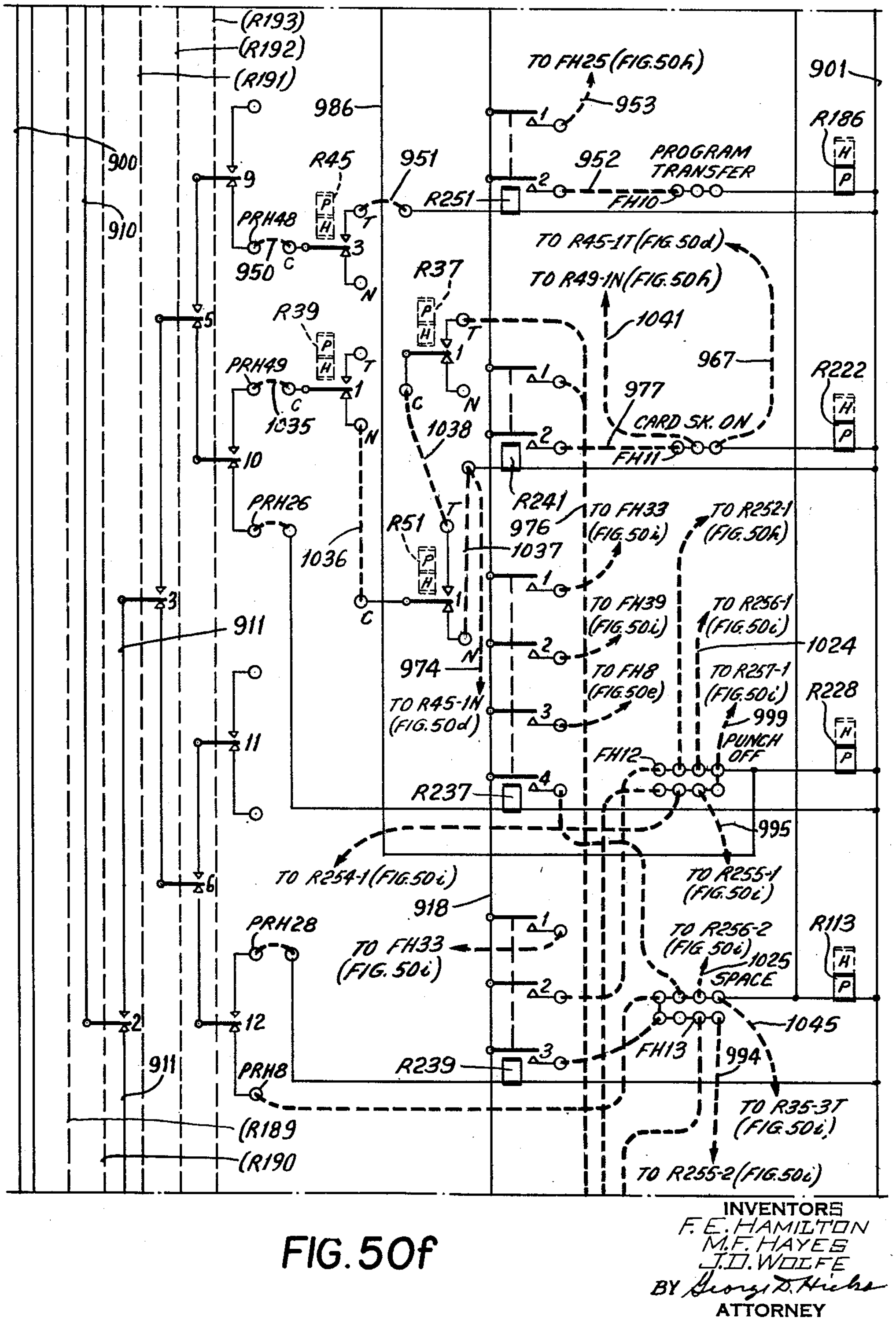
Figure 50G:
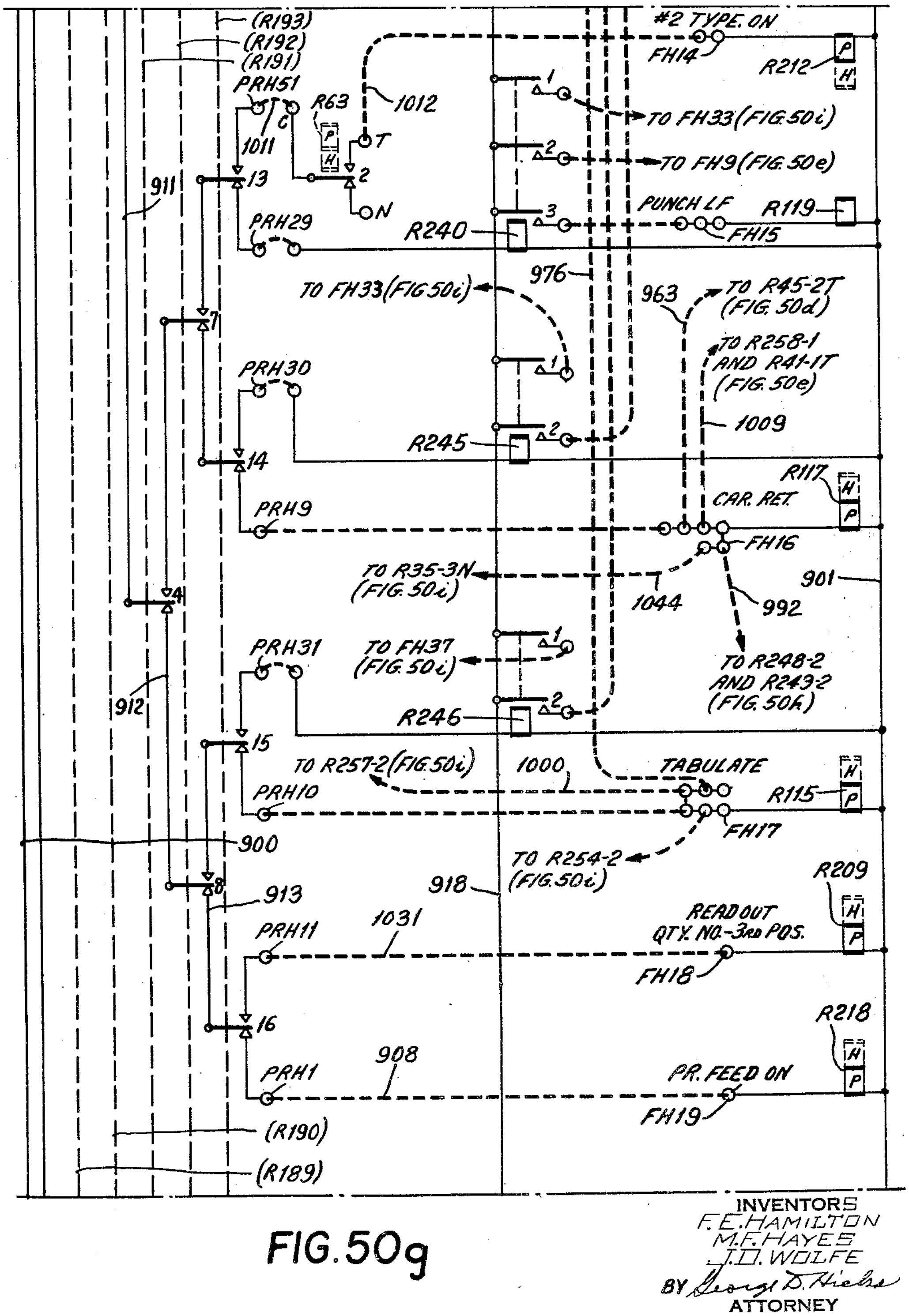
Figure 50H:
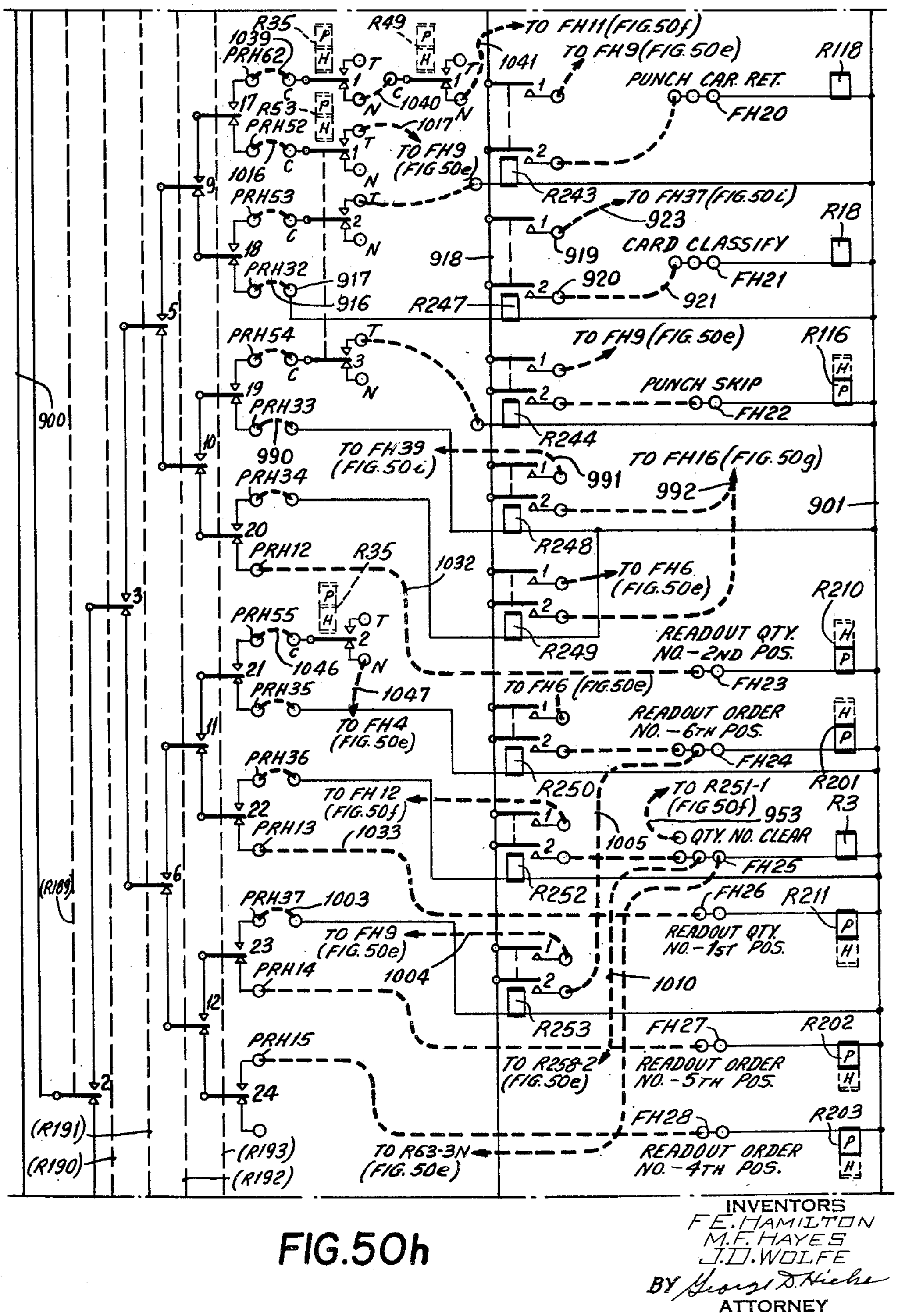
Figure 50L:
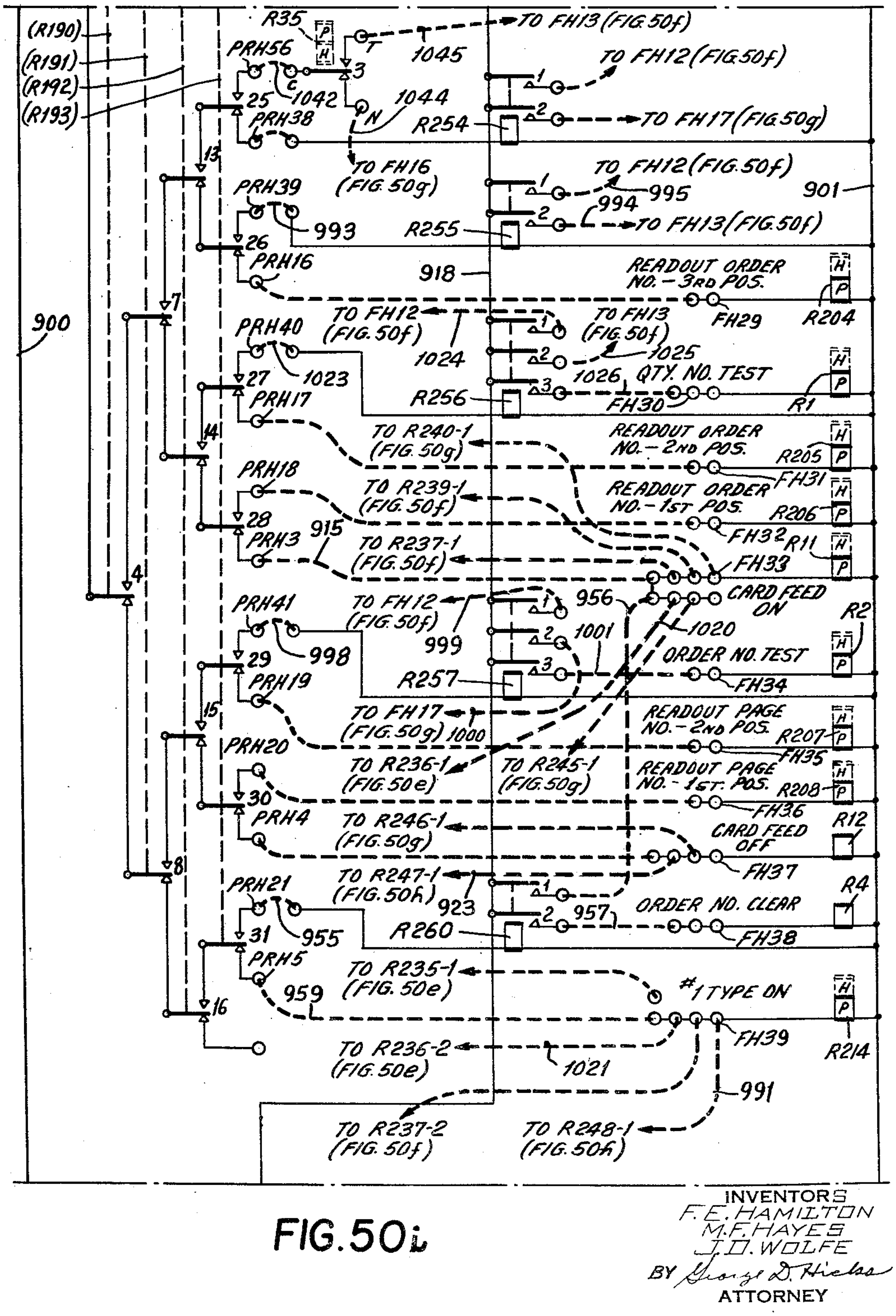
Figure 50J:
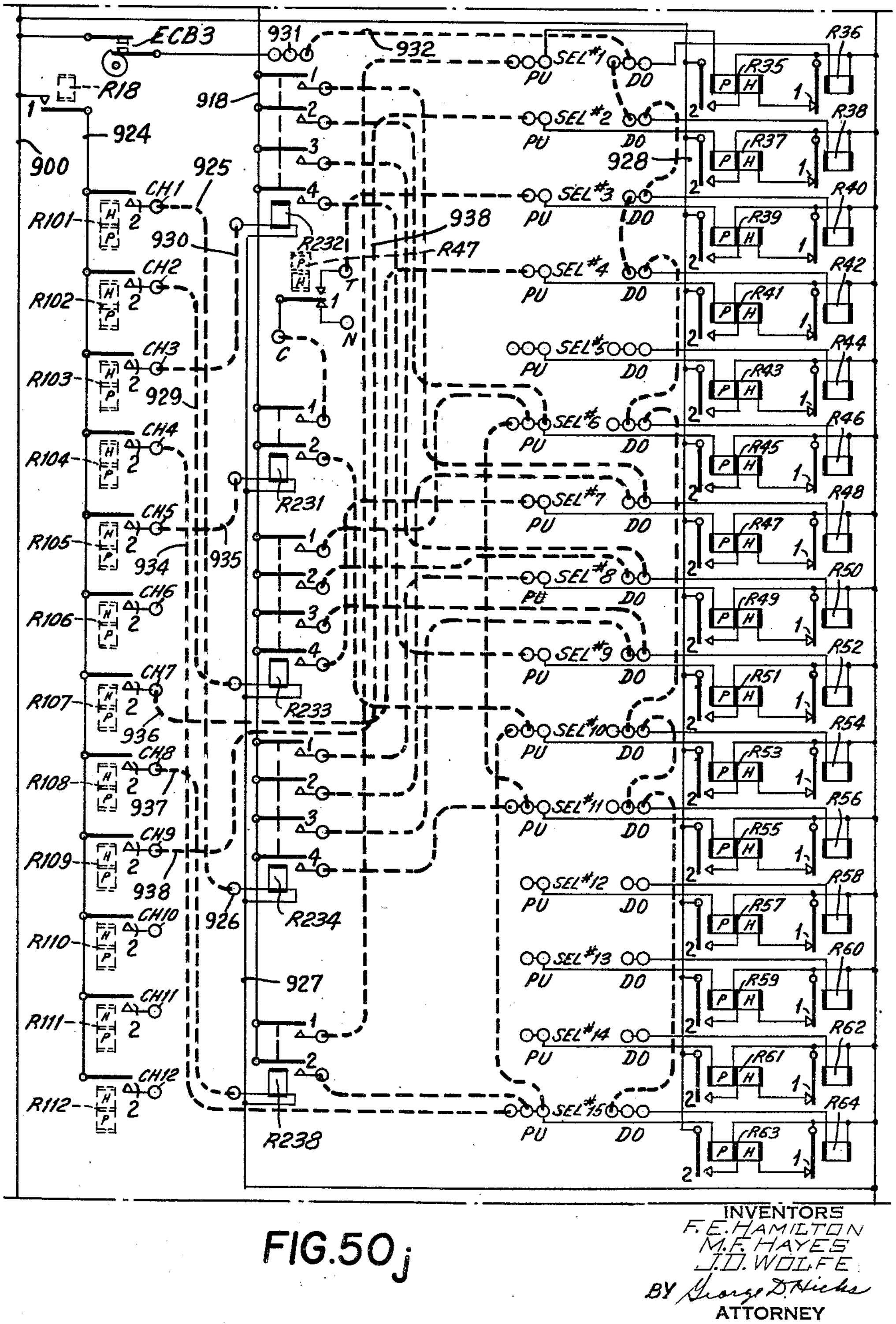
Figure 50K:
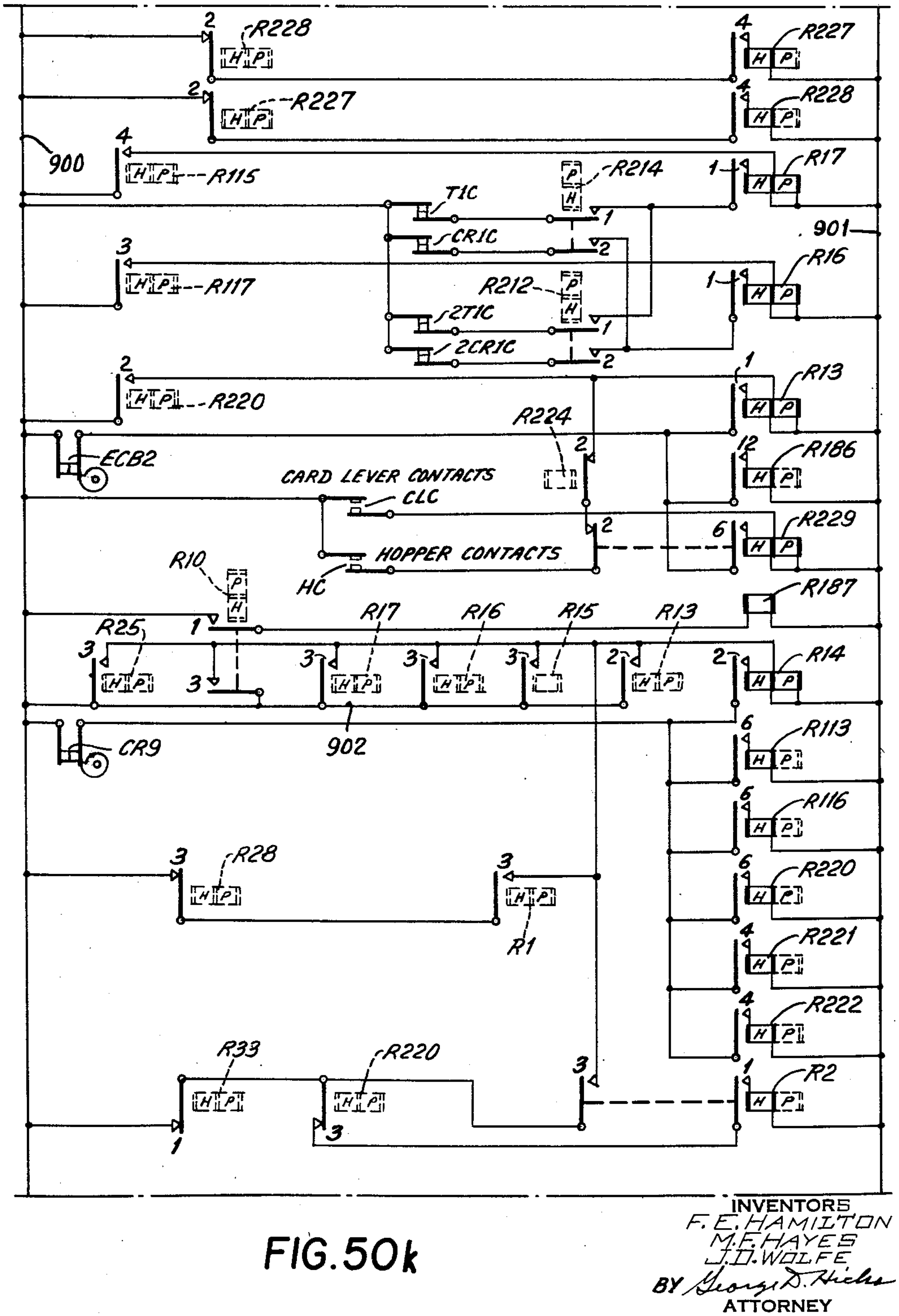
Figure 50L:
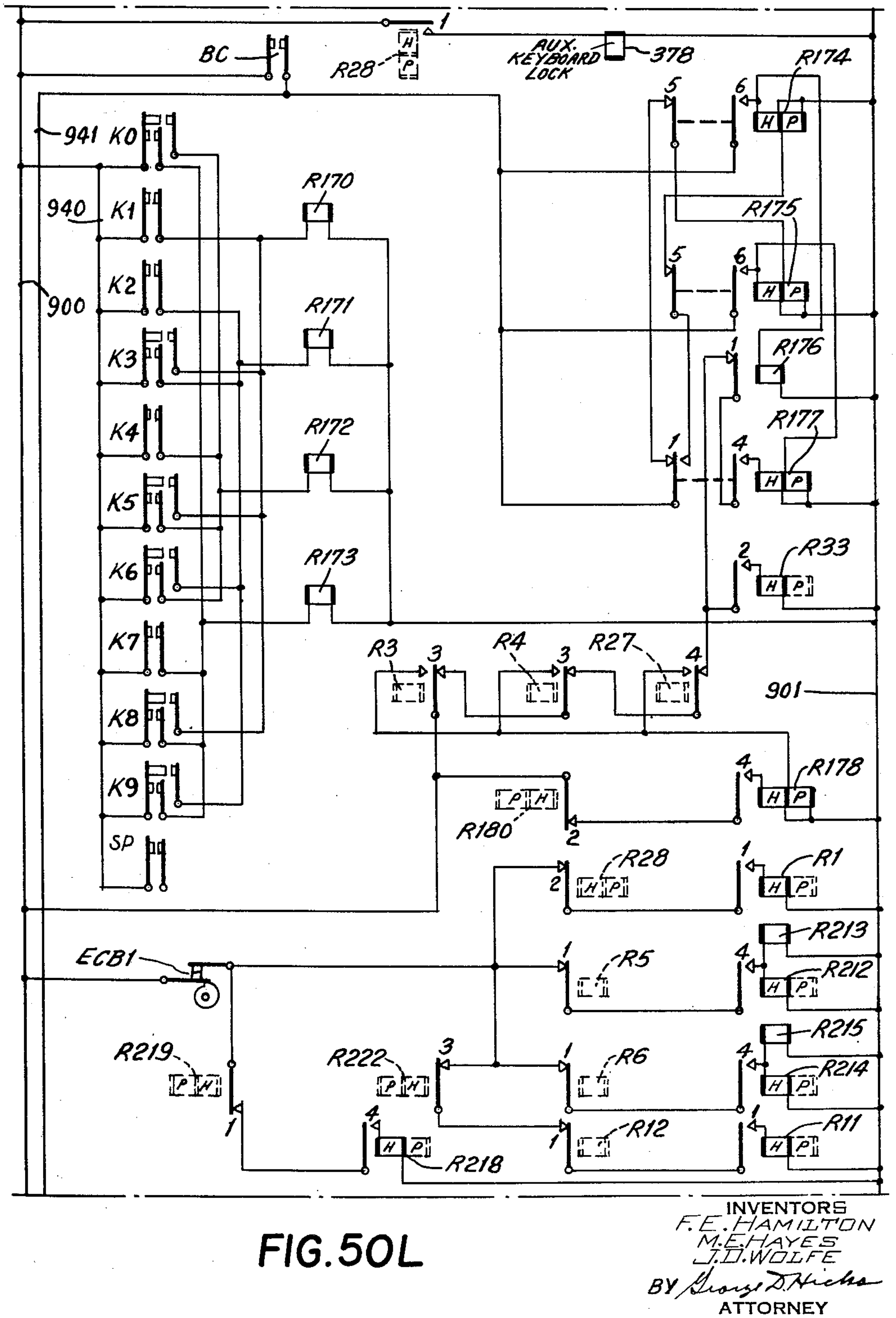
Figure 50M:
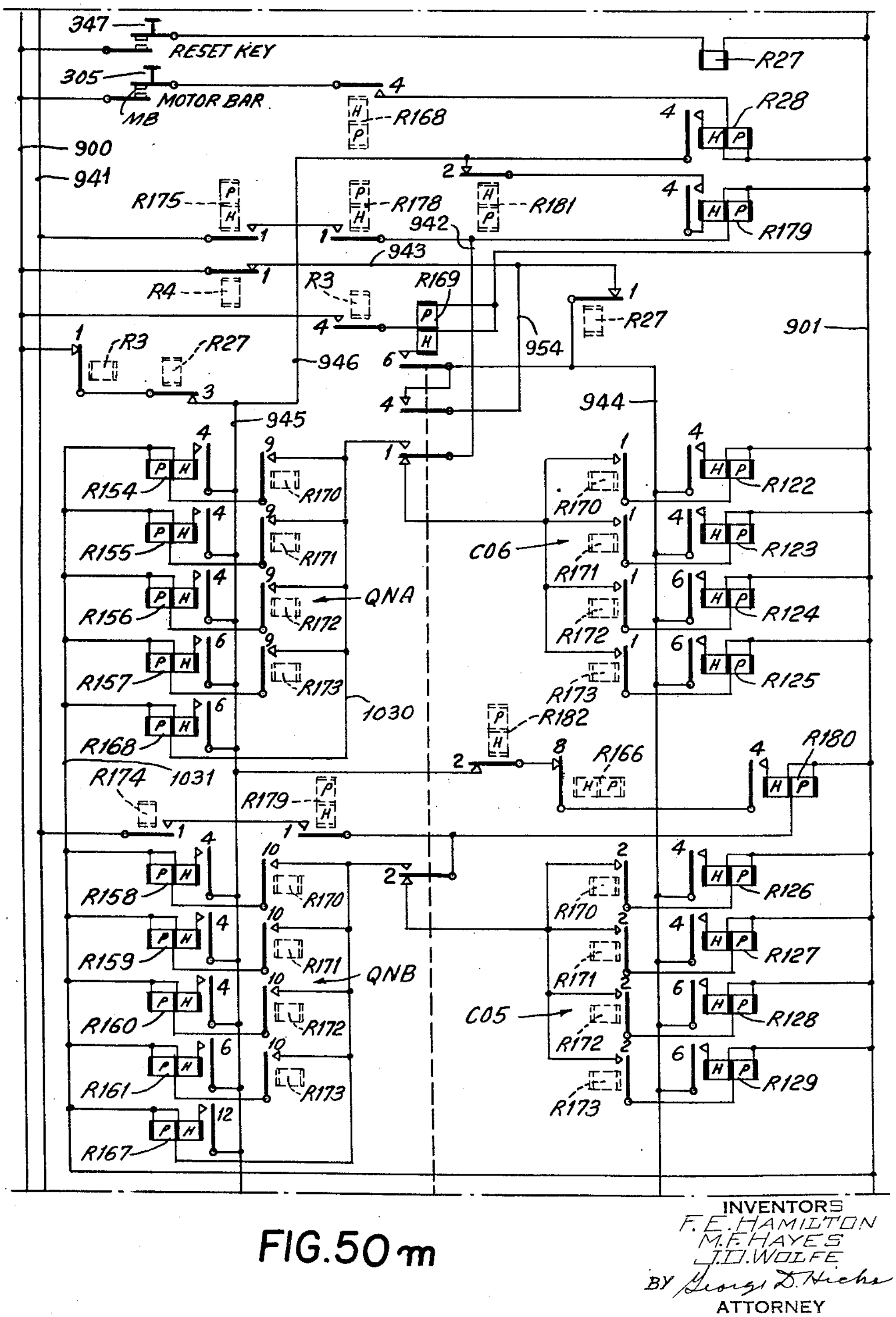
Figure 50N:
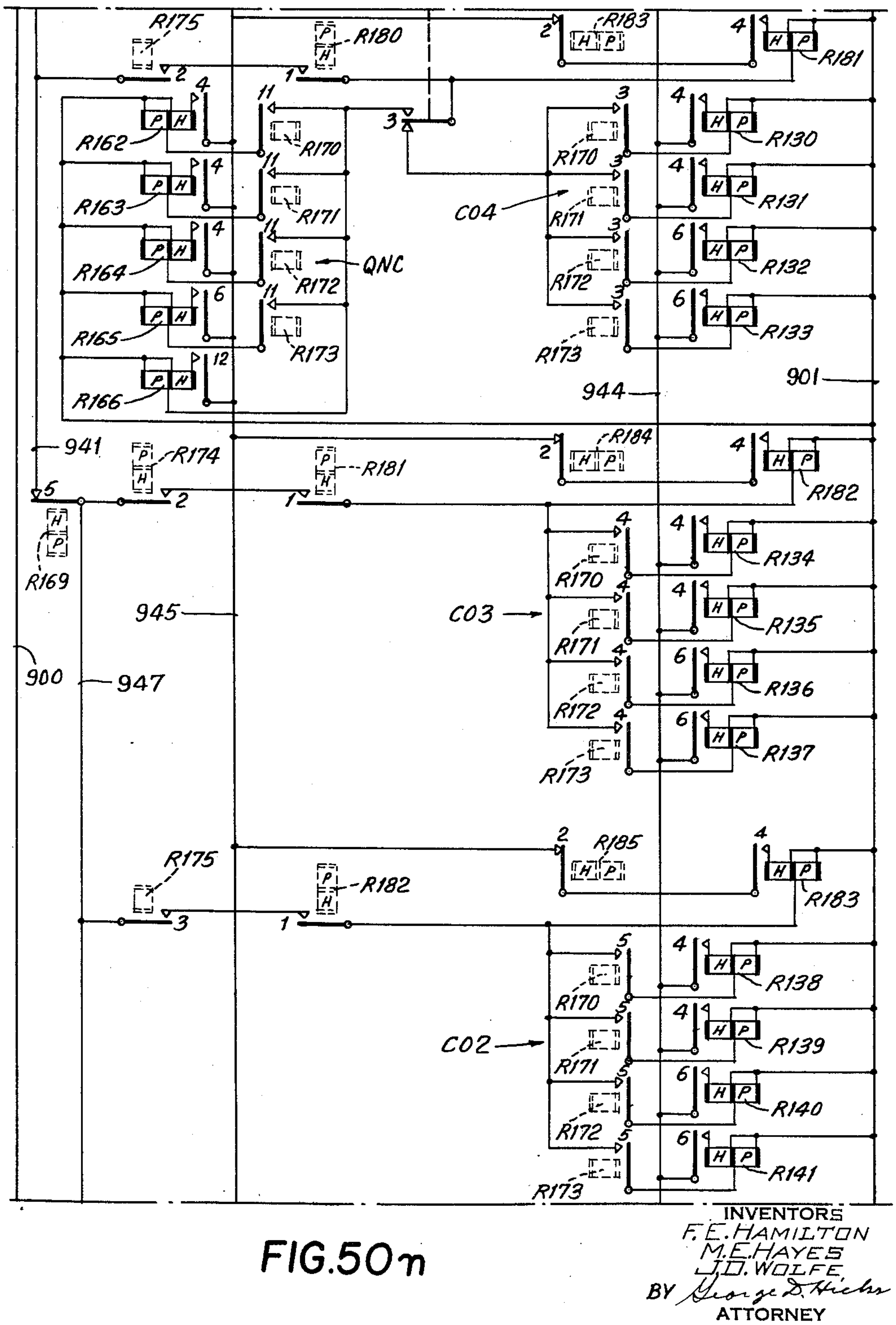
Figure 50O:
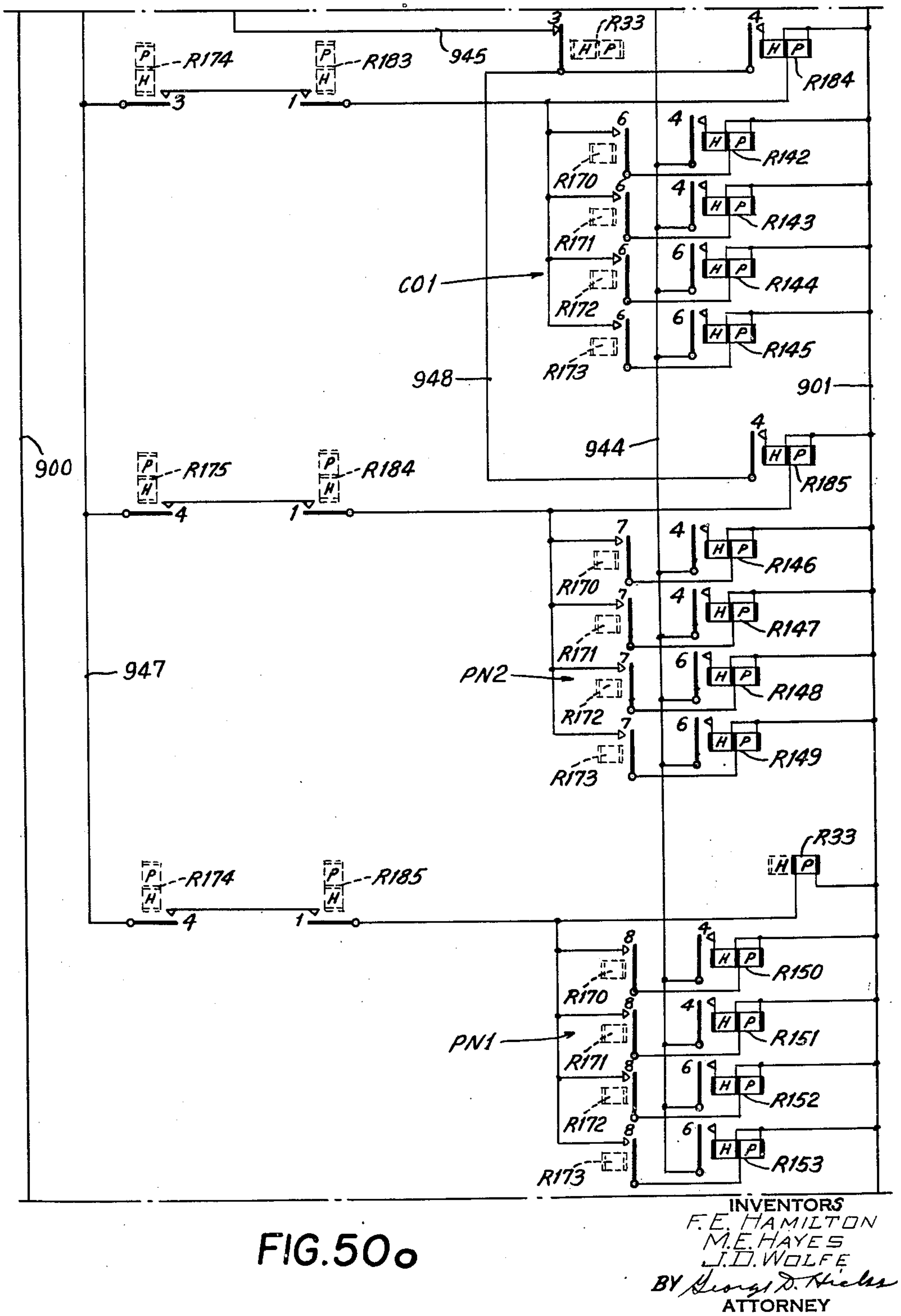
Figure 50P:
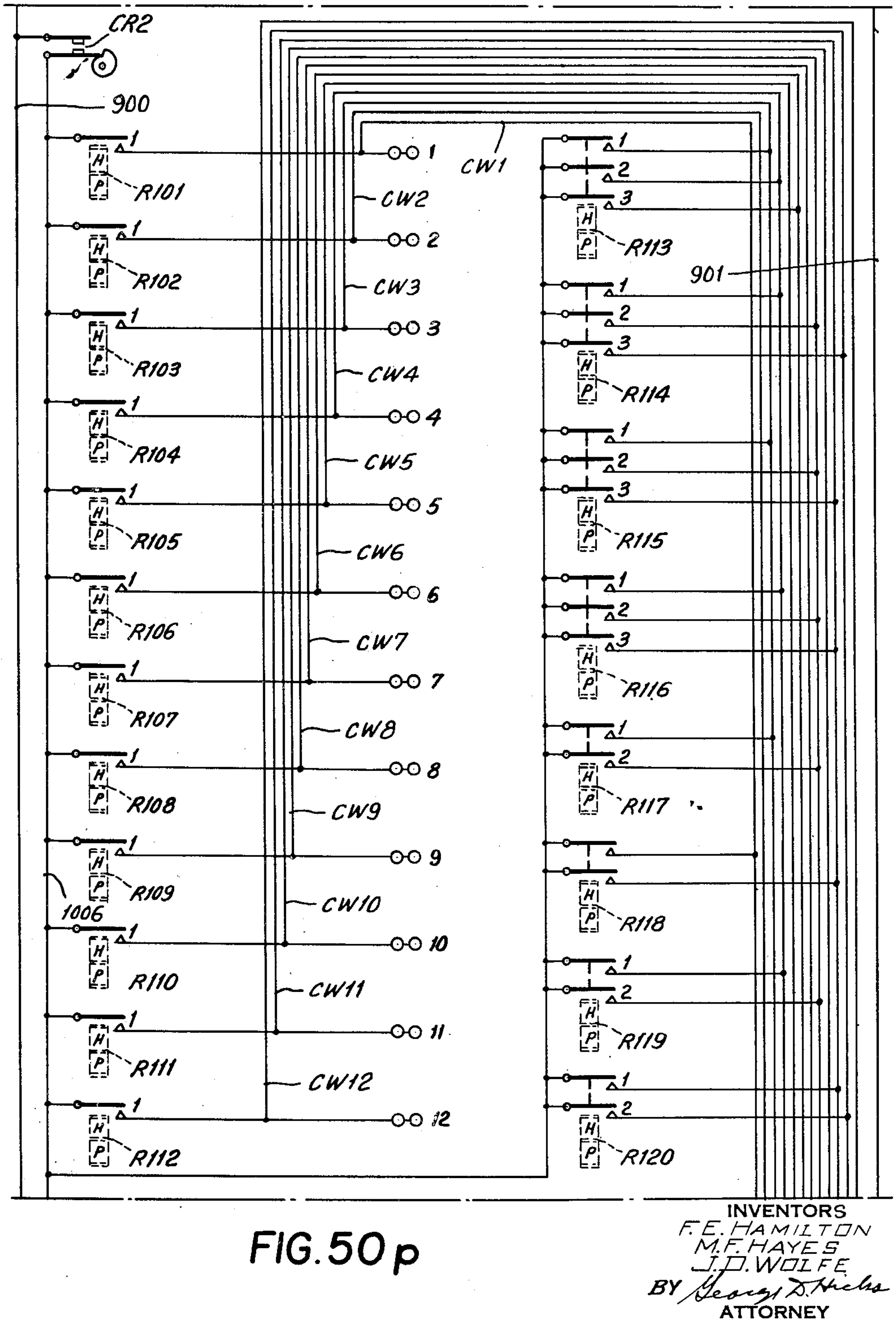
Figure 50Q:
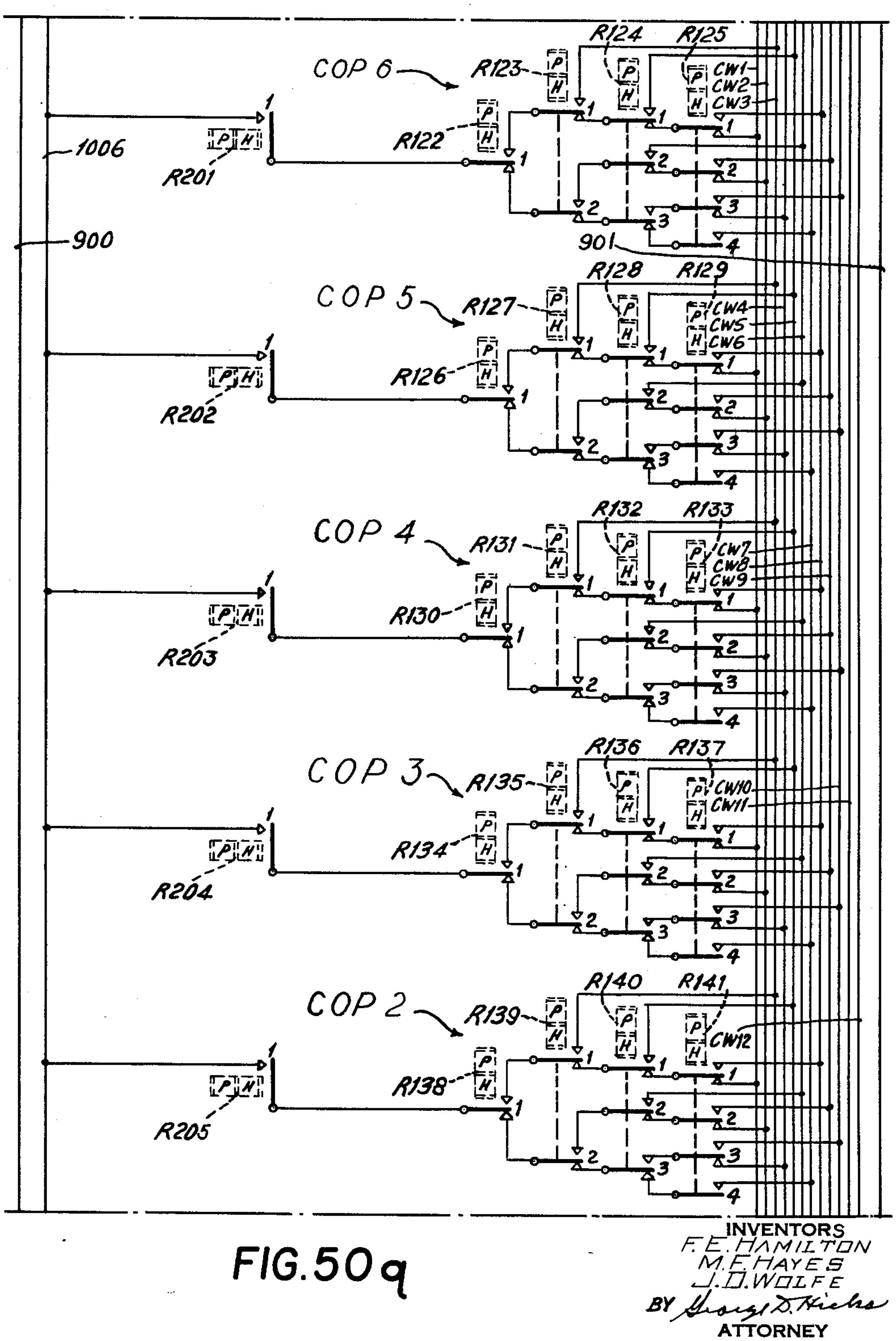
Figure 50R:
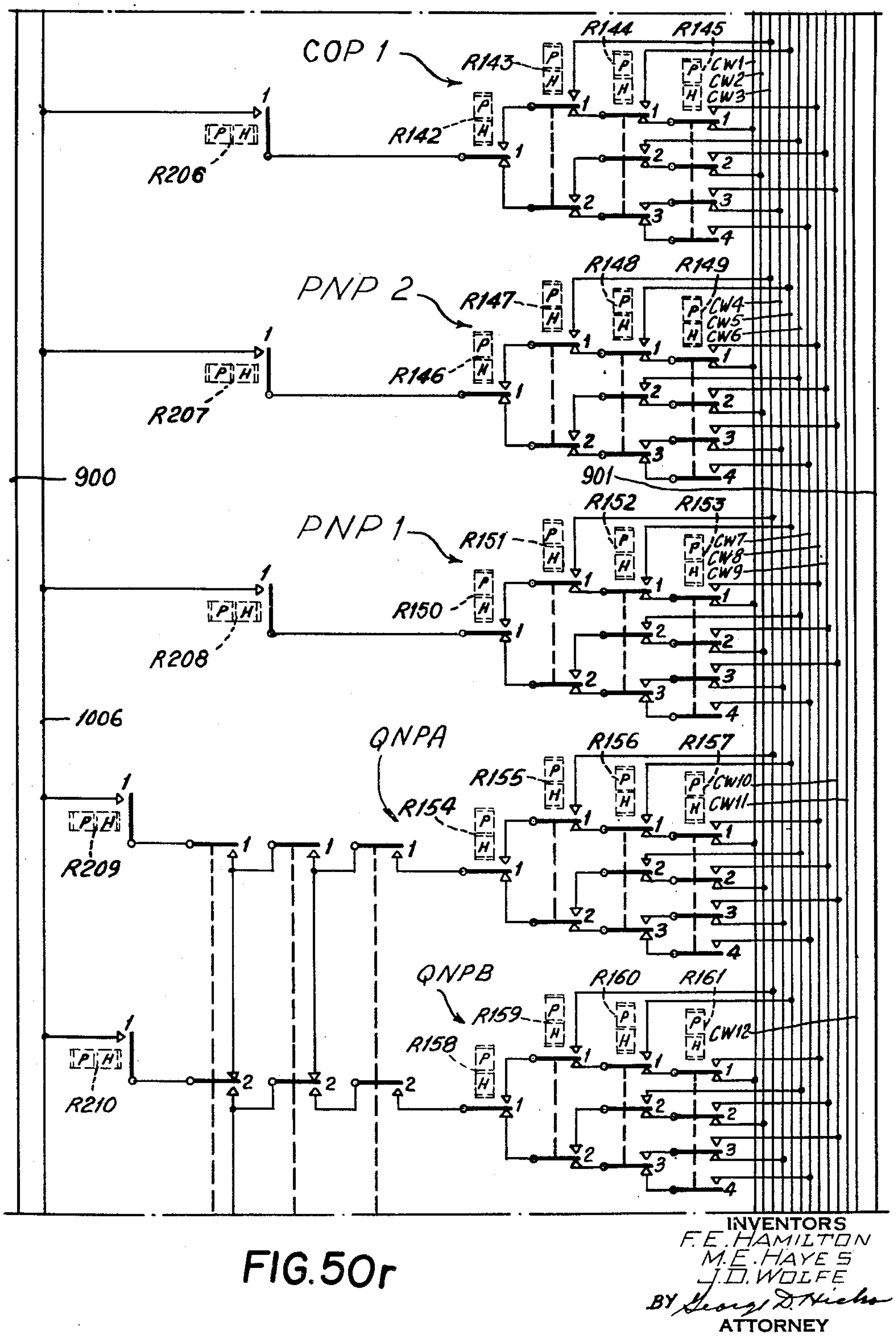
Figure 50S:
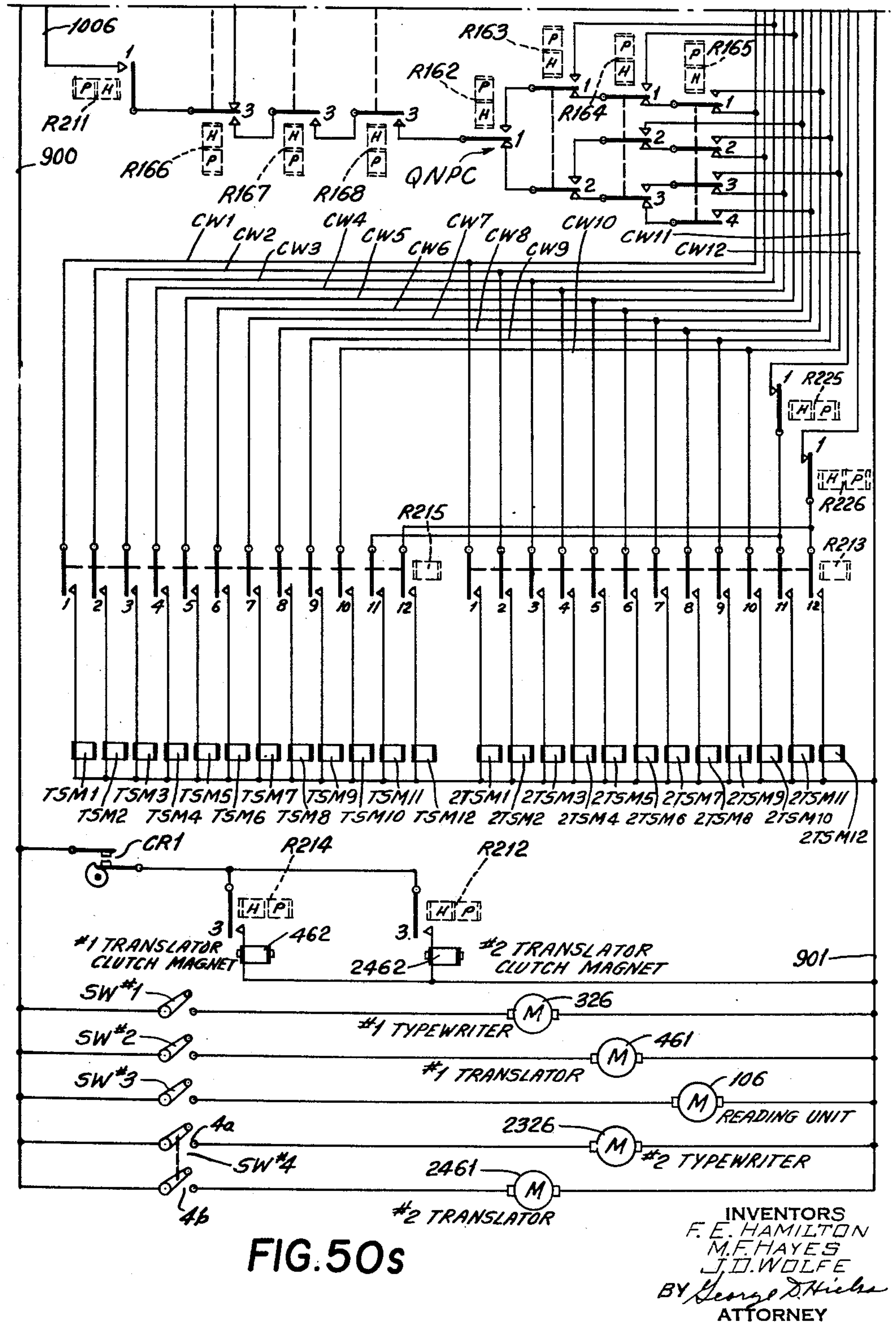

Figs. 4*a* and 4*b* when taken together form a longitudinal vertical sectional view taken on the line 4—4 of Fig. 2, the parts being shown on an enlarged scale;

Fig. 5 is an enlarged fragmentary vertical section taken on the line 5—5 of Fig. 2;

Fig. 6 is a horizontal section taken on the broken line 6—6 of Fig. 5;

Fig. 7 is a horizontal section taken on the broken line 7—7 of Fig. 5;

Fig. 8 is a transverse section taken on the line 8—8 of Fig. 5;

Fig. 9 is a fragmentary horizontal section taken on the line 9—9 of Fig. 4*b*;

Fig. 10 is an enlarged fragmentary vertical section through the card hopper and showing the means for individually feeding the cards into the main card reading passage;

Fig. 11 is a fragmentary sectional view showing on an enlarged scale the parts appearing in the lower right-hand portion of Fig. 4*b*, the plane of the section being the same as Fig. 4*b* and the card positioning stop being shown in its intercepting position;

Fig. 12 is a detail sectional view similar to Fig. 11 and showing the position of the parts when a code hole in the record card is sensed;

Fig. 13 is a fragmentary section taken on the line 13—13 of Fig. 11 and showing in detail the card sensing star wheels and their operated contacts;

Figs. 14 and 15 are detail operational views taken on an enlarged scale and showing the manner in which the hopper contacts are closed by placing the record cards in the hopper;

Fig. 16 is an enlarged fragmentary vertical section through the card hopper and feed throat and showing the position of the throat elements as a card is being fed therethrough;

Fig. 17 is a vertical transverse sectional view taken on the line 17—17 of Fig. 1 and showing on an enlarged scale the structure of one of the typewriters which forms a unit of the illustrated embodiment;

Fig. 18 is an enlarged fragmentary plan section of the back of the typewriter shown in Fig. 24, the general plane of the section being indicated by the broken line 18—18 in Fig. 17;

Fig. 19 is a fragmentary detail vertical section taken on the line 19—19 of Fig. 18 and showing the manner in which interlock control contacts are operated by control stops on the typewriter of Figs. 17 and 18;

Fig. 20 is a diagrammatic view indicating in plan the main and auxiliary keyboards of the typewriter of Figs. 17 to 19, inclusive, and also indicating the power roll of the typewriter and the position of the operating cam units tripped by the actuation of the keys comprising the main keyboard;

Fig. 21 is a fragmentary vertical section taken on the line 21—21 of Fig. 1 and showing on an enlarged scale the auxiliary keyboard of the typewriter of Figs. 17 to 19, inclusive;

Fig. 22 is a fragmentary transverse vertical section showing the locking means for the auxiliary keyboard, the plane of the section being indicated by the line 22—22 of Fig. 21;

Fig. 23 is a fragmentary transverse vertical section on the line 23—23 of Fig. 21 and showing the manner in which a digit key of the auxiliary keyboard operates a pair of bail contacts;

Fig. 24 is a fragmentary vertical section showing a mechanical translator unit which is operated by a remote control source and which functions to actuate keys of the main keyboard of the typewriter of Figs. 17 to 19, inclusive, the plane of the section being indicated by the line 24—24 of Fig. 17;

Fig. 25 is a transverse vertical sectional view taken on the line 25—25 of Fig. 24 and showing details of the mechanical translator, the view showing the translator parts when looking in the direction opposite to that of Fig. 17;

Fig. 26 is a fragmentary vertical section showing a detail of the mechanical translator, the plane of the section being indicated by the line 26—26 of Fig. 24;

Fig. 27 is an enlarged plan section of the mechanical translator, the plane of the section being indicated by the line 27—27 of Fig. 17;

Fig. 28 is an end view of the clutch and drive for the mechanical translator, the plane of the view being indicated by the line 28—28 of Fig. 24;

Fig. 29 is a detail view showing the mechanical driving mechanism for the translator of Figs. 24 to 28, inclusive;

Fig. 30 is a diagram illustrating in plan the keyboard of the second typewriter of the illustrated embodiment, which appears at the right in Fig. 1;

Figs. 31 to 41, inclusive, disclose examples of statistical record cards wherein is recorded according to the code system disclosed in Fig. 42, certain selected character and functional data, the cards being used herein to explain the operation of the illustrated embodiment according to a selected typical problem or example;

Fig. 42 shows a fragment of a statistical record card wherein is recorded all of the code designations of a well-known 12-position statistical code system and also wherein is recorded certain functional designations providing for corresponding functional operations of the apparatus;

Fig. 43 shows an example of a typewritten record sheet or invoice wherein selected data is typed by the typewriter appearing at the left of Fig. 1 as a result of the operation of the illustrated embodiment under the control of the record cards shown in Fig. 31 and Figs. 34 to 41, inclusive, and under the control of the program tape shown in Fig. 47;

Fig. 44 shows a fragment of a stock picker tag on which certain selected data is typed by a second typewriter appearing at the right in Fig. 1 when such typewriter is operated under the control of the cards of Fig. 31 and Figs. 34 to 41, inclusive, and the program tape of Fig. 47;

Fig. 45 is a view similar to Fig. 43 and discloses an invoice which is prepared by the typewriter at the left of Fig. 1 when the record cards shown in Fig. 32 and Figs. 34 to 41, inclusive, are used and when the program tape of Fig. 47 is used;

Fig. 46 discloses an invoice like that in Figs. 43 and 45 and shows the manner in which data is recorded thereon under the control of the record cards of Figs. 33 to 41, inclusive, and the program tape of Fig. 47;

Fig. 47 shows a program tape containing all of the program designations used for controlling the operation of the illustrated embodiment according to the typical example to be described in detail hereinafter, it being noted that Fig. 47 is shown in two parts which are arranged side-by-side for the purpose of conserving space on the drawing sheet;

Fig. 48 is a timing diagram showing diagrammatically the timing of certain of the operating parts of the read unit of Figs. 2 to 16, inclusive, during an eject cycle;

Fig. 49 is a timing diagram showing diagrammatically the timing of operation of certain of the parts of the read unit during successive cycles when the read unit is performing its normal function of reading and spacing the statistical record cards and the program tape; and Figs. 50*a* to 50*s*, inclusive, when placed sequentially and in end-to-end relation, disclose a composite wiring diagram wherein is shown all of the electrical instrumentalities of the illustrated embodiment and the manner in which these instrumentalities operate to effect the operation of the illustrated embodiment according to the selected example, which, as stated, will be explained in detail hereinafter.

GENERAL DESCRIPTION

Referring now in detail to the construction illustrated and first to Fig. 1 of the drawings, the reference numerals 10 and 10*a* indicate, respectively, a pair of specially constructed desks located side-by-side and on which are mounted the several elements composing one preferred embodiment of the invention disclosed herein. As shown, the illustrated embodiment comprises generally a read unit 100 which functions to feed and read the statistical record cards, such as the ones shown in Figs. 31 to 41, inclusive, and to feed and read a program control tape such as the one shown in Fig. 47. The read unit 100 will be described in detail hereinafter under a separate heading. The illustrated embodiment also comprises a #1 typewriter 300 which is operated under the control of code designations in the record cards and in the program tape to type an invoice, examples of which are indicated by the reference characters 11—1, 11—2, and 11—3 in Figs. 43, 45, and 46, respectively. The general construction and operation of the typewriter 300 will be described hereinafter under a separate heading. The #1 typewriter is provided with a main keyboard 301 (Figs. 1, 17, and 20) which is composed of the customary character and functional keys and also comprises an auxiliary keyboard 302 (see also Figs. 21, 22, and 23) which is arranged in front of the main keyboard and includes ten digit representing keys 303, a space key 304, and a motor bar 305. As will appear more fully hereinafter, the ten digit keys 303 and space key 304 may be manually operated to store desired numeric data in a relay storage unit. The storage unit is not shown in Fig. 1 as the elements thereof are mounted in the desk 10 and do not appear above the top wall thereof. As the relay storage unit is composed for the most part of electrical instrumentalities, it is more properly disclosed as a part of the wiring diagram of Figs. 50*a* to 50*s*, inclusive, and will be fully described hereinafter as a part of the detailed description of the operation of the illustrated embodiment. The illustrated embodiment also includes a tape code punch 500 which is indicated in Fig. 1 as being mounted on the left side of the #1 typewriter 300 and which is selectively operated by the actuation of certain keys of the main keyboard 301 of the #1 typewriter, as is described fully in our copending application referred to hereinabove. It is noted that a detail disclosure of the tape punch 500 has not been included herein as it is not considered necessary to an understanding of the present invention. The preferred embodiment also includes a #2 typewriter 2300 which is mounted on the desk 10*a* and which is also selectively operated under the control of the designations in the record cards and program tape, when sensed by the read unit 100, to type selected data on a stock-control picker tag, which data identifies the individual parts ordered, the particular location of the parts ordered, and the customer's order number. An example of a picker tag prepared by the #2 typewriter is indicated at 14 in Fig. 44. A description of the #2 typewriter 2300 is also included hereinafter under a separate heading.

The illustrated embodiment also includes various electrical instrumentalities, such as relays, contacts, solenoids, magnets, connecting circuit wires, etc., which are not disclosed in Fig. 1, as they are mounted within the several units of the illustrated embodiment generally mentioned under this heading and beneath the top of the desks 10 and 10*a*. Such electrical instrumentalities are more properly included as a part of the circuit wiring diagram of Figs. 50*a* to 50*s*, inclusive, and will be described fully hereinafter under the heading "Operation."

*The statistical record card*

As explained above, the read unit 100 functions to read successively the record columns of selected statistical record cards which contain selected data recorded therein. Examples of such record cards are shown in Figs. 31 to 41, inclusive, and are indicated, respectively, as HC—1, HC—2, HC—3, DC—4, DC—5, DC—6, DC—7, DC—4*a*, DC—8, DC—4*b*, and DC—9. It will be recognized by those skilled in this art that these record cards are of well-known type used extensively in the accounting machine art and that data is recorded therein as code designations in accordance with a well-known 12-position statistical code system. Each of these record cards contain 80 vertical record columns indicated by corresponding numerals arranged in a horizontal row along the bottom of each card, and each such vertical column is composed of 12 equally spaced index point positions. The index point positions are indicated in some of the columns by corresponding numerals arranged in vertical rows on the cards. As will be apparent, each character is represented by a code hole punched in one or more of the index point positions of a record column according to the code system.

In Fig. 42, a portion of a record card is shown wherein is punched all of the code designations of the 12-position code system which are used in recording the data in the cards of Figs. 31 to 41, inclusive, and which control the character printing and punching operations and certain functional operations of the illustrated embodiment. Along the top of the card of Fig. 42 and at the top of each record column thereof, appears a legend identifying the character printing or punching operation represented by the code designation recorded in such record column. Code designations representing certain functional operations of the apparatus are identified by legends above the card and opposite the columns where such designations are recorded. The recorded character data are also interpreted along the top of the record columns in the cards of Figs. 31 to 41, inclusive, and the stored functional data in the latter cards are also interpreted by appropriate legends located above the cards and opposite the columns wherein the signifying code designations are recorded.

As indicated hereinabove, one of the principal features of the present invention is in the provision of class controlling means which operates in accordance with different classes of data recorded in the source records, to control different selected operations which are peculiar, respectively, to such classes of data. In order to disclose this and other features the operation of the apparatus of the preferred embodiment will be explained in connection with a particular example or problem. Accordingly, the source record cards of Figs. 31 to 41, inclusive, contain, respectively, recorded data belonging to different types of classes. Generally speaking, the cards contain data belonging to two primary classes, namely, heading data and detail data. Consequently, the cards are referred to hereinafter as heading cards and detail cards. Cards HC—1, HC—2, and HC—3 are heading cards, and cards DC—4, DC—4*a*, DC—4*b*, DC—5, DC—6, DC—7, DC—8 and DC—9 are detail cards. The heading cards also contain, respectively, different subclasses of heading data, and the detail cards contain, respectively, different subclasses of detail data, the differences of which will be presently explained.

It is noted that record column #1 of each of the source record cards of Figs. 31 to 41, inclusive, contains a code designation identifying the class and subclass of the data recorded in such card. As will be explained more fully hereinafter, when each card is in its #1 column sensing position in the read unit 100, the class designation in the #1 column is read and the class controlling means, referred to hereinafter, is adjusted to a controlling condition corresponding to the class of the card; and subsequently in the operation of the preferred embodiment, one or more selected operations which are peculiar to the class of the sensed card, will be effected under the control of program designations in the program tape and because of the adjusted controlling condition of the controlling means.

The cards HC—1, HC—2, and HC—3 are called heading cards because they contain data which is usually printed in the heading or at the top of an invoice such, for example, as the name and address of a customer, and other data relating to the particular customer's account. The record columns of each of the heading cards are shown as grouped together to form different fields in which different types of data are recorded. Legends appearing along the lower part of each heading card denote the type of data recorded in the several fields. For example, it is noted that the data appearing in columns 2 to 59, inclusive, of each heading card relate to the name and address of a customer. The heading cards HC—1, HC—2 and HC—3 contain, respectively, heading data identifying three different types of customers and consequently the cards contain three different subclasses of heading data. The card HC—1 is a source record card containing data relating to a customer who is an authorized dealer of the products sold by the seller. He is therefore known as a dealer customer. The card HC—2 contains data relating to a customer who is not a dealer, but who operates a business of selling the ordered parts to retail customers or in which the ordered parts are used in repairing machines of retail customers. Consequently, the customer of card HC—2 is termed hereinafter a wholesale customer. The heading card HC—3 contains data relating to a retail customer such, for example, as an individual ordering parts for repairing his own machine. The latter type of customer is referred to hereinafter as a retailer.

The record cards DC—4, DC—4*a*, DC—4*b*, DC—5, DC—6, DC—7, DC—8, and DC—9 are called detail cards because they each contain recorded data relating to the different parts or items stocked by a seller and which data is printed item-by-item in different lines of the body of the invoice. The record columns of the detail cards are also grouped to provide different record fields in which different types of data are recorded, and the different types of data recorded in the several fields, are indicated by appropriate legends along the lower part of each detail card. As stated, the data recorded in the different detail cards may also be classified as belonging to different subclasses.

The detail cards DC—4, DC—4*a*, and DC—4*b* contain data belonging to the same subclass. These cards differ from one another only in that data relating to different parts are recorded therein. The cards DC—4, DC—4*a*, and DC—4*b* are regular price cards and contain data relating to ordered parts manufactured by the seller. As shown, each of these cards contains data identifying each ordered part by name, part number, and group number, and indicates the location of such part in the seller's warehouse where the invoice is being prepared and each such card also contains three different types of price data recorded, respectively, in three different record fields which bear appropriate legends identifying the price data.

The detail card DC—5 is also a price card and contains recorded data representing a part which is not manufactured by the seller, but which is purchased from another manufacturer and is stocked by the seller. This card identifies such a part by name, part number, and group number and it contains only two different types of price data instead of the three different types in the card DC—4.

The card DC—6 is termed a direct order card and contains data representing a part which is not in stock at the seller's warehouse where the invoice is being prepared and which must be ordered from a different warehouse. As will later appear, when the card DC—6 is sensed, it controls the operation of the #1 typewriter to type data identifying the ordered part and indicating the warehouse where the part can be obtained.

The card DC—7 is called a substitution card because it contains data indicating that the number of the ordered part has been changed. The substitution card is always read before the regular price card containing the data identifying the changed part number of the ordered part and the price data of such part. The detail card DC—4a identifies the new part number which corresponds to the substitution card DC—7.

The detail card DC—8 is termed a lot price card because it contains price data pertinent to parts which are ordered in quantity lots. As shown, the card DC—8 contains a unit list price, a lot net price, and a unit net price.

The card DC—9 contains data identifying different exchange prices allowed different types of customers for the return of a used or worn part. The data printed in the invoice under the control of card DC—9 signifies an exchange charge which may be subtracted from the amount of the invoice when a used part corresponding to the ordered part is returned by the customer. This card is therefore termed an exchange charge card and is read after the regular price card for the ordered part is read. The regular price card DC—4b is the one containing the regular price data relating to the part identified in the exchange card DC—9.

*The program tape*

As indicated hereinabove, the sequence of operations of the illustrated embodiment is controlled in accordance with a predetermined plan by a program tape containing program code designations. The program designations are recorded in columns of index point positions in the tape and according to a combinational hole code system. The program tape is joined together to form an endless loop and is indicated generally by the reference numeral 15 in Figs. 2, 3, and 4a. As will appear more fully hereinafter, the tape 15 is mounted within the read unit 100 and is read column-by-column by suitable means within such unit. In Fig. 47, one example of a program tape 15 is disclosed wherein is recorded in successive columns thereof, the program designations which effect a predetermined sequence of operations of the illustrated embodiment when operating according to the specific example or problem which will be described in detail hereinafter. The tape 15 has been shown in two parts in Fig. 47 so as to conserve drawing space. It will be appreciated that the upper end of the right-hand part in Fig. 47 is a continuation of the lower end of the left-hand part, and that when mounted in the read unit 100, the lower end of the right-hand part is suitably glued to the upper end of the left-hand part so as to form the endless loop explained above and shown in Fig. 4a. When the program tape 15 is in the start or home position, its column #2 is under a set of sensing brushes, as will be explained in detail hereinafter. In the operation of the apparatus, the tape is fed for its entire length during the period each source record card is in sensing position.

As shown in Fig. 47, the program tape 15 is divided longitudinally into three different sections identified, respectively, by the legends Sec. "A," Sec. "B," and Sec. "C." Each of the three sections is composed of transverse columns of index point positions. Corresponding columns of the three sections are arranged in transverse alignment with one another and are indicated, respectively, by corresponding numerals along the left-hand side of the tape 15. The index point positions of the columns of each section are also indicated by appropriate numerals across the ends of the tape and also across intermediate portions thereof. The first five columns of section A may be termed an initial control section as these columns are read while each one of the source record cards is in its #1 column sensing position. The remaining columns of section A are read while the detail cards are in sensing position and the remaining columns of section B are read while the heading cards are in sensing position, suitable provision being made and explained fully hereinafter for the transferring by the class controlling means of the control of operations of the apparatus to column #6 of section B after the first column of each heading card has been sensed. The columns of section C are read successively while skipping operations of the card and tape are being effected, as will also be explained more fully hereinafter.

As shown there are six index point positions in each of the columns of section A and section B. Thus, the program designations in the columns of sections A and B comprise one or more code holes in the index point positions in accordance with a 6-position code system. The same program designation is used to represent the same control operation in section A as it represents in section B. Hereinbelow there is included a chart showing the complete 6-position code system which is used in the illustrated embodiment. The numerals along the left-hand side of the chart indicate the index point positions of the columns of sections A and B in which code holes are punched and they therefore signify the different program designations. The descriptive matter opposite each program designation indicates the operation, or operations, of the apparatus effected when such program designation is sensed. For example, the numeral "1" at the left of the chart signifies a code hole in the #1 index point position of a column of section A or B and is the program designation for turning on the program tape feed. As a further example, the group of numerals "1–2–6" signifies a code hole in each of index point positions #1, #2, and #6 of a column of sections A or B, and comprises the program designations for turning on the card feed, turning on the #1 typewriter, and turning off the #2 typewriter. The chart is as follows:

*Program tape code system for sections A and B*

| Code designations | Functions performed by designations when sensed |
|---|---|
| 1 | Program feed on. |
| 3 | Card feed on. |
| 4 | Card feed off. |
| 5 | #1 typewriter on. |
| 1–2 | Punch on. |
| 1–3 | Typewriter space. |
| 1–4 | Typewriter carriage return. |
| 1–5 | Typewriter tabulate. |
| 1–6 | Readout quantity number, third position. |
| 2–3 | Readout quantity number, second position. |
| 2–4 | Readout quantity number, first position. |
| 2–5 | Readout order number, fifth position. |
| 2–6 | Readout order number, fourth position. |
| 3–4 | Readout order number, third position. |
| 3–5 | Readout order number, second position. |
| 3–6 | Readout order number, first position. |
| 4–5 | Readout page number, second position. |
| 4–6 | Readout page number, first position. |
| 5–6 | Card feed on—Order and quantity number clear. |

*Program tape code system for sections A and B*—Continued

| Code designations | Functions performed by designations when sensed |
|---|---|
| 1-2-3 | Eject. |
| 1-2-4 | #1 typewriter off. |
| 1-2-5 | Program feed off. |
| 1-2-6 | Card feed on—#1 typewriter on—#2 typewriter off. |
| 1-3-4 | Card feed on—#1 typewriter on—#2 typewriter off—Space. |
| 1-3-6 | Card feed on—Punch off—Space. |
| 1-4-5 | Card feed on—Punch on—Punch line feed. |
| 1-4-6 | Card feed on—Space. |
| 1-5-6 | Card feed off—Punch off. |
| 2-3-4 | Card feed off—Card classify. |
| 2-3-5 | #1 typewriter on—Carriage return. |
| 2-3-6 | #1 typewriter off—Carriage return. |
| 2-4-5 | #1 typewriter off—Readout order number, first position. |
| 2-4-6 | Punch off—Quantity number, clear. |
| 2-5-6 | Punch on—Readout order number, sixth position. |
| 3-4-5 | Punch off—Tabulate. |
| 3-4-6 | Punch off—Space. |
| 3-5-6 | Punch off—Space—Quantity number, test. |
| 4-5-6 | Punch off—Tabulate—Order and page number, test. |
| 1-2-3-4 | Carriage return—Quantity number, clear. |
| 1-2-3-5 | #1 typewriter on—#2 typewriter off. |
| 1-2-4-5 | When cards HC-1, HC-2, or HC-3 are being read, quantity number, clear and program transfer. |
| 1-3-4-6 | When the heading card previously read is HC-3 and the detail card being read is DC-9, tabulate. For all other card conditions, except when the previous heading card read is HC-3, or is HC-2 and the detail card being read is DC-5, card skip and tabulate. |
| 1-4-5-6 | When either card DC-4, DC-5, or DC-8 is read, #2 typewriter on. |
| 2-3-4-5 | When either card DC-4, DC-5, or DC-8 is read, punch on. |
| 2-3-4-6 | When either card DC-4, DC-5, or DC-8 is read, punch on and punch carriage return. |
| 2-3-5-6 | When either card DC-4, DC-5, or DC-8 is read, punch on and punch skip designation. |
| 2-4-5-6 | For all cards except DC-8, eject. |
| 3-4-5-6 | When DC-8 is read, space. When any card except DC-8 is read, carriage return. |
| 1-2-3-4-6 | When card DC-7 is read, carriage return. |
| 1-2-3-5-6 | Do. |
| 1-2-4-5-6 | For all cards except DC-4, DC-5, or DC-8 quantity number clear. |
| 2-3-4-5-6 | For all cards except when previous heading card is HC-1, or when detail card being read is DC-8, card skip on. |

Figure 3:
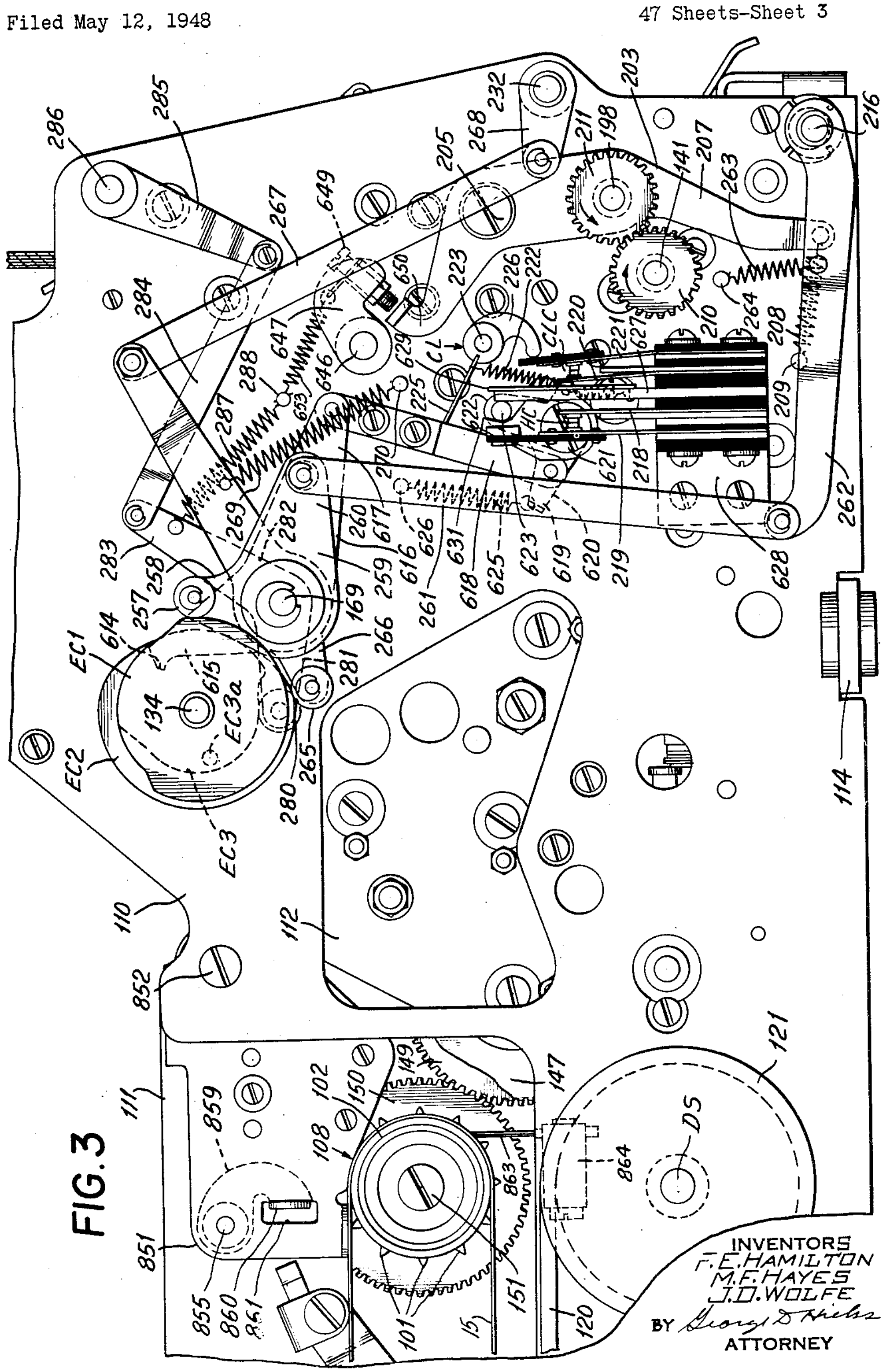
Fig. 3 is an enlarged fragmentary elevation of the read unit shown in Fig. 2, the view showing the unit when looking from the left-hand side of Fig. 2.

In section C of the tape 15 in Fig. 47, each column contains four index point positions and the program designations are recorded therein in accordance with a 4-position combination hole code system. The row of round holes 16 down the center of the tape 15 are tape feed holes and are adapted to receive the teeth 101 of a feed sprocket or drum 102 (Figs. 3, 4*a*, and 7). The columns of section C are sensed successively only while skipping operations of the tape or card are being effected and during such time the sensing of sections A and B is prevented. The program designations in section C provide for the selective stopping of the card and tape and are referred to herein as skip-off designations. In the typical example or problem disclosed herein and to be described in detail hereinafter, only five skip-off designations are used. It will be appreciated, however, that the present invention is not to be considered as being so limited, because as many as sixteen different skip-off designations may be used within the limits of the 4-position code system and, as will later appear, the construction of the preferred embodiment is sufficiently flexible in its application as to utilize a large portion of the available code combinations to effect other selective skip-off operations. It is believed, however, that the five skip-off designations used in the typical example and their selective controls of the skip-off operations, which will be described in detail, are sufficient to disclose the novel and advantageous features of the present invention. Hereinbelow is a chart showing the five skip-off designations and the control effected thereby.

*The 4-position code system of section C of tape 15*

| Code Designation | Function Performed Thereby |
|---|---|
| 1 | Stops skipping of program tape and the source record card, if the latter be then skipping, when heading cards HC-1, HC-2, or HC-3 are in sensing position. |
| 2 | Stops skipping of the card only, when detail record cards are in sensing position. |
| 3 | Stops skipping of program tape and source record card, if the latter be then skipping, when detail record cards are in sensing position. |
| 4 | Stops skipping operations of the program tape and the record card, if the latter be then skipping, when detail record cards DC-4, DC-5, or DC-8 are in sensing position. |
| 5 | Stops skipping operations of program tape at the home or start position when any of the record cards are ejected from the read unit 100. |

*Read unit*

As explained, one of the principal features of novelty of the present invention is a new and improved means for reading and feeding the source record cards and for reading and feeding the program tape. The mechanical elements of this novel means are included as a part of the read unit 100, which is fully disclosed in Figs. 1 to 16, inclusive. As shown in Fig. 1, the read unit 100 is suitably mounted on the desk 10 and the top portion 17 of the desk is so formed as to conceal all parts of the unit except the open top of a hopper 104 which receives the source record cards described hereinabove as containing the character data designations to be recorded. Fig. 1 shows a horizontal receptacle 18 into which the record cards are individually discharged when ejected from the unit 100. Figs. 2 to 16, inclusive, show the unit 100 as removed from the desk 10.

As explained, the principal functions of the read unit 100 are to sense successively and in step-by-step fashion the record columns of a source record card in reading position, and also to sense successively and in step-by-step fashion the columns of the program tape 15 containing the program designations. The read unit 100 is cyclically operable by its own drive motor 106, and the unit comprises a normal card feeding means which, when turned on, feeds the cards in steps and column by column past a sensing station indicated at 107 (Figs. 4*b*, 10, and 11). The record column of the card at the sensing station 107 is sensed and the card is then advanced a distance of one record column during each operating step of the read unit when the normal card feed is turned on. The read unit also comprises a normal program tape feeding means which advances the program tape 15 in steps and column-by-column past a sensing station indicated at 108 (Figs. 3 and 4*a*). The record column of the tape 15 in sensing position is sensed and the tape advances one record column during each normal operating step of the unit 100. The read unit also includes a means for feeding the record card at a relatively fast or skipping rate for the purpose of skipping over any selected group of record columns in the card. Means is also provided for feeding the program tape at a relatively fast or skipping rate for the purpose of skipping over predetermined groups of columns in the tape. As indicated previously, skipping operations are terminated by the reading of the skip-off designations in record columns of section C (Fig. 47) of the program tape when the tape is moving at its fast or skipping rate. Because the control of skip-off operations is in the tape, the tape skipping means must also be activated each time the card skipping means is activated. It is noted, however, that predetermined columns of the tape may be skipped by operating the tape skipping means without moving the card. Means is also provided for preventing the normal sensing operations of the card and for preventing the sensing of sections A and B (Fig. 47) of the program tape while the card and tape are moving at the skipping rate. The read unit 100 also operates, either at the initiation of the operator or under the control of a program designation in the tape, to feed a new record card from the card hopper into a position where its #1 column can be sensed and to eject an old record card from the unit, as will appear later. This last operation is referred to herein as an eject operation.

As shown in Figs. 2 and 6, the read unit 100 comprises two vertical main side frame plates 110 and 111, respectively, and a vertical supplemental frame plate 112 disposed intermediate the two plates 110 and 111. The two main plates are rigidly secured together in parallel spaced relation by a plurality of transversely extending frame members 113, and by a pair of transversely extending mounting plates 114 and 115. The supplemental plate 112 is rigidly secured to the main frame plate 111 by suitable studs 116. As stated, the power for driving the read unit is furnished by the electric motor 106 which is rigidly bolted to a lateral extension 118 of the base plate 115 (Fig. 2). A driving pulley 119 is secured to the motor shaft and is operatively connected to a main drive shaft DS by means of a suitable flexible belt 120 and a driven pulley 121 fixed to the shaft DS. The main drive shaft DS extends transversely across the read unit and is journalled within suitable bearings carried within aligned openings in the two main frame plates 110 and 111 (Fig. 6).

Mounted on the main drive shaft DS are nine constantly running cams CR which, as will later appear, operate respectively contacts CR1 to CR9, inclusive, and which provide for timing various steps which take place during each operating cycle of the read unit. Each operating cycle is effected during a revolution of the drive shaft DS and the constantly running cams CR open and close their related contacts during each revolution of the shaft DS in a predetermined order (Fig. 49). The main drive shaft operates a constantly running driving mechanism, from which all of the mechanical operations of the read unit are selectively effected. This constantly running driving mechanism comprises a gear 123 (Figs. 5 and 6) fixed to the shaft DS and meshing with a gear 124 rotatably mounted on a shaft 125 which is journalled within bearings supported within aligned openings in the plates 110 and 111. The gear 124 also meshes with a gear 126 fixed to a constantly running shaft 127 which is journalled in suitable bearings in the main frame plate 111 and the supplemental plate 112. A second gear 128 is fixed to the gear 126 and shaft 127 and meshes with a gear 129 (Figs. 5 and 7) fixed to a constantly running shaft 130 which is also journalled in bearings within aligned openings in the main frame plate 111 and supplemental frame plate 112. A second gear 131 is secured to the constantly running shaft 130 and meshes with a gear 133 journalled on a shaft 134 which is in turn supported by suitable bearings within aligned openings in the two main frame plates 110 and 111. A third gear 135 (Figs. 5 and 6) is fixed to the constantly running shaft 127 and meshes with a gear 136 journalled on a shaft 137 which is rotatably supported by the main frame plate 111 and the supplemental plate 112. The gear 136 meshes with a gear 138 which is rotatably supported on a stud 139 extending from the main frame plate 111. The gear 138 also meshes with a gear 140 suitably journalled on the outer end of shaft 141 which is in turn rotatably supported by suitable bearings in aligned openings in the main frame plates 110 and 111, respectively. Thus, as long as the motor 106 operates the main drive shaft DS, the constantly running cams CR and the constantly running drive mechanism, which includes the gear trains and the two constantly running shafts 127 and 130, are operated continuously. As stated, all of the mechanical operating functions of the read unit are effected by selectively connecting their operating elements to the constantly running driving mechanism.

Four magnetically operated clutches are provided for selectively effecting the various operations of the read unit. These clutches are the eject clutch EJC (Figs. 5 and 7), the card feed clutch CFC (Figs. 5 and 6), the card skip clutch CSKC (Figs. 4b and 6), and the tape feed clutch TFC (Figs. 4b and 7).

The eject clutch EJC (Figs. 5, 7, and 8) is of the one revolution type and connects, when engaged, the gear 133 of the constantly running driving mechanism, previously described, to the shaft 134. Thus, each time the clutch EJC is engaged, the shaft 134 is rotated for one revolution and the clutch is then disengaged. The shaft 134 is referred to herein as the eject shaft and mounted on this shaft are seven eject cams indicated, respectively, by the reference characters EC1 to EC7, inclusive. These cams effect, in a predetermined order, all of the mechanical operations incident to an eject operation. Four cams ECO are also fixed to the eject shaft 134 and operate, respectively, eject cam contacts ECB1 to ECB4 in a predetermined order (see Fig. 48). The function of these cam contacts will be fully explained hereinafter under the heading "Operation." During each revolution of the eject shaft 134, a new record card is fed into the read unit and if there be an old card in sensing position in the read unit, such old card is ejected therefrom. The eject clutch EJC is engaged by the energizing of the eject clutch magnet EJM. The eject operation will be described fully hereinafter under a separate sub-heading.

The card feed clutch CFC (Figs. 5 and 6) is controlled by the card feed clutch magnet CFM, and when engaged, connects the gear 124 of the constantly running driving mechanism, previously referred to, to the shaft 125. The shaft 125 then continues to rotate as long as the card feed clutch magnet CFM is energized. As will later appear, motion transmitting mechanism is provided for advancing the record card in sensing position one column for each revolution of the shaft 125 and the latter will be referred to hereinafter as the card feed drive shaft. A pair of cams CFC are also fixed to the card feed drive shaft 125 and operate, respectively, card feed contacts CF1 and CF2 which control the timing of sensing circuits in a manner which will be explained more fully hereinafter under the heading "Operation."

The card skip clutch CSKC (Figs. 4b and 6) is controlled by the card skip clutch magnet CSKM and provides, when engaged, for connecting the shaft 127 of the constantly running drive mechanism, previously described, to a gear 143. As will later appear under a separate heading, the gear 143 is a part of a driving mechanism which provides for feeding the card which is in sensing position at a fast or skipping rate.

The tape feed clutch TFC (Figs. 4b and 7) is controlled by the energizing of the tape feed clutch magnet TFM. When the magnet TFM is energized, the clutch TFC is engaged and it connects the shaft 130 of the constantly running drive mechanism, previously referred to, to the tape drive gear 144. The gear 144 meshes with a gear 145 (Fig. 7) journalled on a stud 146 carried by the supplemental support plate 112. The gear 145 meshes with a gear 147 which is fixed to a shaft 148, the latter being journalled at its ends within bearings supported by the plates 111 and 112. A second gear 149 is fixed to the shaft 148 and meshes with a gear 150 which is fixed to a tape feed shaft 151. The tape feed sprocket or drum 102, previously referred to, is also fixed to the shaft 151. The tape feed clutch TFC and the driving train just described, is used both to feed the tape at a normal rate past the sensing station 108 and also to feed the tape at the fast or skipping rate, previously referred to. The performance of these two functions by the one clutch and driving train is made possible because of the manner in which the tape feed clutch magnet is controlled. As will appear more fully hereinafter, for normal tape feeding operations, the magnet TFM is pulsed once during each cycle and engagement of the clutch TFC is thereby effected just long enough to feed the program tape one column. When a tape skipping operation is desired, the tape feed clutch magnet is held energized and the clutch thereby held engaged. As a result, the tape will be fed during each operating cycle a distance equal to four record columns. The latter is the fast or skipping rate which has been previously referred to.

*The card hopper.*—The card hopper 104 (Fig. 4b) is defined at its rear side, the side away from the operator, by a plate 153 which extends laterally across the space between the two main frame plates 110 and 111 and is suitably fixed to such frame plates. The plate 153 extends vertically downward to a point below a card feed throat 174 (see also Figs. 11, 14, 15, and 16) through which the cards are individually fed from the hopper 104 each time an eject operation is effected. Below the throat 174 the plate 153 defines the rear wall of a card feed passage 154 and the lower end of the plate is curved forwardly as shown and terminates at a point just beyond the card sensing station 107.

The front of the hopper 104 is defined by a movable plate 155 which is arranged between the two main frame plates 110 and 111 and loosely rests at its lower end on a member 156, the latter being suitably fixed by screws 157 to a bar 158 and the latter being secured by any suitable means, such as spot welding, to one of the fixed transverse frame plates 113. The rear plate 155 is held in an upright position by means of a hook 159 fixed thereto and receiving a pin 160 carried by the lower end of an operating arm 161 which, as will later appear, forms a part of a mechanism for moving the front plate 155 rearwardly into pressing engagement with the record cards 104 during an eject cycle. The hook 159 is formed as a forwardly extending flange of a bracket plate 163 and the latter is suitably spot welded to the front face of the plate 155. An adjustable abutment screw 164 carried by the transverse frame plate 113 provides a means for limiting forward movement of the plate 155.

In the illustrated embodiment, the hopper 104 is designed to receive as many as twenty source record cards at one time. As will appear more fully hereinafter, means is provided which operates during each eject cycle to feed the rearmost card in the hopper, downwardly and through the throat 174 and into the card passage 154. When this feeding means operates, the arm 161 moves into a position where the plate 155 is resiliently pressed against the cards in the hopper. This feeding means includes a pair of curved friction members or sectors 165 and 166 (see also Figs. 2 and 10), respectively, which are carried by the outer ends of arms 167 and 168, respectively, and the latter are fixedly secured at their other ends to a transverse shaft 169. The feed sectors 165 and 166 are of the same construction and each comprises a metallic base part 170 which is formed integral with its related supporting arm, and each sector also comprises a facing member 171 of a suitable friction material which is secured to the part 170 by any suitable means. In the illustrated embodiment, the face member 171 is formed of rubber and is suitably bonded to the part 170. The friction part 171 of each of the sectors 165 and 166 moves within a related vertical slot 173 formed in the rear plate 153. During an eject operation, the shaft 169 is operated to move the sectors 165 and 166 upwardly from the normal position shown in the drawings and then downwardly and back to the position shown. Just before the sectors begin to move downwardly, the front plate 155 moves rearwardly and presses the cards against the friction faces 171 which, as stated, project through the openings 173 in the rear plate 153. Thus, when the sectors move downwardly, the rearmost card of the group of cards in the hopper 104 is firmly engaged by the friction surface of the member 171 and is thereby fed downwardly through the card feeding throat 174. As stated, the manner in which these operations are effected will be described more in detail under the separate sub-heading "Eject operation."

*The card feed throat.*—The construction of the card feed throat 174 is shown more clearly in Figs. 14, 15, and 16. The throat is defined at its forward side by a knife-like edge 175 of the fixed member 156 and the throat is defined at its rear side by a vertical face 183 of a fixed mounting block 178 when an eject operation is not being effected. As will presently appear, the rear side of the throat 174 is also defined by the curved surface of a roller member 176 during an eject operation when a card is fed through the throat by the sectors 165 and 166. The roller 176 is mounted on a shaft 177 suitably journalled within the mounting block 178 and the latter is suitably secured to one of the transverse frame members 113. Just above the face 183, the lower end of the mounting block 178 is formed with a notch 179 for a purpose which will presently appear. Also, the roller 176 is provided with a flat side 180. In Fig. 14, the hopper and throat parts are shown in their normal or inactive position and no cards are in the hopper 104. Fig. 15 shows the normal or inactive position of the parts after a group of record cards have been placed in the hopper 104 and before the first card has been fed downwardly through the throat 174. The front plate 155 is in its normal forward position and a leaf spring member 181 fixed to the mounting block 178, is in engagement with the lower part of the cards and holds such cards away from the throat 174. As stated above, when a card is fed downwardly through the throat 174, the plate 155 moves to its rearward position, shown in Fig. 16, where the group of cards are pressed towards the rear of the hopper. In this position, the lower end of the rearmost card is aligned with the throat 174 and such card can then be fed downwardly into the passage 154 by the sectors 165 and 166 and to a position where its first record column is in sensing position at the station 167, as will presently appear.

The reason for the flat face 180 on the roller 176 and the notch 179 on the mounting block 178 is to prevent an improperly inserted card from jamming in the throat 174 when a portion of a previously fed card still occupies the throat. With the throat parts in their normal or inactive position as shown in Figs. 14 and 15 and after a card has been fed through the throat 174 and occupies a position such as is disclosed in Figs. 4b, 10, and 11, the front plate 155 is then in its forward position and there is room in the hopper to receive additional cards. It is noted that in this normal position, the flat face 180 of the roller is towards the knife edge 175 and the throat is then defined at its rear by the face 183. In the event that the operator should make a mistake and insert a new card between the card which was previously fed and the rear plate 153, the lower end of such improperly inserted card will be intercepted by the notch 179 on the block 178. If an eject operation is now effected, the partially fed card in the throat can be ejected without interference from the improperly fed card, and during the latter part of such operation, the roller 176 will be rotated clockwise to the position shown in Fig. 16 and in moving to such position, the cylindrical surface of the roller above the flat face 180 will engage the lower edge of the improperly inserted card, referred to above, and move such lower edge forwardly to a point where it will clear the notch 179. With the parts in such position, the feed sectors 165 and 166 will move downwardly and the misplaced card will then be fed through the throat 174 in the normal manner. The position of the parts while the card is being fed downward is shown in Fig. 16. It is noted that the curved surface of the roller 176 projects slightly beyond the flat face 183 and at this time the rear of the throat is defined by the curved surface of the roller. It will be apparent that if the rear of the throat be defined at all times by a flat plate or by the cylindrical surface of a roller, which is the conventional construction, the improper insertion of a card in back of cards in a hopper will likely cause such card to be jammed in the throat and against the card already there and consequently during the next eject cycle, the jammed condition will be aggravated by the outward movement of the card being ejected, and to a degree where the friction between the cards will prevent the latter card from being completely ejected and the improperly inserted card from being fed through the throat.

*Card feed passage.*—The card feed passage 154 provides for guiding each card as it is fed past the sensing station 167 and for holding such card in position during the sensing operation. As explained previously, the lower part of the rear plate 153 extends downwardly below the throat 174 and defines in part the rear wall of the card feed passage (Figs. 4b and 10 to 13, inclusive). The extreme lower end of the plate is formed with a plurality of equally spaced slots 184 which provide a comb construction (Fig. 13), and the slots are adapted to receive, respectively, the outer ends of twelve sensing levers SL1 to SL12, inclusive, the latter corresponding, respectively, to the twelve index point positions of each record column of the source record card and being arranged as shown in Fig. 13. The forward side of the card feed passage 154 is defined by a curved plate 185 which includes a pair of upwardly and forwardly extending arms 186 suitably fixed by spot welding at their upper ends to a transverse plate 187 having a slot 188 (Figs. 11 and 12). The plate 185 is held in position with respect to the plate 153 by a pair of spring clips 189 which are suitably fixed by screws 190 at their rear ends to the plate 113 and extend forwardly through the slot 188 and engage at their forward ends the outer surface of the plate 187 below the slot 188. Additional means may be provided along each frame plate 110 and 111 for positioning the lower part of the plate 185 with respect to the fixed plate 153. For example, in Figs. 11 and 13 there is shown an anchor plate 193 fixed to the frame 111 and having a V-shaped notch 194 in which the lateral rear edge of the plate 185 is held by the force of the spring clips 189. It will be appreciated that a member (not shown) similar to the anchor plate 193 is attached to the other frame plate 110 and is engaged by the other lateral rear edge of the plate 185. The lower transverse edge of the plate 185 is also slotted to provide a comb construction and the slots thereof correspond to and are aligned with the slots 184 of the plate 153.

A pair of card feed rolls 195 and 196, respectively, are mounted on opposite sides of the card passage 154 and are adapted to receive therebetween each source record card while the latter is in sensing position in the passage 154. The roll 195 comprises the shaft 141 and a plurality of spaced feed disks 197 fixed to the shaft 141. The roll 196 also comprises a shaft 198 and a plurality of feed disks 199 fixed thereto. The shaft 198 (Fig. 6) extends within aligned openings 200 in the frame plates 110 and 111 and is supported at its outer ends within bearings 201 carried by a pair of lever arms 203 and 204, respectively, which are arranged outside of the plates 110 and 111. The arms 203 and 204 are similar in construction and are pivoted on studs 205 and 206 extending from the plates 110 and 111, respectively (Figs. 3 and 5). The openings 200 (Fig. 6) are large enough to permit a separating movement of the roll 196 away from the roll 195 so as to facilitate the initial feeding of a card into sensing position. Each of the arms 203 and 204 is provided with a downward extension 207 (Figs. 3 and 5) and a tension spring 208 connecting the lower ends of each extension 207 and a fixed stud 209 on the adjacent frame plate normally urges the arms 203 and 204 and the roll 196 rearwardly against the roll 195. As shown in Figs. 3 and 6, a gear 210 is fixed to the left-hand end of the roll shaft 141 and the gear 210 meshes with a gear 211 fixed to the left-hand end of roll shaft 198. Thus the rolls 195 and 196 are rotated in unison in the direction indicated by the arrows.

As shown in Fig. 4b, a curved plate 215 forms an extension of the rear wall plate 153 when the plate 215 is in its normal position shown, and thereby provides a guide for a record card as it passes between the feed rolls 195, 196. The plate 215 is fixed to a transverse shaft 216 journalled in the plates 110 and 111 and is movable in a manner to be explained more fully hereinafter, by the shaft 216 from the normal position shown in Fig. 4b, to the position shown in Fig. 11 where the upper edge thereof is in the path of a card fed downward through the throat 174. When a card strikes the upper edge of the plate 215, it is stopped thereby in a position where its #1 column is in sensing position at the station 197. The plate 215 therefore functions as a card positioning stop when in the position of Fig. 11 and as a card guide when in the position of Fig. 4b. The upper edge of the plate is formed with slots 217 which are positioned to receive the disks 197 and 199 of the rolls 195 and 196, respectively, and thereby permit movement of the plate 215 between the normal and stop positions described. As will appear more fully hereinafter, the card positioning plate or stop 215 is moved to the stop position shown in Fig. 11 during an eject cycle while a new card is being fed downward through the throat 174. It is moved back to the normal position of Fig. 4b at the end of the eject cycle.

*The hopper contacts and card lever contacts.*—As shown in Fig. 3, the hopper contacts HC and card lever contacts CLC are supported in a suitable manner from the main frame plate 110. The hopper contacts HC comprise an upwardly extending stationary blade 218 and a movable spring blade 219 which carry the points of the contacts, as shown. The movable blade 219 is normally biased toward the right as shown in Fig. 3, which is towards the contact closed position. Likewise, the card lever contacts CLC comprise a pair of upwardly extending spring blades 220 and 221, respectively, which carry the points of the contacts. The blade 221 is normally biased to the right and to their open position which is shown in Fig. 14. The contacts HC and CLC are operated by a card lever CL arranged between the frame plates 110 and 111 and fixed to a transverse shaft 223 which is suitably journalled in bearings carried by the main frame plates. The card lever CL comprises an arm 224 (Figs. 4b, 10, 11, 14 and 15) fixed to the shaft 223 and extending across the lower part of the hopper 104 adjacent the throat 174. The card lever CL also comprises an arm 225 and an arm 226 (Fig. 3) both fixed to an end of the shaft 223 which extends outwardly of the main frame plate 110. It is noted that in Figs. 14 and 15, the frame plate 110 has been omitted so as to show more clearly the complete construction and operation of the card lever and its operated contacts HC and CLC. The views of Figs. 14 and 15 show the contacts HC and CLC in elevation and in the same plane as in Fig. 3, but the right-hand portions of the views show a vertical section through the hopper 104 and the plane of the latter is substantially the same as the plane of Fig. 4b. It is noted that the arm 224 of the card lever CL moves within a vertical slot 227 in the rear plate 153 and that the movable plate 155 is provided with a notch 228 in its lower edge which is aligned with the slot 227 and receives the outer end of the arm 224. A tension spring 222 connecting the arm 225 to a fixed part of the contact mounting constantly urges the card lever CL counterclockwise as shown in Figs. 14 and 15.

In Fig. 14, the parts are shown in the normal position occupied after an eject cycle and when there are no cards in the hopper 104. This is the position the parts occupy at the beginning of an operation of the illustrated embodiment. It is noted that the card lever contacts CLC are in their open biased position and that the hopper contacts HC are latched in their open position by means of the outer end of arm 225 of the card lever engaging the upper end of the movable blade 219 and thereby holding the blade and the contacts HC in their open position. In Fig. 15, the parts are shown in the position occupied after the cards have been placed in the hopper 104 and before the start of an eject cycle. In placing the cards in the hopper, the lower ends thereof engage the arm 224 and thereby move the shaft 223 and arm 225 slightly clockwise to a point where the arm 225 releases the spring blade 219 which results in the latter moving to the right by its inherent spring force and thereby closing the hopper contacts HC. As will appear more fully hereinafter, the closing of the hopper contacts HC in the manner just explained, initiates an eject cycle during which the rearmost card in the hopper 104 is fed downwardly through the throat 174. In so doing, the card moves the lever arm 224 further downwardly to the position shown in dotted lines in Fig. 15, and in full lines in Figs. 4b, 10, and 11. This movement of arm 224 rotates the shaft 223 and arms 225 and 226 further in a clockwise direction as shown in Fig. 15, and so that the arm 226 engages the upper end of the movable blade 221 of the card lever contacts CLC and moves such blade into its contact closing position, which is the position shown in dotted lines in Fig. 15, and in full lines in Fig. 3. It is noted that as long as a card occupies the passage 154, the card lever will remain in the full line position shown in Figs. 3 and 4b, and the contacts CLC will thereby remain closed. As will presently appear, the contacts CLC are opened during an eject cycle when the old card occupying the passage 154 is ejected and the contacts remain open until reclosed in the manner explained by the new card being fed downward through the throat 174.

*Card eject mechanism and operation.*—As explained previously, when there is no record card in reading position in the passage 154, an eject operation is effected for the purpose of feeding the first record card from the hopper 104 into its #1 column reading position within the passage 154. After the first card has thus been fed into reading position in the passage, a subsequent eject operation provides both for ejecting an old card from the passage 154 and for feeding the next card in the hopper 104 downward into its #1 column reading position in the passage. As also explained above, the initial eject operation is effected by the closing of the hopper contacts HC (Figs. 3, 14, and 15) which, as will later appear, provides for energizing the eject clutch magnet EJM (Figs. 5 and 7). Also, the hopper contacts HC are closed incident to the placing of one or more cards into the hopper 104. The closing of the hopper contacts effects an eject operation only when there is no card in the passage 154, as will later appear. With a card occupying the passage 154, an eject operation can be effected by the manual actuation of an eject key EJK (Figs. 1 and 20) on the auxiliary keyboard 302 of the #1 typewriter 300, which results in the closing of the eject key contacts EJC (Fig. 50e) and the latter then provide for the energizing of the eject clutch magnet (Figs. 5, 7, and 50c) in a manner which will be described more fully hereinafter under the heading "Operation." Also, with a card in reading position in the passage 154 of the unit 100, an eject operation may be effected by the sensing of a significant code designation in either Sections A or B of the program tape 15, which will provide for the energizing of the eject clutch magnet EJM in a manner to be described more fully hereinafter.

The energizing of the eject clutch magnet EJM effects engagement of the eject clutch EJC (Figs. 5 and 7) and thereby effects an eject cycle of operation during which the following functional operations are performed:

(*a*) The card feed rolls 195, 196 are rotated to eject any old card occupying the passage 154, the rolls operating for approximately 140° of each eject cycle.

(*b*) A pair of eject pawls 230 (Figs. 2 and 4*b*) pivoted on the end of an arm 231 which is keyed to a shaft 232, are moved by such shaft from their normal position shown in Fig. 4*b* and rearwardly to a position where they will engage the trailing edge of a card being ejected as such card leaves the rolls 195, 196. The shaft 232 is then rotated to move the pawls 231 forwardly and to a position where they complete the ejecting movement of the card and deposit such card into the receptacle 18 (Fig. 1). The pawls are then restored to their normal position shown in Fig. 4*b*.

(*c*) The card feed sectors 165, 166 are moved from their normal lower position shown in Figs. 4*b*, 10, and 11, to their upper position indicated by dot-and-dash lines in Fig. 16. They remain in their upper position for about 69° of the eject cycle and they are then moved downward and back to their normal lower position and, in so doing, they feed the rearmost card in the hopper 104 downward through the throat 174 and into its #1 column sensing position. The sectors move downward to feed the new card from the hopper 104 after the old card has been ejected from the passage 154, as will later appear.

(*d*) While the feed sectors 165, 166 are moving to their upper position, the cards are aligned in the hopper, preparatory to a downward feeding operation, by the movement of a card aligning member 234 (Fig. 9) against the lateral edges of the cards. The aligning member 234 thus presses any cards which may be out of proper alignment, to the left as viewed in Figs. 9 and 2 and until they touch the flat face of a plate 235 (Fig. 2) forming the side of the hopper away from the member 234, the plate 235 being suitably fixed to the inside of the frame plate 110.

(*e*) While the aligning member is in its card aligning position, the front or pressure plate 155 is moved rearwardly to engage the cards in the hopper and to press such cards firmly against the rear plate 153 and against the friction members 171 of the feed sectors 165, 166; and, while the cards are thus held, the sectors 165, 166 are moved downward to feed the new card into the passage 154 as explained.

(*f*) As the feed rolls 195, 196 stop after ejecting the old card from the passage 154 (paragraph *a* above), the roll 196 is separated from the roll 195 to permit the forward edge of the new card to be moved between the rolls. The roll 196 is returned to its normal feeding relation with respect to the roll 195 and new card as shown in Fig. 4*b*, just before the end of each eject cycle.

(*g*) Just before the feed sectors 165, 166 begin their downward movement to feed the new card through the throat 174, the roller throat member 176 is rotated from its normal position in Fig. 14 to its throat defining position shown in Fig. 16.

(*h*) The stop plate 215 is moved to its intercepting position (Fig. 11) across the card passage 154 after the old card has been ejected and as the new card begins to move downward and so that the leading edge of the new card will strike the upper or stop edge of the plate 215 and thereby be positioned at its #1 column sensing position, the position shown in Fig. 11. The plate 215 is moved back to its normal or card guiding position (Fig. 4*b*) at the end of the eject cycle.

(*i*) Mechanism is also provided for relatching the hopper contacts HC in their open positions (Fig. 14). As stated, this mechanism can only perform its relatching function when the last card is ejected from the passage 154.

The manner in which the above functions are performed during each eject cycle will now be described in detail. As previously described, the eject clutch EJC (Figs. 5 and 7) is of the one-revolution type and each time it is engaged, by the energizing of the magnet EJM, it connects for one revolution the eject shaft 134 to the drive gear 133 of the constantly running driving mechanism. It is also noted that the eject cams EC1 to EC7, inclusive, and an eccentric pin EC3*a* on the side of the cam EC3 and the contact operating cams ECO, function during the one revolution of the shaft 134 to effect all of the functions above named. It is also noted that the size and tooth relation of the gears composing the train connecting the gear 123 on the main drive shaft DS with the drive gear 133 are such that the drive shaft DS makes approximately eight revolutions for each revolution of the gear 133 and for the one revolution of the shaft 134 when the eject clutch EJC is engaged.

It will be apparent that the eject clutch EJC (Figs. 5, 7, and 8) is of the conventional type. The clutch comprises a driving clutch disk 236 fixed to the hub of the gear 133 and having eight equally spaced peripheral notches 237 formed therein. The clutch also comprises a driven disk 238 formed with a hub 239 suitably fixed to the shaft 134. A clutch pawl or dog 240 is pivoted on a stud 241 projecting from the driven disk 238 and is formed with a tooth 242 which is adapted to engage within any of the notches 237 on the driving disk 236 when the clutch is engaged. A tension spring 244 connecting the outer end of the pawl 240 and a stud 245 projecting from the driven disk 238 constantly urges the pawl 240 counterclockwise, as viewed in Fig. 5, and into clutching engagement with a notch 237 in the driving disk 236. The pawl 240 is provided with a tail portion 246 which is normally engaged by the outer end 247 of a pivoted armature 248 of the eject clutch magnet EJM. The periphery of the driven clutch disk 238 is provided with a positioning notch or recess 249 adapted to be engaged by a detent roller 250 carried by a detent arm 251 which is pivoted on a stud 252 extending from the frame plate 111 and which is constantly urged toward the periphery of the disk 238 by means of a tension spring 254 connecting the outer end of the arm 251 and a stud 255 also projecting from the frame plate 111.

The position of the clutch parts shown in Figs. 5, 7, and 8 is that occupied when the clutch EJC is disengaged and is holding the shaft 134 at home position. As shown, the outer end 247 of the armature 248 engages the tail 246 of the clutch pawl 240 and thereby holds the tooth 242 out of engagement with the drive disk 236, and the driven disk 238 and shaft 134 are held in the home position by means of the detent roller 250 engaging the notch 249.

The operations of engaging and disengaging the clutch EJC will be apparent from the previous description. When the magnet EJM is energized, it attracts its armature 248 thereby releasing the pawl 240 and the latter is moved into clutching engagement with a notch 237 of the driving disk 236 by the spring 244. The pawl 240, being carried by the driven disk 238, thereby rotates the disk 238 counterclockwise as shown in Fig. 5 and until the tail 246 strikes the outer end of the armature 247, which will disengage the pawl from the driving disk 236, at which time the detent roller 250 engages the notch 249 and stops the disk 238 in the home position shown The timing of the seven eject cams EC1 to EC7, inclusive, and the eccentric pin EC3*a* on the side of the cam EC3 and of the eject cam contacts ECB1 to ECB4, inclusive, which are controlled by the cams EC0 is fully disclosed in the timing chart of Fig. 48. The functions outlined above as paragraphs *a* to *i* inclusive and which are performed during each eject cycle by the seven cams EC1 to EC7 and the eccentric pin EC3*a*, will now be described in detail.

The eject cam EC1 is the one at the extreme left of Fig. 7 and this cam provides for operating the card positioning or stop plate 215 so that it will stop the new card at its #1 column sensing position, as explained above. As shown in Figs. 3 and 7, the periphery of the cam EC1 is constantly engaged by a follower roller 257 rotatably supported on one arm 258 of a bell crank 259 which is in turn rotatably supported on an end of the shaft 169 which projects outwardly from the main frame plate 110. A second arm 260 of the bell crank 259 is pivotally connected to one end of a link 261 and the other end of such link is pivotally connected to the outer end of an arm 262. The arm 262 is fixed to the shaft 216 to which the plate 215 is also fixed. A tension spring 263 connecting the mid-portion of the arm 262 with a fixed stud 264 projecting from the plate 110 serves to keep the follower roller 257 in constant engagement with the periphery of the cam EC1. As shown in Fig. 48, the cam EC1 through the linkage just described, moves the plate 215 into its intercepting position shown in Fig. 11 beginning at 210° and ending at 230° of each eject cycle and the plate 215 is returned to its normal position shown in Fig. 4*b* beginning at 335° and ending at 353° of each eject cycle.

The cam EC2 functions to operate the eject pawls to complete the ejecting of an old card occupying the passage 154 by the feed rolls 195, 196. As shown in Fig. 3, a follower roller 265 constantly engages the periphery of the cam EC2 and is carried by one arm of a lever 266 which is rotatably supported by the end of shaft 169. A second arm of the lever 266 is pivotally connected to one end of a link 267 and the other end of the latter is pivotally connected to an arm 268 fixed to the outer end of the shaft 232 which as previously explained is suitably journalled in aligned openings in the main frame plates 110 and 111 (see also Figs. 2 and 4*b*). A tension spring 269 connecting the lever 266 with a stud 270 projecting from the main frame plate 110 serves to constantly urge the roller 265 into engagement with the periphery of the cam EC2. As previously explained the pair of lever arms 231 (Fig. 4*b*) are fixed to the shaft 232 and an eject pawl 230 is pivoted on a stud 271 carried by the lower end of each arm 231. Each pawl 230 is constantly urged into engagement with the plate 215 by means of a tension spring 272 connecting a stud 273 projecting from the arm 231 and a second stud 274 extending from the upper end of the pawl 230 and movable within an enlarged opening 275 in its related arm 231. The opening 275 with the stud 274 therein serves to limit the amount of pivotal movement of each pawl 230. As shown in the timing diagram of Fig. 48, the cam EC2 rotates the shaft 232 in a clockwise direction, as viewed in Fig. 4*b*, beginning with the initiation of the eject cycle and ending at 20° of such cycle. This initial rotation of the shaft 232 moves the pawl 230 rearward from its normal position shown in Fig. 4*b* to a position where it will engage behind the trailing edge of an old card being ejected as such card passes from between the rollers 195, 196. The cam EC2, through the linkage just described, moves the shaft 232 counterclockwise from the rearward position just noted beginning at 185° of each eject cycle and ending at 285° of such cycle and such counterclockwise rotation of the shaft 232 will provide for the pawls 230 moving the old card toward the right as viewed in Fig. 4*b* and thereby containing the ejection movement of such old card. The pawls 230 will move the old card out of the unit 100 and deposit the same in the receptacle 18 (Fig. 1) provided therefor at the front of the unit. Arms 277 pivoted on studs 278 carried, respectively, by the frame plates 110 and 111 ride upon the upper surface of a card being ejected and thereby aid in depositing the card within the receptacle 18.

The eject cam EC3 (Figs. 3 and 7) functions to operate the movable front or pressure plate 155 (Fig. 4*b*) of the card hopper 104 and also operate the roller 176 (Figs. 14, 15, and 16) of the card throat 174. The eccentric pin EC3*a* on the side of the cam EC3 functions to relatch the hopper contacts HC when an old card is being ejected from the passage 154 and where no cards are in the hopper 104.

The periphery of the cam EC3 is constantly engaged by a follower roller 280 carried by the outer end of one arm 281 of a lever 282 which is journalled on the end of shaft 169. A second arm 283 of the lever 282 is pivotally connected to one end of a link 284 and the latter is pivotally connected to one end of an arm 285 fixed on its outer ends to an outer extension of a transverse shaft 286 which is rotatably mounted in suitable openings in the two frame plates 110 and 111, respectively. A tension spring 287 connecting the arm 283 and a stud 288 carried by the main frame plate 110 constantly urges the roller 280 into engagement with the periphery of the cam EC3. As shown in Fig. 4*b*, an arm 290 is fixed at its upper end to the shaft 286 and is provided with a laterally extending stud 291 on which is rotatably mounted the upper end of the arm 161 which carries the pin 160 previously referred to as being normally engaged by a hook 159 fixed to the front or pressure plate 155 of the card hopper 104. A stud 292 which projects from the lower end of the arm 290 is engaged by an abutment face 293 formed on the lower end of arm 161. A relatively heavy tension spring 294 connects the stud 292 with a stud 295 projecting from the lower forward portion of the arm 161 and thus provides a means for constantly urging the abutment surface 293 against the stud 292. From the foregoing, it will be apparent that when the shaft 286 is rotated clockwise, as viewed in Fig. 4*b*, by the cam EC3 and through the linkage previously described, the arm 161 will be moved rearwardly and by means of the pin 160 will force the front or pressure plate 155 firmly against any cards occupying the hopper 104, the motion to the arm 161 being transmitted from the arm 290 through the tension spring 294 and the stud 291. The tension spring 294 thus provides a resilient connection between the arm 290 and arm 161 whereby, when the plate 155 strikes the cards in the hopper and further rearward movement of the plate 155 is thereby prevented, the arm 290 is permitted to continue its rearward movement. This continued rearward movement of the arm 290 will cause the stud 292 to be separated from the abutment surface 293 and the tension spring 294 will become extended and maintain the pressure of the plate 155 against the cards in the hopper. As shown in Fig. 48, the cam EC3 moves the pressure plate 155 into engagement with the cards beginning at 148° of each eject cycle and ending at 188° and the pressure of the plate against the cards is maintained until 335° after which time the cam EC3 operates to return the plate and its operating mechanism to the normal position shown in Fig. 4*b*, such return movement terminating with the end of the eject cycle.

Fixed to the shaft 286 at the end thereof remote from its connection to the arm 285 and at the outer side of the frame plate 111, is a depending arm 600 (Fig. 5) which is connected by a conventional pin and slot connection indicated at 601 to the upper end of an arm 602 of a bell crank 603 which is pivotally mounted on a stud 604 projecting outwardly from the frame plate 111. The lower end of a second arm 605 of the bell crank 603 engages a stud 606 projecting from the upper end of an arm 607 which is suitably fixed at its lower end to the shaft 177 to which the previously described roller throat member 176 is also fixed (Figs. 14, 15, and 16). The outer end of the shaft 177 is rotatably mounted in an arm 608 of a bracket 609 suitably fixed to the outer face of the frame plate 111. The bracket 609 is also provided with an integral flange 610 which receives an abutment screw 611, the outer end of which is adapted to be engaged by the upper end of the arm 608 mounted on the shaft 177. A tension spring 612 connecting the flange 610 and the outer end of the stud 605 serves to resiliently hold the arm 607 against the end of the abutment screw 611 when the parts are in their normal or inactive position shown in Fig. 5. From the foregoing, it will be apparent that when the shaft 286 is rotated by the cam EC3 to move the pressure plate 155 inward, the arm 600 on the outer end of this shaft moves clockwise as viewed in Fig. 5 and thereby moves the bell crank 603 counterclockwise and the arm 607 and shaft 177 clockwise. As explained above, the clockwise movement of the shaft 177, as shown in Fig. 14, results in the roller 176 rotating to the position shown in Fig. 16 where the curved surface of the roller shrouds the notch 179 and provides the rear defining wall of the card feed throat 174. It will be understood that the amount of motion imparted by the shaft 286 through the cam EC3 is just enough to effect the rotation of the roller 176 from the position of Fig. 14 to the position of Fig. 16. The timing of the rotation of the roller 176 is the same as explained above in connection with the movement of the pressure plate 155 because they are both operated from the same cam EC3. As shown in Fig. 48, the cam is indicated as rotating the roller throat to its position shown in Fig. 16, begining at 148° and ending at 188° and as rotating the roller throat back to the position shown in Fig. 14 beginning at 335° and ending with the termination of the eject cycle.

The eccentric projection EC3*a* (Figs. 3 and 7) strikes the outer end 614 of one arm 615 of a bell crank 616 during each eject cycle. The bell crank 616 is journalled on the end of shaft 169 and includes a second arm 617 which is pivotally connected at its outer end to the upper end of a link 618 and the latter is in turn pivotally connected to an arm 619 of a bell crank 620 which is rotatably mounted on a stud 621 projecting from the frame plate 110. A second arm 622 of the bell crank 620 is provided with an outwardly projecting stud 623 which extends in front of the upper end of the movable blade 219 of the hopper contacts HC. A tension spring 625 connecting the outer end of the arm 619 with a stud 626 projecting from the frame plate 110, constantly urges the bell crank 620 clockwise as viewed in Fig. 3, so that the stud 623 is maintained against the rear face of the upper end of a rigidly mounted stop plate 627 when the eccentric pin EC3*a* is out of engagement with the end 614 of the bell crank 616. The spring 625 thus serves to hold the bell cranks 620 and 616 and link 618 in their normal position shown in Fig. 3. It is noted that the stop plate 627 is formed as a vertical outwardly extending flange of a mounting bracket 628, to which the elements of the contacts HC and CLC are fixed, the bracket 628 being suitably fixed to the outside face of the frame plate 110.

As will be apparent from the previous description of the card lever CL, when a card is ejected from the passage 154, the tension spring 222 which connects the arm 225 with a plate 629 fixed to the plate 627, will rotate the card lever shaft 223 with its arms 224 and 225 counterclockwise, as viewed in Figs. 3, 14, and 15. At this time, the hopper contacts HC are closed as they were previously tripped by a card or cards occupying the hopper 104, and the upper movable blade 219 thereof is in the position shown in Figs. 3 and 15. This counterclockwise movement of the shaft 223 will result in the outer rear end of the arm 225 engaging and resting upon the upper end of an auxiliary latching arm 631 as shown in Fig. 15, the arm 631 being loosely mounted on the stud 621 at the outside of the bell crank 620, and the upper end thereof projecting a slight distance above the upper end of the movable blade 219. Arm 631 is constantly urged clockwise as viewed in Figs. 3, 14, and 15, by a tension spring 632 connecting a pin 633 on the arm 631 and the fixed plate 628. The upper end of the arm 631 is so positioned that when the card lever CL is returned by the spring 222 and the arm 225 strikes such upper end, as just explained, the arm 224 will lightly engage the bottom edges of cards in the hopper 104 as shown in Fig. 15. It will be apparent that if the construction were such that the arm 224 were permitted to strike the bottom of any cards occuping the hopper with a substantial force, the blow might be hard enough to knock some of the cards upward above the bottom of the hopper and one or more of the cards might remain in such upper position because of friction between the cards and the spring 181. It will be obvious that if a card in the hopper be thus held above the bottom thereof at the time the sectors 165, 166 move to feed the same downward, such card will not be fed the same desired distance in the passage 154 as when the card is fed from its correct position on the bottom of the hopper. Thus, the arm 631 in stopping the arm 224 in the position shown in Fig. 15, prevents any such improper positioning and feeding of the cards from the hopper.

As shown in Fig. 48, the eccentric projection EC3*a* engages the end 614 of the bell crank 616 at 188° of each eject cycle and thereby moves the bell crank 616 clockwise as viewed in Fig. 3. This will result in a downward movement of the link 618 and in a counterclockwise movement of the bell crank 620 against the force of the spring 625. This counterclockwise movement of the bell crank 620 will cause the stud 623 to move towards the rear and engage the forward face of the upper end of the movable spring blade 219 and the auxiliary arm 631 and then to move them rearwardly and beyond the position of the blade 219 and arm 631 shown in Fig. 14. If there be no more cards in the hopper 104 at the time of an eject cycle, the spring 222 will then cause the arm 225 to fall in front of the blade 219 and arm 631. This counterclockwise movement of the bell crank 620 ends at 202° (Fig. 48) and the eccentric pin EC3*a* then moves out of engagement with the end 614 (Fig. 3) and thereby permits the spring 625 to return the bell cranks 616 and 620 and stud 623 to the positions shown in Figs. 3 and 14. The movable blade 219 and arm 631 will follow the return movement of the stud 623 until the upper ends thereof engage the rear edge of the arm 225 and the latter will then prevent further forward movement of the blade 219 and arm 631 and the contacts HC will thus be latched in their open position shown in Fig. 14 and they will remain so latched until new cards are placed in the hopper 104 and thereby engage and move the arm 224, shaft 223, and arm 225 to release the blade 219 and permit the contacts HC to again close, in the manner previously explained.

The cam EC4 (Figs. 7 and 10) is the one which effects operation of the card feed sectors 165, 166 to feed a new card from the hopper 104 downward through the throat 174. This cam is fixed to the eject shaft 134 adjacent to the inside face of the frame plate 110. A follower roller 635 carried by the upper outer end of an arm of a lever 636 is held in constant engagement with the peripheral surface of the cam EC4 by means of a tension spring 637 connecting the lower outer end of a downward extension of the lever 636 and a fixed stud 638 projecting inwardly from the frame plate 110 (see also Fig. 2). The lever 636 is fixed in any suitable fashion to the transverse shaft 169 to which is also secured the operating arms 167 and 168 of the feed sectors 165 and 166, as previously described. As shown in Figs. 10 and 48, the cam EC4 through the lever 636, spring 637, and shaft 169 moves the sectors 165, 166 upwardly from the normal position shown in Figs. 4*b* and 10 beginning at 20° of each eject cycle and the upward movement is completed at 140° of the eject cycle, and the sectors are then held in their upper position until 209°. It will be noted that at 188° the cam EC3 completes the movement of the pressure plate 155 against the cards in the hopper 104. At 209°, the sectors 165, 166 are moved downward and they thereby feed the rearmost card from the hopper 104 downward through the throat 174 and into the passage 154. As explained previously, the stop plate 215 is moved by the cam EC1 into its intercepting position shown in Fig. 11 at 230°. Therefore the new card being moved downward by the sectors 165, 166 strikes the end of the stop plate 215 and further movement of the card is therefore prevented. As explained previously, the position where the new card is stopped is the #1 column sensing position of the card. Normally the new card being fed strikes the stop plate 215 at about 297° of the eject cycle. The feed sectors continue their downward movement until 310° where they reach the normal position shown in Figs. 4*b* and 11. Fig. 16 shows in dot-and-dash lines the uppermost position of the feed sectors 165, 166 and shows in full lines the position the sectors occupy at a midportion in the downward feeding of the card. Fig. 11 shows the position of the parts with the card striking the end of the stop plate 215 and before the plate has been moved out of the way. Figs. 4*b* and 10 show the position of the parts at the end of the eject operation and after the new card has been fed to its #1 column sensing position.

The eject cam EC5 (Figs. 4*b*, 7, and 9) is the one which functions to separate the feed roll 196 from the roll 195 after an old card occupying the passage 154 has been ejected and so that the new card being fed downwardly from the hopper can move between the rolls 195, 196 and to its #1 column sensing position. The cam EC5 then returns the roll 196 to its normal feeding relation shown in Fig. 4*b*, where the newly fed card is engaged between the rolls and is in position to be advanced as a part of a normal sensing and feeding operation of the card which will be described in detail hereinafter. The cam EC5 also functions during each eject cycle to operate a lock-out bail 641 which engages the bottom of all of the sensing levers of the group SL1 to SL12, inclusive, and moves such levers out of sensing position in the passage 154 during the time the new card is being fed downward through the passage.

The periphery of the cam EC5 is constantly engaged by a follower roller 642 carried by the upper end of an arm 643 which is journalled on the shaft 169. The upper end of the arm 643 is pivotally connected to one end of a link 644 and the other end of the latter is pivotally connected to the upper end of an arm 645 fixed to a shaft 646 which is suitably journalled within aligned openings in the main frame plates 110 and 111. The shaft 646 extends outwardly beyond the two frame plates and a pair of arms 647 and 648 are secured, respectively, to such outer ends (Figs. 3 and 5). The upper outer ends of the two arms 647 and 648 are each provided with an abutment screw 649, and the abutment screws of the two arms engage, respectively, the upper flanged ends of arms 650 and 651 of the levers 203 and 204 which, as described previously, are rotatably supported on the studs 205 and 206 and carry bearings 201 which rotatably support the shaft 198 of the feed roll 195. A tension spring 653 connecting the abutment screw 649 of the arm 647 and the fixed stud 288 extending from the main frame plate 110 constantly urges the shaft 646 in a counterclockwise direction, as shown in Fig. 3, and through the arm 645, link 644, and arm 643 (Fig. 4*b*) also maintains the roller 642 in constant engagement with the periphery of the cam EC5.

From the foregoing it will be apparent that the cam EC5, through the link and lever arrangement described, provides for moving the levers 203 and 204 counterclockwise, as shown in Figs. 3 and 5, and thereby separating the feed roll 196 from the feed roll 195. It is noted that the amount of separating movement is insufficient to disengage the two drive gears 210 and 211 on the ends of the roll shafts 141 and 198, but is sufficient to permit a new card to be fed therebetween. As shown in Fig. 48, the cam EC5 provides for moving the roll 196 away from the roll 195 beginning at 186° of each eject cycle and completed at 231° and provides for returning the roll 196 into feeding relation with respect to the roll 195 beginning at 310° and ending at 335°.

As shown in Fig. 10, an arm 654 is also fixed to the shaft 646 and is provided at its lower end with a stud 655 which is adapted to engage a flange 656 formed on the outer end of arm 657 of a bell crank 658 (see also Fig. 13) which is fixed to one end of a transverse shaft 659. The shaft 659 is rotatably supported in aligned openings formed in upstanding flanges 660 and 661 of a main support plate 662 for the card sensing unit of which the sensing levers SL1 to SL12, inclusive, are a part. The plate 662 extends between the main frame plates 110 and 111 and is fixed thereto by suitable screws 663 extending through the flange 660 and the plate 110 and through the flange 661 and the plate 111. A second arm 665 of the bell crank 658 extends forwardly and is integrally joined with the left-hand end of the lock out bail 641, as viewed in Fig. 13. An arm 666 is integrally joined with the right-hand end of the bail 641 and is also fixed to the shaft 659.

From the foregoing, it is apparent that when the cam EC5 rocks the shaft 646 by the previously described linkage shown in Fig. 4*b*, the arm 654 (Fig. 10) moves clockwise and the stud 655 thereon engages the flange 656 and thereby moves the bell crank 658 and shaft 659 counterclockwise and, as a result, the two arms 665 and 666 will move the bail 641 upward as viewed in Figs. 4*b*, 10, and 11 and engage the left-hand end of the twelve sensing levers SL1 to SL12, inclusive. This will move the sensing levers clockwise about a supporting pin or rod 667 and will cause the right-hand or sensing ends of the levers to move downwardly and out of sensing relation with respect to the card feed passage 154. As the bail 641 is operated from the same cam as the mechanism for separating the feed roll 196 from the roll 195, the timing of the movement of the lock-out bail 641 will be the same as that previously described in connection with the separation of the feeding rolls, that is, the sensing levers will be moved completely out of sensing relation at 231° of each eject cycle and will be restored to sensing relation beginning at 310° and ending at 335° of such eject cycle.

The eject cam EC6 (Figs. 4*b*, 7, and 9) provides for aligning the cards in the hopper 104 before the pressure plate 155 is moved against such cards. A follower roller 669 constantly engages the cam EC6 and is rotatably mounted on an arm 670 which is journalled on the shaft 169. The upper end of the arm 670 is formed with a flange 671, and a link 672 connects the outer end of the flange 671 with an arm 673 of a bell crank 674. As shown in Figs. 4*b* and 9, the link 672 is so constructed that its length may be adjusted. The bell crank 674 is pivoted on an upstanding pin 675 carried by a bracket 676 which is suitably fixed to the side of the frame plate 111. The bell crank 674 includes a second arm 677 which extends forwardly and downwardly and terminates in the card-aligning member 234, previously described. A tension spring 678 connecting the arm 677 and a fixed bracket 679 constantly urges the bell crank 674 clockwise, as viewed in Fig. 9, and thereby urges the roller 669 into engagement with the cam EC6 through the link 672 and lever arm 670.

From the foregoing, it will be apparent that as the roller 669 moves out of engagement with a high point of the cam EC6 onto a low point of such cam, the roller 669 and arm 670 move rearwardly, as viewed in Fig. 9, and the bell crank 674 moves clockwise, and will thereby effect engagement of the card aligning member 234 with the cards in the hopper 104. From an examination of Fig. 48, it will be noted that the cam EC6 is so shaped that it provides first for moving the aligning member from the position shown in Fig. 9 and into engagement with the cards in the hopper beginning at 42° of each eject cycle and ending at 87° and that the cam then moves the aligning member quickly away from the cards and then back into engagement with the cards ending at 117° and again moves the aligning member quickly away from the cards and back into engagement therewith ending at 147°. These two quick movements of the aligning member 234 away from and into engagement with the cards are effected during a part of the eject cycle before the pressure plate 155 is moved into engagement with the cards and these quick movements have the effect of joggling the cards in the hopper and thereby provide for effectively aligning the cards in the hopper. It is noted that at the end of the second quick inward movement of the member 234, the latter then remains in its aligning position from 147° to 188° and that during this period, beginning at 148° and ending at 188°, the cam EC3 moves the pressure plate 155 into engagement with the cards. It is noted that cam EC6 is returned to the position shown in Fig. 9 at 235° and the pressure plate, through the cam EC3, maintains the cards in their aligned condition in the hopper and is returned to its normal position at the end of the eject cycle.

The cam EC7 is shown in Figs. 7 and 8 as being fixed to the outer right-hand end of the eject shaft 134. The purpose of the cam EC7 is to connect the feed roll drive shaft 141 (see also Fig. 5) to the constantly running driving mechanism previously described, at the beginning of an eject cycle so that the rolls 195, 196 will be rotated to eject or feed out of the passage 154 any old card occupying the passage before a new card is fed downward by the sectors 165, 166.

As described previously, the gear 140 (Figs. 5 and 8) is rotatably mounted on the end of the feed roll drive shaft 141 and this gear is a part of the constantly running drive mechanism which is driven from the main drive shaft DS and the gear 123 fixed to the latter. As shown in Figs. 6 and 8, a clutch collar 681 is connected to the roll drive shaft 141 in such a manner that they rotate together and so that the collar may be moved axially with respect to such shaft. A lever 682 is pivoted on a pin 683 carried by spaced arms 684 of the bracket 609 which is fixed to the frame plate 111. The lever 682 is formed with a forked end 685 which fits within an annular space 686 provided between spaced clutch flanges 687 and 688 which are integral parts of the clutch collar 681. The flange 687 is formed at its periphery with an annular row of clutch teeth 689 which is normally held in engagement with a similar annular row of teeth formed on a hub of a gear 691 which is rotatably mounted on the feed roll drive shaft 141. As will later appear, the gear 691 is the terminal gear of a driving train which is operated to rotate the card feed rolls 195, 196 for normally advancing a card column-by-column and for skipping columns of the card in a manner which will be fully described hereinafter. As shown in Fig. 8, a compression spring 692 engaging the rear end of an arm 693 of the bell crank 682 and fitting within a circular opening 694 in the frame plate 111, constantly urges the bell crank 682 clockwise, as viewed in Fig. 8, and this will cause the forked end 685 to force the collar 681 toward the left as viewed in Figs. 6 and 8 and thereby to hold the teeth 689 of the flange 687 in clutching engagement with the teeth formed on the gear 691. It is noted that during an eject operation, the mechanism for rotating the gear 691 is disconnected from the constantly running driving mechanism previously described. As shown in Figs. 6 and 8, a disk 695 of suitable friction material is suitably fixed to the right-hand face of the clutch flange 688 and in the normal position shown is out of contact with the left-hand face of the gear 140 previously referred to.

A follower roller 696 is rotatably mounted on an arm 697 of a bell crank 698 and constantly engages the face of the cam EC7. The bell crank 698 is suitably pivoted on a pin 699 carried by spaced arms 700 formed integral with the bracket 609 which is secured to the plate 111. The bell crank 698 also comprises a second arm 702 in which an adjustable abutment screw 703 is threaded and the latter engages at its left-hand end, as viewed in Fig. 8, the end 693 of the bell crank 682. Thus, the compression spring 692 acting through the arm 693 also constantly urges the bell crank 698 counterclockwise, as viewed in Fig. 8, and the follower roller 696 into engagement with the cam surface of the eject cam EC7.

From the foregoing, it will be apparent that as the roller 696 engages a high point of the cam EC7, the bell crank 698 will be moved clockwise, as viewed in Fig. 8, and the bell crank 682 will be moved thereby in a counterclockwise direction. This will cause the forked end 685 of the bell crank 682 to move the collar 681 to the right, as viewed in Figs. 6 and 8, and so that the teeth 689 of flange 687 become disengaged from the teeth of the gear 691 and so that the friction surface 695 of the flange 688 engages the left-hand face of the gear 140. As the gear 140 is being constantly rotated by the drive mechanism from the main drive shaft DS, as previously explained, this will cause the collar 681 to rotate with the gear 140 and thereby to drive the feed roll drive shaft 141 at the speed of the gear 140 and the feed roll shaft 198 will also be driven through the meshing gears 210 and 211.

As shown in Fig. 48, the cam EC7, through the connecting levers just described, provides for the frictional clutching engagement of the flange 688 and gear 140 at about 45° of each eject cycle and this frictional clutching engagement is maintained until 186° of such cycle. Thus, for 141° of each eject cycle, the feed rolls 195, 196 are driven from the constantly running driving mechanism previously described of which the gear 140 is a part. As previously explained, the gear ratio for driving the eject shaft 134 is such that the main drive shaft DS and gear 123 (Figs. 5 and 6) make approximately eight revolutions while the eject shaft is making one revolution. It is noted that the gear ratio between the gears of the train comprising the constantly running drive mechanism and including the gear 140 is such that the gear 140 rotates a fraction more than one revolution for each revolution of the main drive shaft DS and the construction is such that during the 141° of the eject cycle the gear 140 is driving the feed rolls 195 and 196, the latter rotate approximately four revolutions. The size of the rolls 195, 196 is such that the four revolutions are more than sufficient to feed a complete card from the passage 154 beginning at its #1 column sensing position and continuing until the card passes from between the rolls. It is noted that this eject operation of the rolls 195, 196 is effected during the first part of each eject cycle and before such feed rolls are separated by the cam EC5 for receiving the new card and before the cam EC4 starts the downward feeding movement of the feed sectors 165, 166.

It is believed that the operations which take place during an eject cycle of the unit 100 will be apparent from the foregoing description, and from an examination of the timing diagram in Fig. 48. The line opposite the legend "Old card ejecting" in Fig. 48 indicates the eject movement of a card in the passage 154 when such card is ejected from its #1 column sensing position. As indicated, the trailing edge of such a card moves beyond the aligner plate 234 (Fig. 9) at 119°, moves out of the throat 174 at 145°, clears the rolls 195, 196 at 186°, is beyond the stop edge of plate 215 at 217° and is clear of the unit 100 at 285°. It will be apparent that when an old card is ejected from column reading positions in the passage 154 after the #1 column position, which of course is the normal operation, such card clears the rolls at a proportionally earlier time than 186° of the cycle and such card will remain in the latter position until the eject pawls 239 start their ejecting movement by reason of the operation of cam EC2. As explained above, the card lever contacts CLC are opened during each eject cycle when the trailing edge of an ejected card clears the end of arm 224 and the latter moves upward under the force of the spring 222. For a card being ejected from its #1 column sensing position, the card lever contacts open at 178° and when a card is ejected from its #80 column sensing position, the card lever contacts open at 46°. For cards ejected from intermediate column sensing positions the contacts CLC will open at proportionally different times. The card lever contacts are reclosed by the entry of each new card into the passage 154 at 208°. The line opposite the legend "New card entry" in Fig. 48 indicates that the sectors 165, 166 start the feeding of each new card at 209° of each eject cycle and such new card engages the stop plate 215 and is stopped in its #1 column sensing position at 297° of such cycle. The timing of the opening and closing of each of the eject cam contacts ECB1 to ECB4 by their related operating cams ECO will also be apparent from an examination of Fig. 48.

*Cam operated contacts.*—As stated above, there are nine constantly running cam contacts, CR1 to CR9, inclusive, two card feed cam contacts, CF1 and CF2, and four eject cam contacts, ECB1 to ECB4, inclusive, provided in the illustrated embodiment and these contacts are operated to control related circuits in a manner which will be fully described hereinafter under the heading "Operation." These cam contacts and the cams which operate them are of identically the same construction and a description of one will suffice for all. The structural details of the constantly running cam contact CR5 and its operating cam is shown in Fig. 4*a*. It will be noted that this cam contact and its operating cam are of identically the same construction and operate in the same manner as the contacts CR3 and cam 803 shown in Fig. 12 of our copending application referred to above at the outset. It is also noted that this type of construction is fully disclosed in the U. S. patent to Cunningham No. 2,384,802, granted September 18, 1945. As shown in Fig. 4*a* of the present application, the cam CR comprises two cam elements 705 and 706, respectively, mounted in fixed relation to one another and rotatable together with the shaft DS. The construction is such that the cam elements 705 and 706 may be adjusted angularly with respect to one another and with respect to the shaft DS, so as to vary the time of opening and closing of their related contacts. The cam element 705 is adapted to engage an end 707 of a pin 708 slidably mounted in a fixed mounting block 709 and engaging at its other end the movable spring blade 710 of the cam contacts CR5. In so doing the movable blade 710 is moved against its inherent spring force to a contact closing position and a ledge 711 on the end 707 moves past a latching projection 712 on the outer end of an arm 714 which is fixed on a pin 715 rotatably mounted in the block 709. A compression spring 716 extending between the arm 714 and a fixed base member 717 constantly urges the latching projection 712 against the end 707 so that when the pin 708 is moved inward to close the contacts CR5, as just explained, the projection 712 snaps behind the ledge 711 and thereby latches the pin 708 and the contacts CR5 in closed position. The contacts CR5 will remain closed until the other cam element 706 strikes the outer end of a second arm 718 also fixed to the pin 715. When the latter happens, the pin 715 and arm 714 are rotated clockwise and the projection 712 is moved downward to clear the ledge 711 and the pin 708 is moved back to the open position shown in Fig. 4*a* by the inherent spring force in the movable spring blade 710. As shown in Fig. 49, the cam contacts CR5 close at 295° of each operating cycle and open at 360°. The time of opening and closing of the other constantly running contacts and of the card feed contacts is also shown in Fig. 49. As stated, the timing of the eject cam contacts appears in Fig. 48.

*Normal card feeding and sensing mechanism.*—At the end of an eject cycle, the card in the passage 154 is in position to have its #1 column sensed, as previously explained, and the columns of the card may then be sensed and advanced column-by-column past the sensing station 107, there being one normal sensing and feeding operation for each normal operating cycle of the unit 100, and each normal operating cycle comprises one revolution of the main drive shaft DS. It is noted that the cam EC5 returns the lock out bail 641 and the sensing levers SL1 to SL12 into sensing relation with respect to column #1 of the new card at 335° of the eject cycle. The normal sensing and feeding operations are effected by the engagement of the card clutch CFC (Figs. 5 and 6) and the latter is engaged by the energizing of the card feed clutch magnet CFM, as stated previously.

The card feed clutch CFC is of the same construction and operation as the card feed clutch of our copending application and is identified herein by the same reference character. As shown in Figs. 5 and 6 herein, the card feed clutch comprises a constantly running driving disk 720 fixed to the hub of the constantly running gear 124, and also comprises a clutch pawl 721 pivoted on a pin 722 projecting from the side of a driven clutch disk 723, the latter being secured by a suitable rubber bonding, indicated at 724, to a disk 725 fixed on the outer end of the card feed shaft 125. The driving disk 720 is formed with a single notch 727 which is adapted to receive the clutch tooth 728 of the pawl 721 and thereby to effect clutching engagement between the driving disk 720 and the driven disk 723. In the declutched position of the parts shown in Fig. 5, the pawl 721 is held out of clutching position by a tail portion 729 formed thereon and engaging the upper end of a pivoted armature 730 of the card feed magnet CFM. The driven disk 723 and pawl 721 are maintained in their declutched position shown by the usual detent roller 731 fitting within a recess 732 formed in the peripheral surface of the driven disk 723. The detent roller 731 is rotatably mounted on the outer end of an arm of a detent lever 733 which is in turn pivoted on a stud 734 projecting from the frame plate 111. A tension spring 735 connects a second arm of the lever 733 with a fixed stud 736 projecting from the frame plate 111 and thereby constantly urges the lever 733 clockwise and the roller 731 into engagement with the periphery of the disk 723. The usual tension spring 737 connecting the outer end of the pawl 721 with a stud 738 carried by the driven disk 723, constantly urges the pawl into clutching engagement with the disk 720; but as stated, the pawl is held in the declutched position shown by the upper end of the armature 730 engaging the tail portion 729 and by the engagement of the detent roller 731 with the notch 732 in the disk 723.

From the foregoing, it will be apparent that when the card feed magnet CFM is energized, it will attract its armature 730 and thereby release the pawl 721 from latching engagement with the upper end thereof and its spring 737 will then move the pawl into engagement with the periphery of the driving disk 720 and the tooth 728 will fit within the notch 727; and, when thus engaged, the disk 723 and shaft 125 rotate with the constantly running driving disk 720 and gear 124. Thus, the card feed shaft 125 is clutched to the constantly running driving mechanism and will remain in such condition until the card feed magnet CFM is deenergized. When the latter occurs, the armature 730 is returned to the position shown in Fig. 5 where it engages the tail 729 of the pawl 721 and thereby moves the pawl against the force of its spring 737 and its tooth 728 out of the notch 727. The driven disk 723 and card feed shaft 125 are then stopped by the detent roller 731 and notch 732, with the disk 723 and shaft 125 in the home position shown. It is noted that the notch 727 is so placed on the driving disk 720 that clutching engagement is effected at the end of the operating cycle in which the magnet CFM is energized (see Fig. 49).

With the card feed clutch engaged, each revolution of the card feed shaft 125 provides a normal card sensing and feeding operation and during each such operation, the record column of the card at the sensing station 107 is sensed and the feed rolls 195, 196 are indexed to move the next card column into sensing position at the station 107. It is noted that each revolution of the shaft 125 corresponds to a revolution of the main drive shaft DS and an operating cycle of the illustrated embodiment.

The indexing or intermittent operation of the feed rolls 195, 196 is effected by the card feed shaft through a conventional Geneva drive mechanism GM and a gear train including a differential mechanism DM, the same as in our copending application identified hereinabove. As shown in Figs. 4b and 6, the Geneva drive mechanism GM comprises a driver in the form of a roller 740 mounted on a stud 741 projecting from the side of a disk 742 which is fixed to the card feed shaft 125, and also comprises a driven member in the form of the conventional Geneva star wheel 743 rotatably mounted on a stud 744 which is carried by the intermediate frame plate 112.

The wheel 743 is formed with six (6) radially disposed slots 745 located sixty degrees (60°) apart and adapted to operatively receive the driving roller 740. Adjacent slots 745 are separated by arcuate surfaces 746 having equal radii of curvature. The Geneva drive also comprises the usual locking disk 747 which is herein shown as being formed integral with the side of the disk 742. The locking disk 747 is formed to provide a locking sector 748 and a cut-away or clearance portion 749. The cylindrical peripheral surface of the locking sector 748 has the same radius of curvature as the arcuate surfaces 746 of the wheel 743. The locking sector 748 is adapted to engage the arcuate surfaces 746 as shown in Fig. 4b, so as to hold the driven star wheel 743 stationary when the roller 740 is out of driving engagement with any of the slots 745. The clearance portion 749 of the locking disk 747 is centrally disposed opposite the driving roller 740 and thereby permits movement of the driven star wheel 743 when the roller 740 is within a slot 745.

In Fig. 4b the roller 740 is shown at the outer end of a slot 745 and this is the position occupied by the roller when the card feed clutch CFC is disengaged. Upon engagement of the card feed clutch CFC, the roller 740 moves clockwise from the position shown until it enters and operatively engages the next slot 745, and during such movement the peripheral arcuate surface of the locking sector 748 will engage a correspondingly curved surface 746 of the wheel 743 and thereby hold the driven star wheel stationary. When the roller 740 enters the outer end of the next slot 745, further movement of the roller will impart counterclockwise movement to the Geneva wheel 743 and such movement will be permitted because of the location at that time of the cut-away portion 749 of the locking sector 747 opposite the roller 740 and opposite the end of the slot 745 engaged thereby. Thus, for each revolution of the roller 740 and card feed shaft 125, the driven Geneva wheel 743 is rotated one-sixth of a revolution, or sixty degrees (60°). As shown in Fig. 49, the Geneva wheel 743 moves from about 245° to about 355° of each machine cycle, the clutch CFC is engaged and such wheel is stationary for the rest of such cycle.

As shown in Fig. 6, the Geneva wheel 743 is an integral part of a hub 751 which is suitably journalled on the stud 744. A gear 752 is also formed on the hub 751 and meshes with a gear 753 having a hub 754 journalled on the shaft 137, previously referred to. A bevel gear 755 is also formed on the hub 754 and comprises one sun wheel of the differential drive mechanism DM. The mechanism DM comprises a second bevel sun gear 756 formed on the hub 757 which is also journalled on the shaft 137, and also comprises a pair of bevel planet gears 758 meshing with both sun gears 755 and 756 and journalled, respectively, on the two outer ends of a planet arm 759. The latter is formed at its midportion as a squared section 760 having an opening therethrough (not shown), through which the shaft 137 extends at right angles to the axis of the planet arm 759. The squared portion 760 and shaft 137 are suitably locked together by a pin 762. The shaft 137 is the power output of the differential mechanism DM.

It is noted that at the time the card feed clutch CFC is engaged and the Geneva wheel 743 is being indexed once for each machine cycle in the manner previously explained, the sun gear 756 of the differential DM is held stationary in a manner which will be explained more fully hereinafter in the description of the mechanism that operates as a result of the engagement of the skip clutch SKC. Thus, with the sun gear 756 held stationary, and with the sun gear 755 driven from the star wheel 743, the planet gears 758 and output shaft 137 will be rotated about the axis of the latter at one-half the rate of rotation of the sun gear 755.

A gear 763 is fixed to the outer end of power output shaft 137 of the differential DM and meshes with a gear 764 rotatably mounted on the stud 139 and the latter meshes with the gear 691 previously described as being rotatably mounted on the feed roll drive shaft 141 and as being normally clutched to the hub 681 by mating sets of teeth on the side of the gear 691 and on a flange 687 of the hub 681, respectively. As also previously described, the hub 681 is keyed to the shaft 141.

From the foregoing, it will be apparent that for each revolution of the main drive shaft DS, and card feed shaft 125, the drive shaft 141 of the card feed rolls 195, 196 is rotated through the Geneva drive mechanism GM and the gear train including the differential mechanism DM previously described. As the shaft 196 is geared to the shaft 141 through the gears 210, 211, both card feed rolls 195 and 196 are rotated through the Geneva drive and differential mechanism just described. The construction is such that for each revolution of the main drive shaft DS and card feed shaft 125, the feed rolls 195, 196 are rotated one-seventeenth of a revoluton which is the amount required to advance a record card a distance equal to the space between two record columns thereof. Thus, as long as the card feed clutch CFC is engaged, the feed rolls 195, 196 are rotated each cycle one-seventeenth of a revolution to advance the record card therebetween and thereby to bring the next succeeding record column thereon into sensing position and the advancing movement of such card is effected between about 245° and 355° of each machine cycle.

The manner in which the record column of the card at the sensing station 187 is sensed during each machine cycle the card feed clutch CFC is engaged, will now be described. The means for sensing the record column at the sensing station includes the twelve sensing levers SL1 to SL12, inclusive, and is shown more clearly in Figs. 11, 12, and 13. It is noted that the sensing means disclosed herein is of the same general construction and operation as that disclosed and claimed in the application of James M. Cunningham, Serial No. 770,349, filed August 25, 1947, and entitled "Perforated Record Sensing Device," which application has matured into Patent No. 2,157,984, dated August 8, 1950.

The supporting pivot rod 667 for the twelve sensing levers SL1 to SL12, inclusive, is carried by a supporting block 766 extending across the forward edge of the fixed supporting plate 662 and suitably fixed to the latter by screws 767.

The block 766 is formed at its outer edge with twelve slots 768 receiving, respectively, the sensing levers SL1 to SL12, inclusive. Each sensing lever comprises a forwardly extending lever arm 769 carrying a related sensing element in the form of a freely rotatable star-shaped sensing wheel 770, and also comprises a rearwardly extending lever arm 771 connected to a related sensing contact element. The sensing contact elements for the twelve sensing levers SL1 to SL12, inclusive, are indicated, respectively, in Figs. 13 and 50*a* by the reference characters SC1 to SC12, inclusive.

As shown in Figs. 12 and 13, each sensing lever is suitably formed by two spaced parallel plates 773*a*, 773*b* integrally joined at their rear portion by a third plate 774. The pivot supporting rod 667 passes through aligned openings in the plates 773*a*, 773*b* of each sensing lever and a spacing collar 775 is arranged between such plates and receives the rod 667. The related star sensing wheel 770 of each sensing lever is rotatably mounted on a pin 776 carried by the two forward ends of its plates 773*a*, 773*b*. A contact operating bracket 777 is suitably spot welded to the rear of the plate 774 of each sensing lever and carries at its rear end a block 778 of insulating material having suitable transverse openings slidably receiving the forward ends of a group of contact wires forming the sensing contact element which relates to such sensing lever. Each sensing contact element of the group SC1 to SC12, inclusive, comprises a group of three contact wires arranged side-by-side and slidably received at their forward ends in an opening in the block 778 of its related sensing lever and the contact wires of each group extend rearwardly through an opening 779 in a corresponding terminal contact plate 780 and at their extreme rear ends each group of wires extends through an opening 781 in an anchor plate 782 of suitable insulating material.

The twelve individual terminal plates 780 are formed of electrically conducting material and are suitably mounted in spaced relation on a transversely extending block 784 of insulating material by screws 785 and each plate 780 extends upwardly to provide a terminal strap to which a related circuit wire, indicated at 786 (Fig. 11), may be attached. The block 784 is suitably fixed to the plate 662 by screws 787 and is provided with twelve transverse passages 788 through which extend the groups of wires forming, respectively, the twelve contact elements SC1 to SC12, inclusive. The anchor plate 782 extends across the back of the block 784 and is suitably secured thereto by screws 789.

As shown in Figs. 11 and 12, each group of three wires forming the twelve contact elements of the group SC1 to SC12, inclusive, engages the top defining wall of the opening 779 in its related terminal plate 780 and engages the bottom defining wall of the related opening 781 in the anchor plate 782. The wires forming each contact element are formed of suitable electrically conducting spring metal, and the anchor plate 782 is so positioned with respect to the terminal plates 780 that the right-hand ends of the wires as shown in Figs. 11 and 12, are normally urged downward or clockwise about the upper defining walls of openings 779 as a fulcrum.

The group of wires forming each of the twelve contact elements comprises an additional spring wire 791 which also extends through the same openings 779 and 781 as the other wires of its group and its right-hand end, as viewed in Figs. 11 and 12, extends slightly upward from the other wires of its group and also outward and to the left as viewed in Fig. 13, and is slidably received at its outer end in a separate opening 792 in the block 778 carried by its related sensing lever. The purpose of the additional wire 791 is to provide spring force, in addition to that provided by its related three wires forming the related contact element, which constantly urges its related block 778 downward and its related sensing lever counterclockwise about the supporting pivot rod 667 and so that its related sensing wheel 770 is constantly urged into sensing relation with respect to the column of the record card in sensing position in the passage 154. A contact plate 793 extending beneath and common to all of the sensing contact elements SC1 to SC12, inclusive, is suitably fixed to a plate 794 and the latter is suitably fixed to the top surface of a transverse block 795*a* of insulating material carried by the supporting plate 662.

A terminal strap 795 is structurally and electrically connected to the plate 794 which is of suitable electrically conductive metal and through the latter is electrically connected to the common contact plate 793. A circuit wire, as indicated at 796, may be connected to the terminal strap 795.

From the foregoing it will be apparent that the twelve sensing contacts SC1 to SC12, inclusive, are operated, respectively, by the twelve sensing levers SL1 to SL12, inclusive, and correspond, respectively, to the twelve index point positions of the record column of the card (see also Figs. 31 to 42) in sensing position. The transverse arrangement of the twelve sensing levers with respect to the card feeding passage 154 will be apparent from an examination of Fig. 13. The sensing wheels 770 of the twelve sensing levers are positioned so that they are in sensing relation with corresponding index point positions of the card column in sensing position. Consequently, looking at the unit 100 from the front (Figs. 1 and 2), each card is so positioned in the hopper 104 that when it is fed downward through the throat 174 (Fig. 4*b*), the #1 record column is fed first and its index point position #12 is at the left-hand side of the passage 154 and its index point position #9 is at the right-hand side of such passage. Fig. 11 shows the position of the star sensing wheel 770 of sensing lever SL3 when the corresponding index point position #3 of the record column at the sensing station 107 does not contain a code hole. The two points 770*a* and 770*b* of the star wheel 770 straddle the record column in sensing position and bear with equal pressure on the surface of the record card and thereby hold the sensing lever SL3 in the position shown and its related contacts SC3 in their open position and against the spring force in the group of wires composing such sensing contacts. Fig. 12 shows the relative position of the same parts when the #3 index point position of the card column at the sensing station contains a code hole. In Fig. 12, the point 770*a* of the star wheel is shown as projecting through a code hole in the card, and the sensing lever SL3 occupies a position counterclockwise from that shown in Fig. 11 and the sensing contacts SC3 now engage the common contact plate 793 and the contacts SC3 are thereby closed.

The manner in which a sensing operation takes place is believed to be apparent from the foregoing description. As a card moves downward through the passage 154 and as a record column thereof moves into sensing position at the station 107, a point of each star wheel 770 moves into a code hole when the corresponding index point position of the column contains such a code hole, and thereby closes its related sensing contacts. If there be no code hole in an index point position, two points of the corresponding star wheel engage the surface of the card and hold the related sensing contacts open. As a record column having no code hole in a given index point position moves from sensing position and the succeeding record column having a code hole in such index point position moves into sensing position, a point of the corresponding star wheel enters such code hole and such wheel is rotated clockwise as viewed in Figs. 11 and 12 to permit such card motion and when the latter column of the card moves away from sensing position the wheel rotates further to permit such movement. When there are no code holes in a given index point position in succeeding record columns, the surface of the card engages two points of the corresponding star wheel as shown in Fig. 11, and such card surface simply slides on the rounded tips of such points as the card is moved.

From the foregoing, it is apparent that as each record column of a card moves into sensing position, the twelve sensing contacts SC1 to SC12, inclusive, are closed or remain open depending upon whether or not code holes are present in corresponding index point positions of such record column. As shown in Fig. 49, the record column of the card to be sensed is moved into sensing position by the rolls 195, 196 beginning with 245° and ending with 355° of each machine cycle that the card feed clutch CFC is engaged, and the sensing contacts of the group SC1 to SC12, inclusive, corresponding to each index point position of such record column containing a code hole, are closed at that time and such sensing contacts remain closed until the succeeding record column of the card is moved into sensing position during the following machine cycle. As will later appear when considering the operation of the illustrated embodiment in connection with the wiring diagram (Fig. 50*a*), the closing of each set of sensing contacts conditions a sensing circuit through a corresponding card code set-up relay and any such conditioned sensing circuits are closed by the card feed cam contacts CF1. As shown in Fig. 49, the contacts CF1 close at 30° of each machine cycle and open at 180° of such cycle. Thus each circuit conditioned by the closing of a set of sensing contacts in one cycle is closed at 30° of the following cycle by the contacts CF1 and such circuit is held closed until 180° of such following cycle. As explained previously, the card feed contacts CF1 and CF2 are controlled, respectively, by cams CFC on the card feed shaft 125 (Fig. 6). The other circuits controlled by these card feed contacts will be explained more fully hereinafter under the heading "Operation."

*Card skipping mechanism.*—As explained previously, a skipping operation of a card in the passage 154 is effected by mechanism which operates as a result of the engagement of the card skip clutch CSKC (Figs. 4*b* and 6) and the clutch is engaged by the energizing of the card skip clutch magnet CSKM. Also, during each machine cycle the card skip clutch is energized, the card feed rolls 195, 196 are operated to feed four record columns of the card in passage 154 past the sensing station 107, the four record columns per cycle being the skipping rate.

The card skip clutch CSKC is of the same construction and operation as the skip clutch shown in Figs. 22 and 23 of our copending application referred to hereinabove at the outset, and is also of the same type as the clutch parts disclosed in U. S. Patent to Lake et al. No. 2,328,653, granted September 7, 1943. Referring to Figs. 4*b* and 6 of the present application, the card skip clutch CSKC comprises a driving ratchet disk 800, a driven clutch disk 801, a latching disk 802 interposed between the disks 800 and 801, and a clutch pawl 803 pivoted on a pin 804 projecting from the driven disk 801 and through an opening provided between adjacent spokes 805 of the latching disk 802, the pawl 803 having a clutch tooth 806 adapted to engage either of four teeth 807 carried by the driving disk 800. The driving disk 800 is keyed to the constantly running shaft 127 which is driven from the gear 126 previously described as forming a part of the constantly running driving mechanism. The driven disk 801 encircles the shaft 127 and is fixed to the side of a disk 808 by a suitable rubber bonding indicated at 809, and the disk 808 is formed integral with a hub 810 journalled on the shaft 127 and fixed to the driven gear 143. The periphery of the driven disk 801 is formed with four equally spaced detent recesses 812 corresponding, respectively, to the four clutch teeth of the driving disk 800, and adapted to be engaged by the end of a detent lever 813, the latter being constantly urged into engagement with the periphery of the driven disk 801 by a suitable tension spring (not shown). The latching disk 802 is rotatably mounted on the shaft 127 and is provided with four equally spaced latching teeth 815 corresponding, respectively, to the four driving teeth 807 of the disk 800 and the four detent recesses of the driven disk 812 and adapted to be engaged by the outer latching end of a pivoted armature 816 of the card skip magnet CSKM when the clutch CSKC is disengaged. The pawl 803 is constantly urged into clutch engaging position by a spring 817 connecting the outer end of the pawl 803 and a stud 818 fixed to the driven disk 801 and extending between two of the spokes 805 of the latching disk 802. An operating pin 819 on the pawl 803 is adapted to cooperate with a cam surface 820 formed on the side of one of the spokes 805 of the latching disk 802 for the purpose of disengaging the pawl tooth 806 from the teeth of the driving disk 800 and for holding the pawl in its disengaged position when the outer latching end of the armature 816 engages a latching tooth 815 on the latching disk.

In Figs. 4*b* and 6 of the drawings, the parts are shown in their relative position with the card skip clutch CSKC disengaged. The outer latching end of armature 816 engages a latching tooth 815 of the disk 802 and the outer portion of the cam surface 820 of the latter engages the operating pin 819 on the pawl 803 and holds the pawl out of engaging position. The detent lever 813 engages a notch 812 in the driven disk 801 and thereby holds the latter, the pawl 803, and the gear 143 driven by the disk 801, in their declutched position shown. The energizing of the magnet CSKM attracts its armature 816 and releases the latching disk 802. The spring 817 through the operating pin 819 then moves the disk 802 counterclockwise as viewed in Fig. 4*b* and the spring 817 is then permitted to move the operating pin 819 inward and along the cam surface 820 and thereby moves the pawl 803 about the stud 804 and into clutch engaging position where the pawl tooth 806 engages one of the teeth 807 of the driving disk 800. Thus, the driving and driven parts are clutched together and the gear 143 is rotated at the speed of the constantly running shaft 127 which is the same speed as the speed of the main drive shaft DS.

When the card skip magnet CSKM is deenergized, a tension spring 821 connected to a tail portion of the armature 816 moves the latter away from the poles of the magnet and into the path of the latching teeth 815 of the latching disk 802. When a tooth of the latching disk 802 engages the outer end of the armature 816, the rotary motion of the disk 802 is stopped and the operating pin 819 of the pawl engaging the now stationary cam surface 820 moves outwardly along such surface and thereby disengages the pawl tooth 806 from the tooth 807 of the driving disk 800. The detent arm 813 then engages a detent notch 812 on the driven disk 801 and thereby holds the parts in their declutched position.

As shown in Fig. 6, the driven gear 143 meshes with a gear 823 which is fixed to the hub 757 of the sun gear 756 forming a part of the differential mechanism DM, previously described. It is noted that at the time the card skip clutch CSKC is engaged, the card feed clutch CFC is disengaged and consequently the other sun wheel 755 of the differential DM is stationary. With the sun wheel 755 stationary and with the sun wheel 756 being rotated through the gears 823 and 143, the planet gears 758 and the planet arm 759 will rotate the power output shaft 137 of the differential and thereby drive the card feed rolls 195, 196 through the gears 763, 764, and 691 and clutch collar 681 which were described hereinabove in connection with the operation of the rolls 195, 196 during a normal card feeding and sensing operation. It is noted that the ratio between the gears of the driving train connecting the driven elements of the card skip clutch and the feed rolls 195, 196 is such that for each revolution of the main drive shaft DS and shaft 127, the card feed rolls move a sufficient angular distance to feed four (4) record columns of the card in passage 154 past the sensing station 107.

*Program tape sensing, feeding, and skipping mechanism.*—As explained hereinabove, the present invention includes a program or sequence control for the various operations while reading the statistical record cards and operating the two typewriters 300 and 2300 (Fig. 1), and such program control is effected in the illustrated embodiment by the program tape 15 (Figs. 2, 4*a*, and 47) having program code designations recorded therein according to a predetermined plan. With a new record card in sensing position in the passage 154, the sequence control of the illustrated embodiment is initiated by the energizing of the tape feed magnet TFM (Figs. 4*b* and 7) which effects engagement of the tape feed clutch TFC. As previously explained, when the tape feed clutch is engaged, the constantly running shaft 130 (Fig. 7) is connected to drive the tape feed sprocket shaft 151 through the gear train composed of the gears 144, 145, 147, 149, and 150 and the rotation of the sprocket shaft 151 provides for feeding the program tape 15 past the sensing station 108 (Fig. 4*a*).

As will presently appear, the tape feed clutch is used in the present embodiment to feed the tape 15 past the sensing station 108 at a normal rate as a part of a normal tape feeding and sensing operation, and is also used to feed the tape past the sensing station at a skipping rate as a part of a tape skipping operation. In a normal operation, the tape feed magnet TFM is pulsed once during each machine cycle so that the clutch TFC will be engaged for only a part of such cycle and while thus engaged will feed the program tape 15 a distance of one column so as to bring the next succeeding record column into sensing position at the sensing station. In a skipping operation, the tape feed magnet is held energized for the entire machine cycle and the clutch TFC will be held engaged throughout such cycle and as a result the program tape 15 will be fed during such cycle at the skipping rate which comprises four (4) columns of the tape for each machine cycle.

The tape feed clutch TFC is also similar in construction and operation to the clutch parts disclosed in the Lake et al. Patent No. 2,328,653, referred to above, and is of exactly the same construction and operation as the tape feed clutch shown in Fig. 16 of our copending application referred to hereinabove at the outset, and is also the same as the card skip clutch CSKC described hereinabove, with the exception that the present tape feed clutch TFC is provided with ten teeth on the driving disk and the latching disk instead of the four of each provided on the card skip clutch.

The clutch TFC is disclosed herein in Figs. 4*b* and 7 and comprises a constantly running driving disk 825 fixed to the constantly running shaft 130, previously described, and is provided with ten (10) clutch teeth 826 equally spaced about the periphery thereof. The clutch TFC also comprises a driven clutch disk 827 rotatably mounted on the shaft 130 and a clutch pawl 828 pivoted at one end on a stud 829 projecting from the side of the driven disk 827 and having a clutch tooth 830 formed thereon and constantly urged into clutching engagement with the teeth of the driving disk 825 by a tension spring 831 connecting the outer end of the pawl 828 with a stud 832 also projecting from the driven clutch disk 827. Interposed between the driving clutch disk 825 and the driven clutch disk 827 is a latching disk 834 rotatably mounted on the shaft 130 and being formed with radial spokes 835 providing openings therebetween and through which the pivot stud 829 and anchor stud 832 for the spring 831 extend, the clutch pawl 828 being disposed on the same side of the latching disk 834 as the driving disk 825, and the driven disk 827 being disposed at the opposite side of the latching disk 834, and relative movement between the latching disk 834 and driven disk 827 being permitted by the openings between the spokes 835. The periphery of the latching disk 834 is formed with ten (10) equally spaced latching teeth 836 corresponding, respectively, to the ten (10) clutch teeth of the driving disk 825 and adapted, respectively, to engage the outer end of the pivoted armature 837 of the tape feed magnet TFM when the magnet is deenergized and thereby to stop movement of the latching disk 834 at any one of ten (10) angular positions thereof. A detent 838 is pivoted on a fixed stud 839 and is urged into engagement with the periphery of the driven clutch disk 827 by a suitable tension spring 840. The detent 838 coacts with either of ten (10) equally spaced detent notches 841 on the periphery of the driven disk 827 to hold the latter at any one of ten (10) angular positions. One of the spokes 835 is formed with a cam surface 842 and the latter coacts with an operating pin 843 on the pawl 828 to control the clutching and declutching movement of the pawl 828.

With the clutch parts in the position shown in Fig. 4b of the drawings, the latching disk 834 is held against clockwise movement by the upper end of the armature 837 engaging a tooth 836; and, in such position, the outer part of the cam surface 842 engaging the pin 843 holds the pawl 828 and its tooth 830 out of clutching engagement with the teeth of the driving disk 825 and against the force of the spring 831. When the magnet TFM is energized, its pivoted armature 837 moves to the right and thereby is disengaged from the tooth 836 and releases the latching disk 834. Then, the spring 831 will, through the pawl 828 and operating pin 843 and cam surface 842, move the latching disk 834 clockwise with respect to the driven clutch disk 827. As this relative movement occurs, the operating pin 843 moves radially inward along the cam surface 842 until the tooth 830 engages a tooth 826 of the driving disk 825 and thereby effects clutching engagement therewith. Thus, the driving clutch disk 827 is clutched or locked to the driving disk 825 and they then rotate clockwise in unison. When the magnet TFM is deenergized, its armature 837 is moved outward by a suitable tension spring 845 and the upper outer end of the armature is thereby moved into the path of the teeth 836 on the latching disk 834. A tooth 836 then engages the upper end of the armature and thereby stops movement of the disk 834, with the result that the driven disk 827 continues rotating and the cam surface 842 cams the pin 843 radially outward and thereby forces the pawl 828 outward about its pivot stud 829 and effects disengagement of the clutch TFC and the positioning of the driven parts thereof in their declutched position shown in Fig. 4b.

The driven clutch disk 827 (Fig. 7) is secured by suitable rubber bonding indicated at 846 to the side of a disk 847 and the latter is fixed to the hub 848 of the driven gear 144. Thus, when the clutch TFC is engaged, the gear 144 is driven at the speed of the constantly running shaft 130 and drives the tape feed shaft 151 through the gear train 145, 147, 149, and 150, previously described.

As previously explained, the shaft 130 (Fig. 5) is a part of the constantly running driving mechanism and is driven from the main drive shaft DS by a gear train including the gears 123, 124, 126, 128, and 129. The gear ratio is such that the shaft 130 rotates four tenths ($\frac{4}{10}$) of a revolution for each revolution of the main drive shaft DS and consequently for each operating or machine cycle of the apparatus. Therefore, as the 10-tooth driving disk 825 is fixed to the constantly running shaft 130, four of its teeth 826 will pass a given fixed point during each machine cycle. Also, as the latching disk 834 has ten teeth, four of its teeth 836 and four corresponding teeth 826 of the disk 825 will move past the upper outer end of the armature 837 during each machine cycle the clutch TFC is engaged. The position of the teeth 826 of the driving disk 825 with respect to each machine cycle is indicated in the timing diagram of Fig. 49.

For normal tape reading and feeding operations where the program tape 15 is advanced one record column for each machine cycle, the energizing of the tape feed magnet TFM (Figs. 4b and 50c) is controlled by the constantly running cam contacts CR5 (Fig. 50c). This will be fully explained hereinafter under the heading "Operation." As shown in the timing diagram of Fig. 49, the contacts CR5 close at 295° of each machine cycle and open at 360° of such cycle. The tape feed magnet TFM will thus be energized soon after 295° of a cycle and the pawl tooth 830 will engage a driving clutch tooth 826 at 360° of such cycle. The magnet TFM is deenergized by the opening of cam contacts CR5 at 360° and the driven clutch disk 827 will be disengaged by the armature 837 stopping the tooth 836 on the latching disk 834 which corresponds to the driving clutch tooth 826 following the one which is engaged. Thus, as shown in Fig. 49, disengagement of the clutch TFC will occur at 90° of the next machine cycle. From this it is apparent that normal feeding movement of the program tape 15 will occur during the first 90° of the machine cycle following the cycle when CR5 close and the tape 15 will remain stationary for the rest of such following cycle. The speed ratio between the elements composing the motion transmitting mechanism just described which connects the main drive shaft DS and the tape feed shaft 151 is such that the tape 15 will move the space of one record column for each 90° of a machine cycle.

As will be described in detail hereinafter, a program tape skipping operation is effected when the #4 contacts of relay R10 (Fig. 50c) are transferred from the position shown. This establishes an energizing circuit for the tape feed magnet TFM which extends across the power line and this circuit is maintained until it is broken by the sensing of a significant skip-off designation in section C of the tape 15 (Fig. 47). Thus, the magnet TFM is held energized and the clutch TFC held engaged for a period depending upon the location of the significant skip-off designation. For each machine cycle the clutch TFC is held engaged, the tape 15 will move four (4) times the one-column distance it is moved during a normal tape feeding operation described above. Consequently, the tape 15 will move four (4) columns for each machine cycle the clutch is held engaged and this is the skipping rate of the tape as previously explained, and this compares with the four-column movement per machine cycle of the card during a card skipping operation described hereinabove. It is noted that a tape skipping operation may be effected with the card remaining stationary, but a card skipping operation can only be effected simultaneously with a tape skipping operation, the reason for the latter being that the control of all skip-off operations, both card and tape, is effected by skip-off designations in the tape and the latter must therefore be moving during each skipping operation.

At the tape sensing station 108 (Figs. 2, 3, and 4a) are located sixteen (16) code sensing brushes BA1 to BA8, inclusive, BC1 to BC4, inclusive, and BB1 to BB8, inclusive. These brushes are indicated diagrammatically in Fig. 50c of the wiring diagram. As shown in Figs. 2 and 4a, these sensing brushes are individually mounted in a block 850 of insulating material and the latter is secured within a frame 851. The frame is pivotally supported at its upper forward edge on a support rod 852 extending between and fixed at its ends to the frame plates 110 and 111. The frame is biased to move upward and clockwise as shown in Figs. 4a and 4b and out of the sensing position shown, by a torsion spring 853 surrounding the fixed rod 852 and anchored at its two ends to the rod 852 and frame 851, respectively. The frame 851 is held latched in its sensing position shown by a pawl 854 (Fig. 4a) fixed on a transverse rod 855 rotatably mounted in the vertical sides of the frame 851, and the lower hooked end of the pawl being in latching engagement with a squared stud 856 projecting from the plate 111. The pawl 854 is urged into latching engagement with the stud 856 by a tension spring 857 connecting the pawl 854 and a stud 858 projecting from the side of the frame 851. The pawl 854 may be manually released by moving a lever arm 859 clockwise as viewed in Fig. 3. The arm 859 is fixed to the rod 855 and is provided at its lower end with a finger piece 860 projecting outwardly through a slot 861 in the side of the frame 851.

These sixteen code sensing brushes BA1 to BA6, inclusive, BC1 to BC4, inclusive, and BB1 to BB6, inclusive, are transversely aligned across the program tape 15 and are so positioned with respect to the tape, that they sense correspondingly numbered index point positions composing each transverse column of each section of the program tape 15, which were fully explained hereinabove under the heading "The program tape" and are shown in the tape 15 of Fig. 47. In other words, the brushes BA1 to BA6, inclusive, sense, respectively, the six index point positions composing a column of section A of the tape 15; the brushes BB1 to BB6, inclusive, sense, respectively, the six index point positions composing a column of section B of the tape; and brushes BC1 to BC4, inclusive, sense the four index point positions forming a column of section C of the tape. As is well known to those skilled in this art, a sensing circuit path is provided by a sensing brush when the outer or sensing end thereof extends through a code hole in its corresponding index point position and thereby engages the electrically conducting surface of the tape feed sprocket 102. As will appear more fully hereinafter, each brush is connected to one side of a power line through a circuit path including control relay contacts, etc (Fig. 50c) and the feed sprocket is electrically connected to the other side of the power line through a common brush 863 (Fig. 4a) which is suitably mounted in a block 864 fixed to the inside of the plate 111 and contacts at all times the outer edge surface of the sprocket 102, the tape 15 being of less width than the sprocket 102. The common brush 863 is connected to such other side of the line by a circuit path which will also be fully explained hereinafter.

It is noted that either the group of six index point positions in columns of section A of the tape or the six index point positions in columns of section B of the tape are used at any one time to control normal operations of the illustrated embodiment, and only the four index point positions in columns of section C are used to control skip-off operations while the tape is moving at the skipping rate. As will also be fully explained hereinafter, when a tape shift relay R186 is in its normal or deenergized condition shown in Fig. 50c, it connects through its six transfer contacts, numbered 1 to 6, respectively, the six tape sensing brushes BA1 to BA6, inclusive, on the section A side of the program tape to six tape code set-up relays R188 to R193, inclusive; and, when the tape shift relay R186 is energized, its #1 to #6 contacts are transferred and they then connect, respectively, the six sensing brushes BB1 to BB 6, inclusive, on the section B side of the tape to the six tape code set-up relays R188 to R193, inclusive. Also, as will be explained fully hereinafter under "Operation" the skip-off read control relay R187 (Fig. 50c) is energized upon the initiation of a skipping operation; and, when so energized, it opens its #1 to #6 contacts in the energizing circuits for the tape code set-up relays R188 to R193, inclusive, and closes its #7 to #10 contacts and thereby connects, respectively, the brushes BC1 to BC4, inclusive, to four skip-off code set-up relays R197 to R200, inclusive. Thus, the sensing of the program designations in the index point positions of the columns of the three sections of the tape 15 provides for energizing code set-up relays singly and in combination, according to the designation sensed, and these code set-up relays function to control the programming of the operations of the illustrated embodiment in a manner which will be fully described hereinafter.

*Circuit breaker contacts.*—A pair of circuit breaker contacts CB (Figs. 2, 5, and 50c) are provided for the purpose of controlling the timing of the sensing circuits through the brushes BC1 to BC4 when sensing the designations in section C of the program tape 15 while the latter is being moved at its fast or skipping rate. The manner in which the circuit breaker contacts CB effect this control will also be explained in detail hereinafter under the heading "Operation." As shown in Figs. 2 and 5, the tape feed sprocket shaft 151 extends outwardly beyond the frame plate 111 and fixed to such shaft is a circuit breaker cam 866 coacting with a follower 867 which is pivoted on a stud 868 projecting from the side of a mounting plate 869 suitably fixed to the frame plate 111. Thus, the circuit breaker cam 866 is rotated with the tape feed sprocket shaft 151. The cam follower 867 is in the form of a bell crank having a roller 870 engaging the under face of a movable spring blade 871 carrying one contact point of the circuit breaker contacts CB. The other point of the contacts CB is carried by a blade 872 which has limited upward movement and both blades 871, 872 are suitably mounted in a supporting block 874 fixed to the side of the support plate 869. The timing of the contacts CB with respect to successive machine cycles will be apparent from an examination of Fig. 49.

*The #1 typewriter*

As stated previously, provision is made for selectively manifesting coded data recorded in record cards by printing such selected data in a predetermined fashion on one or more copy sheets. In so far as the broader aspects of the present invention are concerned, the printing may be effected by any well known form of printing mechanism, or mechanisms, such, for example, as a typewriter. In the illustrated embodiment, the selective printing of a portion of the data on one copy sheet is effected by the #1 typewriter 300 which will be recognized by those skilled in this art as being basically similar to a well known commercial form of power driven typewriter. The general principles of operation and features of construction of the kind of typewriter shown herein are fully disclosed in a number of U. S. patents, among which are Patent No. 1 777,055, granted September 30, 1930, and No. 1,873,512, granted August 23, 1932. As will be apparent as the description proceeds, the #1 typewriter 300 includes certain changes and additions over the commercial form referred to, which were made so as to suit the requirements of the illustrated embodiment.

It is noted that the #1 typewriter 300 disclosed herein is exactly the same in construction and mode of operation as the #1 typewriter disclosed in our copending application referred to hereinabove at the outset.

The structural features of the #1 typewriter are disclosed in Figs. 1, 17, and 18 and the key arrangement of its main keyboard 301 and auxiliary keyboard 302 is shown somewhat diagrammatically in Fig. 20. The keys composing the main keyboard each comprise a key cap 307 mounted on a related key lever 308 and each key may be actuated by manually depressing its related key cap, and it may also be selectively operated by a mechanical type translator under the selective control of code designations in a record card of the type shown in Figs. 31 to 42, inclusive, and in a program tape of the type shown in Fig. 47. The mechanical translator for operating the #1 typewriter is referred to hereinafter as the #1 translator and is indicated by the reference character 400 and is shown in Fig. 17 as being formed as a unit and mounted on the frame of the #1 typewriter and beneath the main keyboard 301 thereof. The structure and operation of the mechanical translator 400 will be fully described hereinafter under a separate sub-heading.

There are three different classes of keys composing the main keyboard 301. One class of keys is referred to generally as character keys as they effect, when actuated, the printing of corresponding characters on an invoice sheet 11 held in printing position by a rotatable platen 309 which is mounted on a laterally movable carriage 310. For simplicity, each of these character keys are indicated on the drawings by the reference numeral 311 and by a significant legend on the key cap, and each such key is identified hereinafter by the numeral 311 followed by a hyphen (-) and then the particular character which is printed when such key is actuated. For example, the key 311 which will effect printing of the character "A," is also identified hereinafter as "311-A." The space key is also considered as belonging to the same class as the character keys and will also be referred to hereinafter as the key "311-space."

It is noted that each of the character keys and the space key 311-space may, under the selective control of a code designation in the program tape 15, provide for operating the tape punch 500 (Fig. 1), in addition to effecting its function of printing the corresponding character on the invoice 11 and the spacing of the carriage 310. Thus, the tape punch 500 will operate to punch in a tape 12 (Fig. 1) a code designation in a well known 5-position code, representing the character printed on the invoice. As stated previously, the detail construction and operation of the tape punch 500 and the manner in which it is operated under the control of the typewriter keys have not been disclosed herein as the details thereof are not considered as essential to an understanding of the present invention. They are disclosed fully in our copending application referred to above.

A second class of keys composing the main keyboard effects operation of the #1 typewriter alone, i. e., keys of the latter class cannot provide for operation of the tape punch. This second class of keys comprises the back space key 312, the carriage return key 313, the tabulating key 314, the hyphen key 315, the comma key 316, and the period key 317.

Keys of the third class comprising the main keyboard provide, when actuated, for operating the tape punch 500 and do not effect either printing or functional operations of the #1 typewriter. The keys of this third class are indicated in Fig. 20 by the reference numeral 318 and by appropriate legends on the key caps, and are separately identified hereinafter by the numeral 318 followed by the hyphen (-) and the character or function represented by the code designation punched as a result of the actuation of the keys. For example, the figures-shift code designation is punched in the 5-position code tape 12 by the depressing of the key 318 bearing the legend "Figs." and identified hereinafter as "318-figs."; the skip code designation by depressing the key 318 bearing the legend "Skip" and identified hereinafter as "318-skip"; the carriage return designation by depressing the key 318 which bears the legend "CR" and also identified hereinafter as "318-CR"; etc.

The type bars 319 of the #1 typewriter, one of which appears in Fig. 17, are pivotally mounted in a type basket 320 and each bar carries type of only one case. Consequently, no provision is made herein for shifting the type basket to print characters in different case. Each time a character key is depressed, for example, the key 311-Y (Fig. 17), a corresponding cam unit 321 is operated by releasing a latch 322 from a cam 323, thereby permitting a spring-pressed lever 324 to move the cam 323 against the periphery of a continuously rotating motor driven power shaft 325. The motor for rotating the power shaft 325 is not shown structurally herein, but is shown diagrammatically in Fig. 50*s* and is indicated therein by the character 26. The cam 323 is then rotated by frictional contact with the roller shaft 325 thereby causing the carrier 327 of the cam 323 to rock in a direction for pulling a link 328 which, through a suitable link-and-lever arrangement, propels the corresponding type bar 319 toward the platen 309 to effect printing of the character "Y" on the invoice 11. During the final increment of movement of the type bar 319, it strikes a universal bar 329 to actuate, through suitable linkage, an escapement lever 330 for releasing the escapement mechanism and thereby to effect a forward spacing movement of the carriage 310 one character space position.

Depression of the space bar 311-space similarly results in downward movement of a key lever 308 to effect operation of a cam unit 321 and thereby operate suitable linkage for actuating the escapement lever 330 to cause a character space operation. The linkage and the escapement mechanism operated by the lever 330 are not disclosed in detail herein as they do not per se form a part of the present invention. They are fully disclosed in the above mentioned Patent No. 1,873,512.

Depression of the back space key 312 operates a cam unit 321 to effect the backward spacing of the typewriter carriage 310 one character space position and in a manner not disclosed herein, but which is fully disclosed in U. S. Patent No. 1,873,553, granted August 23, 1932.

The carriage return mechanism is operated by depressing the key 313 and is of the type disclosed in U. S. Patent No. 2,104,559, granted January 4, 1938, and No. 1,753,450, granted April 8, 1930. As is usual in the power driven typewriter shown, the carriage return movement is accompanied by a line spacing operation. After the carriage has been returned and a single line spacing operation effected as an incident thereto, a repeated depression of the carriage return key 313 merely causes an additional line space operation.

The tabulating mechanism operated by key 314 is such as shown in U. S. Patent No. 1,935,436, granted November 14, 1933, and includes the usual settable tab stops 332 which are pivotally mounted on a rack bar 333 extending across the back of the machine 300 (Fig. 18). As is disclosed fully in the last-mentioned patent, the depressing of the tab key 314 effects movement of a tab lever 334 to an operated position where the end 335 thereof lies in the path of the pre-set tab stops 332. The movement of the tab lever also releases the escapement mechanism to permit tabulating movement of the carriage 310. When the carriage 310 reaches the character space position where a regular tab stop 332 has been pre-set, the end 335 of the tab lever 334 is engaged by the pre-set stop 332 and thereby stops the carriage 310 and restores the tab lever 334 to its normal position shown at such character space position.

As shown in Figs. 1, 18, and 19, a special or extra rack bar 337 is mounted on the back of the carriage 310 for movement therewith, and is fixed at its two ends to rearwardly extending support plates 338 and 339, respectively, which are suitably fixed to the two end plates of the carriage 310. As shown, the special rack bar 337 is formed with a plurality of pairs of vertical grooves 340, 340, each pair being formed on opposite sides, respectively, of the bar 337 and extending in a common transverse vertical plane. The several pairs of grooves 340 correspond, respectively, to the character-space positions of the carriage, the same as the regular settable tabular stops 332 previously described. Each of the pairs of grooves 340 is adapted to receive either one of two kinds of control stops, indicated, respectively, by the reference characters CS1 and CS2. Each of these control stops functions when the carriage 310 reaches the character-space position corresponding to the pair of grooves 340 where such control stop has been placed, to open a related pair of interlock contacts mounted within a contact assembly 341 fixed to the rear portions of the typewriter frame. As will appear more fully hereinafter in the description of the operation in connection with the circuit diagram appearing in Figs. 50*a* to 50*s*, inclusive, there is a separate pair of interlock contacts actuated by each of the two kinds of control stops CS1 and CS2 and such contacts are located in interlock circuits for controlling certain operations of the apparatus disclosed herein.

As shown in Figs. 18 and 19, the contact assembly 341 comprises a pair of tab interlock contacts TIC and a pair of carriage return interlock contacts CRIC, and these pairs of contacts are both break contacts and are of similar construction. Each pair of contacts is actuated by a separate related lever 342 when the latter is engaged by a contact actuating tab formed on its related control stop. As shown in Fig. 19, the control stop CS2 is provided with a tab 343 in alignment with the lever 342 for actuating the pair of break interlock contacts TIC, so that, when the carriage reaches the character space position corresponding to a pair of grooves 340 where a control stop CS2 has been set, the related contacts TIC are opened by such stop. Also, a lever 342 is shown as being in alignment with a tab 344 on a control stop CS1 not appearing in Fig. 19 as it is located behind the stop CS2. The stop CS1 appears in Fig. 18. The interlock contacts CRIC will thus be opened by the tab 344 and lever 342 when the carriage 310 reaches the character space position occupied by the control stop CS1.

In Fig. 18, the character space positions of the typewriter which correspond, respectively, to the different pairs of grooves 340 are indicated on the rack bar 337 by corresponding numerals. The control stops CS1 and CS2 are located in the pairs of grooves 340 of the rack 337, they will occupy when the apparatus in the illustrated embodiment is operated to effect the automatic typing of the data appearing on the invoices 11—1, 11—2, and 11—3 shown in Figs. 43, 45, and 46, respectively, and under the control of the heading cards HC—1, HC—2, and HC—3 of Figs. 31, 32, and 33 and the detail cards DC—4, DC—5, DC—6, DC—7, DC—4*a*, DC—8, DC—4*b*, and DC—9 of Figs. 34, 35, 36, 37, 38, 39, 40, and 41, respectively, and under the control of the program tape 15 of Fig. 47. A full description of the operation of these control stops and related interlock contacts appears hereinafter under the heading "Operation."

*The auxiliary keyboard.*—As stated hereinabove, under the heading "General description," the auxiliary keyboard 302 of the #1 typewriter 300 is arranged at the front of the main keyboard 301 and comprises ten digit keys 303, a space key 304, and a motor bar 305, which may be manually operated to store numeric values in a relay storage unit in a manner which is shown fully in the wiring diagram of Figs. 50*a* to 50*s*, inclusive, and which will be fully explained hereinafter under the heading "Operation." The auxiliary keyboard 302 appears in plan in Figs. 1 and 20 and is shown in the sectional views, Figs. 21, 22, and 23. In addition to the keys named, the auxiliary keyboard comprises certain functional control keys which are identified in Fig. 20 as follows: a manual control key 346, a re-set or error key 347 (Fig. 50*m*) and an eject key EJK (Fig. 50*e*), the operation of which will all be explained under the heading "Operation." Additional control keys 346 may also be provided. They operate related contacts and the latter are wired to exit hubs on a plugboard (not shown), from which plug connections may be made for controlling different desired functions. The keys 346 and their exit hubs are shown in Fig. 50*d*, but plug connections are not shown as the control by these keys is not used in the particular problem described herein. Each digit key is indicated hereinafter by the general character 303 followed by a hyphen (-) and a legend identifying the particular key. For example, the key for entering the numeral "1" is identified hereinafter as 303-1.

The auxiliary keyboard 302 is suitably fixed to the frame of the #1 typewriter 300 and comprises a top frame plate 350 and a bottom frame plate 351 joined together by end plates 352. Each digit-representing key 303 and the space key 304 comprises a key cap 353 mounted on a vertically movable bar 354 which extends through aligned openings in the top and bottom plates 350 and 351, respectively. An integral projection 355 extends laterally from each bar 354 and is slidable within a related slot 356 formed in a guide comb plate 357, the latter being fixed at its ends to the end plates 352. A bar 358 is fixed across the front of the comb plate 357 and is provided with transverse vertical slots 359 aligned respectively with the slots 356 of the comb plate 357 and the bar 358 is also provided with a recess extending for its length thereof and filled with a multiplicity of interlock rollers 361 as shown in Fig. 21. As is well known, the number of rollers 361, their dimension, and the length of the recess in the bar 358 are such that when any key is depressed, the projection 355 moves to the bottom of its aligned slots 356, 359; and, in so doing, the rollers 361 are displaced laterally of the recess in the bar 358, so that a roller 361 will then extend across each of the other slots 356, 359, and will thereby prevent any of the other keys having projections 355 from being depressed until the key previously depressed is restored to its normal or inactive position shown. The motor bar 305 is mounted on two such vertically slidable bars 354, but only one of such bars 354 is provided with a projection 355 extending into a slot 356 of the comb plate 357 and an aligned slot 359 in the bar 358. Each of the keys 346, 347, and EJK also comprises a key cap 363 and a vertically slidable bar 364, but the bars 364 thereof are not provided with interlocking projections like the projection 355 of the bars 354. Tension springs 365 serve to return all keys of the auxiliary keyboard 302 to their upper or normal positions shown when such keys are released by the operator.

Each key and the motor bar of the auxiliary keyboard 302 closes one or more pairs of related key contacts when such key is depressed. As shown in Fig. 21, a contact actuating wedge 365a is fixed to a side of each of the bars 354 and 364 of the keys and to the right-hand bar 354 of the motor bar 305. As each key and the motor bar is depressed, its wedge 365a engages the upper inclined end 366 of a movable spring contact blade 367 and thereby cams such movable blade to the right to close a related pair of contacts. As shown in Fig. 21, some of the keys simultaneously close two pairs of contacts and this is effected by a block of insulation 368 connecting the movable spring blades 367 of both pairs of contacts so that when the wedge 365a moves the one spring blade 367 to close its pair of contacts, the block 368 simultaneously moves the other spring blade 367 to close its pair of contacts. The contacts closed by the ten digit keys 303-1 to 303-9, inclusive, and 303-0 are indicated, respectively, in Fig. 50L by the reference numerals K1 to K9, inclusive and K0. The contacts closed by the actuation of the space key 304, are indicated in Fig. 50L by the character SP and the motor bar contacts by the character MB (Fig. 50*m*).

A pair of bail contacts BC (see also Fig. 50L) are also closed each time one of the digit keys 303 is closed and each time the space key 304 is closed. To this end a bail plate member 370 extends lengthwise beneath the bottom frame plate 351 and is pivoted at its end, as indicated at 371, to spaced blocks 372 fixed to the bottom plate 351. A bar 373 is mounted on the bail plate member 370 and extends beneath the lower ends of each of the bars 354 of the digit keys 303 and the space key 304. A tab 374 is formed integral with the bail plate 370 and extends beneath a contact actuating pin 375 which is fixed to the lower movable blade 376 of the pair of bail contacts BC. Thus, when any one of the keys 303 or the key 304 is depressed, the lower end of its bar 354 engages the top surface of the bar 373 and thereby moves the bail 370 counterclockwise as viewed in Fig. 23 so that the tab 374 moves the pin 375 upward and thereby moves the blade 376 upward to close the contacts BC. Leaf springs 377 fixed to the bail member 370 and engaging the under side of the bottom frame plate 351 return the bail member 370 to the position shown in Fig. 23, when the keys are released, and thereby permit the contacts BC to open due to the inherent spring force of the blade 376.

Means is provided for locking the digit keys 303, the space key 304, and the motor bar 305 so that they cannot be depressed. This means is shown in Fig. 22 as being in the form of a solenoid 378 including an armature 379 to which is attached a bar 380 like the bars 354 of the keys 303, 304, and 305. The bar 380 includes a projection 381 movable within aligned slots 356, 359. Thus, when the solenoid 378 is energized, the projection 381 is moved downward in the slots 356, 359 and thereby displaces the interlock rollers 361 laterally and, as a result, none of the keys 303, 304, or bar 305 can then be depressed. A tension spring 382 serves to restore the bar 380 and armature 379 when the locking magnet 378 becomes deenergized. As will be fully explained hereinafter, the key lock solenoid 378 is energized as a result of the actuation of the motor bar.

*The #1 translator*.—As explained hereinabove, the keys composing the main keyboard 301 of the #1 typewriter 300 are selectively actuated by means of the #1 translator 400 and under the control of code designations recorded in the columns of the record card at the sensing station 107 within the reading unit 100 and the program designations recorded in the columns of the program tape 15 at the sensing station 108 in the reading unit 100.

The #1 translator is of the type known in this art as a mechanical translator; i. e., the key levers of the #1 typewriter are mechanically operated from a power shaft, and the selection of the key lever to be operated is made by the relative positioning of longitudinally slidable permutation members. The relative positioning of the permutation members is controlled electrically by the sensed code designation in the record cards and program tape. The #1 translator is disclosed in detail in Figs. 17 and 24 to 28, inclusive.

The #1 translator comprises generally twelve code or permutation bars corresponding, respectively, to the twelve positions of a predetermined code system and indicated, respectively, by the reference characters PB1 to PB12, inclusive. The translator 400 also comprises twelve selector magnets TSM1 to TSM12, inclusive, controlling, respectively, the relative positioning of the twelve permutation bars PB1 to PB12, inclusive, and also comprises a plurality of seeker members 401 corresponding, respectively, to the keys composing the main keyboard 301 of the #1 typewriter and functioning to actuate their respective keys, each seeker member 401 comprising an upper hooked end 402 engaging a stud 403 on the side of its corresponding key lever 308 and being adapted to be pulled down to operate such key lever. The translator 400 also includes an operating or power shaft 404 having control cams 405, 406, 407 and 408, mounted thereon, and the translator also comprises mechanism operated by the cams for effecting a cycle of operation during which a selected key lever 308 of the #1 typewriter is actuated and the parts then restored to a normal or inactive position.

As shown, the twelve permutation bars PB1 to PB12, inclusive, are arranged horizontally and extend transversely beneath the main keyboard 301 and in spaced parallel relation with respect to one another. The permutation bars are supported at their two ends for limited longitudinal sliding movement by vertically disposed end comb plates 410 (Fig. 27) suitably fixed to side flange members 411 of a main frame plate 412 and being guided intermediate their ends by vertical comb plates 413 and 414 also suitably fixed to the frame. Suitable tension springs 415 serve to hold integral projections 416 of the bars against the bottom of the guide slots of the intermediate comb plates 413 and 414. Each permutation bar is normally urged to move to the left as viewed in Fig. 27 by a corresponding compression spring 418 surrounding an operating pin 419 which is slidably mounted in spaced flanges 420 of a fixed bracket 421, each such pin 419 engaging the right-hand end of its corresponding permutation bar. Fig. 27 shows the bar PB1 and its corresponding compression spring 418 and pin 419. It will be appreciated that the remaining permutation bars are each slidably mounted and are each normally urged to move toward the left by corresponding operating pins and springs in the same manner as PB1. Each permutation bar of the group PB1 to PB12, inclusive, is normally held in an inactive or latched position against the force of its related compression springs 418 by means of a corresponding armature 423 of a corresponding selector magnet of the group TSM1 to TSM12, inclusive. The permutation bars are shown in the drawings in their inactive or latched positions where they are at the end of their movement toward the right as viewed in Fig. 27. In the latter view, the bar PB1 is shown as provided with an integrally formed lug 424 having a latching point 425 engaging the left-hand end of a groove 426 formed in the outer end of the pivoted armature 423 of its related selector magnet TSM1. It will be appreciated that each of the other permutation bars is provided with a similar latching lug 424 which engages a similar groove 426 in the armature 423 of its related translator selector magnet. From the foregoing, it will be apparent that when any one of the selector magnets of the group TSM1 to TSM12 is energized, its related armature is attracted, thereby releasing its related permutation bar of the group PB1 to PB12, inclusive, and each such released bar is then moved longitudinally toward the left as viewed in Fig. 27 by its related compression spring 418 and until a lug 427 formed thereon engages a normally stationary restoring bail 428. All released permutation bars are returned at the end of each operating cycle of the translator to their latched positions by means of the restoring bail 428, the latter being mounted on a lever 429 and being operated by a follower lever 430 engaging the cam 406 on the power shaft 404 (Figs. 26 and 27). The manner in which the permutation bars are returned and relatched will be presently described in detail.

There are fifty of the seeker members 401 shown in the illustrated embodiment, there being one seeker for each of the key levers 308 of the main keyboard. As shown in Figs. 17 and 25, the seeker members 401 extend downwardly from their related key levers and the straight lower ends 432 thereof are arranged transversely of the twelve permutation bars PB1 to PB12, inclusive, and the seekers are disposed at the sides of the bars which are opposite to that occupied by the translator selector magnets TSM1 to TSM12, inclusive. The seeker members 401 are maintained against movement in a direction extending lengthwise of the permutation bars by spaced upper and lower comb plates 433 and 434, respectively, which are formed as integral flanges of a rigid frame plate 435 extending transversely beneath the main keyboard 301 of the typewriter. The upper comb plate 433 is bent over as indicated at 436 to provide a means for holding a rod 437 which extends transversely of and beneath the key levers 308 and serves both as a fulcrum and as a retaining means for the upper ends of the seeker members 401, each of the seeker members being formed with a lug 438 which is adapted to engage the underside of rod 437 and thereby limit upward movement of such seeker member 401. A tension spring 440 connects each seeker member 401 with a flange 441 of a fixed frame plate 442 and thereby constantly urges its related seeker member 401 against a seeker positioning bail 443, the latter extending transversely across all of the seeker members and being connected at its two outer ends, respectively, to the lower ends of a pair of arms 444 which are in turn pivotally supported at their upper ends to the ends of the fixed support rod 437. There are two cams 407 (Fig. 24) identical with one another, and they are carried, respectively, on opposite ends of the power shaft 404 and at points adjacent the two arms 444. Each of the arms 444 carries a follower roller 445 (Fig. 25) which is held in continuous engagement with a related one of the cams 407 by the tension springs 440 holding the seeker members 401 against the positioning bail 443. The two cams 407 function as positioning cams for the bail 443 and the seeker members 401. In the normal or inactive position of the #1 translator, the cams 407 hold the positioning bail 443 in the position shown in Figs. 17 and 25, thereby holding the lower straight ends 432 of the seekers 401 out of seeking relation with respect to the permutation bars PB1 to PB12, inclusive.

As indicated by the showing of permutation bar PB1 in Fig. 27, the longitudinal edge thereof facing the seeker members 401 is formed as a series of tabs 446 which before assembling may be removed by a suitable tool; and, when so removed, provide permutation slots 447. The remaining permutation bars are similarly formed. Each seeker member 401 is disposed opposite either a tab 446 or a slot 447 in each permutation bar, when such bar is both in its latched and in its released position. In a manner which is well known in this art, the tabs 446 of the twelve permutation bars are permutatively removed according to a predetermined plan so that for each positional relationship of the twelve permutation bars, the lower straight edge 432 of only one of the seeker members 401 will be opposite a slot 447 in each of the twelve bars and such one seeker member is the one for actuating the key of the typewriter which is represented by the code designation which effects such positional relationship of the bars. The code designations used in the illustrated embodiment for effecting the different relative positions of the permutation bars for operating the typewriter keys appear in Fig. 20 as relatively small characters on the lower parts of the corresponding key caps, the legends identifying the several keys being relatively large characters on the upper parts of such key caps. As an example, it is noted that the key cap for the key 311-A bears in small characters the code designation "1–12." This means that when the permutation bar PB1 and the bar PB12 are released by the energizing of their related selector magnets TSM1 and TSM12, respectively, and with all other permutation bars remaining in their latched position, the lower edge 432 of the seeker member attached to the key lever 308 for actuating the key 311-A will be opposite a slot 447 in each of the twelve permutation bars, and no other seeker member will be opposite a continuous vertical row of such slots. It is noted that the code designations appearing on the lower part of the key caps for all the character keys 311 in Fig. 20 are the same as those representing such characters in the 12-position statistical code system shown punched in the record card of Fig. 42; but, that the code designations for actuating the other keys of the main keyboard are not included in Fig. 42.

At a selected point in each cycle of operation of the #1 translator, the cams 407 and springs 440 will provide for movement of the positioning bail 443 to the left as viewed in Fig. 25 and so that the seeker members 401 will pivot about the rod 437 and the lower ends 432 thereof will move into seeking relationship with respect to the twelve permutation bars. The seeker member 401 which is opposite a continuous vertical row of slots 447 in the permutation bars will then move into such vertical row of slots and all other seekers will be stopped by a tab 446 in one or more of the permutation bars. The selected seeker member 401 which moves into the continuous row of slots, moves far enough for a ledge portion 450 thereon to be beneath and in the path of an operating bail 451.

The operating bail 451 extends across all of the seeker members 401 and is fixed at its two outer ends, respectively, to a pair of operating bail levers 452. The two bail levers 452 are pivoted, respectively, on fixed studs 453 projecting inwardly from frame members 454. Each bail lever 452 is composed of two parts (Fig. 25) one part 452*a* carrying the operating bail 451 and the other part 452*b* being adjustably secured by a suitable means indicated at 455 to the part 452*a* and carrying a follower roller 456 engaging an operating cam 408. As shown in Fig. 24, there are two such cams 408 engaged, respectively, by the two rollers 456 of the two bail levers 452 and each bail lever 452 is kept in engagement with its related operating cam by a tension spring 457 connecting an extension of each part 452*b* and a flange 458 of the fixed transverse frame plate 442.

From the foregoing, it will be apparent that during each revolution of the power shaft 404 when a seeker member 401 has been selected, each such revolution comprising an operating cycle of the translator, and after the cams 407 have positioned the selected seeker member 401 beneath the operating bail 451, the cams 408 and springs 457 will provide for moving the bail levers 452 clockwise as viewed in Fig. 25 and during such movement the operating bail 451 will engage the ledge portion 450 on the selected seeker and pull down such selected seeker 401 and thereby pull down the key lever 308 to which such selected seeker is attached. From the foregoing description of the #1 typewriter, it will be apparent that such downward movement of the related key lever 308 will result in actuating the related key by tripping its related cam unit 321 (Fig. 17).

In the illustrated embodiment, the cams 407, through the springs 440 and positioning bail 443, move the seekers 401 into seeking relationship with the twelve permutation bars at approximately 47° of each operating cycle of the translator shaft 404 and move such seekers out of seeking relationship at approximately 203° of each such cycle. Also, the operating bail cams 408 start moving the selected seeker member 401 downward at approximately 89° of each translator operating cycle, and the operating bail 451 is restored to its inactive position at approximately 350° of each such cycle. The positioning bail 443 disconnects the selected seeker 401 from the operating bail 451 when the seekers are engaged by the bail 443 beginning at approximately 203° of each such cycle.

Each operating cycle of the #1 translator is initiated by engaging the #1 translator clutch 460 shown in Figs. 24 and 28. When the clutch 460 is engaged, it connects a power source in the form of a constantly running electric motor 461 (Figs. 29 and 50*s*), mounted at the back of the #1 typewriter, with the power shaft 404 of the #1 translator. The power shaft 404 is rotated for one revolution and is then disconnected from the power source by disengagement of the clutch 460. As stated, each revolution of the power shaft 404 provides for one operating cycle of the #1 translator. The clutch 460 is engaged by the energizing of the #1 translator clutch magnet 462 (Figs. 24, 28 and 50*s*).

As will appear more fully hereinafter in the description under the heading "Operation," when the #1 typewriter is turned on, the circuit for energizing the #1 translator clutch magnet 462 is under the control of the constantly running cam contacts CR1 (Fig. 50*s*). As shown in Fig. 49, CR1 closes at 170° of each machine cycle which comprises a revolution of the main drive shaft DS of the reading unit 100, and such contacts open at 250° of each such revolution. Also, the circuits for controlling the selective energizing of the #1 translator selector magnets TSM1 to TSM12, inclusive (Fig. 50*s*), are controlled by the cam contacts CR2 (Fig. 50*p*) which close at 172° and open at 226° of each machine cycle, or revolution of the main drive shaft DS.

As shown more clearly in Fig. 28, the clutch 460 comprises a constantly running driving member in the form of a cylinder or drum 464 and a driven member in the form of a clutch pawl 465 which is pivoted on a stud 466 carried by a plate 467 and the latter is fixed to the end of the power shaft 404. The pawl 465 carries a friction shoe 468 which is pivoted at 469 on the pawl 465 and is adapted to frictionally engage the inner surface of the cylinder 464 to effect engagement of the clutch 460 when the pawl 465 is released by the energizing of the magnet 462.

The cylinder 464 is fixed to a gear 470 (Figs. 24 and 29) mounted on a sleeve-like hub 471 and the latter is suitably journalled on the power shaft 404. The gear 470 meshes with a gear 472 rotatably mounted on a stub shaft 473, suitably carried by the frame of the #1 typewriter. A pulley 474 is fixed to the side of the gear 472 and is engaged by a drive belt 475. The belt 475 also engages a pulley 476 fixed to the side of a gear 477 and the two are rotatably mounted on a stub shaft 478 suitably carried by the typewriter frame. The gear 477 meshes with a gear 479 mounted on a shaft 480 carried by the typewriter frame. A pulley 481 is fixed to the gear 479 and a driving belt 482 operatively connects the pulley 481 with a pulley 483 mounted on the end of the operating shaft of the motor 461. Thus, the drum 464 is constantly rotated at a fixed rate by the electric motor 461.

With the #1 translator clutch magnet 462 deenergized, the clutch 460 is disengaged and the parts are in their inactive positions shown in Figs. 24 and 28 of the drawings. In the inactive position, the outer end 484 of the pawl 465 engages the outer end 485 of a pivoted armature 486 of the #1 translator clutch magnet 462, the latter being held in its inactive position by a pair of leaf springs 487 fixed to a bracket 488 suitably secured to the frame of the #1 translator. The armature 486 is pivoted on a stud 489, and a knock-off arm 490 is also fixed with respect to the armature and extends upwardly and engages the cam 405 fixed to the shaft 404.

As shown in Fig. 28, the pivot pin 466 for the pawl 465 is eccentrically located with respect to the axis of the cylinder 464, which is the same as the axis of the shaft 404, so that the friction shoe 468 is out of engagement with the inner surface of the cylinder 464 in the latched or inactive position of the clutch parts. A tension spring 491 connecting a pin 492 rigid with the plate 467 and a pin 493 on the pawl 465, normally urges the pawl 465 clockwise as viewed in Fig. 28. Thus, when the magnet 462 is energized and the armature 486 thereby attracted, the pawl 465 is released and the spring 491 rotates the pawl clockwise and thereby effects frictional clutching engagement of the shoe 468 and cylinder 464. The pawl 465 and shaft 404 are then locked to the cylinder 464 and therefore rotate with the latter.

The magnet 462 is deenergized by the opening of the cam contacts CR1 (Fig. 50*s*) at 250° of the main drive shaft DS of the reading unit 100. This will occur at about 30° of a revolution of the translator shaft 404. Ordinarily, the springs 487 (Fig. 28) return the armature 486 to the position shown when the magnet 462 is deenergized. This will usually occur beginning at about 90° of a revolution of the translator shaft 404. If the armature 486 should stick, the knock-off cam 405 (Fig. 24) will move the arm 490 beginning at about 161° of a revolution of the translator shaft 404 and this will move the armature 486 counterclockwise, as viewed in Fig. 28, to the position shown. Thus, in any event, the end 485 of the armature 486 is moved into intercepting position with respect to the end 484 of the pawl 465 before the shaft 404 completes a revolution. As will be apparent, the translator shaft 404 is declutched from the cylinder 464 at the end of its revolution by the end 484 striking the end 485 and thereby moving the pawl 465 and shoe 468 out of clutching engagement with the cylinder 464.

It is noted that the knock-off cam 405 and the arm 490 may advantageously serve as a detent means for the clutch; i. e., the cam 405 is so shaped that when the translator shaft 404 is in its inactive or home position, the springs 487 will urge the arm 490 into engagement with the cam 405 and will thereby resist rotary movement of the cam 405, the translator shaft 404, and the driven parts of the clutch 460 which are connected to such shaft.

Summarizing the foregoing, it is noted that the #1 translator clutch 460 is engaged by the action of cam CR1 (Fig. 50*s*) to energize the magnet 462; and, at about the same time, the permutation bars PB1 to PB12, inclusive, are selected and released by the action of cam CR2 (Fig. 50*p*) to energize the #1 translator selector magnets (Fig. 50*s*); the cam CR1 (Fig. 49) closing at 170° and CR2 at 172° of each machine cycle. It is also noted that when the #1 translator shaft 404 begins to rotate, the positioning bail 443 and springs 440 move the seekers 401 into seeking relation with respect to the permutation bars, and the operating bail 451 then engages the selected seeker 401 and thereby actuates the related typewriter key.

From an examination of Fig. 27, it is noted that six of the selector magnets, of the group TSM1 to TSM12, inclusive, are shown in plan. The remaining six of the selector magnets are arranged below the six shown (see Fig. 25) and they are so arranged that there is a selector magnet arranged directly below each of the six shown in Fig. 27. It is also noted that the six selector magnets shown in Fig. 27 are arranged in pairs with the outer ends of the armatures 423 of each pair disposed in overlapping staggered relation with respect to one another. It will be appreciated that the translator selector magnets below the ones shown in Fig. 27 and their respective armatures are also arranged in pairs which correspond to and are beneath the pairs appearing in Fig. 27. A restoring and knock-off bail 494 is associated with each pair of armatures 423 and their selector magnets shown in Fig. 27 and is also associated with the corresponding pair of armatures directly beneath those shown. The knock-off bails 494 are suitably pivoted on fixed studs 495 and each bail comprises a first bail element 496 extending across the magnet side of each of its associated armatures 423, and also comprises a second bail element 497 disposed above and across its associated armatures and coacting with the rear or right-hand edge of the lugs 424 carried by the permutation bars corresponding to the four armatures and selector magnets with which such knock-off bail is associated. Each knock-off bail is urged toward the position shown by a tension spring 498. Each armature 423 is pivoted on an upstanding fixed member 423*a* and is urged away from its related coil by a tension spring 423*b*.

The knock-off bail 494 coacts with the restoring bail 428 to relatch the permutation bars PB1 to PB12, inclusive, at the end of an operating cycle of the translator. As shown in Fig. 27, the lug 427 on any permutation bar will engage the bail 428 when released by the energizing of its related selector magnet. At about 211° of each revolution of the translator shaft 404, the restoring bail cam 406 will start moving the follower 430 counterclockwise as viewed in Fig. 26. The follower 430 will then move the bail lever 429 clockwise as viewed in Fig. 27, and the bail 428 will start restoring movement, to the right, of any of the permutation bars which were previously released. At about 272° of each revolution of the translator shaft 404, the restoring bail 428 will also engage the restoring lugs 427 on the permutation bars which were not previously released, and then the bail 428 will move all twelve of the permutation bars to the right as viewed in Fig. 27. At about 284° of the translator shaft 404, the rear edges of the lugs 424 on the permutation bars engage the bail elements 497 of their corresponding knock-off bails 494. The restoring bail 428 will continue to move the permutation bars to the right as viewed in Fig. 27 until about 310° of the revolution of the translator shaft 404. This will move the knock-off bails 494 clockwise and their bail elements 496 will engage and move outward any of their related armatures 423 which are stuck against their related magnet poles and will thereby assure the engagement of the latching points 425 of the lugs 424 on the permutation bars within the slots 426 of the related armatures 423. The springs 423b will then hold all armatures 423 against the lugs 425. The restoring bail 428 will, after about 310°, start a counterclockwise movement back to the inactive position shown, with the result that the permutation bars PB1 to PB12, inclusive, under the force of their springs 418, and the knock-off bails 494 under the force of their springs 498 will follow the restoring bail 428 in its return movement until the latching point 425 of the lug 424 of each permutation bar engages the latching left-hand end of the slot 426 of its related armature 423. All permutation bars will be relatched at about 327° of each revolution of the translator shaft 404 and the restoring bail 428 will be returned to the inactive position shown at about 357°.

*The tape punch*

As stated hereinabove, the details of construction and operation of the tape punch 500 (Fig. 1) to record code designations in the tape 12, and the manner in which punching operations are initiated by depressing key levers of the main keyboard 301 of the #1 typewriter, have not been included herein, because a full disclosure of such structure is not considered as being necessary to an understanding of the present invention. In the circuit diagram (Figs. 50*a* to 50*s*) there is included the coils of a punch-on control relay R227 which provides for performing the function of activating the punch for operation under the control of the typewriter key levers. Also, there is disclosed the coils of a punch-off control relay R228 which provide for performing the function of de-activating the punch so that the punch cannot be operated by the typewriter key levers. However, the contacts of these relays R227 and R228 and the circuits by which the stated functions are performed, are not included because they are not necessary to an understanding of the novel features of the present invention. There is included a relay R119, the contacts of which are shown in the circuit diagram as controlling the operation of the #1 translator 400 to pull down the key 318-LF on the keyboard 301 (Fig. 20) so as to operate the punch to record a line-feed code in the tape 12. A relay R118 is also included and the contacts thereof are shown as controlling the operation of the #1 translator to pull down the key 318-CR on the keyboard 301 so as to operate the punch to record a carriage-return code in the tape 12; but, as stated, the manner in which these keys 318-LF and 318-CR perform these operating functions of the punch has not been disclosed. If desired, reference may be had to our copending application referred to hereinabove at the outset for a complete disclosure of the operation of the punch 500 and its control by the typewriter key levers.

*The #2 typewriter*

The #2 typewriter 2300 is shown at the right of Fig. 1 as being supported on the desk 10*a*; and, as explained hereinabove at the outset, is selectively operated under the control of code designations recorded in the program tape and the record cards, to type data in a stock picker tag like the tag 14 of Fig. 44. The detailed arrangement of the keys composing the keyboard 2301 of the #2 typewriter is shown in plan in Fig. 30. The #2 typewriter 2300 is exactly the same in general construction and mode of operation as the #1 typewriter 300 described hereinabove in detail. The character keys 2311 and functional keys 2312, 2313, and 2314 of the #2 typewriter are operated by a #2 translator, not shown herein in detail, but which is the same in construction and operation as the #1 translator 400 previously described in detail. The twelve code selector magnets of the #2 translator appear in the wiring diagram of Fig. 50*s* and are represented, respectively, by the reference characters 2TSM1 to 2TSM12, inclusive. Also, the #2 typewriter motor 2326 and the #2 translator motor 2461, which correspond to the motors 326 and 461 of the #1 typewriter, appear in Fig. 50*s*. The #2 translator clutch magnet 2462 also appears in Fig. 50*s* along with the #1 translator clutch magnet 462, and they are both shown as being under the control of the constantly running cam contacts CR1 of the reading unit 100. The #2 typewriter 2300 is also provided with an extra tab rack 2337 at the back thereof (Fig. 1) which is identical with the rack 337 of the #1 typewriter, and also with tab interlock contacts 2TIC (see also Fig. 50*k*) and carriage return contacts 2CRIC which are controlled by control stops 2CS1 and 2CS2 placed in a predetermined fashion in the rack 2337 and effecting the same functions as the contacts TIC and CRIC and the control stops CS1 and CS2 of the #1 typewriter 300. In Fig. 50*k*, the interlock circuits controlled by the contacts 2TIC and 2CRIC of the #2 typewriter are shown along with the interlock circuits controlled by the contacts TIC and CRI3 of the #1 typewriter. The details of construction of the parts of #2 typewriter 2300 and the #2 translator have not been included in the drawings and a detailed description of the operation of the parts thereof has not been included herein because they are the same as those of the #1 typewriter and the #1 translator and will be readily understood from the showing and description of the #1 typewriter included as a part hereof.

It is noted that the actuation of the keys of the #2 typewriter does not control the operation of the tape punch. The characters typed and functional operations performed by the actuation of the several keys 2311, 2312, 2313, and 2314 (Fig. 30) composing the keyboard 2301 of the #2 typewriter are indicated by significant legends appearing above the horizontal center lines of the key caps 2307 in Fig. 30. The numeral characters appearing on the key caps below the legends referred to, indicate the code combinations of the #2 translator used to actuate the several keys. In comparing the main keyboard 301 (Fig. 20) of the #1 typewriter with the keyboard 2301 (Fig. 30) of the #2 typewriter it is noted that the keyboard 2301 does not include any keys comparable to the keys 318 of the keyboard 301 which control the operation of the punch 500. All of the keys of the keyboard 2301 control the #2 typewriter in the conventional manner. The #2 keyboard contains some extra character keys 2311 not included in the keyboard 301. As indicated on the key caps thereof these extra keys 2311 are those for printing the characters "&", "#", "*", and "'".

OPERATION

It is believed that certain of the novel features of the present invention will be more clearly understood by following the operation of the illustrated embodiment in connection with the composite wiring diagram shown in Figs. 50*a* to 50*s*, inclusive, wherein is diagrammatically illustrated all the electrical instrumentalities necessary to explain the operating features of such illustrated embodiment.

As explained previously, the composite wiring diagram is assembled by arranging Figs. 50a to 50s, inclusive, sequentially and in end-to-end relation. As is customary, the coils of the electrical relays are identified in the drawings and in the specification by the letter "R" followed by an identifying numeral; and, where the relay comprises both a pick up and a holding coil, the identifying letter "P" appears on the pick up coil and the letter "H" on the holding coil. Each set of contacts of each relay is identified on the drawing by a reference numeral located in the immediate vicinity of the contacts, and may be identified in the following description in either of two conventional ways; for example, relay R101 is shown in Fig. 50a at the upper right and the numeral "6" is shown immediately above a pair of contacts operated by such relay. The contacts may be referred to herein both as the #6 contacts of relay R101 and as the contacts R101—6 of relay R101. Where a relay coil operates more than one pair of contacts and it is practical to do so, the coil is shown adjacent one pair of the contacts and a dash line extends from the latter to the other pair or pairs of contacts of such relay. When the contacts of a relay are shown at points remote from their operating coil, such coil is also indicated adjacent such contacts in the conventional manner by dotted lines. As is also customary, when the pick up coil of a relay is located at a first point in the drawings and its holding coil at a second point, the pick up coil is indicated in full lines and the holding coil by dotted lines at such first point and the pick up coil is indicated in dotted lines and the hold coil by full lines at the second point; for example, the pick up coil of relay R188 is shown in Fig. 50c in full lines and its hold coil is shown in full lines in Fig. 50a.

As will be more apparent as the description proceeds, one advantage of the preferred embodiment of the invention disclosed herein over that disclosed in our copending application referred to hereinabove at the outset, is that the preferred embodiment herein can be readily used for a large number of different commercial applications without modifying the so-called permanent wiring. This is made possible herein by wiring a large number of the controlling and controlled electrical instrumentalities of the present embodiment to the plughubs of a plugboard and by electrically connecting in a predetermined selected manner these instrumentalities by removable plug wires, or connectors, so as to effect the operations according to the particular commercial application or problem for which the apparatus is to be used. The plugboard has not been shown herein in its entirety, because the illustration of the plugboard with plug connectors made according to a selected comprehensive problem would only be confusing and would perform no useful purpose. However, the plughubs of the plugboard are shown individually throughout the wiring diagram, and plug connectors connecting such plughubs in a preselected manner so as to effect operations of the apparatus according to the particular problem disclosed herein, are each indicated by relatively heavy dash lines so that the connectors may be readily distinguished from the permanently connected circuit wires which are shown in full lines.

As indicated hereinabove, the operation of the apparatus can best be explained in connection with a typical problem or example. The typed data on the invoice 11—1 of Fig. 43 is that prepared by the #1 typewriter when the heading card HC—1 of Fig. 31 and the detail cards shown in Figs. 34 to 41, inclusive, are read in succession by the read unit 100, and when sequence of operations is controlled by the program destinations with program tape 15 of Fig. 47, and when plug connections are made as indicated by the heavy dash lines on the wiring diagram. The typed data on the invoice 11—2 of Fig. 45 is that prepared by the #1 typewriter when the heading card HC—2 of Fig. 32, followed in succession by the same detail cards of Figs. 34 to 41, inclusive, are read by the unit 100 and with the program control being effected by the same tape 15 of Fig. 47 and the plug connections being those shown in the wiring diagrams. The invoice 11—3 of Fig. 46, is that prepared with the same program tape and plug connections as previously described and when the unit 100 reads the heading card HC—3 of Fig. 33 followed in succession by the same detail cards of Figs. 34 to 41, inclusive. The picker tag 14 of Fig. 44 is that prepared by the #2 typewriter 2300 simultaneously with the operation of the #1 typewriter in preparing either of the invoices 11—1, 11—2, or 11—3.

The row of figures below each lower broken margin of the invoices 11—1, 11—2, and 11—3 comprises a scale indicating character space positions of the #1 typewriter carriage 310 when the respective invoice sheets are held in typing positions by the platen thereof. Likewise, the scale below the broken lower edge of the picker tag 14 indicates the character space positions of the #2 typewriter carriage when the tag is held in printing position by the platen thereof.

It will be assumed that the left-hand margin stops of both typewriters are set so that the carriages thereof occupy their #11 character space positions when the sheets carried thereby are in position to print the first character of a line. It is also noted that a carriage-return control stop CS1 of typewriter 300 is placed in the #11 character space position of its extra rack 337 (Figs. 1 and 18) and that a tab control stop CS2 is placed in each of character space positions #17, #25, #41, #57, #66, and #76. It is also noted that a carriage-return control stop 2CS1 of the #2 typewriter 2300 is placed in the #11 character space position of its extra rack 2337, and that tab control stops 2CS2 are placed in character space positions #15, #35, and #43 of the rack 2337.

In the wiring diagram of Figs. 50a to 50s, inclusive, all switches are shown in their off position, and all relay contacts are in their normal or deenergized positions. Also, all constantly running cam controlled contacts CR1 to CR9, inclusive, are shown in the positions occupied at the 0° or 360° position of each machine cycle, as disclosed in the timing diagram of Fig. 49. The card feed cam operated contacts CF1 and CF2 are shown in the positions they occupy when the card feed clutch CFC and its drive shaft 125 are in the declutched or latched position. Also, the eject cam operated contacts ECB1 to ECB4, inclusive (Fig. 48), are shown in the positions they occupy when the eject clutch EJC and its driven clutch shaft 134 are in their latched or declutched positions. For the purposes of this description, it is assumed that at the beginning there are no record cards in the card hopper 104 of the unit 100 and that the program tape 15 of Fig. 47 is in its start or home position where its #2 record column is in sensing position beneath the tape sensing brushes previously described at the station 108.

The double pole main power switch MS (Figs. 1 and 50*a*) is first closed, thereby connecting a convenient source of direct current to the main positive conductor 900 and the main negative conductor 901. As shown, the main positive conductor 900 extends lengthwise along the left-hand side of Figs. 50*a* to 50*s*, inclusive, and the main negative conductor extends lengthwise along the right-hand side of such figures of the drawings.

The switches SW#1, SW#2, SW#3, and SW#4, located on the right-hand side of the #1 typewriter 300 (Fig. 1) and appearing in Fig. 50*s* of the wiring diagram, are now closed by adjusting each one of them to the left, as shown in Fig. 1. As shown in Fig. 50*s*, switch SW#1, when thus closed, establishes an energizing circuit across the main power conductors 900 and 901 which includes the motor 326 of the #1 typewriter 300 which motor continuously operates the power roll 325 (Fig. 17). Switch SW#2, when closed, establishes an energizing circuit across the main conductors 900 and 901 and including the motor 461 for operating the #1 translator 400. Switch SW#3, when closed, establishes an energizing circuit extending across the main power conductors 900 and 901 and including the driving motor 106 for the reading unit 100 which, as previously described, drives the constantly running driving mechanism including the main drive shaft DS and operates the constantly running cams CR for operating the cam contacts CR1 to CR—9, inclusive. Switch SW#4 is a double pole switch comprising poles 4*a* and 4*b* and when closed, the pole 4*a* establishes an energizing circuit across the power line for the #2 typewriter motor 2326 and the pole 4*b* establishes across the power line an energizing circuit for the motor 2461 of the #2 translator.

A blank invoice is properly positioned on the platen of the #1 typewriter 300 (Fig. 1) and a blank picker tag sheet is positioned on the platen of the #2 typewriter 2300. The carriage return keys 313 and 2313 of both typewriters are manually depressed and thereby provide for returning both of their carriages 310 and 2310 to their left-hand margin positions. As previously explained, both carriages now occupy their #11 character space positions and the invoice sheet and picker tag sheet are held in positions to print the first character in their #11 space positions as indicated by the scales at the bottom of the invoice sheets of Figs. 43, 45, and 46 and the picker tag sheet of Fig. 44.

*Initial eject and card feeding operation*

With no cards in the hopper 104 (Fig. 4*b*) and no card occupying the card feed passage 154, operation of the apparatus is initiated by the placing of a card or cards in the hopper which provides for closing the hopper contacts HC (Fig. 50*k*), as described hereinabove under the heading "The hopper contacts . . . " For the purposes of the present description, it will be assumed that the cards HC—1, DC—4, DC—5, DC—6, DC—7, DC—4*a*, DC—8, DC—4*b*, and DC—9 are arranged in the order named and are placed by the operator in the hopper 104 with the heading card HC—1 in the rearmost position in the hopper. The closing of the hopper contacts HC by the placing of the cards in the hopper in the manner just explained, effects automatically a card eject operation in the manner previously described in detail under the sub-heading "Card eject mechanism and operation" and during such operation the heading card HC—1 is fed to its #1 column sensing position in the passage 154 (Fig. 4*b*).

It is noted that an eject operation may also be effected by manually depressing the eject key EJK (Figs. 20 and 50*e*), and it may be effected in response to the sensing of a significant designation in the program tape 15. When effecting eject operations by either of the last mentioned ways, a record card usually occupies the passage 154 (Fig. 4*b*) at the beginning of such eject operations; and, when a card occupies such passage, it will be ejected from the passage as a part of the eject operation and this will occur before the feeding into the passage of the new card from the hopper 104.

The electrical circuits effecting and controlling the initial eject operation will now be described in connection with the wiring diagram of Figs. 50*a* to 50*s*. As shown in Fig. 50*k*, the closing of the hopper contacts HC establishes an energizing circuit for the pick up coil of the eject control relay R13 and this circuit is traced as follows: from the positive conductor 900 through the contacts HC, the normally closed contacts R229—2 and R224—2, and through the pick up coil of relay R13 to the negative conductor 901. When thus energized, the eject control relay R13 closes its hold contacts R13—1 (Fig. 50*k*) and thereby establishes an energizing circuit for the hold coil thereof which extends across the main power conductors 900 and 901 and includes the eject cam contacts ECB2, the latter being closed at the beginning of an eject cycle (see also Fig. 48). R13 also closes its contacts R13—2 (Fig. 50*k*) and thereby establishes an energizing circuit for the pick up coil of the main interlock control relay R14. As shown, this circuit extends from the positive conductor 900 through a wire 902, the contacts R13—2 now closed, and the pick up coil of R14 to the negative conductor 901. R13 also closes its contacts R13—4 (Fig. 50*c*) and thereby establishes an energizing circuit extending across the power line and including the eject clutch magnet EJM which, as previously explained, effects engagement of the eject clutch EJC and provides for an eject cycle during which the heading card HC—1 (Fig. 31) is fed downward from the hopper 104 (Fig. 4*b*) into the passage 154 and to its #1 column sensing position at the sensing station 107. The mechanical functions performed during an eject cycle have all been fully disclosed hereinabove under the sub-heading "Card eject mechanism and operation" and need not be repeated at this point.

The relay R13 will remain energized until the cam contacts ECB2 (Fig. 50*k*) open to deenergize the hold coil thereof. As shown in Fig. 48, the cam contacts ECB2 open at 335° of the eject cycle. When the latter happens, R13—4 (Fig. 50*c*) will open and thereby break the energizing circuit for the eject clutch magnet EJM which provides for disengaging the clutch EJC and for restoring the shaft 134 (Fig. 7) and the elements operated thereby to the home or 0° position shown in the drawings.

As explained previously under the heading "The hopper contacts and card lever contacts," the eject operation provides for feeding the card HC—1 to its #1 column sensing position, and, in so doing, it closes the card lever contacts CLC (Figs. 3, 14, 15, and 50*k*) at 241° of the eject cycle (Fig. 48). The closing of the contacts CLC establishes an energizing circuit for the pick up coil of the card lever control relay R229 which circuit extends across the main power conductors 900 and 901 as shown in Fig. 50k. The relay R229 closes its hold contacts R229—6 and thereby establishes an energizing circuit for the hold coil thereof which also extends across the main power conductors and includes the eject cam contacts ECB2. R229 also opens its contacts R229—2 in the energizing circuit for the pick up coil of the eject control relay R13 which was previously traced. It is noted that during the eject cycle the hopper contacts HC open at 196° and reclose at 208° of each eject cycle and during this interval the energizing circuit for the pick up coil of R13 was broken but the hold circuit for R13 was energized at this time through contacts ECB2. The eject cam contacts ECB2 open at 335° and reclose at 355° of the eject cycle. This will break the hold circuit for the relay R229, but during this interval the card lever contacts CLC remain closed due to the card in the passage 154 and thereby maintain the energizing circuit for the pick up coil of R229, and so that when the contacts ECB2 reclose at 355° the hold circuit for R229 will be reestablished and will remain closed until the next eject cycle when the cam contacts ECB2 open. The opening of ECB2 at 335° breaks the hold circuit for R13 and thereby drops out R13 because at this time R229—2 are open and the pick up circuit for R13 is also broken.

The contacts R229—2 remain open and thereby prevent the hopper contacts HC from reestablishing an energizing circuit for the eject control relay R13. From this it is apparent that it is only when there is no card in the passage 154 (Fig. 4b) to close the card lever contacts CLC that the closing of the hopper contacts HC can effect an eject operation.

As explained hereinabove under the sub heading "Card eject mechanism and operation," the eject cam EC7 (Fig. 7) positions the movable clutch collar 681 (Fig. 6) during each eject cycle to effect rotation of rolls 195, 196 from the gear 140 and consequently to eject any old card in the passage 154 from the unit 100. As shown in Fig. 48, the ejecting of an old card begins at 45° of the eject cycle and ends at 186°. Following this, the cam EC5 functions to separate the feed roll 196 from the feed roll 195. As also explained, the normal position of the clutch collar 681 is that shown in Fig. 7 where the clutch teeth 689 between the flange 687 and the side of gear 691 are in engagement. In order to assure proper meshing of the clutch teeth 689 upon return of the collar 681 to its normal position shown by the cam EC7, means is provided herein for rotating the gear 691 as the teeth come into engagement and this rotation of the gear 691 is effected during the eject cycle as a result of the energizing of card skip clutch magnet CSKM (Fig. 50c) by the closing of eject cam contacts ECB4. Any rotation of roll 195 incident to this engaging of the teeth 689 on the clutch collar 681 with the teeth on the rotating gear 691, will not affect the positioning of the new card in the passage 154; because, at this time, the new card has not reached the rolls 195, 196 and because the roll 196 is also separated from the roll 195 by the cam EC5.

As shown in Fig. 50c, the closing of eject cam contacts ECB4 at 150° of the eject cycle establishes an energizing circuit across the main power conductors 900, 901 for the card skip magnet CSKM. As previously described under the sub heading "Card skipping mechanism" this provides for energizing the clutch CSKC and for rotating the drive gear 691. The eject cam contacts ECB4 open at 250° and drop out the clutch magnet CSKM which disengages the clutch CSKC in the manner previously explained. The timing is such that the clutch CSKC is latched up before the eject cam EC5 returns the feed roll 196 into feeding relation with respect to roll 195.

*Main interlock control.*—It is noted that throughout each eject operation provision is made for preventing normal feeding and sensing operations of the card and of the tape and this is effected by the energizing of the main interlock relay R14 (Fig. 50k) when the contacts R13—2 of the eject control relay R13 close, as previously described. When thus energized, the relay R14 closes its hold contacts R14—2 and thereby establishes a hold circuit extending across the main power conductors 900 and 901 and including the constantly running cam contacts CR9. It is noted that the pick up coil of R14 remains energized until the contacts R13—2 open as a result of the opening of eject cam contacts ECB2 at 335° of the eject cycle which open the hold circuit for R13, as previously described. R14, when thus energized, also opens its contacts R14—1 (Fig. 50c) and thereby prevents the establishing of normal tape sensing circuits through the program tape sensing brushes and which are under the control of cam contacts CR5, and the open contacts R14—1 also prevent the establishing through contacts CR5 of a pulsing circuit through the tape feed magnet TFM which provides for normal tape feeding operations, as previously explained. R14 also opens its contacts R14—4 (Fig. 50e) and thereby prevents, during the eject operation, the establishing of circuit paths under control of cam contacts CR3 and extending through the pyramid relay translator of Figs. 50e to 50i, inclusive, which is adjusted as a result of normal sensing operations of the program tape to be presently described.

R14 also transfers its contacts R14—3 (Fig. 50c) and thereby breaks the energizing circuit path for the card feed magnet CFM. Thus, during the eject cycle the card feed clutch remains deenergized and the card feed shaft 125 (Fig. 6) remains in its home or latched up position and the cam contacts CF1 and CF2 operated by the shaft 125 remain open. Thus, the transferred contacts R14—3 prevent normal card feeding and sensing operations during the eject cycle. The contacts R14—3, in their transferred position, condition holding circuits for the homing control relay R223 and also condition through a circuit wire 903, hold circuits for relays R261 and R7 and for relays R8, R26, and R262 (Fig. 50b). As will appear more fully hereinafter, relays R7 and R261 are energized during a card skip-off operation and relays R8, R26, and R262 are energized during a tape skip-off operation. These hold circuits conditioned by the transferred points of relay R14—3 are of no significance in the initial eject and card feeding operation being described because during this operation no provision is made for homing the program tape 15 under the control of the relay R223. The homing of the program tape is a tape skip operation effected for returning the tape to its home or #2 column sensing position and is effected only during an eject operation initiated by the closing of the eject key EJK (Fig. 50e) which energizes the eject control relay R220, or when an eject operation is initiated as a result of the sensing of significant code designations in the program tape. As will later appear, this latter operation also includes the energizing of the relay R220. At the beginning of this initial eject operation now being described, the tape 15 was at its home position because of a previous eject operation which included the homing of the tape. The holding circuit paths conditioned by the transferring of R14—3, for the card skip-off control relays and for the tape skip-off control relays, are used when the interlock relay R14 is energized at the beginning of card skipping and tape skipping operations which will be explained more fully hereinafter.

The pick up coil of the main interlock relay R14 (Fig. 50k) is deenergized by the opening of the contacts R13—2 which occurs after the eject cam contacts ECB2 open at 335° of the eject cycle. The hold circuit for the relay R14 which is timed by the constantly running cam contacts CR9 is for the purpose of assuring the proper time relation between the end of an eject cycle and the beginning of a normal operating cycle of the apparatus and so that the timing of operations taking place during such normal operating cycle will be in the prescribed manner. As explained previously, a normal operating cycle is coincident with a machine cycle. As shown, the cam contacts CR9 open at 50° and close at 90° of each machine cycle. Thus, the hold coil of the interlock relay R14 can become deenergized only during this 40° period between the opening and closing of the contacts CR9. When the holding coil of R14 is thus deenergized by the opening of contacts R13—2, the interlock relay R14 drops out and returns its contacts to the position shown in the drawings.

*Normal sensing and feeding of the program tape— Program tape feed on*

With the termination of the initial eject and card feeding cycle just described, the card HC—1 (Fig. 31) is in its #1 column sensing position and the program tape 15 (Fig. 47) is in its #2 column sensing position and the automatic operation of the apparatus under the control of the program tape 15 and the card HC—1 begins. The tape feed and skip magnet TFM (Fig. 50c), the card skip magnet CSKM, the eject magnet EJM, and the card feed magnet CFM are all deenergized at this time. As stated previously, the card lever relay R229 remains energized as long as a card is in the passage 154 (Fig. 4b) and closes the card lever contacts CLC (Fig. 50k) and as long as the normally closed eject cam contacts ECB2 remain closed. Thus, at the end of the eject cycle the card lever relay R229 is energized and its contacts R229—1 (Fig. 50c) are closed; and, with the reclosing of the interlock relay contacts R14—1, a tape sensing circuit path is conditioned which extends from the contacts CR5 through the now closed contacts R229—1, the normally closed contacts R14—1, the normally closed points of relay contacts R187—11, the common brush 863 to the electrically conductive surface of the tape feed sprocket or drum 102 (Fig. 4a). As explained, column #2 of the program tape is in sensing position and such column contains a code hole in its #1 index point position in Section A thereof (Fig. 47). As indicated hereinabove in the program tape code chart, this is the code designation for turning on the normal feeding operations of the program tape. Thus, the tape sensing brush BA1 now projects through the code hole in the #1 index point position of column #2 of the tape and is in contact with the surface of the feed sprocket 102 and thereby completes the sensing circuit path just traced from the brush BA1 through the normally closed points of contacts R186—1 of the tape shift control relay R186, the normally closed contacts R187—1, the pick up coil of tape code set up relay R188, and to the negative conductor 901. This sensing circuit path is completed to the positive conductor 900 by the closing of cam contacts CR5 at 295° of the same machine cycle in which CR9 (Fig. 50k) opened to drop out the interlock relay R14. Thus, the pick up coil of tape code set up relay R188 becomes energized.

The relay R188 then closes its hold contacts R188—4 (Fig. 50a) and thereby establishes an energizing circuit for its hold coil which is traced as follows: from the positive conductor 900, through the constantly running cam contacts CR6, a wire 904, a wire 905, a wire 906, the now closed hold contacts R188—4, the hold coil of R188, a wire 907 to the negative conductor 901. As shown in Fig. 49, the cam contacts CR6 close at 350° of a machine cycle and open at 230° of the following machine cycle. Thus, the contacts CR6 establish the hold circuit for the tape code set up relay R188 before the cam contacts CR5 open at 360° to break the just described sensing circuit including the pick up coil of R188, and R188 is therefore held energized by CR6 until 230° of the machine cycle following the one in which it was energized.

As will be readily understood by those skilled in this art, translator contacts of the tape code set up relays R188 to R193, inclusive, in Figs. 50e to 50i, inclusive, are interconnected by circuit wires to form a translator network of the pyramid type. As a part of each normal tape sensing operation, like the one just described, one or more of the tape code set up relays R188 to R193, inclusive, adjust their translator contacts in this pyramid network to condition an energizing circuit path therethrough, which circuit path corresponds to the particular code designation which was sensed in Section A or B of the tape 15. These conditioned circuit paths terminate, respectively, in pyramid outlet plughubs arranged in a vertical row in Figs. 50e to 50i, inclusive, and these pyramid outlet plughubs are selectively connected by plug connectors to other hubs for effecting the functional operation, or operations, represented by the different sensed code designations. In the illustrated embodiment, those pyramid outlet plughubs which terminate the conditioned translator circuit paths corresponding to the code designations listed above in the code chart entitled "Program tape code system for sections A and B," are identified in Figs. 50e to 50i, inclusive, by the letters "PRH" followed by a reference numeral, and plug connectors are shown as extending from these identified pyramid outlet plughubs to inlet plughubs of electrical instrumentalities for performing the functions represented by the program code designations of the code chart just referred to, as will appear more fully hereinafter. The pyramid outlet plughubs terminating the circuit paths through the translator provided by code combinations not used herein, appear in Figs. 50e to 50i, inclusive, in vertical alignment with those used herein, but they are not identified by reference characters. The conditioned circuit paths through the pyramid translator are controlled by the constantly running cam contacts CR3 (Fig. 50*e*) which close at 80° of each machine cycle and open at 228° of such cycle (Fig. 49).

In the particular tape sensing operation described above, the tape code set up relay R188 transfers its translator contacts R188—1 (Fig. 50*e*) and with the translator contacts of the other tape code set up relays remaining in the position shown, a circuit path is conditioned through the pyramid network and terminates in the outlet hub PRH1 (Fig. 50*g*) and the latter is connected by a plug connector 908 to the functional inlet hub FH19 which is connected by a circuit wire through the pick up coil of the functional relay R218 to the negative conductor 901. This conditioned circuit path is traced through the pyramid network as follows: from the contacts R188—1 (Fig. 50*e*) of the tape code set up relay R188, now in their transferred position; through a wire 909; contacts R189—1, in the position shown; a wire 910; contacts R190—2 (Fig. 50*f*), in their position shown; wire 911; contacts R191—4 (Fig. 50*g*), in the position shown; wire 912; contacts R192—8, in the position shown; wire 913; and the contacts R193—16, in the position shown, to the pyramid outlet hub PRH1.

As stated, the conditioned pyramid circuit just traced is under the control of cam contacts CR3 (Fig. 50*e*) which close at 80° of a machine cycle and open at 228° of a machine cycle (see Fig. 49). Thus, the circuit conditioned through the pyramid network by the energizing of R188 is closed by CR3 at 80° of the cycle following the one in which the sensing circuit was established by CR5; and, when closed, energizes the program feed on relay R218. R218 then closes its hold contacts R218—4 (Fig. 50L) and thereby establishes an energizing circuit for its hold coil which circuit extends from the positive conductor 900 through the normally closed eject cam contacts ECB1, the normally closed contacts R219—1 of the tape off control relay R219, the now closed hold contacts R218—4, and through the hold coil of R218 to the negative conductor 901. Thus, the program tape feed on relay R218 remains energized until the next eject cycle when the eject cam contacts ECB1 open; or, until the relay R219 (Fig 50*e*) is energized in response to the sensing of a tape-off designation in the tape 15 and thereby opens its contacts R219—1 (Fig. 50L).

The tape fe d on control relay R218 closes its contacts R218—1 (Fig. 50*c*) to condition a pulsing or normal feed circuit for the tape feed magnet TFM. This conditioned pulsing circuit is under the control of cam contacts CR5 and is traced as follows: from the positive conductor 900, through contacts CR5, the now closed contacts R229—1 of the card lever relay R229, the new closed contacts R14—1 of the interlock relay R14, a wire 914, the now closed contacts R218—1 of the tape feed on control relay R218, the normally closed points of transfer contacts R10—4 of a tape skip control relay R10, the normally closed contacts R26—1 of tape skip off control relay R26, and through the magnet TFM to the negative conductor 901. Thus, the tape feed magnet TFM is now under the control of the cam contacts CR5 which, as shown in Fig. 49, close at 295° of each machine cycle and open at 360° of such cycle. As will be recalled, R218 was picked up by the pyramid circuit path when CR3 (Fig. 50*e*) closed at 80° of the machine cycle following the closing of the tape sensing circuit by CR5. The tape will remain in its #2 column sensing position throughout such following cycle; and, at 295° of this next cycle when CR5 close again, the column #2 of the tape 15 is sensed again; and, at the same time, the pulsing or normal tape feed circuit just traced through the magnet TFM is also closed. The sensing again of the #2 column of the Section A of the tape 15 will have no effect on the operation as R218 is already energized by its holding circuit previously traced. As explained hereinabove under the sub-heading "Program tape sensing, feeding, and skipping mechanism," the tape feed magnet TFM, when thus energized by CR5 at 295° of a machine cycle trips the tape feed clutch TFC (Figs. 4*b* and 7) and a clutch tooth 826 is engaged by the clutch pawl 828 at 360° of such cycle. The position of the clutch teeth on the driving disk of the tape feed clutch with relation to the machine cycle is shown in the timing chart of Fig. 49. Thus, the program tape 15 begins to move at 360° of the machine cycle in which CR5 closed to energize the magnet TFM. CR5 opens at 360° and thereby breaks the energizing circuit for the magnet TFM. The clutch TFC will remain engaged and the tape will continue to move until the next tooth 836 of the clutch latching disk 834 engages the outer end of the armature 837 and thereby disengages the clutch pawl from the driving tooth 826. As explained, this happens at 90° of the cycle following the one in which the tape feed magnet TFM is pulsed by CR5. The tape movement is thus stopped until 360° when the clutch TFC is again engaged as a result of the magnet TFM being pulsed through CR5. As also explained, the tape 15 moves a distance of one column for each pulsing of the magnet TFM through the normal tape feeding circuit conditioned by the closing of the tape on relay contacts R218—1. From the foregoing, it is apparent that the tape is sensed between 295° and 360° of each machine cycle while the tape is stationary, and the tape moves one column distance beginning at 360° and ending at 90° of the following cycle and this normal sensing and feeding of the tape continues as long as the pulsing circuit traced above remains in the condition described.

*Card feed on—normal sensing of card*

As the contacts R218—1 (Fig. 50*c*) remain closed, the contacts CR5 will again pulse the tape feed magnet TFM at 295° of a machine cycle and the tape 15 will move to its column #3 sensing position during the first 90° of the following cycle, in the manner just described.

*Card feed on.*—As shown in Fig. 47, the #3 column of Section A of the tape contains a code hole in its #3 index point position and this is the code designation for turning on the card feed as indicated above in the chart of the tape code system. Thus, at 295° of the machine cycle in which the tape 15 moves to its #3 column sensing position, CR5 close again and thereby establish a tape sensing circuit in the manner previously described and such circuit includes the pick up coil of the tape code set up relay R190. R190 then closes its hold contacts R190—6 (Fig. 50*a*) thereby establishing a holding circuit therefor including the cam contacts CR6 which, as previously explained, close at 350° of each cycle and open at 230° of the following cycle. R190 also adjusts its contacts in the pyramid translator network of Figs. 50*e* to 50*i*, inclusive, and thereby conditions a translator circuit path therethrough corresponding to the sensed code designation and terminating in the pyramid outlet hub PRH3 (Fig. 50*i*). This conditioned translator circuit path will be obvious from the previously described tape sensing operation. A plug connector 915 extends from outlet hub PRH3 to a function inlet hub FH33 and the latter is connected by a circuit wire to the pick up coil of the function control relay R11 for effecting the card feed on operation. Thus, with the closing of the cam contacts CR3 (Fig. 50*e*) at 80° of the machine cycle following the one in which column #3 of the tape 15 is sensed, the pick up coil of the card feed on relay R11 is energized. R11 closes its hold contacts R11—1 (Fig. 50L) and thereby establishes a hold circuit therefor extending across the conductors 900, 901, and including the normally closed eject cam contacts ECB1, the normally closed contacts R222—3 of the card skip control relay R222, and the normally closed contacts R12—1 of the card feed off control relay R12. R11 also closes its contacts R11—3 (Fig. 50*c*) and thereby establishes an energizing circuit for the card feed clutch magnet CFM. As shown, this circuit extends across the power conductors 900, 901 and also includes the normally closed points of contacts R14—3 of the main interlock relay R14 described above under the sub-heading "Main interlock control."

*Normal card sensing.*—As described above under the sub-heading "Normal card feeding and sensing mechanism," the energizing of the card feed clutch magnet CFM provides for effecting engagement of the card feed clutch CFC (Figs. 5 and 6) and the latter then provides for the intermittent drive of the main card feed rolls 195, 196 through the Geneva mechanism GM and the gear train including the differential gear mechanism DM and the gear 691. The card feed clutch CFC will engage at 360° of the machine cycle in which the cam contacts CR3 close to establish the energizing circuit for the card feed on relay R11 through the pyramid translator; and, during the next following cycle, the card feed cam contacts CF1 (Figs. 50*a* and 49) close at about 30° and thereby establish a card sensing circuit path through column #1 of the card HC—1 in sensing position in the passage 154 (Fig. 4*b*). As previously explained, when a card is fed to its #1 column sensing position during an eject cycle, the star wheel 770 of each card sensing lever, of the group SL1 to SL12, inclusive (Figs. 11, 12 and 13), senses its corresponding index point position in column #1, and each wheel 770 which senses a code hole therein closes its related code sensing contacts of the group SC1 to SC12, inclusive. Thus, as the card HC—1 which is now in sensing position, contains a code hole in its #1 index point position of column #1 thereof, the sensing contact SC1 is closed at the time the card feed cam contacts CF1 close. Thus, as the contacts R229—4 of the card lever contacts are now closed, the closing of the cam contacts CF1 (Fig. 50*a*) establishes a sensing circuit extending across the power conductors 900, 901 and including the pick up coil of relay R101 of the group of card code set up relays R101 to R112, inclusive. This card sensing circuit is broken at 180° of the machine cycle by the opening of the card feed cam contacts CF1. R101 closes its hold contacts R101—6 (Fig. 50*a*) and thereby establishes a hold circuit therefor including the cam contacts CR6 which, as stated, close at 350° of each machine cycle and open at 230° of the following cycle. As shown in Fig. 49, the card is moved by the Geneva mechanism to its #2 column sensing position beginning at 245° of the cycle in which column #1 thereof was sensed.

*Card classifying*

As previously explained under the sub-heading "The statistical record card," one of the principal features of the present invention comprises an improved form of class controlling means. In the illustrated embodiment, this class controlling means is adjustable to different controlling conditions which correspond, respectively, to the primary classes and subclasses to which the record cards belong, and these adjusted controlling conditions provide for subsequent operations of the apparatus peculiar to the different classifications of the cards. In accordance with the present invention, a record classifying means is activated in response to a significant code designation in column #4 of section A of the program tape and is operable, when so activated, and in response to the sensing of card classifying designations in column #1 of each card, to adjust the class controlling means to the controlling condition corresponding to the class and subclass of the sensed card. The operations controlled by the adjusted controlling conditions of the class controlling means will be explained as the description of the operation under the selected example proceeds.

At 360° of the machine cycle in which column #3 of the tape 15 was sensed by the closing of CR5 the tape clutch TFC engages in the manner before explained, and the tape moves to its #4 column sensing position during the first 90° of the following machine cycle, which is the cycle in which the card feed on relay R11 was energized. At 295° of the latter cycle CR5 close again and sense column #4 of section A of the tape. The card feed clutch CFC engages at 360° of such latter cycle, and the card feed cam contacts CF1 close to energize the card code set up relay R101 at 30° of the next cycle and R101 is held through CR6, as before explained. As shown in Fig. 47, column #4, section A, of the tape contains the 2–3–4 code designation; and, as indicated hereinabove in the chart of the program tape code system, this program designation performs the function of turning off the card feed and also the function of classifying the card, the latter function being also referred to herein as activating the record card classifying means. As will be apparent from the previous description, the sensing of the 2–3–4 designation in tape column #4 provides for energizing the pick up coils of tape code set up relays R189, R190, and R191 (Fig. 50*c*) and these relays close, respectively, their hold contacts R189—4, R190—6, and R191—12 (Fig. 50*a*) and thereby establish hold circuits therefor through the cam contacts CR6 during the same cycle the latter establish the hold circuit for the card code set up relay R101.

The tape code set up relays R189, R190, and R191 adjust their translator contacts in the pyramid network of Figs. 50*e* to 50*i*, inclusive, and thereby condition a translator circuit path therethrough including the program outlet hub PRH32 (Fig. 50*h*) and which is under the control of the cam contacts CR3 (Fig. 50*e*) the same as in previously described normal tape sensing operations. As shown in Fig. 50*h*, the hub PRH32 is connected by a plug connector 916 to the inlet hub 917 which is wired to the negative conductor 901 through the single coil of a distributor relay R247. Thus, the distributor relay R247 is energized when CR3 close at 80° of the cycle in which R189, R190, R191, and R101 are held by CR6. As shown, the distributor relay R247 includes two sets of contacts R247—1 and R247—2, respectively, and these contacts are connected at one side to a wire 918 which is in turn connected to the positive conductor 900 through the cam contacts CR4 (Fig. 50*e*). The contacts R247—1 and R247—2 (Fig. 50*h*) are wired at their other sides to outlet plughubs 919 and 920, respectively. The hub 920 is connected by a plug connector 921 to the inlet function hub FH21 and the latter is wired to the single coil of relay R18 and to the negative conductor 901. The relay R18 effects the function of activating the card classifying means, as will presently appear. The hub 919 is connected by a plug connector 923 to the inlet function hub FH37 (Fig. 50*i*) and the latter is wired to the coil of card feed off relay R12 and through the latter to the negative conductor 901. As shown in Fig. 49, the cam contacts CR4 close at 100° of each machine cycle and open at 230° of such cycle. In the example being described, CR4 close at 100° of the cycle in which the distributor relay R247 is energized by CR3, and thereby energize, through the distributor relay contacts R247—1 and R247—2, the card classifying relay R18 and the card feed off relay R12.

In order to facilitate the understanding of the wiring diagram of Figs. 50*a* to 50*s*, inclusive, it is noted at this point that where plug connectors, such as the connector 923, are used to connect plughubs in different figures of the drawings, a portion of the plug connector is shown in each figure, and a legend at the end of each portion in one figure indicates the point of connection in the other figure. Obviously, this is necessary in the present case in order to prevent confusion in the circuit connections. It is also noted that there are provided herein a large number of distributor relays, such as R247, which are used to control a plurality of controlling circuits from one control circuit, and each of the coils of each of these distributor relays is connected at one side by a wire to an inlet plughub, such as the hub 917, and at its other side to the negative conductor 901, and each distributor relay is provided with two or more contacts permanently connected at one side to the wire 918 which is under the control of CR4 and wired at their other sides to outlet hubs, such as 919 and 920, from which plug connections may be made to control a plurality of functions. The plughubs of the distributor relays are, of course, a part of the plugboard (not shown) previously referred to.

In the example being described, the card code set up relay R101 is energized as a result of sensing column #1 of card HC1 and relays R18 and R12 are energized as a result of sensing column #4 of the tape 15.

The relay R12 opens its contacts R12—1 (Fig. 50L) in the hold circuit for the card feed on relay R11 and thereby deenergizes this relay which opens its contacts R11—3 (Fig. 50*c*) in the energizing circuit for the card feed magnet CFM. Thus the latter disengages the card feed clutch CFC (Fig. 5) in the manner previously described and the card feed shaft 125 comes to rest at the end of the machine cycle in which the card feed off control relay R12 is energized.

The electrical instrumentalities and wiring connections for classifying each card and for adjusting the class controlling means in accordance with the class of the card being sensed, are shown for the most part in Fig. 50*j*.

The adjustable class controlling means includes fifteen control selectors identified, respectively, as selector #1 to selector #15, inclusive, and arranged in a vertical row along the right-hand side of Fig. 50*j*. Each selector comprises a pick up plughub identified as PU and a drop out plughub identified as DO. Each selector also comprises an activating relay, the pick up coil of which is wired to its pick up hub PU and to the conductor 901, and comprises a deactivating or drop out relay having a single coil wired at one side to its drop out hub DO and at its other side to the conductor 901. The activating relay of each control selector also comprises a hold coil connected at one side to the positive conductor 900 by normally open hold contacts of such activating relay and a wire 928, and connected at its other side to the conductor 901 through normally closed contacts of the drop out relay of such control selector. As will presently appear, the control selectors are energized and deenergized in a predetermined manner as a result of the sensing of classifying designations in column #1 of the cards and of the particular plug connections shown in Fig. 50*j*, and control contacts of the activating relays of the control selectors are located in Fig. 50*j* and other figures of the wiring diagram and control operations of the apparatus according to the class of the cards, all of which will be more apparent as the description proceeds. As shown in Fig. 50*j*, the fifteen activating relays for control selectors #1 to #15, inclusive, are indicated, respectively, as R35, R37, R39 R41, R43, R45, R47, R49, R51, R53, R55, R57, R59, R61, and R63. The fifteen drop out or deactivating relays for control selectors are indicated, respectively, as R36, R38, R40, R42, R44, R46, R48, R50, R52, R54, R56, R58, R60, R62, and R64. The set of hold contacts for each activating relay is numbered "2," and the set of drop out contacts for each deactivating relay is numbered "1." As will appear more fully hereinafter, the activating relay of each control selector comprises one or more sets of control contacts of the transfer type; for example, see the contacts R47—1 (Fig. 50*j*) of control selector #7; and each such set of control contacts is wired to a common inlet plughub designated as "C," the normally open points of each such set is wired to a transferred or controlled outlet hub designated as "T" and the normally closed points of each such set is wired to a normal outlet hub designated as "N." It is noted that control selectors #5, #12, #13, and #14 are not used in the particular example or problem described herein.

The card classifying relay R18, when energized in the manner previously explained, closes its contacts R18—1 (Fig. 50*j*) and thereby connects the positive conductor 900 to a wire 924 which is in turn connected to one side of all of the normally open classifying contacts R101—2 to R112—2, inclusive, of the twelve card code set up relays R101 to R112, inclusive. The other sides of the contacts R101—2 to R112—2, inclusive, are connected, respectively, to outlet classifying plughubs CH1 to CH12, inclusive. It will therefore be apparent that during all card classifying operations, such as the one being described, the classifying hubs CH1 to CH12 are rendered hot in accordance with the class of the cards sensed.

As previously explained, in the particular example being described, there are nine different card classifications used, three of which, HC—1, HC—2, and HC—3, are heading cards, and the remaining six of which, DC—4, DC—5, DC—6, DC—7, DC—8, and DC—9, are detail cards. As is obvious, the numerals 1 to 9, inclusive, following the primary class designations "HC" and "DC" which form the identifying reference numerals used herein for the cards, correspond, respectively, to similarly numbered index point positions of column #1 of the cards containing the classifying code holes, and these numerals 1 to 9, inclusive, also correspond, respectively, to the outlet hubs CH1 to CH9, inclusive.

*Classifying heading cards.*—The manner in which heading card HC—1 is classified and the manner in which the class controlling means is adjusted to a condition corresponding to its class and subclass, will first be described. As shown in Fig. 50*j*, the outlet hub CH1, which is now hot due to the closed contacts R101—2 and R18—1, is connected by a plug connector 925 to an inlet hub 926 of the coil of distributor relay R234 and the other side of such coil is connected by a wire 927 to the negative conductor 901. The distributor relay R234 is provided with four distributing contacts R234—1 to R234—4, respectively, and the latter are under the control of the wire 918 and the cam contacts CR4, as explained hereinabove. The outlet hub of distributor relay contacts R234—1 is connected by a plug connector to the pick up hub PU of the control selector #8. The outlet hub of contacts R234—2 is connected by a plug connector to the drop out hub DO of the control selector #7. The outlet hub of contacts R234—3 is connected by a plug connector to the drop out hub DO of the control selector #9. The outlet hub of contacts R234—4 is connected by a plug connector to the pick up hub PU of the control selector #11. It is noted that the pick up hub PU of control selector #11 is also connected by a plug connector with the pick up hub PU of a control selector #6.

Thus, when the heading card HC—1 is classified by the sensing of its column #1 along with the sensing of column #4 of section A of the program tape 15, the activating relays R45, R49, and R55 of the control selectors #6, #8, and #11, respectively, are energized, and they thereby close their #2 hold contacts in Fig. 50*j* to establish hold circuits therefor through their respective hold coils. These activating relays of selectors #6, #8 and #11 also transfer all of their control contacts in the wiring diagram from the positions shown and will control class selecting operation in a manner which will appear more fully hereinafter as the description proceeds. Also, the classifying of heading card HC—1 provides for energizing the drop out relays R48 and R52 of control selectors #7 and #9, respectively. These drop out relays then open their #1 contacts and thereby break the hold circuit paths for their corresponding activating relays, should the latter be energized at this time. As will presently appear, the control selector #7 is only activated when the heading card HC—2 is classified and selector #9 is only activated when the heading card HC—3 is classified. Consequently, the selectors #7 and #9 which are peculiar to heading cards HC—2 and HC—3, are deenergized when the heading card HC—1 is classified.

From the foregoing description of the card classifying operations which take place when heading card HC—1 is sensed along with the sensing of column #4 of the program tape, it will be apparent that when heading card HC—2 is in the passage 154 (Fig. 4*b*) and its #1 column is sensed along with the sensing of column #4 of the program tape, the classifying hub CH2 (Fig. 50*j*) will be rendered hot. As shown, this hub is connected by a plug connector 929 to the inlet hub of distributor relay R233. The relay R233 comprises four distributing contacts R233—1 to R233—4, inclusive, which are connected to the wire 918 previously explained as being under the control of cam contacts CR4. The outlet hub of distributing contacts R233—1 is connected by a plug connector to the pick up hub PU of selector #6. The outlet hub of contacts R233—2 is connected by a plug connector to the drop out hub DO of selector #8. The outlet hub of contacts R233—3 is connected by a plug connector to the drop out hub DO of selector #9. The outlet hub of contacts R233—4 is connected by a plug connector to the inlet pick up hub PU of selector #7. Thus, when the card HC—2 is classified, activating relays R45, R47, and R55 of control selectors #6, #7, and #11, respectively, are energized and they close their #2 hold contacts to establish energizing circuits for their respective hold coils. Also, the classifying operation of heading card HC—2 provides for energizing the drop out relays R50 and R52 of control selectors #8 and #9. These drop out relays then open their #1 contacts and thereby deenergize the hold coils of their companion activating relays, if either of the latter be energized. From this it is noted that the classifying of heading card HC—2 provides for activating selectors #6 and #11 the same as the heading card HC—1 and it provides for dropping out selector #8 which is energized by the classifying of heading card HC—1 and for dropping out selector #9 which is energized by the classifying of heading card HC—3.

When the #1 column of heading card HC—3 is sensed along with the sensing of column #4 of the tape 15, classifying operations are effected to adjust the class controlling means to conditions corresponding to such card, the same as previously described in connection with the cards HC—1 and HC—2. In the classifying operation, the code hole in the #3 index point position of column #1 of card HC—3 provides for the energizing of the card code set up relay R103 and in closing its corresponding classifying contacts R103—2 (Fig. 50*j*). As shown, the outlet classifying hub CH3 which is wired to R103—2, is connected by a plug connector 930 to the inlet hub of a distributor relay R232. R232 comprises four distributing contacts R232—1 to R232—4, inclusive, and these contacts are also connected to the wire 918 which is under the control of cam contacts CR4. The outlet hub of distributor relay contacts R232—1 is connected by a plug connector to the drop out hub DO of selector #7. The outlet hub of contacts R232—2 is connected by a plug connector to the pick up hub PU of selector #6. The outlet hub of contacts R232—3 is connected by a plug connector to the drop out hub DO of selector #8. The outlet hub of contacts R232—4 is connected by a plug connector to the inlet hub PU of selector #9. Thus, when the heading card HC—3 is classified, activating relays R45, R51, and R55 of the selectors #6, #9, and #11, respectively, are energized and they close their #2 hold contacts to establish energizing circuits for the hold coils thereof. The drop out relays R48 and R50 of selectors #7 and #8, respectively, are also energized and they open their normally closed #1 contact to break the hold circuit path through the hold coils of their corresponding activating relays.

It is noted that the normally open eject cam contacts ECB3 (Fig. 50j) are connected to their outlet plug-hubs 931 and that the latter is connected by a plug connector 932 to the drop out hubs DO of selector #1. It is also noted that the drop out hubs DO of the selectors #1, #2, #3, #4, #6, #10, #11, and #15 are all interconnected by plug connectors. Thus, the control selectors just named, when activated by card classifying operations, are each deactivated or dropped out by the closing of the eject cam contacts ECB3 during the eject cycles when such classified cards are ejected from the unit 100. As will be apparent from examination of Fig. 50j, the closing of these cam contacts ECB3 energizes the drop out relays of each of the control selectors last named and such drop out relays then open their #1 contacts and thereby break the hold circuit paths for their corresponding activating relays in the same manner as described above.

Summarizing the foregoing, it is noted that when either of the heading cards HC—1, HC—2, or HC—3 is classified, the control selectors #6 and #11 are both energized and that these control selectors are dropped out during an eject cycle when either of such heading cards is ejected from the read unit 100. It is also noted that control selector #8 is activated only by the classifying of card HC—1, that control selector #7 is activated only by the classifying of card HC—2, and that control selector #9 is activated only by the classifying of heading card HC—3 and that upon the classifying of either one of the heading cards, the hold circuit paths are broken of the activating relays of the selectors which are special to the other two heading cards. Thus, when the heading card HC—1 is classified, its control selector #8 will remain activated throughout the reading of subsequent detail cards and until the next heading card is classified provided such subsequently classified heading card is not a second heading card HC—1, in which case selector #8 will remain activated. Similarly, selector #7 is activated by the classifying of heading card HC—2 and remains activated throughout the reading of detail cards following the reading of heading card HC—2 and until heading card HC—1 or HC—3 is classified. The selector #9 activated when card HC—3 is classified, also remains activated throughout the subsequent reading of detail cards and until a heading card HC—1 or HC—2 is read.

From the above it is apparent that class controls of subsequent operations which are peculiar to the reading of heading cards, as distinguished from detail cards, are effected by the control contacts of the activating relays for selectors #6 and #11, and that class controls of subsequent operations which are peculiar to each heading card, as distinguished from the other heading cards, are effected by the control contacts of the activating relays for selectors #8, #7, and #9.

*Classifying detail cards.*—It is believed that the classifying operations which take place when the #1 column of each of the detail cards is sensed along with the #4 column of tape 15, will be apparent from the previous description of the classifying operations of the heading cards and from an examination of Fig. 50j.

When the #1 column of either of detail cards DC—4, DC—4a, or DC—4b is sensed along with the #4 column of the tape 15, the code hole in the #4 index point position thereof provides for energizing the card code set up relay R104 which closes its classifying contacts R104—2 and thereby renders hot the classifying hub CH4. As shown, the hub CH4 is connected by a plug connector 934 to the inlet plughub PU of selector #15 and the latter plughub is also connected by a plug connector to the inlet plughub PU of selector #10. Thus, when one of the detail cards DC—4 is classified, the activating relays R53 and R63 for control selectors #10 and #15 are energized and they then close their #2 hold contacts and establish hold circuits therefor in the manner previously described. As previously explained, the drop out hubs DO for selectors #10 and #15 are interconnected by plug connectors with drop out hubs DO of the other selectors #6, #4, #3, #2, and #1, and they are also connected by plug connector 932 with the hub 931 and the latter is connected to the eject cam contacts ECB3. Thus, the selectors #10 and #15 which are activated by the classifying of the cards DC—4, are dropped out when such cards are ejected from the unit 100 and any class controls effected by these selectors, are effected only while the cards DC—4 are still in sensing position within the passage 154 (Fig. 50b).

When the card DC—5 is classified, the code hole in the #5 index point position of its #1 column provides for closing the classifying contacts R105—2 (Fig. 50j) which, as shown, is wired to the classifying hub CH5. A plug connector 935 connects the hub CH5 with the inlet hub for distributor relay R231. R231 is provided with two sets of distributing contacts R231—1 and R231—2, respectively. As shown, the outlet hub for distributing contacts R231—2 is connected by a plug connector with the inlet hub PU for selector #10 and, as explained above, the latter hub PU is connected by a plug connector with the inlet hub PU of selector #15. Thus, the selectors #10 and #15 are also energized when the detail card DC—5 is classified and these selectors are dropped out by the closing of the eject cam contacts ECB3 when a card DC—5 is ejected from the unit 100. The outlet hub of distributing relay R231—1 is connected by a plug connector with the common hub C of the set of control contacts R47—1 of the activating relay R47 for selector #7. As previously explained, selector #7 is activated only when a heading card HC—2 is classified and it remains activated throughout the reading of subsequent detail cards and until the next heading card is classified. The normal outlet hub of control contacts R47—1 is not connected to any plug connector. The controlled or transferred outlet hub T of R47—1 is connected by a plug connector to the pick up hub PU of selector #3. It is therefore apparent that when either the heading card HC—1 or HC—3 is sensed by the unit 100 and is followed by detail card DC—5, that these contacts R47—1 remain in the position shown and no classifying controls are provided by the distributing contacts R231—1. However, when the detail card DC—5 follows a heading card HC—2, the contacts R47—1 are in transferred position at the time the card DC—5 is classified and consequently an energizing circuit will be established from the distributing contacts R231—1 to the pick up coil for the relay R39 which is the activating relay for selector #3. It is noted that the drop out hub DO for selector #3 is also connected by plug connectors to the eject cam contacts ECB3 and the selector #3 will also be deactivated when the card DC—4 is ejected from the unit 100.

As shown in Fig. 50j, no plug connection is made in the particular example being described, from the classifying hub CH6. So, when the detail card DC—6 is classified the #6 code hole in column #1 thereof is sensed and the card code setup relay R106 is picked up and closes its classifying contacts R106—2, but no classifying circuits are completed. For reasons which will be more apparent as the description proceeds, as there are no selectors energized when card DC—6 is classified and as a code designation calling for a skipping operation is not punched in column #5 of the card DC—6, the source data recorded in columns #35 to #39 inclusive of DC—6 will be read and recorded by the #1 typewriter and also the columns #63 to #69 inclusive of section A of the tape 15 will be read and will control operations peculiar to card DC—6 when the data in its columns #35 to #39 is being read. Columns #63 to #69, inclusive, of section A of the tape are not read while any other detail card is in the unit 100. As shown in Fig. 47, column #69 of section A contains the 1–2–3 code designation and as indicated in the tape code chart included hereinabove, this designation represents an eject operation. Thus, card DC—6 is ejected from the circuit 100 at this point and this particular operation is not effected when any other card is in the circuit unit 100.

When the card DC—7 is classified the sensing of the code hole in its #7 index point position provides for energizing the card code setup relay R107 and the latter closes its classifying contacts R107—2 (Fig. 50i) and thereby renders the classifying hub CH7 hot. As shown the hub CH7 is connected by a plug connector 936 with the pickup hub PU for selector #4. It will be noted that the drop out hub DO of this selector is under the control of the eject cam contacts ECB3. Thus, when the card DC—7 is classified the selector #4 is activated for the period while such card is in sensing position in the passage 154 (Fig. 4b). As will later appear, the control contacts for the activating relay R41 of selector #4, provide for a carriage return operation in column #44 of section A of the tape and provide for an eject operation in column #45 of section A. Thus, the detail card DC—7 because of its classification is ejected from the unit 100 at a predetermined time in the operation.

When card DC—8 is classified, the classifying contacts R108—2 are closed and a plug connector 937 connecting the classifying hub CH8 with the inlet hub for distributor relay R—238 provides for energizing the latter. As shown the distributing contacts R—238—2 are connected by a plug connector to the pickup hub PU of selector #15 which is also interconnected by a plug connector with the pickup hub PU of selector #10. Thus, both control selectors #15 and #10 are activated as a result of the classifying operation of the card DC—8. As explained above, the drop out hubs DO of selectors #10 and #15 are interconnected by plug connectors with the eject cam contacts ECB3; so, when card DC—8 is ejected from the unit 100, the selectors #10 and #15 are dropped out. The outlet hub of distributing contacts R238—1 is connected by a plug connector with the inlet hub PU of selector #1 and thereby provides for the activating of this selector along with selectors #10 and #15 when the card DC—8 is classified. The drop out hub DO of selector #1 being connected by connector 932 to the hub 931 and the latter to contacts ECB3, the selector #1 is also dropped out by the closing of the eject cam contacts ECB3 when the card DC—8 is ejected from the unit 100.

When card DC—9 is classified, the code hole in the #9 index point position of column #1 thereof provides for energizing the card code setup relay R109 and the latter closes its classifying contacts R109—2 and thereby renders hot the classifying hub CH9. The latter is connected by a plug connector 938 with the pickup hub PU of selector #2, and the drop out hub DO of this selector is connected by plug connectors with the eject cam contacts ECB3. Thus, when the card DC—9 is classified, the selector #2 is activated and when the card is ejected from the unit 100 the cam contacts ECB close to drop out this selector #2.

*Relay storage unit*

Before proceeding further with the description of the operation of the illustrated embodiment under the control of the heading card HC—1, it is believed that it will be helpful to describe first the relay storage unit disclosed in Figs. 50L to 50o, inclusive, and Figs. 50q to 50s, inclusive, and also to explain the manner in which numeric data may be stored therein under the manual control of the auxiliary keyboard 302 (Fig. 20) of the #1 typewriter 300. The relay storage unit is described herein as a part of the general operation because it can best be disclosed and understood as a part of the electrical wiring diagram of Figs. 50a to 50s, inclusive. The relays comprising the relay storage unit, the contacts actuated by the keys of the auxiliary keyboard for manually entering numeric data in the storage unit, and the connecting circuit network for effecting digit entering operations are shown in Figs. 50L and 50o, inclusive. The readout contacts controlled by the digit representing relays of the storage unit are shown in Figs. 50q, 50r, and 50s as a part of a plurality of readout pyramid networks corresponding, respectively, to different order-representing relay banks of the storage unit and functioning to control readout circuits including the cam contacts CR2 (Fig. 50p) and the code wires CW1 to CW10, inclusive, which are adapted to be respectively connected to corresponding selector magnets TSM1 to TSM10, inclusive (Fig. 50s), of the #1 translator 400 and to corresponding selector magnets 2TSM1 to 2TSM10, inclusive, of the #2 translator.

It is noted that the construction and operation of the relay storage unit disclosed herein are substantially the same as that disclosed in our copending application referred to hereinabove at the outset.

The relays of the storage unit are divided into three sections so that three different numbers may be stored therein, the first section being used in the particular example described herein to store the serial number assigned to the customer's order, the second section being used herein to store each page number of the invoice, and the third section being used to store the quantity number of each part ordered by the customer. Thus, the first section is referred to hereinafter as the customer's order section, the second section as the page number section, and the third section as the quantity number section.

The first or customer's order section is arranged along the right hand side of Figs. 52m, 52n, and 52o, and comprises digit-representing relays R122 to R145, inclusive, and the digit-representing relays of the customer's order section are divided into six (6) banks of four relays each, and each bank represents an order or position of the customer's order number. Therefore, the maximum capacity of the first or customer's order section is the greatest number having six orders or positions. The six order banks are indicated, respectively, in the drawings as CO6 to CO1, inclusive. The highest order bank, CO6 (Fig. 50*m*) is used for storing the sixth order when the customer's order number is that large, and comprises the relays R127 to R125, inclusive. The next highest or fifth order bank CO5 (Fig. 50*m*) comprises the digit relays R126 to R129, inclusive. The fourth order bank, CO4 (Fig. 50*n*) comprises the digit relays R130 to R133, inclusive. The third order bank, CO3 (Fig. 50*n*) comprises digit relays R134 to R137, inclusive. The second, or tens order bank, CO2 (Fig. 50*n*) comprises the digit relays R138 to R141, inclusive. The first or units order bank, CO1 (Fig. 50*o*), comprises the four digit relays R142 to R145, inclusive.

The second or page number section of the relay storage unit is arranged at the right-hand side of Fig. 52*o* and is in effect a continuation of the customer's order number section. As shown, the page number section comprises the digit-representing relays R146 to R153, inclusive, and they are divided into two order banks, identified, respectively, as PN2 and PN1. The second or page number section, therefore, has a maximum capacity of the highest number having two orders.

The third or quantity number section of the relay storage unit is arranged along the left-hand side of Figs. 50*m* and 50*n* and comprises the digit-representing relays R154 to R165, inclusive, and column shift control relays R166 to R168, inclusive. The digit relays are divided into three order-representing banks identified herein as QNA, QNB, and QNC, respectively. Each order bank comprises four of the digit-representing relays and one of the column shift control relays, as shown.

The manner in which numbers are manually stored in the three sections of the relay storage unit will be described in detail hereinafter under separate sub-headings. In general, the digits of each number are stored in succession by manually operating the keys 303, 304, and motor bar 305 of the auxiliary keyboard 302 shown in plan in Fig. 20. The key contacts closed by the actuation of the digit keys 303 are indicated as K0 to K9, inclusive, in Fig. 50L. The contacts closed by the space key 304 are identified by the character SP (Fig. 50L) and the contacts operated by the motor bar 305 are identified by MB in Fig. 50*m*. As explained, when the operator depresses one of these keys, a corresponding key contact is closed. It is noted that when a digit key 303 or the space key 304 is depressed the bail contacts BC (Fig. 50L) are also closed. It is also noted that the space contacts SP do not control a circuit path. In the illustrated embodiment, the closing of the bail contacts BC by the space key performs the function of spacing over a storage bank. Four set up relays R170 to R173, inclusive, are energized singly and in combination by the closing of the key contacts K0 to K9, inclusive, to represent the different digits according to a predetermined 4-position code. A relay R28 (Fig. 50*m*) is energized by the closing of the motor bar contacts MB when the contacts 168—4 of the column shift control relay R168 are closed. The contacts of the set up relays R170 to R173 control the energizing of the digit-representing relays of each order bank of the three sections of the relay storage unit according to the 4-position code referred to, and in a manner which will be more fully explained hereinafter.

As stated, when a digit of a number is stored in an order bank, the energized relay or relays of such order bank, adjust their read out contacts in a corresponding pyramid translator network of Figs. 50*q*, 50*r*, and 50*s* and thereby condition a read out circuit path therethrough including the code wires of the group CW1 to CW10, inclusive, corresponding to the digit stored. The pyramid networks corresponding to the order banks CO6 to CO1, inclusive, are identified, respectively, in Figs. 50*q* and 50*r*, as COP6 to COP1, inclusive. The pyramid networks corresponding to order banks PN2 and PN1 are identified in Fig. 50*r* as PNP2 and PNP1, respectively. The pyramid networks corresponding to the order banks QNA to QNC, inclusive, are identified, respectively, in Figs. 50*r* and 50*s* as QNPA to QNPC, inclusive.

Before a number can be stored in any section of the relay storage unit, a storage conditioning relay R178 (Fig. 50L) must first be energized so that its entry control contacts R178—1 (Fig. 50*m*) are closed. As shown in Fig. 50L, the pick up coil of the relay R178 may be energized in either of three ways; viz., by the transferring of contacts R3—3, R4—3, or R27—4. As will later appear, the relay R3 is energized and transfers its contacts R3—3 to pick up R178, as a part of an operation for clearing out any stored number in the quantity number order banks QNA, QNB, and QNC, and will be referred to hereinafter as the quantity number clear operation. The relay R4 is energized and transfers its contacts R4—3 to pick up R178, as a part of an operation for clearing out any stored customer's order number and invoice page number in the storage order banks CO6 to CO1, inclusive, PN2 and PN1. The latter operation will be referred to hereinafter as an order number clear operation. The relay R27 is the reset control relay and is energized and transfers its contacts R27—4 as a result of the manual depressing of the reset key 347 of the auxiliary keyboard 302 (Fig. 20). The operator depresses the reset key 347 when an error has been made in the storing of the number and it is desired to wipe out the number or part thereof already stored. The storage conditioning relay R178 is held energized across the power supply by its hold contacts R178—4 (Fig. 50L) and the normally closed contacts R180—2 of sequence control relay R180.

As will presently appear, when the storage conditioning relay R178 is energized and its contacts R178—1 thereby closed and a digit entering impulse is transmitted through the latter contacts under the control of the operator for the purpose of entering the first digit of an order number or of a quantity number, the adjusted condition of the contacts R169—1 of a storage shift control relay R169 determines whether such first digit entering impulse will be routed to the quantity number section or to the order and page number sections. Contacts R169—2, R169—3 (Fig. 50*n*), and R169—5 determine whether subsequent digit entering impulses will be routed to the quantity number or customer's order and invoice page number sections. In the drawings R169 is shown as deenergized and its control contacts in their normal position. In this position successive entering impulses are routed to the order banks of the customer's order and page number sections, in succession. When R169 is energized its contacts are shifted from their positions shown and they then route digit entering impulses to the order banks of the quantity number section, in succession.

*Storing the customer's order number and invoice page number.*—For the purpose of explaining this operation, it is assumed the relay R178 (Fig. 50L) is now energized and its contacts R178—1 (Fig. 50*m*) are closed and they thereby condition circuit paths for entering a number into the relay storage unit. It is also assumed that R169 is now deenergized and its contacts R169—1 are therefore in the position shown. In the illustrated embodiment, the relay storage unit is conditioned to receive and store the customer's order number first, and the invoice page number is stored next. As is customary, order numbers are assigned serially by the seller to the customer's orders as they are received. In the particular example being described (see invoice 11—1 in Fig. 43), the selected customer's order number is "123456" and the invoice page number is "1." The order and page numbers are usually stored by the operator while the apparatus is operating automatically under the control of a heading card and after column #6 of section B of the tape is read and before column #100 of section B is read. As will appear more fully hereinafter, if the order and page numbers are not stored before column #100 is read, the apparatus will automatically stop and it cannot start again until the order and page numbers are stored.

The digits of the customer's order number are entered successively with the highest order digit entered first. Thus as the number "123456" comprises a digit in each of six order positions, the operator enters this number by first depressing the key 303—1 of the auxiliary keyboard (Fig. 20) for entering the highest order digit "1," and then by depressing the keys 303—2, 303—3, 303—4, 303—5, and 303—6, in succession, for entering the succeeding digits "2," "3," "4," "5" and "6." The invoice page number comprises only the units digit "1." Thus, the operator then stores the page number by first depressing the space key 304 and then the digit key 303—1 for entering "1."

When the operator first depresses the key 303—1, the corresponding key contacts K1 (Fig. 50L) and the bail contacts BC are closed. The contacts K1 establish a circuit for the storage set up relay R170. The energizing circuit for R170 is traced as follows: from the positive conductor 900, through a wire 940, the now closed key contacts K1, and the coil of R170, to the negative conductor 901. R170 closes its contacts R170—1 (Fig. 50*m*) in the order bank CO6 and thereby conditions an energizing circuit for the digit storage relay R122 of this bank. The closing of the bail contacts BC establishes an energizing circuit for a first entry control relay R175 (Fig. 50L) which is traced as follows: from the positive conductor 900, the now closed bail contacts BC; the normally closed points of transfer contacts R177—1, the normally closed contacts R174—5 of a second entry control relay R174, and through the pick up coil of R175 to the negative conductor 901. The first entry control relay R175 closes a pair of hold contacts R175—6 and thereby provides for holding R175 energized by a circuit path which includes the bail contacts BC. Thus, R175 is held energized as long as the operator holds down the digit key 303—1 and thereby keeps the bail contacts BC closed. The closing of the hold contacts R175—6 of the first entry control relay R175 also establishes an energizing circuit for the pick up coil of the relay R177 and such circuit also includes the now closed bail contacts BC. The relay R177 is held energized by its hold contacts R177—4 and by a circuit extending from the positive conductor 900 and including the normally closed points of contacts R3—3, R4—3, and R27—4 and the normally closed contacts R176—1 of R176. The first entry control relay R175 opens its interlock contacts R175—5 and thereby prevents the establishing of an energizing circuit for a second entry control relay R174 until the operator releases the digit key 303—1 and thereby opens the bail contacts BC and breaks the hold circuit for R175. R177 transfers its contacts R177—1 and thereby conditions an energizing circuit for said second entry control relay R174; but, as stated, the now open interlock contacts R175—5 prevent the establishing of such circuit as long as R175 is kept energized by the closed bail contacts BC.

The first entry control relay R175, when thus energized, also closes its entry control contacts R175—1 (Fig. 50*m*) and thereby establishes, through the now closed bail contacts BC (Fig. 50L), a digit entering circuit including the pick up coil of digit relay R122 (Fig. 50*m*) which, as stated, as in the sixth order bank and was conditioned by the closing of the storage conditioning relay contacts R178—1 and also includes the now closed contacts R170—1 of the set up relay R170. The digit entering circuit is traced as follows: from the positive conductor 900 (Fig. 50L), through the now closed bail contacts BC, a wire 941, the now closed entry control contacts R175—1 (Fig. 50*m*), the previously closed contacts R178—1 of the storage conditioning relay R178, a wire 942, the normally closed points of contacts R169—1 of the storage shift control relay R169, the contacts R170—1 now closed, and the pick up coil of relay R122 to the negative conductor 901.

The digit representing relay R122 is then held energized across the power supply by a hold circuit extending from the positive conductor 900, through the normally closed contacts R4—1 of the order number clear relay R4, a wire 943, the normally closed contacts R27—1 of the reset control relay R27, a wire 944, the hold contacts R122—4 now closed, and the hold coil of R122 to the negative conductor 901. As shown in Figs. 50*m* to 50*o*, inclusive, the hold contacts of all digit representing relays of the order and page number order banks are connected to the wire 944.

Simultaneously with the energizing of the pick up coil for R122, a parallel circuit is established from the contacts R178—1 (Fig. 50*m*) to energize the pick-up coil of a sequence control relay R179. R179 is held energized by a circuit extending from the positive conductor 900, through the normally closed contacts R3—1 of the quantity number clear relay R3, through the normally closed contacts R27—3 of the reset relay R27, a wire 946, the normally closed contacts R181—2 of storage sequence control relay R181 (Fig. 50*m*) and then through the now closed hold contacts R179—4 and the hold coil of R179 to the negative conductor 901. The sequence control relay R179 closes its control contacts R179—1 and thereby conditions a digit entering circuit for the next or fifth position order bank CO5 of the section of storage relays for storing the order number. R179—1 function to condition the order bank CO5 for receiving a storage entry in the same manner as the contacts R178—1 function with respect to the sixth order bank CO6.

When the operator releases the digit key 303—1, the bail contacts BC (Fig. 50L) open and break the hold circuit for the first entry control relay R175 and the contacts of R175 then return to their positions shown. This includes the interlock contacts R175—5 which now reclose to condition an energizing circuit for the second entry control relay R174. The pick up coil of R177 is also deenergized by the open bail contacts, but the contacts R177—1 remain in their transferred position, because the hold coil of R177 remains energized across the power supply by the circuit previously traced.

The next digit of the order number is "2." The operator enters this digit in CO5 by depressing the key 303—2 which closes the contacts K2 (Fig. 50L) and bail contacts BC. The closing of K2 picks up storage set up relay R171 which closes its contacts R171—2 in order bank CO5 to condition an entering circuit for digit relay R127. Simultaneously with the picking up of R171, a circuit is established through the bail contacts BC, contacts R177—1 now in their transferred position, R175—5 in the normal position shown, and the pick up coil of the second entry control relay R174. R174—6 then close to hold energized the hold coil of the second entry control relay R174 through the bail contacts BC, as long as the operator keeps his finger on the key 303—2. A circuit is also established from R174—6 through the coil of R176. R174 also opens its interlock contacts R174—5 to prevent the energizing again of the first entry control relay R175 until the operator first releases the digit key 303—2 and thereby opens the bail contacts BC. Thus, R174—5 function in this second entry operation in a manner similar to R175—5 in the first described storage entry operation. The relay R176 opens its contacts R176—1 and thereby drops out the hold coil of R177, the latter then returning its contacts R177—1 to their normal position shown.

The second entry control relay R174 closes its contacts R174—1 (Fig. 50*m*), and thereby establishes a digit entering circuit for the pick up coil of digit relay R127 of order bank CO5, which entering circuit was previously conditioned by the closing of contacts R171—2 and R179—1. The digit entering circuit includes the bail contacts BC (Fig 50L), the wire 941, the now closed contacts R174—1 and R179—1, the normally closed points of contacts R169—2, and the now closed contacts R171—2. The digit relay R127 is held energized across the power line through its now closed hold contacts R127—4, the wire 944, and the normally closed contacts R27—1 and R4—1.

Simultaneously with the energizing of R127, a parallel circuit path extending from R179—1 energizes the pick up coil of storage sequence control relay R180 and the latter closes its hold contacts R180—4 and thereby establishes an energizing circuit for its hold coil which extends across the power conductors 900, 901 and includes the normally closed contacts R3—1, the normally closed contacts R27—3, a wire 945, the normally closed contacts R182—2 of the sequence control relay R182 (Fig. 50*n*) and the normally closed contacts R166—8 of the column shift control relay R166 of order bank QNC. The sequence control relay R180 closes its control contacts R180—1 (Fig. 50*n*) and thereby conditions an entering circuit for the next digit to be stored in the next order bank CO4 of the storage relays. R180 also opens its contacts R180—2 (Fig. 50L) and thereby drops out the hold coil of the storage conditioning relay R178 and the latter then opens its contacts R178—1 (Fig. 50*m*) to disconnect the storage entering circuit wire 941 from the sixth order bank CO6. When the operator releases the digit key 303—2, the bail contacts BC again open and deenergize the second entry control relay R174 which returns its contacts to their normal positions shown in the drawings.

To enter the next digit "3" in order bank CO4, the operator depresses the digit key 303—3 and thereby closes the key contacts K3 (Fig. 50L) and bail contacts BC. The closing of K3 energizes the set up relays R170 and R171, and the closed bail contacts BC energize again the first entry control relay R175. R170 and R171 close their contacts R170—3 and R171—3, respectively (Fig. 50*n*), to condition an entering circuit for the pick up coils of digit storage relays R130 and R131 in the order bank CO4. As will be readily understood, the relays R130 and R131, when energized, represent the digit "3" in the 4 position digit storage code. The closing of the bail contacts BC again energizes the first entry control relay R175 (Fig. 50L) through the normally closed points of contacts R177—1 and the contacts R174—5 in their normally closed position, the same as when the digit key 303—1 was depressed to effect the first described entering operation. The relay R175 is again held energized through the bail contacts BC and the now closed hold contacts R175—6 as long as the operator keeps the key 303—3 depressed. R175 opens its interlock contacts R175—5, as before. The closing of contacts R175—6 also energizes the relay R177 through the bail contacts BC, and the hold coil of R177 is again held by its hold contacts R177—4 and through the normally closed contacts R176—1 and the normally closed points of contacts R3—3, R4—3, and R27—4. R177—1 again transfer to condition an energizing circuit for the second entry control relay R174, but the latter cannot be established at this time because of the now open R175—5. The relay R175 closes its entry control contacts R175—2 (Fig. 50*n*) and thereby establishes through the bail contacts BC and the storage entering wire 941, an entering circuit for the digit storage relays R130 and R131 which was previously conditioned by the closing of sequence control relay contacts R180—1 and set up relay contacts R170—3 and R171—3. R130 and R131 close their hold contacts R130—4 and R131—4, respectively, and thereby establish hold circuits therefor including the wire 944 and the now closed R27—1 (Fig. 50*m*) and R4—1. Thus, the digit "3" is stored in order bank CO4. It is noted that, even though the entry control contacts R175—1 (Fig. 52*m*) are also closed again in this entering operation, no circuit can now be established to the order bank CO6, because the relay R178 is now deenergized and its contacts R178—1 are open. Simultaneously with the energizing of R130 and R131, a branch parallel circuit is established from R180—1 (Fig. 50*n*) and extending through the pick up coil of a storage sequence relay R181. The sequence relay R181 is held energized by its hold contacts R181—4, the normally closed sequence control relay contacts R183—2, the wire 945, the reset relay contacts R27—3 (Fig. 50$m$) and the normally closed contacts R3—1. R181 opens its contacts R181—2 (Fig. 50$m$) and thereby drops out the hold coil of the first sequence relay R179 to be energized. R179 then opens its contacts R179—1 (Fig. 50$m$) in the entry path circuit for the order bank CO5. The sequence relay R181 closes its contacts R181—1 (Fig. 50$n$) to condition an entering circuit path for the third position order bank CO3. When the digit key 303—3 is released, bail contacts BC (Fig. 50L) are again opened and thereby deenergize the first entry control relay R175. The relay R177 is now held energized, as previously explained.

The operator next stores the digit "4" in order bank CO3 by depressing the key 303—4 which closes the key contacts K—4 (Fig. 50L) and the bail contacts BC. The closed key contacts K4 energize the set up relay R172, and the closed bail contacts BC energize the second entry control relay R174. R172 closes its contacts R172—4 (Fig. 50$n$) to condition an energizing circuit for the pick up coil of digit storage relay R136 which circuit includes the previously closed contacts R181—1 of the sequence control relay R181. As stated, the closing of the bail contacts BC by the actuation of the digit key 303—4 energizes again the pick up coil of the second entry control relay R174, thus closing R174—5 to energize the hold coil of R174 and also energize the relay R176. R176 opens its contacts R176—1 and thereby again drops out the hold circuit for R177 and the latter then restores its contacts R177—1 to the position shown. Also, with the picking up of R174, the latter closes its entry control contacts R174—2 (Fig. 50$n$), and thereby establishes the previously conditioned entering circuit for energizing the digit storage relay R136. R136 is held through its contacts R136—6, the wire 944, and the normally closed contacts R27—1 and R4—1 (Fig. 50$m$). Sequence control relay R182 is picked up simultaneously with R136 by a parallel circuit path extending from 181—1. R182 closes its hold contacts R182—4 to establish a hold circuit therefor extending through the normally closed sequence relay contacts R184—2 and through the wire 945 and the normally closed contacts R27—3 and R3—1 (Fig. 50$m$). R182—2 then open to drop out the sequence relay R180 which opens its contacts R180—1 (Fig. 50$m$) in the entering circuit for the order bank CO3. R182 closes its sequence control contacts R182—1 and thereby conditions a storage entry circuit for the second position order bank CO2. The digit key 303—4 is released to open its key contacts K4 and the bail contacts BC (Fig. 50L) and thereby drops out the relays R172, R174, and R176.

The operator next depresses the key 303—5 for storing the numeral "5" which, as stated, is the tens order digit of the selected customer's order number. The key contacts K5 (Fig. 50L) are closed thereby and they establish energizing circuits for the digit storage set up relays R170 and R172 which close their contacts R170—5 and 172—5, respectively (Fig. 50$n$), to condition an entering circuit, including the previously closed sequence contacts R182—1, for energizing the pick up coil of the digit storage relays R138 and R140 in the order bank CO2. The relays R138 and R140, when energized together, represent the digit "5." The bail contacts BC (Fig. 50L) also close and pick up the first entry control relay R175 and the latter closes its entry control contacts R175—3 (Fig. 50$n$) and thereby completes the digit entering circuit for energizing R138 and R140, which circuits include the now closed contacts R170—5 and R172—5, R182—1, a wire 947, the normally closed contacts R169—5 and the wire 941. R138 and R140 then close their hold contacts R138—4 and R140—4, respectively, and thereby establish hold circuits therefor including the wire 944 and the normally closed contacts R27—1 (Fig. 50$m$) and R4—1. R175 (Fig. 50L) opens its interlock contacts 175—5, and closes its contacts R175—6 to pick up R177 which, as before, is held through its hold contacts R177—4 and the normally closed contacts R176—1, R27—4, R4—3, and R3—3. R177 transfers its contacts R177 to condition a pick up circuit for R174, as previously explained. Simultaneously with the energizing of digit storage relays R138 and R140 (Fig. 50$n$), a branch parallel circuit is established from R182—1 for energizing the pick up coil of sequence control relay R183. R183 is held energized by its hold contacts R183—4 and the normally closed contacts R185—2, the wire 945, and the contacts R27—3 and R3—1 (Fig. 50$m$). R183 closes its sequence control contacts R183—1 (Fig. 50$o$) to condition an entering circuit for energizing digit storage relays of the next or units position order bank CO1. Contacts R183—2 (Fig. 50$n$) open to drop out the sequencing relay R181 and the latter then opens its contacts R181—1 to disconnect the entering circuit wire 941 from the storage relays of the order bank CO3.

The operator next depresses the key 303—6 of the auxiliary keyboard 302 (Fig. 20) for entering the units digit "6," and this closes the key contacts K6 (Fig. 50L). The contacts comprise two pairs of contacts which establish, respectively, energizing circuits for storage code set up relays R171 and R172 which together represent the digit "6." The set up relays close their contacts R171—6 and R172—6 (Fig. 50$o$) to condition energizing circuits for digit storage relays R143 and R144, respectively, of the units order bank CO1. The depressing of the key for entering the numeral "6" also closes the bail contacts BC (Fig. 50L) and with R177—1 in shifted position, this picks up the entry control relay R174 which is held energized by the closing of its contacts R174—6 until the bail contacts BC are again opened by releasing the key. An entering circuit is also established for energizing the storage relays R143 and R144 when R174 closes its contacts R174—3 (Fig. 50$o$) and this circuit includes the bail contacts BC (Fig. 50L), the wire 941, contacts R169—5 (Fig. 50$n$), and the wire 947, as previously described. R143 and R144 are held through their hold contacts R143—4 and R144—6, respectively, and through the circuit path including the wire 944 and the normally closed contacts R27—1 and R4—1 (Fig. 50$m$). Upon the establishing of the pick up circuit for R143 and R144, a branch parallel circuit path is established from contacts R183—1 (Fig. 50$o$) and including the pick up coil of sequence control relay R184. R184 is held by its contacts R184—4, and through the normally closed contacts R33—3, the wire 945, and the contacts R27—3 and R3—1 (Fig. 50$m$). R184 opens its contacts R184—2 (Fig. 50$n$) and drops out the sequence relay R182. R182 then opens its contacts R182—1 to prevent the establishing of a second entering circuit through the pick up coils of the storage relays of the second position order bank CO2. R184 closes its contacts R184—1

(Fig. 50o) and thereby conditions a pick up circuit for the storage relays of the second position order bank PN2 which, as explained, are used to store the tens order digit of the page number of the invoice 11—1 being typed by the #1 typewriter.

From the foregoing, it is apparent that the operator has now stored the customer's order number "123456" in the six order banks CO6 to CO1, inclusive, of the storage relay network provided for this purpose. The energized digit representing relays of order banks CO6 to CO1, inclusive, adjust their contacts in the corresponding pyramid relay networks COP6 to COP1, inclusive, in Figs. 50q and 50r, so that the stored order number can be read out in a manner which will be fully described hereinafter under the subheading "Storage readout."

The invoice page number "1" will now be stored in order banks PN2 and PN1. As stated above, this is effected by depressing the space key 304 (Fig. 20) and then the key 303—1 for storing the number "1." This operation will not store a digit in PN2 and will store the digit "1" in PN1 by energizing R150.

As stated hereinabove, the now closed sequence relay contacts R184—1 (Fig. 52o) condition the order bank PN2 for receiving the tens order digit of the invoice page number. Upon releasing the key 303—6 for storing the units digit "6" of the customer's order number in the order bank CO1, the operator next depresses the space key 304, which closes the contacts SP (Fig. 50L) which are disconnected from the circuit network, as previously explained, and thereby has no effect on the operation. The key 304 also closes the bail contacts BC and thereby energizes the first entry control relay R175 which closes its contacts R175—6 to establish a hold circuit for R175 and also to establish an energizing circuit for R177, in the same manner as previously explained. As the contacts SP do not energize a set up relay, no entering circuit for energizing the relays of PN2 will be established during this entering operation. However, R175 closes its entry control contacts R175—4 (Fig. 50o), and thereby establishes a circuit including the bail contacts BC (Fig. 50L), the entering circuit wire 941, the contacts R169—5 (Fig. 50n), the wire 947, the now closed contacts R175—4 (Fig. 50o), the now closed contacts 184—1, and the pick up coil of sequence control relay R185. R185 then closes its hold contacts R185—4 and thereby provides an energizing circuit for its hold coil which also includes a wire 948, the normally closed contacts R33—3, the wire 945, and the normally closed contacts R27—3 and R3—1 (Fig. 50m). R185 opens its contacts R185—2 (Fig. 50n) to drop out the hold circuit for sequence relay R183. R183 then opens its contacts R183—1 to prevent the establishing of a second entering circuit to the storage relays of the order bank CO1. R185 also closes its sequence control contacts R185—1 (Fig. 50o) to condition a pick up circuit for the relays of the units order bank PN1. Thus, when the operator releases the space key 304 and then depresses the key 303—1 for entering the numeral "1" in PN1, the key contacts K1 (Fig. 50L) close and energize the set up relay R170 and simultaneously therewith, the bail contacts BC close to pick up the entry control relay R174, the contacts R177—1 being now transferred as a result of the previous entering operation. R174 is held through its contacts R174—6 and the bail contacts BC, as before. The set up relay R170 closes its contacts R170—8 (Fig. 52o) to condition an energizing circuit for the pick up coil of digit storage relay R150. R174 also closes its entry control contacts R174—4 and thereby established the entering circuit for energizing the pick up coil of R150, and the latter circuit also includes the previously closed sequence relay contacts R185—1, the wire 947, the contacts R169—5 (Fig. 50n), the wire 941, and the bail contacts BC (Fig. 50L). With the energizing of the storage relay R150 (Fig. 50o) a branch parallel circuit is established from R185—1 to the pick up coil of sequence control relay R33. R33 then closes its hold contacts R33—2 (Fig. 50L) and thereby establishes an energizing circuit for the hold coil thereof extending across the power line and including the normally closed points of contacts R3—3, R4—3, and R27—4. R33 then opens its contacts R33—3 (Fig. 50o) which break the hold circuits of sequence control relays R184 and R185. R184 opens its contacts R184—2 to drop out R182 which opens its contacts R182—1 to disconnect the entering circuit wires 947 and 941 from the order bank CO2. R185—2 open to drop out R183 and R183—1 then open to break the entering circuit connection to CO1. R184 also opens its contacts R184—1 to break the entering circuit connection to PN2 and R185 opens its contacts R185—1 to break the entering circuit connection to PN1. It is also noted that at this time the order banks CO3 to CO6, inclusive, are also disconnected from the entry circuit wire 941 by the now open sequence control contacts R181—1, R180—1, R179—1, and the now open storage conditioning relay contacts R178—1, respectively.

Summarizing the foregoing, it is noted that the customer's order number 123456 is now stored in the section of the relay storage unit comprising order banks CO6 to CO1, inclusive, and the invoice page number "1" is stored in the section comprising order banks PN2 and PN1, and that all of the storage relays of these order banks energized as a result of the above described entering operations are held by circuits including the wire 944, the reset relay contacts R27—1 (Fig. 50m), and the contacts R4—1. Also, the storage conditioning relay R178 (Fig. 50L) is now deenergized. Sequence control relays R179 to R185, inclusive, are also now deenergized so that their contacts are in the position shown in the drawings. R33 (Fig. 50L) is now held energized across the power line. Further actuation of the digit keys and space key of the keyboard 302 (Fig. 20) will not affect the condition of the relays of the storage unit because of the open contacts R178—1 (Fig. 50m). The condition of the storage relays of the eight order banks comprising the first and second section of the storage unit will remain as described as long as the reset relay R27 and the relay R4 are deenergized so that the holding circuits for the storage relays are maintained through the wire 944 and contacts R27—1 and R4—1.

*Resetting of relay storage unit.*—With the order number clear relay R4 remaining deenergized and thereby keeping its contacts R4—1 (Fig. 50m) closed, and with the storage shift control relay R169 remaining deenergized and its contacts staying in their positions shown, the customer's order number and invoice page number now stored in the eight order banks of the first and second sections of the relay storage unit can be wiped out and new numbers stored therein at any time, by the operator depressing the reset control key 347 (Figs. 20 and 50*m*), the latter operation establishing an energizing circuit for the reset control relay R27.

As previously explained, the order and page number are stored after an order number clear operation which energizes R4 under the control of a significant program designation in column #6 of section B of the program tape 15. This operation will be presently described under a separate sub heading. When reading the heading card HC—1, no program designation calling for an order number clear operation, is in section B of the program tape after column #6. As will also be explained, a quantity number clear operation is effected under the control of a program designation in column #110 of section B of the tape 15 and this latter operation includes the energizing of the storage shift control relay R169 (Fig. 50*m*). Thus, while the heading card is in passage 154 (Fig. 4*b*) and between the reading of the program designation in column #6 of section B of tape 15 and column #110, thereof, the operator may wipe out any stored order and page number by depressing the key 347 (Fig. 50*m*).

When thus energized, relay R27 transfers its contacts R27—4 (Fig. 50L), thereby breaking the circuit path including the hold coil of sequencing relay R33, and at the same time establishing an energizing circuit for the pick up coil of the storage conditioning relay R178. It is noted that transferred contacts R27—4 also break the energizing circuit path for the hold coil of relay R177 so as to make certain that its contacts R177—1 will be in their normal position shown and the first entering operation will energize the first entry control relay R175. The relay R33 then recloses its contacts R33—3 (Fig. 50*o*) so that the hold coils of sequence control relays R184 and R185 can be energized at the proper entering step to control entering of a page number in the order banks PN2 and PN1 in the manner previously described. The relay R178 (Fig. 50L) closes its hold contacts R178—4 to establish the hold circuit therefor which includes the normally closed contacts of R180—2.

The reset relay R27 also opens its contacts R27—1 (Fig. 50*m*) and thereby drops out the hold coils of all of the digit storage relays that were picked up as a result of a previous storing of an order and page number as in the example described. It is noted that when a storage shift control relay R169 is energized its contacts R169—4 are closed and a circuit path is provided thereby which connects the wires 944 and 943 and which shunts the contacts R27—1. Thus, when R169—4 are closed, the hold circuits for the storage relays cannot be broken by the open contacts R27—1. The function of relay R169 will be described hereinafter under the sub heading "Quantity number clear." As stated, however, R169 is not energized at this time and R27—1 can now function as described to drop out the storage relays R122 to R153, inclusive, of the eight order banks.

The reset relay R27 also opens its contacts R27—3 and thereby breaks the hold circuit paths for the hold coil of the motor bar control relay R28 and the sequence control relay R179 and also breaks the hold circuit paths for the remaining sequence control relays R180 to R185, inclusive. At this time, the relay R28 is not energized and the sequence relays R179 to R185 have already been deenergized as a part of the storing operation, as previously explained. It will be apparent, however, that should the operator depress the reset key 347 because of a mistake made while storing an order and a page number, and before the storing operation is completed, then the opened contacts R27—3 would drop out any of these sequence relays which successively condition the several order banks for receiving the number and which are energized at the time. As will appear hereinafter in the description of operations under the control of the detail card, wherein the quantity numbers are stored in and read out of order banks QNA to QNC, inclusive, the opening of R27—3 also drops out the hold coils of any of the relays R154 to R168, inclusive, and also drops out the motor bar control relay R28. When the order number and the page number are wiped out of the storage unit by the operation of the relay R27, as explained, new numbers may be stored in the order banks provided therefor in the same manner as in the example described hereinabove.

*Program tape transfer quantity number clear*

Returning now to the description of the operation under the heading card HC—1 and the program tape 15, it is noted that in Fig. 47, column #5 of the program tape 15, section A, is shown as containing the 1-3-4-5 code designation. As indicated in the above included chart of the program tape code system, this designation when sensed provides, when the card being read is a heading card, for transferring the program control from section A of the tape to section B thereof and also provides for clearing out any number stored in the quantity number section of a relay storage unit. As explained, columns #2 to #5, inclusive, of section A of the program tape comprise an initial control section and the program designations therein control operations of the apparatus when all classes of cards are being read. The remaining columns of section A comprise a detail control section and the program designations therein control the sequencing of operations when any of the detail cards is being sensed. The remaining columns of section B of the tape contain program designations controlling the sequence of operations when the card in sensing position in passage 154 is a heading or master card.

When CR5 (Fig. 50*c*) close at 295° of the machine cycle in which the previously described classifying operation is taking place, the 1-3-4-5 designation in tape column #5 is sensed; and, as a result, the pick up coils of the tape code set up relays R188, R190, R191, and R192 are energized. They close their hold contacts R188—4, R190—6, R191—12, and R192—17, respectively, (Fig. 50*a*) and thereby provide hold circuits therefor under the control of contacts CR6. These tape code set up relays also adjust their translator contacts in the pyramid network of Figs. 50*e*, to 50*i*, inclusive, and thereby provide a translator circuit path therethrough which is under the control of contacts CR3 and which terminates in outlet plughub PRH48 (Fig. 50*f*). The latter hub is connected by a plug connector 950 to the inlet or common hub C of the set of control contacts R45—3 of the activating relay R45 for control selector #6. The transferred or controlled outlet hub T of control contacts R45—3 is connected by a plug connector 951 to the inlet hub for energizing the coil of distributor relay R251. The outlet hub of distributing contacts R251—2 is connected by a plug connector 952 to the function hub FH10 and the latter is wired to the negative conductor 901 through the pick up coil of relay R186 which, as previously explained, is the tape shift control relay. The outlet hub of contacts R251—1 is connected by a plug connector 953 to function hub FH25 (Fig. 50*h*) and the latter is wired to the negative conductor through the coil of relay R3, which is the function relay for clearing out any number stored in the quantity number section of the relay storage unit and for conditioning the storage unit to receive a new quantity number.

It is noted at this point that no plug connector is connected to the normal outlet hub N of the control contacts R45—3 (Fig. 50*f*) of the control selector #6. The selector #6 is now activated and the relay R45 thereof is energized because of the above described classifying operation of the heading card HC—1. Thus, the operating contacts R45—3 are now transferred and the energizing circuit path for distributor relay R251 is now complete from the hub PRH48 to the negative conductor 901. As also explained, the selector #6 is activated by the classifying operation when any of the heading cards are in sensing position and is not activated when any of the detail cards are in sensing position. Therefore, when a detail card is in the passage 154, and column #5 of the program tape is sensed, the translator circuit path conditioned by the sensing of the code designation 1-3-4-5 cannot be completed through the contacts R45—3. No functional operations of the apparatus will be effected by this code designation, and the tape 15 will move to its #6 column sensing position.

However, with the card HC—1 being now sensed, R45—3 are now transferred, and when CR3 close, the distributor relay R251 is energized, and when CR4 close the pick up coil of tape shift control relay R186 and the single coil of quantity number clear relay R3, are both energized.

The tape shift control relay R186 then closes its hold contacts R186—12 (Fig. 50*k*) and thereby establishes an energizing circuit for its hold coil which circuit extends across the main power conductors 900, 901 and includes the normally closed eject cam contacts ECB2. Thus, R186 is held energized until the next eject cycle when card HC—1 is removed from the unit 190.

The tape shift control relay R186 transfers its control contacts R186—1 to R186—6, inclusive (Fig. 50*c*), from the position shown and thereby breaks the sensing circuit paths previously described and extending from the tape sensing brushes BA1 to BA6, inclusive, and including the pick up coils of tape code set up relays R188 to R193, inclusive. In their transferred position, the now closed points of contacts R186—1 to R186—6, inclusive, connect, respectively, the tape sensing brushes BB1 to BB6, inclusive, in six corresponding tape sensing circuit paths which include the pick up coils of the tape code set up relays R188 to R193, inclusive. From the foregoing, it will be apparent that when tape 15 is spaced to its next or #6 column sensing position, the sensing brushes BB1 to BB6, inclusive, will sense the code designation in column #6 of section B of the tape 15 and the tape code set up relays R188 to R193, inclusive, will be energized in accordance therewith.

As explained, the relay R3, when energized, provides for clearing out any number which may be stored at this time in the order banks QNA, QNB, and QNC composing the quantity number section of the relay storage unit and also provides for conditioning the relay storage unit for entering a new quantity number therein. It is noted that the quantity number clear operation now being described is effected at a time in the operation of the apparatus which is before the customer's order number and invoice page number are stored in the manner explained under the previous heading. The relay R3 opens its contacts R3—1 (Fig. 50*m*) and thereby disconnects the positive wire 900 from the previously described wire 945 which forms a part of the hold circuits for all of the storage relays R154 to R165, inclusive, of the three banks QNA, QNB, and QNC and which is also a part of the hold circuit of the column shift control relays R166, R167, and R168 and of the hold circuit of the motor bar control relay R28 and of the hold circuits of all of the sequence control relays R178 to R185, inclusive. Thus, the motor bar control relay R28, all of the relays of the quantity number section, and all of the sequence control relays are dropped out by the opening of the contacts R3—1 in case any of these relays are energized at this time.

R3 also transfers its contacts R3—3 (Fig. 50L) and thereby breaks the hold circuit paths for R33 and R177 and establishes an energizing circuit for the pick up coil of the storage conditioning relay R178. R178 closes its hold contacts R178—4 and thereby establishes an energizing circuit for its hold coil extending across the power conductors 900, 901 and including the normally closed contacts R180—2 of the sequence control relay R180. R178 closes its control contacts R178—1 (Fig. 50*m*) and thereby conditions a digit entering circuit by which the first digit of a number may be entered in the storage unit, as previously explained.

R3 also closes its contacts R3—4 (Fig. 50*m*) and thereby establishes an energizing circuit for the pick up coil of the entry shift control relay R169 which circuit extends across the power conductors 900, 901, as shown. R169 closes its contacts R169—4 and R169—6 and thereby establishes an energizing circuit for the hold coil thereof which includes the normally closed contacts R4—1 of the order number clear relay R4, the wire 943, and a wire 954 shunting the reset relay contacts R27—1. A second hold circuit path for R169 can be traced from the wire 943 through R27—1 and R169—6. It is noted that, if there be an order and page number stored in relays R122 to R153, inclusive, at the time of a quantity number clear operation, such as when column #110 of section B of the tape 15 is read and the code designation therein effects a quantity number clear operation, the closing of R169—4 shunts the contacts R27—1, as previously explained, and from then on the stored order and page number can only be wiped out by energizing R4 which opens its contacts R4—1. The latter takes place as a part of an order number clear operation, as will be presently explained.

As previously explained, the relay R169 functions primarily as a means for selectively routing incoming digit entering impulses from the bail contacts BC and wires 941 and 947 to the order banks QNA, QNB, and QNC composing the quantity number section, and to the order banks CO6 to CO1, inclusive, PN2, and PN1 composing the customer's order and page number sections. With the relay R169 deenergized, its contacts R169—1, R169—2, R169—3, and R169—5 route the entering signals to the order and page number sections. With R169 energized as a part of the quantity number clear operation being described, the contacts R169—1, R169—2, R169—3, and R169—5 are shifted from the positions shown and the entering circuit paths are connected thereby only to the order banks of the quantity number section of the relay storage unit.

As will appear more fully hereinafter in the description of operations when the detail cards are being read, the quantity numbers of the detail items or parts ordered by a customer, are stored and read out as a part of the operations under the control of the detail cards representing such ordered parts or items. Consequently, at this time in the operation, when a heading card is being read, the quantity number clear operation could be considered as being superfluous. The reason for including at this point in the tape 15 a program designation which effects a quantity number clear operation is to insure against faulty operation of the apparatus such as would be caused by the accidental presence of a stored quantity number.

*Order and page number clear*

As will be noted from Fig. 47 and the code chart of the tape code system included hereinabove, column #6 of section B of the program tape 15 contains the 5–6 program designation and the latter represents both a card feed on operation and an order number clear operation. The sensing of this program designation provides for energizing the tape code set up relays R192 and R193 (Fig. 50*c*) and these relays adjust their translator contacts in the program pyramid network of Figs. 50*e* to 50*i*, inclusive, to condition a translator circuit path therethrough in the manner previously described and which terminates in program outlet hub PRH21 (Fig. 50*i*). As shown, the hub PRH21 is connected by a plug connector 955 with the inlet hub which is wired to the negative conductor 901 through the coil of distributor relay R260. The outlet hub of distributing contacts R260—1 is connected to the functional hub FH33 by a plug connector 956 and the latter, as previously stated, is wired to the pick up coil of the card feed on relay R11. The outlet hub of distributing relay contacts R260—2 is connected by a plug connector 957 with the functional hub FH38 which is wired to the negative conductor 901 through the relay R4, the latter being the relay which effects an order number clear operation. Thus, when cam contacts CR3 (Fig. 50*e*) close at 80° of the machine cycle, the previously conditioned translator circuit through the program pyramid and including the coil of distributor relay R260 is closed. R260 then closes its contacts R260—1 and R260—2, and, when the cam contacts CR4 close, circuits are established through the latter contacts from the wire 918, and including the pick up coil of the relay R11 and the coil of R4.

The card feed on relay R11 functions to turn on the card feed in the same manner as described hereinabove under the subheading "Card feed on" and it is therefore believed unnecessary to repeat the description of such operation at this point.

The relay R4 functions to clear out any previously stored order and page numbers in order banks CO6 to CO1, inclusive, PN2 and PN1, and to condition such order banks for receiving a new customer's order number and page number. R4, when thus energized, opens its contacts R4—1 (Fig. 50*m*), and thereby breaks the hold circuits for the storage relays R122 to R153, inclusive, and also breaks the hold circuit for the storage shift control relay R169 and the latter then returns its contacts to their positions shown in the drawings where storage entering impulses from the wire 941 are routed to the order banks for storing the customer's order and invoice page number, as will be apparent from the previous description. The relay R4 transfers its contacts R4—3 (Fig. 50L) and thereby breaks the hold circuit paths including the hold coils of relays R33 and R177 for the same purpose as described hereinabove when the relay contacts R27—4 were transferred as a part of a resetting operation. The closed points of transferred contacts R4—3 establish an energizing circuit for the pick up coil of the storage conditioning relay R178. R178—4 then close and establish an energizing circuit for the hold coil thereof which extends across the main power conductors and includes the normally closed contacts R180—2 of the sequence control relay R180. R178 then transfers its contacts R178—1 (Fig. 50*m*) and thereby conditions a circuit path for entering the first digit of the customer's order number in the highest order bank CO6. From this point in the operation of the apparatus under the control of the heading card HC—1, the customer's order number and page number may be stored. It will be assumed that the operator now stores the customer's order number "123456" in order banks CO6 to CO1, inclusive, and the invoice page number "1" in the order banks PN2 and PN1, as explained hereinabove under the subheading "Storing the customer's order number and invoice page number."

*Typewriter operations*

The operations of the #1 typewriter 300 (Fig. 1) under the control of the heading card HC—1 (Fig. 31) and section B of the program tape 15 (Fig. 47) will now be described.

As stated previously, it will be assumed that the invoice 11—1 shown in Fig. 43 is now being held by the platen of the #1 typewriter 300 in position where the first character "A" of the line identifying the customer's name may be printed. As will be noted, this printing position is the #11 character space position of the first line of printing of the invoice 11—1.

*#1 typewriter on.*—With column #7 of section B of the program tape 15 in sensing position, the #5 code designation therein will be sensed in the same manner as previously described tape sensing operations and a translator circuit path will be conditioned as a result thereof which terminates in the program outlet hub PRH5 (Fig. 50*i*). As shown, the hub PRH5 is connected by a plug connector 959 to the functional hub FH39 and the latter is wired to the negative conductor 901, through the pick up coil of the relay R214. The relay R214 is the functional relay for effecting a #1 typewriter on operation. This conditioned translator circuit path is established at 80° of the machine cycle by the closing of the cam contacts CR3 (Fig. 50*e*) as will be obvious from the previous description.

The relay R214, when thus energized, closes its hold contacts R214—4 (Fig. 50L) and thereby establishes an energizing circuit for its hold coil which extends from the power conductor 900, and includes the normally closed eject cam contacts ECB1 and the normally closed contacts R6—1 of the functional relay R6 for effecting a #1 typewriter off operation. Thus, the #1 typewriter on relay R214 remains energized until the next #1 typewriter off operation when R6 is energized or until the next eject operation when the eject cam contacts ECB1 are open. It is noted that the hold circuit for R214 also energizes a single coil relay R215 which is connected in parallel with the hold coil of R214. Consequently, the contacts of relay R215 as well as the contacts of relay R214 are used herein for performing the function of turning on the #1 typewriter.

The relay R214 closes its contacts R214—1 and R214—2 (Fig. 50*k*) and thereby conditions holding circuits for the carriage-return interlock relay R16 and for the tabulating interlock relay R17. As previously explained, these relays are energized as a result of a carriage-return operation and tabulating operation of the #1 typewriter and the holding circuits, therefor include the contacts of relay R214, as just stated, and also include interlock contacts CRIC and TIC (Figs. 18 and 19) which are operated by control stops CS1 and CS2, respectively, inserted in grooves of the extra rack bar 337 on the back of the #1 typewriter, for a purpose which will be explained hereinbelow under the subheadings "Carriage return" and "Tabulating."

R214 closes its contacts R214—3 (Fig. 50*s*) and thereby connects the #1 translator clutch magnet 462 in a circuit path extending between the conductors 900 and 901 and including the constantly running cam contacts CR1. Thus, as long as the #1 typewriter on relay R214 is energized, the #1 translator clutch magnet 462 wil be energized and deenergized each machine cycle under the control of cam contacts CR1 (see Fig. 49).

The relay R215 (Fig. 50*s*) closes each of its contacts R215—1 to R215—12, inclusive, and thereby connects, respectively, the twelve selector magnets TSM1 to TSM12, inclusive, of the #1 translator 400 to the twelve code wires CW1 to CW12, inclusive. As will be noted, these twelve code wires extend upward along the right-hand side of Figs. 50*s*, 50*r*, 50*q*, and 50*p*, and the timing of circuits through such code wires is under the control of the cam contacts CR2 (Fig. 50*p*).

Thus, with the relays R214 and R215 energized, the #1 typewriter is turned on and any circuits established through the code wires CW1 to CW12, inclusive, will energize corresponding selector magnets of the #1 translator and will thereby effect the selective operation of keys of the #1 typewriter in a manner which will be more apparent as the description proceeds.

Figure 31:
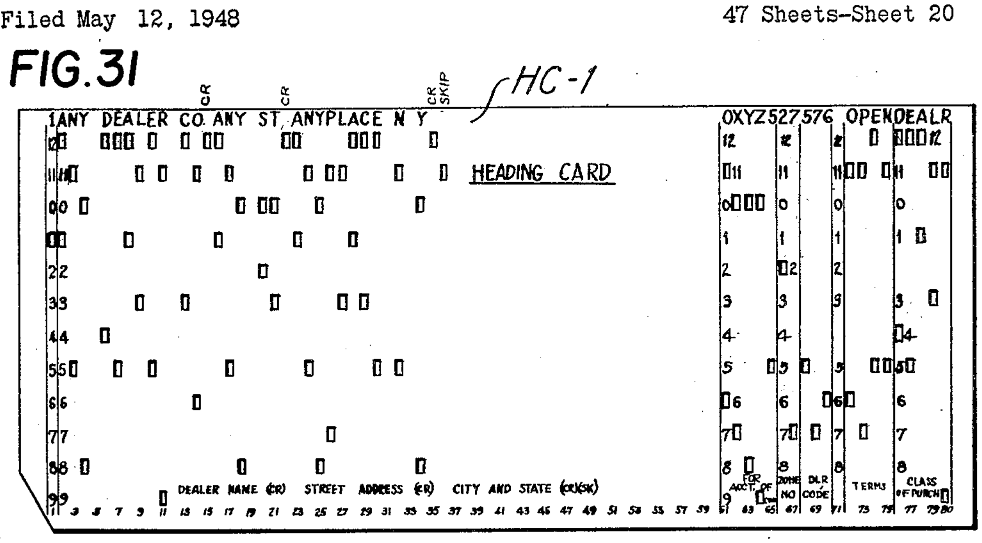
Figure 32:
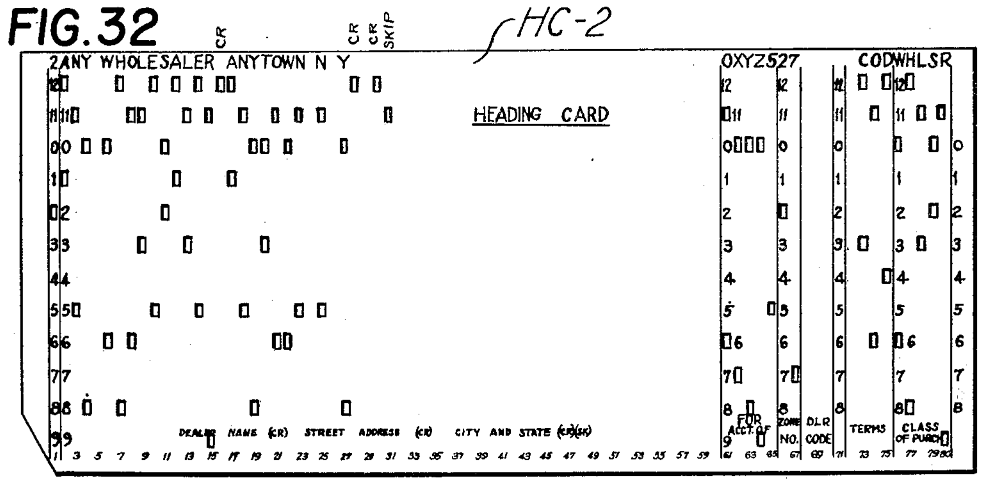
Figure 33:
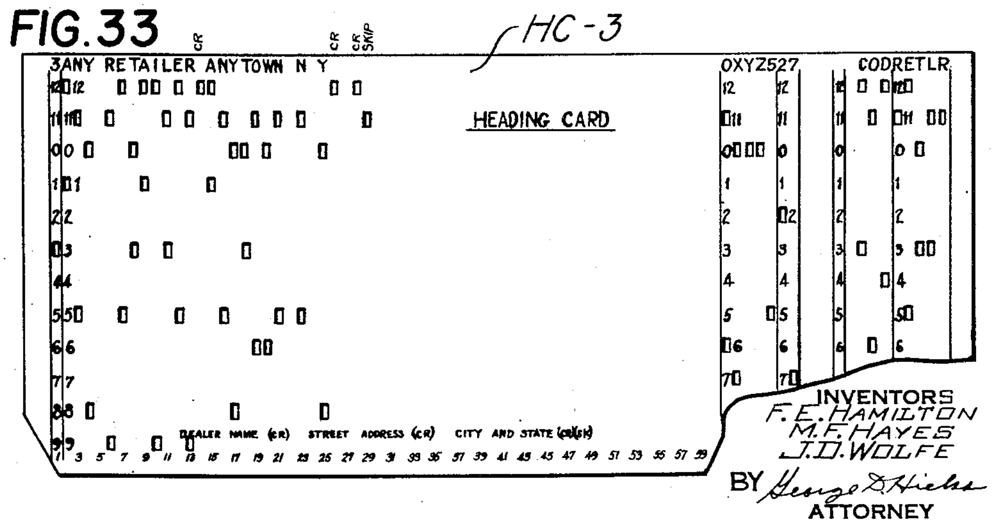
Figure 34:
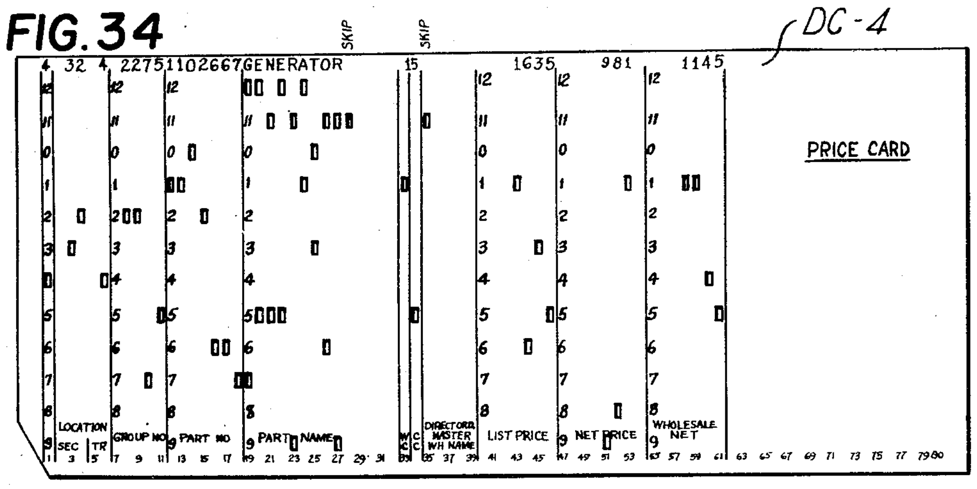
Figure 35:
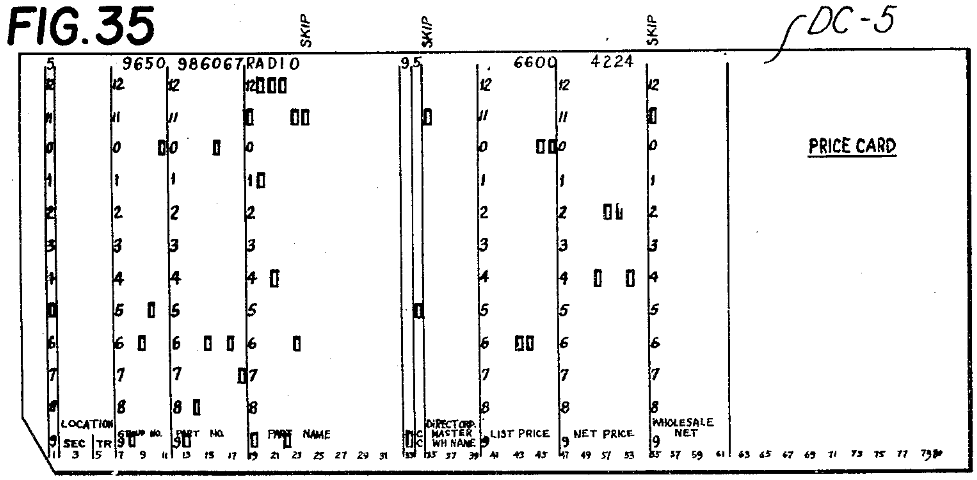
Figure 36:
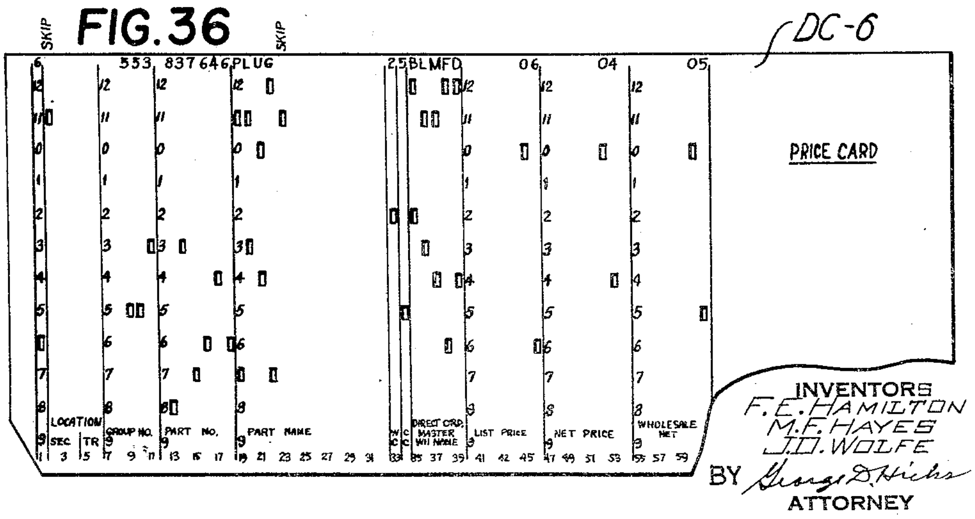
Figure 37:
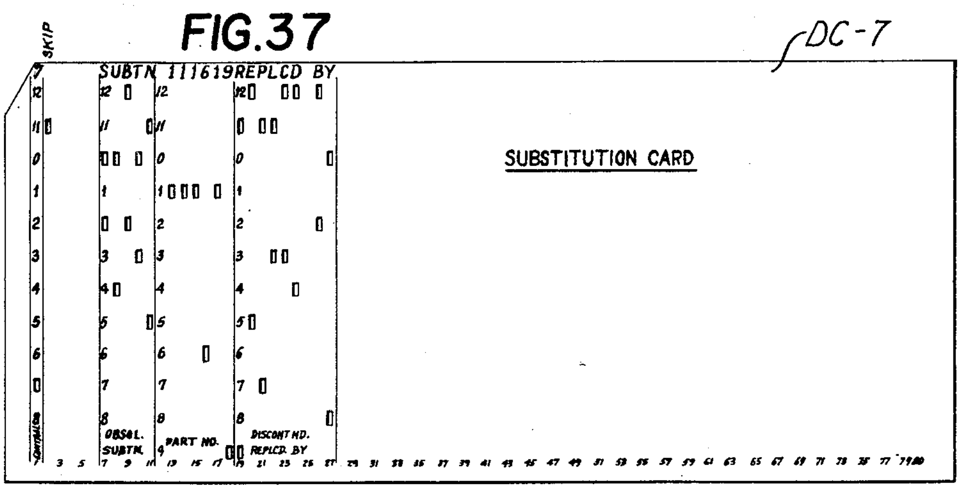
Figure 38:
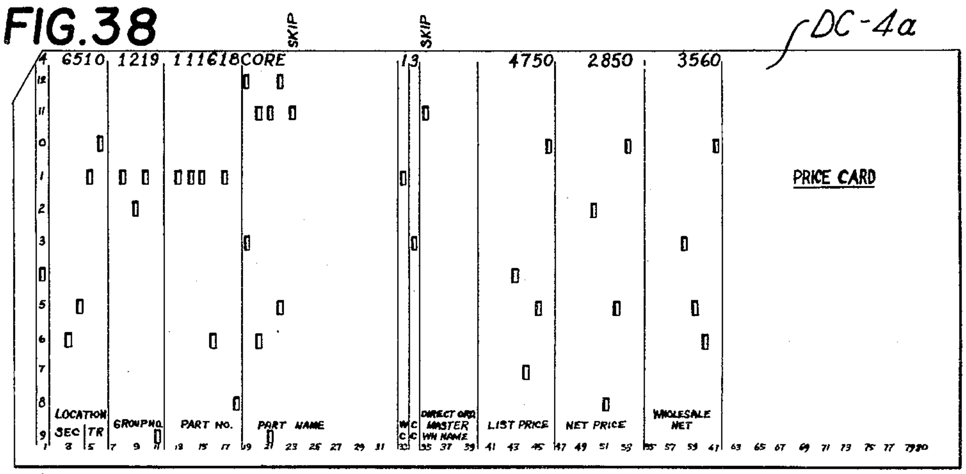
Figure 39:
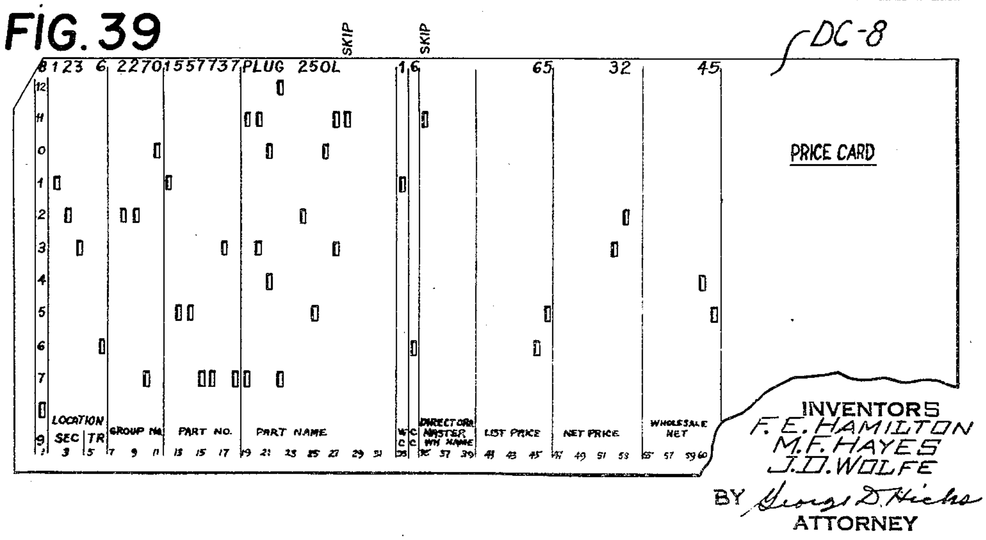
Figure 40:
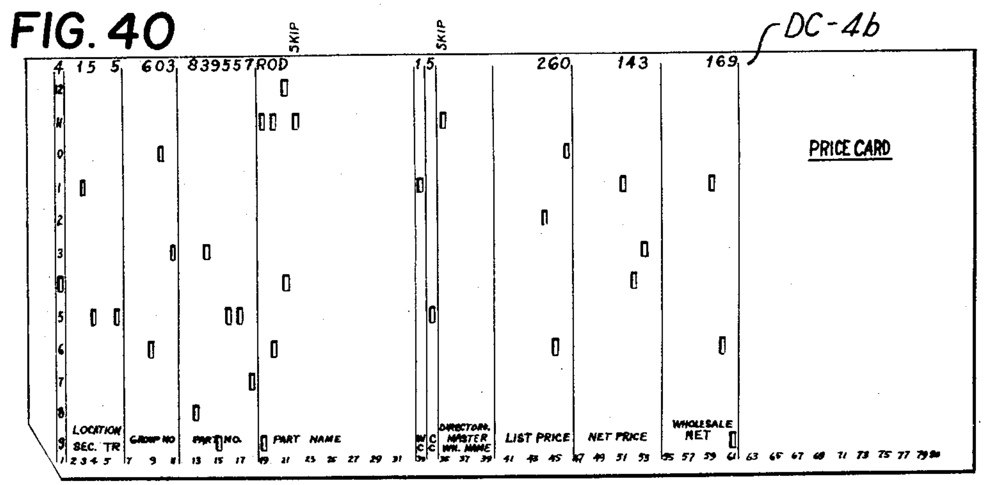
Figure 41:
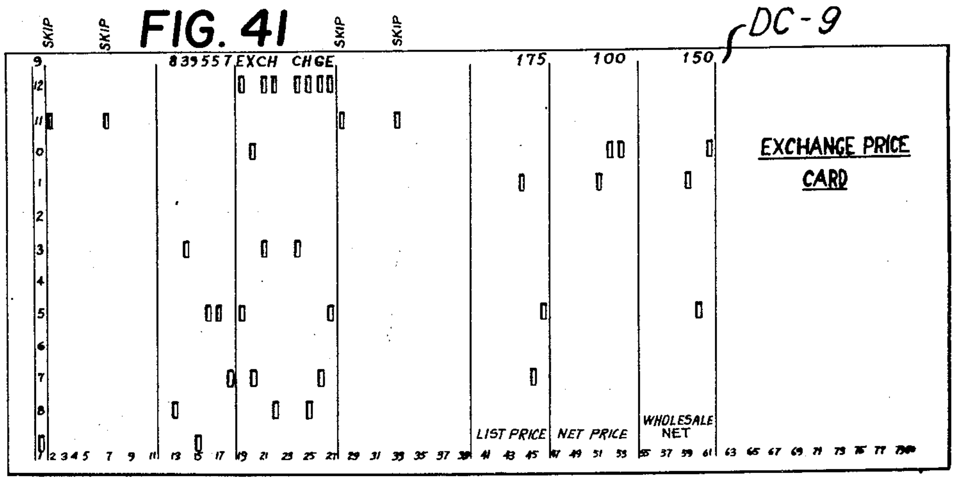

*Normal typing operation.*—As stated above, a card feed on operation was effected as a result of the sensing of the 5–6 code designation in section B of the type 15. As a part of this card feed on operation, the card feed clutch magnet CFM (Fig. 50*c*) was energized and the card feed clutch CFC (Fig. 5) was engaged at the end of the machine cycle in which the card feed on operation was effected; and, in the next machine cycle when the just described #1 typewriter on operation was effected under the control of the code designation in column #7 of the tape 15, the card feed cam contacts CF1 close at 30° of such cycle (Figs. 49 and 50*a*) and thereby establish a sensing circuit through the #2 record column of the card HC—1 (Fig. 31). It will be recalled that the contacts R229—4 of the card lever control relay R229 were previously closed when the relay R229 was energized during the eject operation which fed the card HC—1 into sensing position.

As shown in Fig. 31, the heading card contains a 12—1 designation in its #2 record column and this designation represents the letter character "A." The sensing of this designation closes the sensing contacts SC12 and SC1, respectively, and when the contacts CF1 close, as just explained, sensing circuits will be established through these now closed sensing contacts and including the pick up coils of corresponding card code set up relays R112 and R101. R112 will close its hold contacts R112—12 and R101 will close its contacts R101—6 and thereby establish energizing circuits for their respective holding coils which include the cam contacts CR6. The card code set up relays R112 and R101 will thus close their contacts R112—1 and R101—1 (Fig. 50*p*) and thereby establish circuit paths from the cam contacts CR2 and including the code wires CW12 and CW1, respectively. As shown in Fig. 49, the cam contacts CR2 close at 172° of the machine cycle and these contacts will therefore establish energizing circuits for the #1 translator selector magnets TSM12 and TSM1 through the code wires CW12 and CW1, respectively, and the contacts R112—1 and R101—1 (Fig. 50*p*). These energizing circuit paths for the selector magnets will be established during the same cycle in which the #1 typewriter on relay R215 closes its contacts R215—1 to R215—12, inclusive, and during this same cycle at 170° the cam contacts CR1 (Fig. 50*s*) will establish the energizing circuit for the #1 translator clutch magnet 462 which, as stated, was conditioned by the closing of contacts R214—3 of the #1 typewriter on control relay R214. Consequently, the selector magnets TSM12 and TSM1 will release corresponding permutation bars of the #1 translator 400 in the manner fully described herein previously, and the #1 translator will be operated to pull down the key lever 308 which actuates the type bar for printing the letter character "A." Thus, the latter character will be printed in the #11 character space position of the line in the invoice 11—1 containing the name of the customer, and the #1 typewriter carriage will then space to its next or #12 character space position. From this description, it will be apparent how the customer's name, "Any Dealer Co.," recorded in record column #2 to #18, inclusive, of the card HC—1, is typed on the first line of the invoice.

*Character spacing.*—As a part of the normal typing operations under the control of the record columns of the heading card HC—1 described under the preceding sub-heading, the space key of the #1 typewriter 300 is actuated in response to the sensing of blank record columns, for example, record column #5. This normal character spacing operation of the typewriter carriage is effected in the following manner.

During the machine cycle, when the card feed cam contacts CF1 (Fig. 50*a*) close in an attempt to establish sensing circuits through the blank record column #5, such circuits cannot be established and consequently none of the card code set up relays R101 to R112, inclusive, will become energized, and their contacts R101—4 to R109—4, inclusive, R110—7, R111—7, and R112—7 remain in their normally closed positions shown in Fig. 50*d*. When the card feed cam contacts CF2 close at 90° of the machine cycle, a circuit is established from the positive conductor 900, through the contacts CF2, the normally closed contacts of the card code set up relays just identified, a wire 960, a wire 961, and through the pick up coil of relay R113 (Fig. 50*f*) to the negative conductor 901. The relay R113 is the functional relay for effecting a spacing operation of the typewriter carriage. R113 closes its hold contacts R113—6 (Fig. 50k) and thereby establishes an energizing circuit for the hold coil thereof which extends across the power supply and includes the cam contacts CR9.

The relay R113 also closes its contacts R113—1, R113—2, and R113—3 (Fig. 50p) and thereby connects the cam contacts CR2 to the code wires CW3, CW4 and CW6. Consequently, when CR2 close, energizing circuits are established for selector magnets TSM3, TSM4 and TSM6, respectively, and these selector magnets will adjust the #1 translator 400 in the manner previously explained, so that an operating cycle of the latter will be effected and during such cycle the space bar of the #1 typewriter will be pulled down and the carriage thereof spaced to its next character space position.

*Carriage-return operation.*—When column #15 of the heading card HC—1 is sensed, a carriage return operation of the #1 typewriter will be effected in response to the #12 code designation therein. With the code hole in the #12 index point position of the card column in sensing position, the sensing contacts SC12 (Fig. 50a) are closed, and, when the card feed cam contacts CF1 close, an energizing circuit is established for the pick up coil of card code set up relay R112 and the latter then closes its hold contacts R112—12 and establishes a hold circuit therefor including the cam contacts CR6. Relay R112 then closes its contacts R112—5 and thereby establishes an energizing circuit for the relay R117 (Fig. 50g) which is under the control of CR7 (Fig. 50d) and is traced as follows: from the positive conductor 900, through the cam contacts CR7, the normally closed contacts R18—3, the normally closed contacts R101—3 to R110—3, inclusive, of the corresponding card code set up relays, the normally closed contacts R111—4, the now closed contacts R112—5 which are wired to an outlet function hub FH40 entitled "12 only," a plug connector 962, the inlet hub C of the set of control contacts R45—2 now transferred, the outlet hub T of the latter contacts, a plug connector 963 which extends from the outlet hub T of R45—2 to a function hub FH16 in Fig. 50g, and thence through the pick up coil of the relay R117 to the negative conductor 901.

The card code setup relay R112 also closes its contacts R112—3 (Fig. 50d) and thereby establishes an energizing circuit path for the coil of relay R226 which extends from the normally closed contacts R110—3 and is also controlled by CR7. R226 then opens its contacts R226—1 (Fig. 50s) in the circuit wire CW12. The purpose of R226—1 is to prevent the establishing of an energizing circuit for the selector magnet TSM12 during an operation when the #12 code designation effects a carriage-return operation. As shown in Fig. 50p the contacts R112—1 will also close when R112 is energized and if the contacts R226—1 did not break the wire CW12 a faulty key operation of the #1 typewriter might be effected along with the carriage-return operation.

The relay R117 is the function relay for effecting a carriage return operation. R117 closes its hold contacts R117—4 (Fig. 50a) and thereby establishes an energizing circuit for the hold coil thereof, which is under the control of the cam contacts CR6 and includes the circuit wires 904, 905 and 906. R117 closes its contacts R117—1 and R117—2 (Fig. 50p) and thereby conditions energizing circuits for the selector magnets TSM3 and TSM8 which include the code wires CW3 and CW8 and are under the control of the cam contacts CR2 the same as in previously described typewriter operations.

The energizing of selector magnets TSM3 and TSM8 adjusts the #1 translator 400 so that the carriage return key (Fig. 20) on the #1 typewriter is pulled down and effects a carriage return and line spacing operation thereof in a manner well known to those skilled in this art and described hereinabove under the heading "The #1 typewriter," and, as a result of this operation, the carriage 310 thereby positions the invoice 11—1 in its #11 character space position and in position to print the first line of the customer's address.

When R117 is energized it also closes contacts R117—3 (Fig. 50k) and thereby establishes an energizing circuit for the pick up coil of the carraige return interlock relay R16. R16 then closes contacts R16—1 and thereby establishes an energizing circuit for the hold coil thereof which includes the now closed contacts R214—2 of the #1 typewriter on relay R214 and the normally closed interlock contacts CRIC which, as previously explained, are under the control of a control stop CS1 (Figs. 18 and 19) placed in the #11 character space position of the extra tab rack 337 on the back of the #1 typewriter. Thus, the hold circuit for R16 remains closed until the carriage of the #1 typewriter is returned to its #11 character space position, where the control stop CS1 opens the contacts CRIC and thereby breaks the hold circuit and drops out the relay R16.

When R16 is energized in the manner just explained, it closes its contacts R16—3 (Fig. 50k) and thereby establishes an energizing circuit for the main interlock control relay R14, which then closes its hold contacts R14—2 and provides an energizing circuit for its hold coil under the control of cam contacts CR9. The main interlock control relay R14 provides during the carriage return operation now being described, the same interlock functions as described previously under the sub heading "Main interlock control."

As previously described, the interlock contacts R14—1 (Fig. 50c) open to prevent the establishing of sensing circuits through the program tape and to prevent the pulsing of the tape feed magnet TFM through the now closed tape feed on contacts R218—1. Contacts R14—4 (Fig. 50e) open and prevent the establishing of translator circuit paths through the program pyramid translator of Figs. 50e to 50i, inclusive. Contacts R14—3 (Fig. 50c) transfer to break the energizing circuit for the card feed magnet CFM. Thus, the tape feeding and sensing and card feeding and sensing operations are suspended as long as the interlock relay R24 is held energized. When the carriage return operation is completed and the interlock relay R16 (Fig. 50k) deenergized by the opening of the contacts CRIC in the manner just described, R16 will then open its contacts R16—3 (Fig. 50e) in the energizing circuit for the pick up coil of R14 and when CR9 open at 50° of the machine cycle, the hold coil for R14 is deenergized and the contacts of R14 then return to their position shown and the normal sensing and feeding operations of the program tape and heading card proceed in the manner previously explained.

*Selective control of printing the diagonal line (/).*—It is noted that the previously described energizing circuit for the carriage return control relay R117 and which was established by cam contacts CR7 (Fig. 50d) includes the now transferred set of control contacts R45—2 of the activating relay R45 for the #6 selector. As explained previously under the heading "Card classifying," the #6 selector is activated by the energizing of relay R45 when a heading card, such as HC—1, is classified. When detail cards are classified, the #6 selector is not activated and the contacts R45—2 remain in their normal position shown. It is noted that the normal outlet hub N of the contacts R45—2 is connected by a plug connector 964 to the function hub FH3 which is wired to the negative conductor 901 through the coil of relay R114 which performs the function of operating the key of the #1 typewriter for printing the diagonal line "/" (Fig. 20). Thus, when detail cards are read, and a record column containing a single code hole in the #12 index point position thereof is sensed, the control relay R114 is energized by the circuit just explained, and R114 closes its contacts R114—1, R114—2, and R114—3 (Fig. 50p), to energize the translator selector magnets TSM4, TSM8, and TSM11, respectively, through the code wires CW4, CW8, and CW11, and under the control of cam contacts CR2. The #1 translator 400 then operates to pull down the key for printing the diagonal line in the same manner as previously described.

From the preceding description of the operation of the #1 typewriter under the control of columns #2 to #15, inclusive, of the heading card HC—1, it will be apparent that the remaining columns #16 to #35, inclusive, of the card HC—1, which contain the name and address of the dealer customer, effect the typing of the data recorded therein in the second and third lines of the invoice 11—1, as shown in Fig. 43. In column #35, the carriage 310 is returned again and line spaced. The code designation in column #36 thereof is then read and such designation effects a skipping operation of the card HC—1 and tape 15 in a manner which will be explained in detail in the description under the following heading.

*Card and tape skipping operations*

Under this heading there will be described the manner in which the cards and program tape are skipped together and the manner in which the program tape is skipped by itself. It is noted that each time the card is skipped the program tape must also be skipped so that the skipping operations can be stopped. As explained, all skip off controls are in the section C of the tape 15 and consequently the tape must be moving in order to stop the skipping of the card as well as the skipping of the tape. However, the program tape may be skipped by itself, if desired. It is also noted that in skip off operations, the skipping of the card may be stopped without stopping the skipping of the tape; but, when the skipping of the tape is stopped, the card skipping operation must also be stopped.

Simultaneous skipping of the card and tape is effected herein by energizing the card skip on relay R222 (Fig. 50f) and R222 can be energized in response to the sensing of a significant designation in a record card and also in response to the sensing of a significant designation in the tape 15. A skipping operation of the program tape alone, is effected by the energizing of relay R221 (Fig. 50e) and the latter is energized in the illustrated embodiment by a designation in the tape 15.

In the particular example being described, skipping operations of the card and the tape are simultaneously effected in response to the sensing of the code hole in the #11 index point position of column #36 of the card HC—1. At this time, the program tape is in its #41 column sensing position. In this operation, card columns #37 to #60, inclusive, and tape columns #42 to #64, inclusive, will be skipped and the skipping operations will be stopped in response to the sensing of a skip off designation in section C column #65 of the tape and the card will stop in its column #61 sensing position and the tape in its column #66 sensing position.

*Skipping initiated by heading card.*—The sensing of the single code hole in the column #36, located in the #11 index point position thereof, provides for closing the sensing contacts SC11 (Fig. 50a) and thereby establishing, when CF1 close, an energizing circuit for the card code set up relay R111. R111 closes its hold contacts R111—12 and thereby establishes an energizing circuit for its hold coil under the control of cam contacts CR6. R111 transfers its contacts R111—4 (Fig. 50d) and thereby provides an energizing circuit for the card skip on control relay R222 (Fig. 50f) which circuit is traced as follows: from the positive conductor 900, through the cam contacts CR7 (Fig. 50d), the normally closed contacts R18—3 of the relay R18 which effects the card classifying operation as described, the normally closed contacts R101—3 to R110—3 of the corresponding card code set up relays, the now transferred points of R111—4, contacts R112—4 in the position shown, the outlet function hub FH39 entitled "11 only," a plug connector 966, the inlet hub C of the set of control contacts R45—1 of the activating relay R45 for selector #6, the contacts R45—1 being now transferred as selector #6 was energized as a part of the classifying of heading card HC—1, the outlet hub T of R45—1, a plug connector 967 connecting the hub T with the function hub FH11 (Fig. 50f) and from the latter through the pick up coil of the card skip on relay R222 to the negative conductor 901. It is noted that a branch parallel circuit extends from the normally closed contacts R110—3 (Fig. 50d) through now closed contacts R11—3 of the card code set up relay R111 and through a wire 968 and the coil of relay R225 to the negative conductor 901. These circuits just traced are established by the closing of cam contacts CR7 at 90° of the machine cycle. The relay R222 closes its hold contacts R222—4 (Fig. 50k) and thereby establishes an energizing circuit for the hold coil thereof through the cam contacts CR9.

The relay R225, which is also energized by CR7 and the circuit just traced, opens its contacts R225—1 (Fig. 50s) and thereby breaks the code wire CW11 which, as stated, is normally connected to the translator selector magnet TSM11. The card code set up relay R111, which was energized by the sensing of the #11 hole in column #36 of the card, also closes its contacts R111—1 (Fig. 50p) and thereby connects the code wire CW11 for control by the cam contacts CR2. The circuit through the code wire is broken, however, by the now open contacts R225—1. It is therefore apparent that the relay R225 is energized for the purpose of preventing a pulse to the selector magnet TSM11 and a resulting unwanted operation of the typewriter in an operation where the #11 code hole is used to effect skipping of the card and tape.

The relay R222 is the function relay for effecting a card and tape skipping operation. As shown in Fig. 50c, R222 closes its control contacts R222—1 and R222—2 and thereby establishes energizing circuits for both the pick up coils of card skip control relay R9 and tape skip control relay R10, respectively. R9 closes its hold contacts R9—1 and thereby establishes an energizing circuit for its hold coil extending across the power line and including the normally closed contacts R262—1 of the program skip off control relay R262, and the normally closed contacts R261—1 of the card skip off control relay R261. The program skip control relay R10 closes its hold contacts R10—2 and thereby establishes an energizing circuit for its hold coil which extends across the power line and includes the normally closed contacts R262—2 of the program control skip off relay R262. R222 opens its contacts R222—3 (Fig. 50L) in the hold circuit for the card feed on relay R11, and the latter then opens its contacts R11—3 (Fig. 50c) in the energizing circuit for the card feed magnet CFM and thereby turns off the card feed as a part of a skipping operation. The program skip control relay R10 closes its contacts R10—3 (Fig. 50k) and thereby establishes an energizing circuit for the pick up coil of the main interlock control relay R14 which adjusts its contacts to prevent normal tape sensing and card sensing operations during the skipping operation being described, in a manner which will be apparent from the previous description under the heading "Main interlock control" and consequently need not be repeated at this point. It is noted, however, that when R14—3 (Fig. 50c) transfer, the closed points thereof condition through the wire 903 the holding circuit for the program skip off control relays R262, R26, and R8 and that such circuit is established during the skip off operation to be presently described.

The relay R14 closes its hold contacts R14—2 (Fig. 50k) as previously described and thereby establishes a hold circuit including the cam contacts CR9.

The skip control relay R10 also closes its contacts R10—1 (Fig. 50k) and thereby establishes an energizing circuit for the tape sensing interlock relay R187 and the latter then opens its contacts R187—1 to R187—6, inclusive (Fig. 50c) and thereby breaks the previously described normal tape sensing circuit paths from the sensing brushes and including, respectively, the tape code set up relays R188 to R193, inclusive. The relay R187 also closes its contacts R187—7 to R187—10, inclusive, and thereby connects, respectively, the four sensing brushes BC1 to BC4, inclusive, to the coils of skip off set up relays R197 to R200, inclusive, so that during the skipping operation, the brushes BC1 to BC4 will sense the code designations in section C of the tape and operate the relays R187 to R200, inclusive, in accordance with the designations sensed therewith. The relay R187 also transfers its contacts R187—11 (Fig. 50c) and thereby connects the common brush 863 which is in contact with the tape feed roll 102, to the positive conductor 900 through the circuit breaker contacts CB. The transferred contacts R187—11 also break the previously described normal sensing circuits of the tape which are under control of the cam contacts CR5.

The tape skip control relay R10 transfers its contacts R10—4 (Fig. 50c) and thereby breaks the normal pulsing circuit for the tape feed magnet TFM which includes the tape on relay contacts R218—1 and is under the control of CR5, and the contacts R10—4 in transferred position establish an energizing circuit for the tape feed magnet TFM extending across the power conductors 900, 901 and including the normally closed contacts R26—1 of the program skip off control relay R26 (Fig. 50b). Simultaneously with the establishing of the energizing circuit for the tape feed magnet TFM by R10—4, the contacts R9—4 of the card skip control relay R9 close to establish an energizing circuit for the card skip magnet CSKM which extends across the main power conductors 900, 901 and includes the normally closed contacts R8—1 of the program skip off control relay R8 and the normally closed contacts R7—1 of the card skip off control relay R7. Thus, as long as R9 and R10 remain energized, the tape feed magnet TFM and the card skip magnet CSKM are held energized. As explained herein previously, the energizing of the card skip magnet CSKM provides for energizing the card skip clutch CSKC (Fig. 4b) and the energizing of the tape feed magnet TFM provides for the energizing of the tape feed clutch TFC. The card skip clutch provides for feeding the card at the skipping rate of four record columns for each machine cycle and the tape feed clutch, when held engaged, through a machine cycle, provides for feeding the tape 15 at the same skipping rate of four record columns for each cycle.

Summarizing the foregoing, it is noted that the skipping operation described was initiated by the sensing of a #11 hole in the heading card HC—1. The card skip on control relay R222 (Fig. 50f) was energized and its contacts energized relays R9 and R10 (Fig. 50c) and the contacts of the latter energized both the tape feed magnet TFM and the card skip magnet CSKM, respectively, and the latter operated their related clutches to start the skipping operations of both tape and card. The interlock relay R14 is energized to prevent normal tape sensing and spacing and normal card sensing and spacing and to condition hold circuits for skip off operations. The relay R187 is energized to disconnect the tape code set up relays R188 to R193 (Fig. 50c) from the normal tape sensing brushes and to connect the skip off set up relays R197 to R200, inclusive, to their related skip off sensing brushes BC1 to BC4, inclusive. The contacts R187—11 transfer to place the skip off sensing operations under the timing control of the circuit breaker contacts CB. Both the tape and card are now moving at the skipping rate.

*Skip-off of card and tape when skipping is initiated by heading card.*—The card and tape continue to move at the skipping rate until the skip off designation in column #65 of section C of the tape moves into sensing position. It is noted that this column contains a code hole in the #1 index point position thereof and because the card in the passage 154 (Fig. 4b) is a heading card, the skipping operation is stopped in response to the sensing of this designation.

The contacts of the skip off set up relays R197 to R200, inclusive, are interconnected in a skip off pyramid network (Fig. 50b) and condition skip off translator circuit paths therethrough according to the designations sensed and these skip off circuit paths extend from the positive conductor 900 and terminate, respectively, in skip off outlet hubs. In the illustrated embodiment, only five of the possible fifteen skip off combinations are used and consequently only five skip off translator circuit paths will be described and they terminate in the skip off hubs designated, respectively, in Fig. 50*b* as SKH1 to SKH5, inclusive.

One of the skip off translator circuit paths is conditioned by the sensing of a 1–2 skip off designation recorded only in the #1 column of the tape 15 and is used to stop skipping of the tape at its #2 column sensing position. As will later appear, this stopping of the tape at the #2 column sensing position is incident to a homing operation which takes place as a part of the ejecting of a card from the passage 154 (Fig. 4*b*) under the control of a designation in the tape or as a result of the manual actuation of the eject key EJK (Fig. 50*e*). The 1–2 skip off designation conditions a translator circuit path through the pyramid of Fig. 50*b* terminating in the skip outlet hub SKH 5 (Fig. 50*b*) and this circuit path is completed only when the homing control relay R223 is energized and closes contacts R223—1. As will later appear, the relay R223 is energized when either of the eject operations just mentioned is effected.

Of the four remaining skip off designations used in the illustrated embodiment, only one of the translator circuit paths conditioned as a result of the sensing of these four designations can be completed while a heading card is in the passage 154 (Fig. 4*b*). This is because of the previously described classifying operation of the heading cards. As will be noted from an examination of Fig. 50*b*, the sets of control contacts R55—1, R55—2, and R55—3 of the activating relay R55 for the selector #11 are connected, respectively, by plug connectors 969, 970, and 971 to the skip off outlet hubs SKH1, SKH2, and SKH3, and the set of control contacts R63—1 of the activating relay R63 for selector #15 is connected by a plug conductor 972 with the outlet hub SKH4. As previously explained, the selector #11 is activated when a heading card has been sensed. Consequently, with the heading card HC—1 in the passage 154, the activating relay R55 for selector #11 is now energized and its contacts R55—1, R55—2, and R55—3 are in their transferred positions. As also explained previously, when either of the detail cards DC—4, DC—5, or DC—8 is classified, the selector #15 is activated. Consequently, the activating relay R63 for selector #15 is not now energized as a heading card is in the passage 154 and the contacts R63—1 thereof are in their normal position shown in Fig. 50*b*. From this it is apparent that a skip off translator circuit path can only be completed from the outlet hub SKH1 in the operation being described. The sensing of a single hole in index point position #1 of the tape energizes the set up relay R197 (Fig. 50*c*) and with the contacts of R197 (Fig. 50*b*) transferred and with the contacts of the remaining set up relays staying in their position shown, a circuit path from the positive conductor 900 is thereby conditioned and this circuit path terminates in the hub SKH1. As shown, the circuit path extends from the outlet hub SKH1, through the plug connector 969, the contacts R55—1 in their transferred position, a plug connector 973, function hub FH1, the closed points of contacts R223—1 in their normal position shown, and through the coils of program skip off control relays R8, R26, and R262 in parallel to the negative conductor 901.

As explained above, the skipping operation was initiated by a code designation in column #36 of the card HC—1 and at this time the tape 15 was in its column #40 sensing position. From an examination of the tape 15 in Fig. 47, it is noted that during the skipping movement of the tape, the skip off sensing brushes BC1 to BC4, inclusive, will sense a #3 skip off designation in column #43, a #2 skip off designation in column #53, and a #1 skip off designation in column #65. For the reasons just explained, neither the #3 nor the #2 skip off designations can complete a skip off control circuit from the pyramid of Fig. 50*b*, but when the #1 skip off designation is sensed in column #65 of the tape, the skip off control circuit including the hub SKH1, and just traced, is completed and the relays R8, R26, and R262, are energized thereby.

The relay R262 (Fig. 50*b*) closes its hold contacts R262—4 and thereby establishes a hold circuit for the coils of relay R8, R26, and R262 which includes the wire 903, and the now transferred points of contacts R14—3 (Fig. 50*c*) of the interlock relay R14. The relay R26 then opens its contacts R26—1 and deenergizes the tape feed magnet TFM. The relay R8 opens its contacts R8—1 and deenergizes the card skip magnet CSKM. With the magnets TFM and CSKM thus deenergized, they disengage the tape feed clutch TFC and the card skip clutch CSKC in the manner previously described. R262 also opens its contacts R262—1 in the hold circuit for the card skip control relay R9 and opens its contacts R260—2 in the hold circuit for the tape skip control relay R10. R9 will then open its contacts R9—4 to prevent the reestablishing of the energizing circuit for the card skip magnet CSKM. R10—4 (Fig. 50*c*) return to their position shown and thereby provide again the normal pulsing circuit path for the tape feed magnet TFM under the control of the tape feed on relay contacts R218—1. R10 opens its contacts R10—1 (Fig. 50*k*) and thereby drops out the relay R187. R187 then returns its contacts R187—7 to R187—10, inclusive, to their normal open position shown in Fig. 50*c*, and thereby breaks the skip off sensing circuit paths which include the relays R197 to R200, inclusive, as previously explained. R187 recloses its normally closed contacts R187—1 to R187—6, inclusive, and thereby reestablishes the sensing circuit paths for the normal tape code set up relays R188 to R193, inclusive. R187 also returns its contacts R187—11 to the position shown and thereby provides again the normal tape sensing circuit path for control under the cam contacts CR5 when R14—1 reclose and R187—11 also break the skip off sensing circuit path through the circuit breaker contacts CB. R10 opens its contacts R10—3 (Fig. 50*k*) and thereby breaks the energizing circuit path for the pick up coil of the main interlock control relay R14. In the next machine cycle, the cam contacts CR9 open at 50° thereof and then drop out the hold coil of the interlock relay R14 and the latter then returns its interlock control contacts to their normal position shown in the drawings. R14—1 (Fig. 50*c*) reestablish the normal tape sensing and pulsing circuit under the control of CR5. R14—4 (Fig. 50*e*) reclose to connect the cam contacts CR3 with the program pyramid network of Figs. 50*e* to 50*i*, inclusive. R14—3 return to their position shown in Fig. 50*c* and thereby break the hold circuits for the program skip off control relays R8, R26, and R262 and recondition an energizing circuit for the card feed magnet CFM. It is noted that when the skipping operation was initiated under the control of the relay R222, the latter opened its contacts R222—3 (Fig. 50L) and thereby dropped out the card feed on control relay R11. Therefore, at the termination of the skipping operation, the contacts R11—3 (Fig. 50c) remain open and it will be necessary to again energize the relay R11 before normal card feeding and sensing operations can be resumed.

*Skipping initiated by a detail card.*—All card and tape skipping operations which are effected in response to the sensing of a skip designation in the detail card are also accompanied by a tabulating operation of one of the typewriters. The code designation for effecting these skipping operations is a code hole in the #11 index point position of a card column, the same as in the heading cards. The sensing of such a designation will energize the card code set up relay R111 (Fig. 50a) in the same manner as described above. R111 will transfer its contacts R111—3 and R111—4 in Fig. 50d. It is noted that when a detail card is classified, the control contacts R45—1 of the activating relay R45 for selector #6 remain in their normal position shown in Fig. 50d because selector #6 is only activated as a part of a classifying operation for a heading card. With R45—1 in the position shown, the circuit established by the closing of cam contacts CR7 and including the transferred points of R111—4 now includes the normal outlet hub N of the contacts R45—1 and from the hub N the circuit extends through a plug connector 974 to the inlet hub for the coil of distributor relay R241 (Fig. 50f) and extends from such coil to the negative conductor 901. Thus, upon sensing a #11 code hole in a detail card, the distributor relay R241 is energized and closes its distributing relay contacts R241—1 and R241—2. A plug connector 976 extends from the outlet hub of distributing contacts R241—1 to the function hub FH17 (Fig. 50g) which is wired to the negative conductor 901 through the pick up coil of relay R115 which performs the function of pulling down the tabulating key 314 (Fig. 2) and thereby effecting a tabulating operation of the typewriter. The circuits for effecting a typewriter tabulating operation will be described hereinafter under the sub heading "Tabulating the typewriter." The outlet hub of distributing contacts R241—2 (Fig. 50f) is connected by a plug connector 977 to function hub FH11 and the latter is wired to the negative conductor 901 through the pick up coil of the relay R222 which, as before explained, effects a card and tape skipping operation. Thus, when cam contacts CR4 (Fig. 50e) close, the circuits extending through the contacts R241—1 and R241—2 are completed from the wire 918 and as a result the pick up coils of the tabulating control relay R115 and the skipping control relay R222 are both energized. The relay R222 will then effect a skipping operation of both the program tape and the card in the passage 154 (Fig. 4b) in identically the same manner as described hereinabove under the sub heading "Skipping initiated by heading card." As stated, the typewriter tabulating operation will be explained hereinafter.

*Skip off of card and tape when skipping is initiated by detail card.*—As shown in Fig. 50b, a plug connector 977 connects the normal outlet hub N of the contacts R55—3 with the function hub FH1 and a plug connector 978 connects the transferred outlet hub T of contacts R63—1 with the function hub FH1. The contacts R55—3 of the activating relay R55 for selector #11 are in the position shown in the drawings when any of the detail cards are in the passage 154 because, as explained before, the selector #11 is only initiated when a heading card is classified. The relay R63 is the activating relay for selector #15 and the latter is activated only by the classifying of either of the detail cards DC—4, DC—5, or DC—8. Thus, when a skipping operation is initiated, under the control of a detail card, the sensing of a code hole in the #3 index point position of section C of the tape will provide a skip off translator circuit path through the pyramid of Fig. 50b and terminating in the outlet hub SKH3 and this circuit path will be completed through the contacts R55—3 in their normal position shown and through the coils of the program skip off relays R8, R26, and R262, and under such conditions, these relays will terminate the skipping of the card and tape in identically the same manner as described above under the sub heading "Skip off of card and tape when skipping is initiated by heading card." Likewise, when a skipping operation is initiated by a #11 code designation in a column of a detail card DC—4, DC—5, or DC—8, the sensing of a code hole in the #4 index point position of section C of the program tape, will provide a skip off translator circuit path through the pyramid of Fig. 50b and terminating in the outlet hub SKH4 and this circuit path will be completed through the transferred points of relay R63—1 and will also include the coils of the program skip off control relays R8, R26, and R262 and, under such conditions, the latter relays will then effect the termination of the skipping operation in the same manner, as previously described.

*Differential skip off of card and tape.*—One of the novel features of the present invention is the provision herein of means for differentially stopping the skipping operations of the card and tape. This means is effective when it is desired that the area of the tape to be skipped comprises a greater number of record columns than the area of the card to be skipped. An example of this is when the columns #35 to #39, inclusive, of detail cards DC—4, DC—5, and DC—8 are skipped as a result of the sensing of a #11 or skip designation in column #35 thereof. This same record field, columns #35 to #39, inclusive, in the card DC—6 contains data indicating the main warehouse from which a customer is to reorder a part, the part ordered not being in stock at the warehouse where the invoice is being prepared, and consequently when this card DC—6 is read, the columns #35 to #39, inclusive, thereof are not skipped, but are read and the designations therein control the typing on the invoice of the recorded data. While the card columns #35 to #39, inclusive, of DC—6 are being read, column-by-column, and the typing operations are taking place, corresponding program tape columns #63 to #67, section A, are also being read. In the machine cycle, when card column #39 of DC—6 is read, tape column #67, section A, provides for turning off the card feed. This function is effected at the end of the cycle as previously explained. Columns #68 and #69 of the tape, section A, are then read; and, in response to the program designations therein, a carriage return operation is effected and then an eject operation is effected, whereby the typewriter carriage is returned to print the next line and the card DC—6 is ejected from the passage 154 (Fig. 4b). It will therefore be apparent that this carriage-return operation and eject operation only apply when a card DC—6 is read. Therefore, when the cards DC—4, DC—5, and DC—8 are read and the simultaneous skipping of the card and tape, initiated by the skip code in card column #35, is effected, the skipping of the card is stopped by the skip off designation in column #67 of section C of the tape and the skipping of the tape is stopped by the skip off designation in column #69 of section C of the tape. Thus, seven columns of the tape and five columns of the card will be skipped. The card will then be in position to have its column #40 read and the tape will be in position to have its column #70 of section A read.

It will be apparent that when column #35 of either card DC—4, DC—5, or DC—8, is read, the skip code recorded therein will energize the card skip on relay R222 (Fig. 50*f*) and this energized relay will effect a simultaneous skipping operation of the card and of the tape, in exactly the same manner as previously described. The #1 skip off designation in section C, column #65 will not be effective during this skipping operation because, as described hereinabove, such a skip off designation is only effective when a heading card is in the passage 154 (Fig. 4*b*). When the code hole in the #2 index point position of section C of column #67 of the tape is sensed, it provides for the energizing of the skip off set up relay R198 (Fig. 50*c*) and the latter then adjusts its contacts from the position shown in Fig. 50*b* and thereby provides a skip off translator circuit through the skip off pyramid network which includes the skip off outlet hub SKH2, and the circuit extends from the latter hub through the connector 970, the contacts R55—2 in their normal position shown, a plug connector 989, connecting the outlet hub N with a function hub FH2, and from the latter through the coils of card skip off control relays R7 and R261, in parallel, to the negative conductor 901.

The relays R7 and R261 are thus energized by the sensing of the #2 skip off designation and R261 closes its hold contacts R261—4 and thereby establishes a hold circuit for R7 and R261 through the wire 903, and the now transferred points of interlock contacts R14—3. R7 opens its contacts R7—1 (Fig. 50*c*) and thereby deenergizes the card skip magnet CSKM which disengages the clutch CSKC and stops the card in the manner previously explained, and in position ready to have its column #40 read. R261 opens its contacts R261—1 and thereby breaks the hold circuit for the card skip on control relay R9. R9 then opens its hold contacts R9—1 and also opens its contacts R9—4 in the energizing circuit for the card skip magnet CSKM so as to prevent the reenergizing of this magnet when the relay R7 is dropped out at the end of the skipping operation by the contacts R14—3. Thus, the skipping of the card is stopped, but the tape continues to move at the skipping speed.

When the code hole in the #4 index point position of section C of column #69 of the tape is read, a skip off translator circuit is established through the network of Fig. 50*b* and includes the outlet hub SKH4. This circuit now extends from the latter hub through the plug connector 972 and through the control contacts R63—1 which are now transferred as one of the cards of the group DC—4, DC—5, or DC—8 is in the passage 154 (Fig. 4*b*); and the circuit extends from the control outlet hub T of the transferred contacts R63—1 through the plug connector 978, the function hub FH1, the contacts R223—1 in the position shown, and the coils of relays R8, R26, and R262, to the negative conductor 901. The relays R8, R26, and R262 then shift their contacts in the same manner as previously explained, and thereby provide for dropping out the tape feed magnet TFM, the tape skip control magnet R10 and the pick up coil of interlock relay R14. R262—2 breaks the hold circuit for R10. R26—1 breaks the energizing circuit for the magnet TFM. R10—1 (Fig. 50*k*) breaks the circuit for relay R187 and R10—3 breaks the pick up circuit for interlock relay R14. R10 transfers its contacts R10—4 (Fig. 50*c*) to recondition the normal tape pulsing circuit through the tape on relay contacts R218—1. The relay R187 then returns its contacts to the position shown in Fig. 50*c* and the relay R14 returns its contacts to the position shown in the drawings and so that the normal tape sensing circuit under the control of CR5 and the normal tape pulsing circuit also under the control of CR5 and the contacts R218—1, are again established. As in previously described skipping operations, the circuit to the card feed clutch magnet CFM is now broken by the open contacts R11—3 which were open at the beginning of the skipping operation. Thus, the program tape is stopped in a position to read its column #70 of section A thereof, and normal operations under the control of the tape and card are then resumed.

*Skipping of the program tape only.*—As explained previously, provision is made in the illustrated embodiment for skipping the program tape 15 without skipping the card. This operation is effected under the control of the relay R221 (Fig. 50*e*). As shown, the pick up coil of R221 is included in the circuit path extending from function hub FH5 to the negative conductor 901, and the pick up coil is also connected by a wire 981 with the contacts R220—1 of the eject control relay R220. In the selected example being described herein, no plug connection is made between the function hub FH5 and any of the program outlet hubs of the pyramid network of Figs. 50*e* to 50*i*, inclusive. Consequently, the program skip on relay R221 is not energized in response to the sensing of a significant designation in the program tape. It will be appreciated, however, that a significant program code designation may be assigned for performing this function alone, or in combination with performing other functions, and in such case proper plug connections would be made to hub FH5 so as to energize the relay R221 in response to the sensing of any such assigned designation or designations.

In the illustrated embodiment, the program skipping operation, effected by the energizing of R221, is initiated as a part of an eject operation when such eject operation is initiated by the energizing of the eject control relay R220 (Fig. 50*e*). Provision is made for energizing this relay by manually depressing the eject key EJK and also by pyramid translator circuit paths connected by plug connectors to the function hub FH4. As an example of the latter, the plug connector 982 connects the function hub FH4 with the pyramid outlet hub PRH22. The sensing of a 1-2-3 designation in either section A or section B of the tape 15 provides for conditioning a corresponding translator circuit path through the pyramid network of Figs. 50*e* to 50*i*, inclusive, in the same manner as explained previously in describing other normal tape sensing operations, and such conditioned circuit path includes the hub PRH22, the connector 982, hub FH4, and the pick up coil of R220. Thus, when the 1-2-3 code designation in the tap is sensed, and when cam contacts CR3 close, the pick up coil of relay R220 is energized.

The eject contacts EJK (Fig. 50*e*) are connected at one side thereof by a wire 983 to a wire 984 which connects the contacts CR3 with the normally closed interlock control contacts R14—4, and the eject contacts EJK are connected at their other side by a wire 985 with the circuit wire connecting hub FH4 with R223. Thus, when the key EJK is depressed, and when cam contacts CR3 close, the eject relay R220 is also energized.

R220 then closes its hold contacts R220—6 (Fig. 50*k*) and thereby establishes an energizing circuit for the hold coil thereof which extends through the cam contacts CR9. R220 closes its contacts R220—1 (Fig. 50*e*) and thereby establishes an energizing circuit for the pick up coil for the program skip on relay R221, which energizing circuit may include either the eject key EJK or the translator circuit path just traced for energizing R220. R220 closes its contacts R220—5 (Fig. 50*e*) and thereby energizes through a circuit wire 986, the pick up coil of a punch off control relay R228 (Fig. 50*f*). R220 closes its contacts R220—2 (Fig. 50*k*) and thereby establishes an energizing circuit extending across the power supply and including the pick up coil to the eject control relay R13. The relay R13 then closes its hold contacts R13—4 to establish a hold circuit therefor through the eject cam contacts ECB2 and closes its control contacts R13—4 (Fig. 50*c*) and thereby establishes an energizing circuit for the eject clutch magnet EJM.

From this it is apparent that the relay R13 provides an eject operation during which the card in passage 154 (Fig. 4*b*) is ejected and the rearmost card in the hopper 104 is fed downward into the passage 154 to its column #1 sensing position. This eject operation is effected in the same manner as that described hereinabove under the heading "Initial eject and card feeding operation," when the relay R13 (Fig. 50*k*) was energized by the closing of the hopper contacts HC. Consequently, to repeat the details of this operation at this point is believed to be unnecessary.

The relay R220 also closes its contacts R220—4 (Fig. 50*c*) and thereby establishes an energizing circuit for the pick up coil of the homing control relay R223. R223 then closes its hold contacts R223—4 and provides an energizing circuit for its hold coil which is established when the interlock contacts R14—3 transfer as a part of the program tape skipping operation to be presently explained. R220 opens its contacts R220—3 (Fig. 50*k*) and thereby breaks the hold circuit path for the relay R2, the function of which will be described in detail hereinafter under the subheading "Order number and page number test."

The relay R221, when energized in the manner just explained, closes its hold contacts R221—4 (Fig. 50*k*) and thereby establishes an energizing circuit for its hold coil which includes the cam contacts CR9. R221 closes its contacts R221—1 (Fig. 50*c*), and thereby establishes an energizing circuit for the pick up coil of the program skip control relay R10, which circuit is under the control of cam contacts CR5. R10 then closes its hold contacts R10—2 and establishes an energizing circuit for its hold coil extending across the power supply and including the normally closed contacts R262—2 of the program skip off control relay R262. R10 closes its contacts R10—1 (Fig. 50*k*), thereby establishing an energizing circuit for the tape sensing control relay R187, which then adjusts its contacts in Fig. 50*c* in the same manner as described above in other skipping operations, and so that the set up relays R197–R200, inclusive, are under the control of the skip off sensing brushes BC1 to BC4, inclusive. R10 also closes its contacts R10—3 (Fig. 50*k*) and thereby establishes an energizing circuit for the pick up coil of the main interlock control relay R14, the function of which has already been described in detail hereinabove as a part of other skipping operations and also under the subheading "Main interlock control." It is noted that the contacts R14—3 of this relay (Fig. 50*c*) transfer to establish the hold circuit of the homing control relay R223 previously referred to. The relay R10 also transfers its contacts R10—4 (Fig. 50*c*) and thereby establishes an energizing circuit for the tape feed magnet TFM which effects engagement of the tape feed clutch TFC and a skipping operation of the tape in the same manner as previously described.

From the foregoing it is apparent that as part of an eject operation initiated by the energizing of relay R220 (Fig. 50*e*); the tape 15 is now being fed at its skipping speed.

*Skip off of tape—Homing control.*—As a part of the eject and skipping operation initiated as described under the preceding subheading, the homing control relay R223 was energized and is now held by R14—3 (Fig. 50*c*). R223 transfers its contacts R223—1 (Fig. 50*b*) and thereby conditions an energizing circuit for the program skip off control relays R8, R26 and R262, which circuit is established by the sensing of a 1–2 skip off designation in section C of tape 15. The latter circuit includes a plug connector 988 connecting the skip off outlet hub SKH5 and a hub identified as "Homing control" and also a wire 989 connecting the latter hub with the now closed points of the relay contacts R223—1. The transferring of the relay contacts R223—1 also disconnects the program skip off relays R8, R26 and R262 from the previously described skip off translator circuit paths including the hubs SKH1, SKH3 and SKH4. Consequently, the tape skip off operation can only be effected in response to the sensing of the 1–2 skip off designation in section C of the program tape. As shown in Fig. 47, the 1–2 skip off designation is in column #1 of the tape 15. Thus, when the tape reaches this column, the program skip off relays R8, R26 and R262 will be energized and will terminate the tape skipping operation with the tape in position to have its column #2 read. The manner in which this skip off operation is effected is the same as that described hereinabove under subheading "Differential skip off of card and tape," and it is, therefore, unnecessary to repeat the details of the description at this point.

*Remaining operations controlled by heading card HC—1 from tape column #66*

As explained above in the description of skip off operations of the card and tape when the skipping was initiated by the skip designation in column #36 of the heading card HC—1, normal operations of the illustrated embodiment are resumed with the heading card HC—1 in position to have its record column #61 read and the program tape in position to have its column #66, section B, read. As explained, the hold circuit for the card feed on relay R11 (Fig. 50L) was broken by R222—3 as a part of this skipping operation. Column #66 of section B of the tape 15 contains the 2–3–5 code designation and, when sensed, provides a translator circuit path terminating in program outlet hub PRH33 (Fig. 50*h*). A plug connector 990 connects the latter hub with the coil of distributor relay R248 and thereby provides for energizing the latter when cam contacts CR3 (Fig. 50*e*) close. The distributing relay contacts R248—1 are connected by a plug connector 991 to function hub FH39 (Fig. 50*i*) which, as previously explained, is wired to the pick up coil of the #1 typewriter on relay R214. The distributing relay contacts R248—2 are connected by a plug connector 992 to the function hub FH16 (Fig. 50*g*) which, as previously explained, is wired to the pick up coil of the carriage-return function relay R117. Thus, relays R214 and R117, provide, when CR4 close, for turning on the #1 typewriter in the manner previously explained and for pulling down the carriage return key 313 thereof (Fig. 20) to effect a carriage return operation. The manner in which these functions are performed will be apparent from the previous description and need not be repeated at this point. It is noted that the function of turning on the #1 typewriter is superfluous in the present operation as the #1 typewriter has been already turned on, as described hereinabove under the subheading "#1 typewriter on."

The typewriter carriage 310 will be returned to its #11 character space position and the platen is line spaced so that it is now in position to print the first letter character "O" in the line shown in invoice 11—1 (Fig. 43) in the column entitled "For acct. of." The #3 program designation in column #67, section B, of the tape 15 is next sensed and provides for turning on the card feed in the same manner as previously explained.

From the description thus far, it is believed that it will be apparent from the drawings how the data recorded in the columns #61 to #67, inclusive, of the heading card HC—1 are typed on the invoice 11—1 under the control of columns #68 to #80, inclusive, of section B of program tape 15 (Fig. 47). While typing this data, the extra spacing of the typewriter carriage is effected by significant program designations in section B of the tape. For example, the 3–4–6 designation in column #76 of section B, when sensed, provides for a translator circuit path through the pyramid of Figs. 50*e* to 50*i*, inclusive, and including the program outlet hub PRH39 (Fig. 50*i*). As shown, this hub is connected by a plug connector 993 to energize the distributor relay R255, and plug connector 994 connects the outlet hub of distributing contacts R255—2 with the function hub FH13 (Fig. 50*f*) which is connected by a circuit wire to the negative conductor 901 through the pick up coil of the space relay R113. The latter relay will then close its contacts R113—1, R113—2 and R113—3 and thereby provide for energizing the corresponding translator selector magnets of Fig. 50*s* to pull down the space bar 311 (Fig. 20) on the #1 typewriter in the same manner as previously described under "Character spacing."

It is noted that the outlet hub of distributing contacts R255—1 is connected by a plug connector 995 with function hub FH12 (Fig. 50*f*) and that the latter hub is wired to the pick up coil of punch off control relay R228. The manner in which relay R228 turns off the punch 500 is not explained herein because as previously explained it is not essential to an understanding of the present invention. This is true of all function relays indicated herein as controlling the operation of the punch. In each instance the coil of the relay which controls such operation has been included in the diagram.

Included in section B of the program tape are other program designations which when sensed effect a spacing operation of the typewriter, and it is believed that these operations can be readily followed from the previously described operations and from the drawings. For example, in section B column #77 of the tape, the 1–3 program designation provides for energizing only the space control relay R113 (Fig. 50*f*), and this relay will again effect a simple spacing operation of the #1 typewriter in the manner explained.

*Card feed off.*—It is noted that sensed program designations in the tape 15 which represent the function of turning off the card feed provide for energizing circuits connected by a plug connector to the function hub FH37 (Fig. 50*i*) which is wired to the negative conductor 901 through the coil of a relay R12, and the latter effects the function of turning off the card feed by opening its contacts R12—1 (Fig. 50L) in the hold circuit for the card feed on relay R11. R11 will then open its contacts R11—3 (Fig. 50*c*) and thereby deenergize the card feed clutch magnet CFM which will then disengage the card feed clutch CFC in the manner previously described.

*Tabulating the typewriter.*—In column #81, section B, of the tape, the 3–4–5 code designation provides for energizing a tabulating control relay R115 (Fig. 50*g*) in a manner which will be obvious from the drawings and the previous descriptions of different normal tape sensing operations. The relay R115, when thus energized, closes its hold contacts R115—6 (Fig. 50*a*), thereby establishing an energizing circuit for its hold coil including the cam contacts CR6 and the circuit wires 904, 905, and 906. R115 closes its typewriter control contacts R115—1, R115—2, and R115—3 (Fig. 50*p*) and thereby provides under the control of cam contacts CR2 for the energizing of translator selector magnets TSM3, TSM8, and TSM10. These selector magnets provide for the operation of the #1 translator 400 to pull down the tabulating key 314 (Fig. 20). The manner in which a tabulating operation is effected is described fully hereinabove under the heading "The #1 Typewriter" and need not be repeated at this point.

It is noted that at the time the 3–4–5 program designation in section B of column #81 of the tape 15 was read, the #1 typewriter had just completed the printing on the invoice 11—1 (Fig. 43) of the last character "7" under the column entitled "Zone," and that this character is printed in character space position #21. It is also noted from Fig. 18 that a regular tab stop 332 has been preset in character space position #25 of the typewriter, and that a control stop CS2 is in the same character space position of the extra tab rack 337 on the back of the #1 typewriter.

The tabulating control relay R115 also closes contacts R115—4 (Fig. 50*k*) and thereby establishes an energizing circuit for the pick up coil of the tabulating interlock control relay R17. R17 then closes its hold contact R17—1 and thereby establishes an energizing circuit for its hold coil which extends across the power supply and includes the now closed contacts R214—1 of the relay R214 which turns on the #1 typewriter, and the circuit also includes the normally closed interlock contacts TIC which are mounted on the back of the #1 typewriter (Figs. 18 and 19) and, as previously explained, are actuated by the control stops CS2 inserted in the extra tab rack 337.

The tabulating interlock control relay R17 closes its contacts R17—3 (Fig. 50k) and thereby establishes an energizing circuit for the pick up coil of the main interlock control relay R14. This relay then functions to prevent, during this typewriter tabulating operation, the normal tape and card sensing and feeding operations in the same manner as previously described under the sub heading "Main interlock control." When the typewriter carriage 310 reaches its #25 character space position, the preset tab stop 332 stops the movement of the carriage in the manner previously described and which is well known to those skilled in this art, and the control stop CS2 in this same character space position opens the tab interlock contacts TIC and thereby breaks the hold circuit for the tab interlock control relay R17 (Fig. 50k). R17 will then return its contacts to the position shown in the drawings and thereby drop out the main interlock relay R14 which, in turn, will also return its contacts to the position shown in the drawings, and as a result, normal operations of the apparatus under the control of the card and tape are resumed.

From the foregoing description, it will now be apparent how the remaining record columns #68 to #80, inclusive, of card HC—1 are read and how the data designations recorded therein control the typing of such data on the invoice 11—1. It is noted that a second tabulating operation is effected upon sensing the 1–5 program designation in column #93 of section B of the tape. The preset tab stop 332 (Fig. 18) in character space position #41 and the control stops CS2 in the same character space position provide for terminating the tabulating operation in such character space position and in the same manner as described in the preceding paragraph.

*#1 typewriter off.*—It is noted that the sensed 1–2–4 program designation in column #88 section B of the tape 15 provides for turning off the #1 typewriter, and as this particular operation has not been previously described, it will now be explained. As shown in Fig. 50e, the function hub FH6 is wired to the negative conductor 901 through the coil of a relay R6 which, when energized, performs the function of turning off the #1 typewriter. From the previous description, it will be apparent that this coil is energized when circuits are established which include plug connectors connected to the function hub FH6. The sensed 1–2–4 program designation provides for a translator circuit path through the pyramid of Figs. 50e to 50i, inclusive, and including the outlet hub PRH23 (Fig. 50e). A plug connector 997 connects the hub PRH23 with the hub FH6. Thus, when CR3 close, the energizing circuit for the relay R6 is established. R6 then opens its contacts R6—1 (Fig. 50L) and thereby breaks the holding circuit for the relays R214 and R215 which were energized as a result of a #1 typewriter on operation, as previously explained. The relays R214 and R215 will then return their contacts to the normal positions shown in the drawings where control of the #1 typewriter is prevented by circuits including the code wires CW1 to CW12, inclusive (Fig. 50s).

*Order number and page number test.*—After the cycle in which column #80 of the card HC—1 is read, and in which the card feed is turned off under the control of the #4 designation in column #99 of section B of the tape, the tape is spaced to its next column reading position and the 4–5–6 program designation therein provides for tabulating the #1 typewriter and for testing the apparatus to determine at this time if the customer's order and invoice page numbers have been stored in the relay storage unit in the manner previously described. If the order and page numbers have been stored, the tape 15 will be spaced to the next column reading position. If the order and page numbers have not been stored, the normal operation of the apparatus will stop and will not be resumed until both numbers are stored.

The sensing of the 4–5–6 program designation in column #100 of section B of the tape 15 provides in the manner previously described for conditioning a translator circuit path through the program pyramid of Figs. 50e to 50i, inclusive, and including the outlet program hub PRH41 (Fig. 50i). As shown, this hub is connected by a plug connector 998 with an inlet hub which is wired to the negative conductor 901 through the coil of distributor relay R257. The latter relay includes distributing contacts R257—1 which is connected by a plug connector 999 with function hub FH12 (Fig. 50f) which, as previously explained, is connected to the pick up coil of the punch off control relay R228. The distributing relay contacts R257—2 are connected by a plug connector 1000 to function hub FH17 (Fig. 50g) and the latter is wired to the pick up coil of the function relay R115, which effects a tabulating operation. The distributing contacts R257—3 are connected by a plug connector 1001 with function hub FH34, and the latter is wired to the pick up coil of the relay R2 which is the relay for performing the function of testing the apparatus to determine whether or not the customer's order and invoice page numbers have now been stored in the relay storage unit. The circuits through the contacts of the distributor relay R257 are closed by cam contacts CR4 (Fig. 50e) and through the circuit wire 918 in the manner previously described and the relays R228, R115, and R2 are energized thereby.

It is noted that the character recorded in column #80 of the card HC—1 was typed in character space position #45 of the invoice 11—1 (Fig. 43). The energizing of the relay R115 provides for actuating the tabulating key 314 (Fig. 20) in the manner previously described, and this provides a tabulating operation of the #1 typewriter, and such operation is terminated by a preset tab stop 332 in character space position #57 (Fig. 18) and by a control stop CS2 in the same character space position of the extra rack 337.

The relay R2 (Fig. 50i), when energized in the manner above explained, closes its hold contacts R2—1 (Fig. 50k) and thereby attempts to establish an energizing circuit for its hold coil which extends across the power supply and includes the relay contacts R33—1 and the relay contacts R220—3. R2 also closes its interlock control contacts R2—3 and thereby attempts to establish an energizing circuit for the pick up coil of the main interlock control relay R14 by a circuit which includes the contacts R33—1.

As will be recalled in the above description under the sub heading "Storing the customer's order number and invoice page number," the relay R33 (Fig. 50o) was energized as a part of the operating step in which the digit "1" was stored in the order bank PN1, this order bank being the last one to receive a stored digit. The relay R33 then closed its hold contacts R33—2 (Fig.

50L) and thereby established an energizing circuit for its hold coil, which circuit extends across the power supply and is now closed. Consequently, at this time the contacts R33—1 (Fig. 50k) are open and they thereby prevent the establishing of the hold circuit for the test relay R2 and the circuit through the pick up coil of the main interlock control relay R14.

From the foregoing, it is believed to be apparent that if, at the time the program designation in column #100 of section B of the tape is read, the complete customer's order and invoice page number has not been stored in the relay storage unit, the relay R33 (Fig. 50o) would not be energized and its contacts R33—1 (Fig. 50k) would be closed; and, as a result, the above traced hold circuit for the hold coil of relay R2 would be established and also the pick up circuit for the main interlock control relay R14 would be established. The relay R14 will then transfer its interlock contacts in the manner previously explained under the sub heading "Main interlock control" and will thereby prevent further normal tape and card feeding and sensing operations. When normal operations are stopped by R14, as just explained, the operator must store the customer's order and invoice page numbers in the relay storage unit in the manner previously described, before normal operations can be resumed. When the numbers are stored, the relay R33 is energized as a part of the last storing step and it then opens its contacts R33—1 and thereby drops out the hold circuit for the relay R2 and the pick up circuit for relay R14. R14 will then become deenergized and restore its contacts to their normal condition in the drawings and normal operations are then resumed.

*Storage readout—Order and page numbers.*—Beginning in column #101 of section B of the program tape, the now stored customer's order number "123456" and invoice page number "1" are read out digit-by-digit and the numbers typed in character space position numbers #57 to #62, inclusive, and #65 of the invoice 11—1 (Fig. 43). When the 2-5-6 program designation in column #101 is sensed, it provides a corresponding translator circuit path including the outlet hub PRH 37 (Fig. 50h). A plug connector 1003 connects the latter hub with a hub which is wired to the negative conductor 901 through the coil of distributor relay R253, and consequently, when contacts CR3 close, the relay R253 is energized and closes its distributing contacts R253—1 and R253—2. The outlet hub of R253—1 is connected by a plug connector 1004 of function hub FH9 (Fig. 50e) and the latter hub is wired to the negative conductor 901 through the pick up coil of relay R227, which performs the function of turning on the punch 500 in a manner not disclosed herein. R253—2 are connected by a plug connector 1005 to function hub FH24 which is wired to the negative conductor 901 through the pick up coil of relay R201, which performs the function of reading out the highest or sixth order position of the stored customer's order number.

The readout control relay R201, when thus energized, closes its hold contacts R201—4 (Fig. 50a) and thereby establishes an energizing circuit for its hold coil including the cam contacts CR6 and the circuit wires 904 and 905. R201 also closes its contacts R201—2 (Fig. 50d) for the purpose of establishing, through cam contacts CR7, an energizing circuit for the space control relay R113 (Fig. 50f) when there is no digit stored in the sixth order bank CO6 (Fig. 50m) of the relay storage unit. It is noted that this circuit path (Fig. 50d) includes the normally closed contacts of the four storage relays composing the order bank CO6. Consequently, if none of the storage relays of this order bank are energized, then the circuit will be closed by R201—2 and will thereby energize the space control relay R113 which will then effect a typewriter spacing operation in the same manner as previously described. As previously explained when describing the storing of the order number, the digit "1" is now stored in the order bank CO6 and consequently this storage relay R122 is now energized, and its contacts R122—3 (Fig. 50d) are now open and they thereby prevent the establishing of this energizing circuit for the space control relay R113.

Readout control relay R201 also closes its readout control contact R201—1 (Fig. 50q) and thereby connects the readout pyramid COP6 with the wire 1006 which is in turn connected to the positive wire 900, through the cam contacts CR2. As the digit "1" is stored in the sixth order bank CO6, the contacts R122—1 in the readout pyramid COP6 are now transferred and a readout circuit path can now be traced through such pyramid and including the code wire CW1. Thus, when CR2 (Fig. 50p) close, the readout circuit will be established through the contacts R201—1 and pyramid COP6, and such circuit includes the #1 translator selector magnet TSM1 (Fig. 50s). This will provide a cycle of operation of the #1 translator 400, during which the key 311—1 (Fig. 20) is pulled down and the numeral "1" thereby printed in character space position #57 of the invoice 11—1.

In like manner, the program designations recorded in columns #102 to #106, inclusive, of section B of the tape 15 provide, during successive machine cycles, for reading out the digits "2," "3," "4," "5," and "6" stored in the order bank CO5 to CO1, inclusive, and for typing such digits in character space positions #58 to #62, inclusive, of the invoice 11—1 (Fig. 43).

The 3-4-6 program designation in column #107 of section B provides for energizing the space control relay R113 (Fig. 50f) and the punch off control relay R228 (Fig. 50f), which will result in turning off the punch 500 (Fig. 1) by means not disclosed herein and in pulling down the space bar 311 (Fig. 20) to space the carriage of the #1 typewriter to its #64 character space position in a manner which will be apparent from the drawings and the previous description.

The 4-5 program designation in column #108 of section B provides for energizing the readout control relay R207 (Fig. 50i) in the same manner as explained above in other normal tape sensing operations. R207 will close its hold contacts R207—4 (Fig. 50a) to establish a hold circuit therefor through the cam contacts CR6, and R207 will close its contacts R207—2 in Fig. 50d, and its readout control contacts R207—1 in Fig. 50r. As the stored page number does not contain a digit in the second or tens order position, the contacts R146—3, 147—3, 148—5 and 149—5 (Fig. 50d) of the storage relays of order bank PN2 remain in their normally closed positions shown. Consequently, the closing of the readout control relay contacts R207—2 provides an energizing circuit for the space control relay R113 (Fig. 50f) which is under the control of the cam contacts CR1 (Fig. 50d), and the relay R113 will then effect a spacing operation of the #1 typewriter to space the invoice 11—1 of Fig. 43 into its #65 character space position. The readout control contacts R207—1 (Fig. 50r) cannot establish a readout circuit under the control of CR2 through the readout pyramid PNP2 during this operation, because none of the storage relays of the tens order bank PN2 (Fig. 50o) are energized and consequently all of their control contacts in the pyramid PNP2 are now in their normal positions shown.

The 4–6 program designation in column #109 of section B of the program tape provides for energizing the readout control relay R208 (Fig. 50i) in the same manner as previously described for other tape sensing operations, and this readout control relay R208 will close its readout contacts R208—1 (Fig. 50r) and thereby establish, when cam contacts CR2 (Fig. 50p) close, a readout circuit through the pyramid PNP1 and including the code wire CW1. This readout circuit path will provide for energizing the #1 translator selector magnet TSM1 (Fig. 50s) and thereby provide for pulling down the key 311—1 (Fig. 20) and in typing the digit "1" in column space position #65 of the invoice 11—1 (Fig. 43).

The 1–2–3–4 program designation in column #110 of section B of the tape 15 provides, when sensed, a translator circuit path including the pyramid outlet hub PRH42 (Fig. 50e). A plug conector 1008 connects the latter hub with an inlet hub which is wired to the negative conductor 901 through the coil of distributor relay R258. Thus, when cam contacts CR3 (Fig. 50e) close, the translator circuit path provides for energizing the distributor relay R258 and the latter then closes its distributing contacts R258—1 and R258—2. The outlet hub for contacts R258—1 is connected by a plug connector 1009 with function hub FH16 (Fig. 50g), and the latter is wired to the negative conductor through the pick up coil of the relay R117 which, as previously explained, effects a carriage return operation when energized. The distributing contacts R258—2 (Fig. 50e) are connected by a plug connector 1010 with function hub FH25 (Fig. 50h), and the latter is wired to the negative conductor 901, through the coil of the relay R3 which, as previously explained, performs the function of clearing the quantity number section of the relay storage unit of any number which may be stored therein, and of conditioning such quantity number section for receiving a new quantity number.

The just explained circuit path through the distributing relay contacts R258—1 and R258—2 are closed in the manner previously explained by the cam contacts CR4 and consequently the relays R117 and R3 are energized. The relay R117 provides for pulling down the carriage return key 313 (Fig. 20) on the #1 typewriter in the same manner as previously described, and as a result the carriage is returned to the left hand margin and is line spaced so as to be in position to manually type the dates appearing in the next line of invoice 11—1 (Fig. 43).

The functions performed by the relay R3, when energized, are fully explained hereinabove under the heading *"Program tape transfer—Quantity number clear."* In the manner previously explained, the relay R3 now transfers its contacts R3—3 (Fig. 50L) to break the energizing circuit for relays R33 and R177 and to establish an energizing circuit for the storage conditioning relay R178. R178 then transfers its contacts R178—1 (Fig. 50m) thereby conditioning the relay storage unit to receive the first digit of a quantity number to be stored. R3 also closes its contacts R3—4 (Fig. 50m) and thereby establishes an energizing circuit for the storage shift relay R169, the latter relay then shifting its contacts from the position shown in the drawing where they route the digit entering impulses from the wire 941 to the order banks QNA, QNB and QNC as the quantity number is stored.

It is also noted that the contacts R169—4, in closed position, now shunt the reset relay contacts R27—1. Consequently, the customer's order number and invoice page number previously stored in order banks CO6 to CO1, inclusive, PN2, and PN1, cannot be wiped out until the next heading card is in passage 154 (Fig. 4b) and the program tape energizes the relay R4 to open its contacts R4—1 as a part of an order number clear operation. Thus the customer's order and invoice page number remains stored while the following detail cards representing the ordered parts, are being read.

The program tape 15 spaces to its column #111 sensing position and the 1–2–4 program designation in this column (section B) is sensed and provides a corresponding translator circuit path including the outlet hub PRH23 (Fig. 50e). As shown, the latter hub is connected to function hub FH6 by the plug connector 997 and this circuit therefore energizes the relay R6 when the cam contacts CR3 close. As a result, R6 turns the #1 typewriter off in the same manner as described above under the sub heading "#1 typewriter off."

The 1–2–5 program designation in column #112 provides a translator circuit path including the program outlet hub PRH24 (Fig. 50e). As shown, this hub is connected to function hub FH7 by a plug connector 1007 wired to the negative conductor 901 through the pick up coil of relay R219. Thus, when CR3 closes, the relay R219 is energized. R219 then opens its contacts R219—1 (Fig. 50L) and thereby breaks the hold circuit for the tape on control relay R218. R218 then opens its contacts R218—1 (Fig. 50c) and thereby breaks the normal tape feed circuit under the control of cam contacts CR5 which, as previously explained, pulses the tape feed magnet TFM once for each machine cycle.

The operator now manually types the dates and other data included in the next line of the invoice 11—1 and then manually depresses the carriage return key 313 (Fig. 20) to effect a carriage return operation and a line spacing of the platen, so that the invoice 11—1 of Fig. 43 is now in position to print the first line of the body of the invoice.

The operator then depresses the eject key EJK (Fig. 50e) and thereby energizes the eject control relay R220 and effects a manual eject operation during which the heading card HC—1 in passage 154 (Fig. 4b) is ejected from the unit 100 and deposited in the receptacle 18 (Fig. 1) and the rearmost card now in hopper 104, the card DC—4, is fed downward into passage 154. Also, as described above under the sub-heading "Skipping of program tape only," the program tape is moved to its home position as a part of this manual eject operation, and the skip off designation 1–2 in section C column #1 of the program tape 15 stops the movement of the tape in position to have its column #2 of section A read, in the manner described above under the sub heading "Skip off of tape—Homing control."

It is noted that the program shift control relay R186 (Fig. 50k) is dropped out by the opening of eject cam contacts ECB2 as a part of the eject operation. The relay R186 then returns its contacts R186—1 to R186—6 (Fig. 50c) to their normal positions shown where the tape sensing circuits now include the sensing brushes BA1 to BA6, inclusive, which sense section A of the tape 15. The hold coil of card lever relay R229 (Fig. 50k) is also deenergized by the opening of eject cam contacts ECB2, but the new card DC—4 entering the passage 154 recloses the card lever contacts CLC at the time ECB2 are open so that the pick up coil of R229 is energized at this time. Thus, when ECB2 reclose at the end of the eject cycle the hold circuit for R229 is again established (see Fig. 48). Also, during this eject operation, the eject cam contacts ECB3 (Fig. 50j) close at 90° to energize the drop out relays R46 and R56 which then perform the function of breaking the hold circuits for R45 and R55, respectively, and the latter then restore their sets of control contacts to their normal positions shown in the drawings. As previously stated, R45 and R55 are the activating relays for selectors #6 and #11, respectively, which were activated as a part of the operation of classifying the heading card HC—1. The selector #8 which was also activated as a part of this classifying operation, remains activated until column #1 of a heading card HC—2 or HC—3 is sensed.

At the end of the manual eject operation just explained, normal tape sensing circuits are again established through CR5 (Fig. 50c) and normal operations of the illustrated embodiment are resumed under the control of the program tape 15, section A, and the detail card DC—4 which is now in its #1 column sensing position in passage 154.

*Operations controlled by detail cards and tape section A*

It is believed that the successive operations of the illustrated embodiment under the control of the detail cards and section A of the tape will be readily understood from the drawings and the previous description. Considering first the card DC—4 (Fig. 34), it will be recalled that this card is a regular price card for an ordered part which is in stock at the seller's warehouse where the invoice 11—1 (Fig. 43) is being prepared. The detail data appearing in the first line of the body of the invoice 11—1 is printed by the #1 typewriter 300 while the card DC—4 is in reading position in the passage 154 (Fig. 4b). Also, the data appearing in the first and second lines of the picker tag 14 of Fig. 44, is printed by the #2 typewriter while the detail card DC—4 is in the passage 154. As will be obvious, all of the printed data in these lines, except the quantity number in invoice 11—1 and the quantity number, order number, and page number in picker tag 14, are recorded as code designations in the card DC—4 and are typed in response to the sensing of such designations therein. The quantity number, order number, and page number are printed by reading out these numbers from the relay storage unit.

With the detail card DC—4 in sensing position in passage 154 (Fig. 4b), the #1 program designation in column #2, section A, of the tape 15 (Fig. 47) turns on the program feed in the manner previously explained by energizing the relay R218 (Figs. 50g and 50L). The #3 program designation in column #3, section A, of the tape 15 turns on the card feed in the manner previously explained by energizing the relay R11 (Figs. 50i and 50L), and the 2–3–4 program designation in tape column #4 provides for turning off the card feed by energizing the relay R12 (Figs. 50i and 50L) and provides, in conjunction with the classifying designation in column #1 of the detail card DC—4, for classifying such detail card. As previously explained under the heading "Classifying detail cards," selectors #10 and #15 are activated when a card DC—4 is classified and the contacts of their activating relays R53 and R63, respectively (Fig. 50j), are now shifted from their normal positions shown in the drawings.

The 1–3–4–5 program designation in tape column #5 is sensed in the same manner as previously explained in connection with heading card HC—1, but during this operation the corresponding translator circuit path which extends from pyramid outlet hub PRH48 (Fig. 50f) cannot now be established as the relay R45 is now deenergized and its contacts R45–3 remain in the position shown. As explained, R45 is the activating relay for selector #6 (Fig. 50j), and this selector was dropped out by the closing of eject cam contacts ECB3 when the card HC—1 was ejected from the read unit 100. Consequently, the program transfer relay R186 is, therefore, not energized as a part of this operation and its contacts R186—1 to R186—6 (Fig. 50c) remain in their positions shown where the control of subsequent tape sensing operations remains with the program designations in succeeding columns of section A of the tape 15.

*#2 typewriter on.*—The #3 program designation in column 6 of section A turns on the card feed in the manner previously explained, and the 1–4–5–6 program designation in column #7 provides for turning on the #2 typewriter when either the detail card DC—4, DC—5 or DC—8 is in sensing position in the passage 154. The program designation 1–4–5–6, when sensed, provides a corresponding translator circuit path through the pyramid of Figs. 50e to 50i, inclusive, and such circuit path includes the program outlet hub PRH51 (Fig. 50g). A plug connector 1011 connects the latter hub with the common hub C of the set of contacts R63—2, which is now closed as its selector #15 was activated as a part of the classifying operation of either DC—4, DC—5 or DC—8. A plug connector 1012 connects the outlet hub T of the latter contacts to function hub FH14, and the latter is wired to the negative conductor 901, through the pick up coil of the relay R212 which is the function relay for turning on the #2 typewriter. R212 closes its hold contacts R212—4 (Fig. 50L) and thereby establishes an energizing circuit for its hold coil which include the normally closed eject cam contacts ECB1 and the normally closed contacts R5—1 of the #2 typewriter off control relay R5.

It is noted that when this hold circuit for R212 is established the single coil of relay R213 is also energized. The contacts of relays R212 and R213 perform the function of turning the #2 typewriter on, so that the latter may be operated under control of circuits including the code wires CS1 to CS12, inclusive (Fig. 50s). The relay R212 closes its contacts R212—1 and R212—2 (Fig. 50k) and thereby conditions energizing circuits for the hold coils of relays R17 and R16, respectively. The now closed contacts R212—1 are in the circuit path including the normally closed tabulating interlock contacts 2TIC and the hold coil of relay R17, and they thereby provide for establishing an interlock circuit during tabulating operations of the #2 typewriter in the same manner as is provided by the contacts R214—1 of the #1 typewriter. Also, the contacts R212—2 are in the circuit path including the carriage return interlock contacts 2CRIC of the #2 typewriter and with the hold coil of relay R16. It is, therefore, apparent that the contacts R212—2 perform the same functions during a carriage return operation of the #2 typewriter as is performed by the contacts R216—2 during a carriage return operation of the #1 typewriter. The relay R213 closes its contacts R213—1 to R213—12, inclusive, (Fig. 50s) and thereby respectively connects the code wires CS1 to CS12, inclusive, to the #2 translator selector magnets 2TSM1 to 2TSM12, inclusive. The relay R212 also closes its contacts R212—3 (Fig. 50s) and thereby conditions the #2 translator clutch magnet 2462 for control by cam contacts CR1.

From the foregoing, it will be apparent that upon the energizing of the relays R212 and R213 in the manner explained, the 12 selector magnets of the #2 typewriter are now under control of circuits including the 12 code wires and cam contacts CR2 (Fig. 50p) and the #2 translator magnet 2462 is under the control of the cam contacts CR1 and consequently the #2 translator can now control the operation of the keys of the #2 typewriter 2300 in exactly the same manner as the #1 translator controls the operation of the keys of the #1 typewriter.

As the card feed is turned on when column #6 of section A of the program tape is read and as the #2 typewriter is turned on, when column #7 is read, the data designations appearing in columns #2 to #6, inclusive, of the card DC—4 is read and such data is typed in the first line of the picker tag 14 of Fig. 44 by the #2 typewriter. These typing operations are effected under the control of the program designations in columns #7 to #12, inclusive, of section A of the program tape. The 1–4–6 designation in column #13 of section A provides for turning on the card feed and actuating the space bar on the #2 typewriter. The #5 program designation in column #14 of section A provides for turning on the #1 typewriter in the manner previously described. With the card feed turned on by the previous tape designation and with both the #1 and the #2 typewriters now being turned on, the data appearing in columns #7 to #28, inclusive, of the card DC—4 is read during successive operating cycles and under the control of columns #14 to #39, inclusive, of section A of the program tape 15. Such data is typed by the #1 typewriter in the first line of the body of invoice 11—1 (Fig. 43) and is typed by the #2 typewriter in the first line of the picker tag 14 (Fig. 44). The manner in which these operations are effected will be apparent from the previous description of normal typewriter operations when the card HC—1 was being sensed. It will be appreciated that these operations, so far, are identically the same when the cards DC—4, DC—5, and DC—8 are read. It is also noted that the #2 typewriter is only turned on when one of these latter named detail cards is being read.

A skip code designation in the record column of cards DC—4, DC—5, and DC—8, which follows the column containing the last character of the "part name," provides for a skipping operation in the same manner as explained hereinabove under the heading "Skipping initiated by a detail card" and included in this skipping operation is a tabulating operation of the #1 and #2 typewriters. At the beginning of the skipping operation when the card DC—4 is being sensed, the #1 typewriter is in character space position #34 of the invoice 11—1. The carriage 310 will then tabulate to character space position #41 where a preset regulator stop 332 stops the tabulating operation (see Fig. 13), and where a control stop CS2 breaks the interlock circuits including the contacts TIC of Fig. 50k. The #2 typewriter is in character space position #41 of the picker tag 14 and the carriage thereof will be tabulated to its #43 character space position. It will be recalled that in the above description it was stated that a control stop 2CS2 is placed in character space position #43 of the extra tab rack 2337. A corresponding regular tab stop (not shown) of the #2 typewriter would stop the tabulating operation in a manner which is obvious to those skilled in the art from the previous description. The #3 skip off designation in section C of column #43 of the program tape will provide for stopping the skipping operation in the same manner as explained under the heading "Skip off of card and tape when skipping is initiated by detail card."

*Selective carriage-return and eject of detail card.*—In the manner previously explained, the card feed on relay R11 is dropped out by R222—3 (Fig. 50L) as a part of the skipping operation. The skipping operation will terminate with column #44, section A, of tape 15 in reading position. The 1–2–3–4–6 program designation in this column of the tape will have no effect on the operation when a card DC—4 is read and also when any of the other detail cards is read, except the card DC—7. As previously explained, when a card DC—7 is classified, selector #4 is activated by the energizing of its activating relay R41 (Fig. 50j). The relay R41 then transfers its sets of control contacts R41—1 and R41—2 (Fig. 50e) from their normal positions shown. The sensing of the 1–2–3–4–6 program designation provides a program translator circuit path including the pyramid outlet hub PRH58 (Fig. 50e). A plug connector 1013 connects the latter hub with the inlet hub C of R41—1 and a plug connector 1009 connects the outlet hub T of these contacts with the function hub FH16 (Fig. 50g), and the latter as explained previously is connected to the negative conductor 901 through the pick up coil of relay R117, which effects a carriage return operation.

As a detail card DC—4 is now being sensed, the relay R41 of selector #4 is not now energized and the contacts R41—1 are in their normal positions shown in Fig. 50e. Consequently, upon sensing this 1–2–3–4–6 program designation in the tape, the control circuit cannot be established with card DC—4 being read. As stated above, this is true also when any other detail card is being read except the detail card DC—7. Obviously, when DC—7 is read, a carriage return operation of the #1 typewriter will be effected. The #2 typewriter will not be turned on at this time when the card DC—7 is read because, as explained under the heading "#2 typewriter on," such operation is effected under the control of the program designation 1–4–5–6 in column #7 of section A of the tape only when a card DC—4, DC—5 or DC—8 is being read.

The 1–2–3–5–6 designation in column #45 of section A provides when sensed a program translator circuit path including the outlet hub PRH59 (Fig. 50e). A plug connector 1014 connects the latter hub with the inlet hub C of the set of contacts R41—2. A plug connector 1015 connects the outlet hub T of these contacts with the function hub FH4 which, as previously explained, is wired to the negative conductor 901 through the pick up coil of the eject control relay R220. When a card DC—4 or any of the other detail cards, except the card DC—7, is being read, the relay R41 is not energized, as previously explained, and the translator circuit through the contacts R41—2 and including the eject control relay R220 cannot be established. However, when the card DC—7 is being sensed, the contacts R41—2 are in their transferred position and the circuit including the eject control relay R220 is established. As a result, the card DC—7 will be ejected from the read unit 100 and the rearmost card in the hopper 104 (Fig. 4*b*) will be fed into its #1 column reading position in the passage 154 in the same manner as described previously in connection with the other eject operations initiated by the energizing of relay R220 (Fig. 50*e*). As explained hereinabove under the subheading "Skipping of the program tape only" and "Skip off of tape—Homing control," the relay R221 (Fig. 50*e*) is energized with the relay R220 and provides for the skipping of the tape 115 to its home or start position where the #2 column thereof is in sensing position.

From the foregoing it will be apparent that, because of the adjustment of the classifying means in response to the classifying of the different cards, one class of card, DC—7, is ejected from the read unit in response to the sensing of a significant program designation and all other classes of detail cards are not ejected when such significant program designation is sensed.

With the card DC—4 in the passage 154, the 2-3-6 program designation in column #46 of the tape 15, section A, will provide for turning off the #1 typewriter and for effecting a carriage-return operation of the #2 typewriter. The manner in which these functions are performed will be apparent from the previous description. The 2-3-4-5 program designation in column #47 of section A provides for energizing the punch on control relay R227 (Fig. 50*e*) when the card being sensed is the detail card DC—4 and this is also true when the card being sensed is a detail card DC—5 or a card DC—8. The 2-3-4-5 designation provides a translator circuit path including program outlet hub PRH52 (Fig. 50*h*). As shown, the latter hub is connected by a plug connector 1016 with the inlet hub C of contacts R53—1. The relay R53 is the activating relay for selector #10 (Fig. 50*j*) and, as previously explained under the heading "Classifying detail cards," this selector is activated when either a card DC—4, DC—5 or DC—8 is classified. Consequently, with the card DC—4 in sensing position a circuit will be established through the contacts R53—1 (Fig. 50*h*) in the transferred position, and such circuit includes a plug connector 1017 connecting the outlet hub T with the function hub FH9 (Fig. 50*e*), and the latter hub is wired to the negative conductor 901, through the pick up coil of the relay R227. As previously explained the latter relay when energized provides for turning on the tape punch 500 in a manner which is not disclosed herein.

*#2 typewriter off.*—The 1-2-6 program designation in column #48 of section A of the program tape provides for turning on the card feed, for turning on the #1 typewriter and turning off the #2 typewriter. This program designation provides a translator circuit path including a program outlet hub PRH 25 (Fig. 50*e*). As shown, this hub is connected by a plug connector 1019 to an inlet hub which is wired to the negative conductor 901 through the coil of distributor relay R236. The contacts R236—1 are connected by a plug connector 1020 to function hub FH33 (Fig. 50*i*) which, as previously explained, is wired to the negative conductor 901 through the pick up coil of relay R11 which performs the function of turning on the card feed. The contacts R236—2 (Fig. 50*e*) are connected by a plug connector 1021 with function hub FH39 (Fig. 50*i*) which, as previously explained, is wired to the negative conductor 901 through the pick up coil of relay R214 which performs the function of turning on the #1 typewriter. The outlet hub of distributing contacts R236—3 is connected by a plug connector 1022 with the function hub FH8, and the latter is wired to the negative conductor through the coil of relay R5 which performs the function of turning off the #2 typewriter.

The relay R5 then opens its contacts R5—1 (Fig. 50L) and thereby drops out the hold circuit for relays R212 and R213 which were energized previously as a part of an operation for turning on the #2 typewriter. As a result, these relays R212 and R213 return their contacts to the positions shown in the wiring diagram and thereby prevent the #2 typewriter from being operated by circuits including the code wires CW1 to CW12, inclusive (Fig. 50*s*).

The warehouse code designation appearing in column #33 and the card code designation in column #34 of card DC—4 are read and the corresponding data printed in character space positions #41 and #43, respectively, of invoice 11—1 (Fig. 43) and under the control of program designations contained in columns #49 to #53, inclusive, of section A of the program tape 15 in a manner which will be apparent from the previous description.

*Quantity number test.*—The operator manually stores a number in order banks QNA, QNB, and QNC (Figs. 50*m* and 50*n*) each time a detail card DC—4, DC—5, DC—6 and DC—8 is read, which number comprises in each instance the number of parts ordered by the customer and which are represented by the detail cards. When one of these detail cards follows a heading card in the passage 154, the quantity number of the ordered part represented by such detail card may be manually stored by the operator at any time after the previously described quantity number clear operation is effected under the control of the program designation in column #110 of section B of tape 15. As explained, this latter operation conditions the quantity number section of the relay storage unit for entering a quantity number. If a detail card follows another detail card in the passage 154 the quantity number may be stored after the last quantity number clear operation in section A of the tape.

A quantity number test operation is effected under the control of a 3-5-6 program designation in column 54 section A of the tape. If, by the time this program designation is sensed, the operator has not stored the quantity number, then the main interlock control relay R14 (Fig. 50*k*) will be energized and normal operations of the illustrated embodiment will be stopped. If the quantity number has been stored by the time this designation is sensed in column 54 then the interlock relay R14 cannot be energized as a part of this test operation and normal operations will continue under the control of the program designations in the following columns of section A of the tape.

The sensing of the 3-5-6 program designation in column 54, section A of the tape provides a program translator circuit path through the pyramid network of Figs. 50*e* to 50*i*, inclusive, and such path includes the program outlet hub PRH40 (Fig. 50*i*). As shown, a plug connector 1023 connects the latter hub with an inlet hub which is wired to the negative conductor 901 through the coil of distributor relay R256. When this circuit is completed by the closing of cam contacts CR3 (Fig. 50*e*), the relay R256 is energized and closes its distributing contacts R256—1, R256—2 and R256—3. The outlet hub of R256—1 is connected by a plug connector 1024 with function hub FH12 (Fig. 50*f*) and as previously explained this hub is wired to the negative conductor 901 through the pick up coil of the punch off control relay R228. Distributing contacts R256—2 (Fig. 50*i*) are connected by a plug connector 1025 with function hub FH13 (Fig. 50*f*) which as explained is wired to the negative conductor through the pick up coil of the space control relay R113. The distributing relay contacts R256—3 (Fig. 50*i*) are connected by a plug connector 1026 with function hub FH30 and the latter is wired to the negative conductor through the pick up coil of relay R1 which performs the function of testing to determine if a quantity number has been stored at this time. These circuits through the distributing relay contacts just traced are closed by the cam contacts CR4 (Fig. 50*e*) and through the circuit wire 918 in the same manner as previously explained. The relay R228 (Fig. 50*f*) performs its function of turning off the punch 500, as explained previously. The relay R113 when thus energized performs the function of pulling down the space key 311 (Fig. 20) of the #1 typewriter, which is turned on at this time.

The quantity number test control relay R1 closes its hold contacts R1—1 (Fig. 50L) and thereby attempts to establish an energizing circuit for the hold coil of relay R1 which extends across the power supply and includes the normally closed eject cam contacts ECB1 and the normally closed contacts R28—2 of the motor bar control relay R28 (Fig. 50*m*). As will be presently explained, the motor bar 305 (Fig. 20) is depressed after the operator has stored each quantity number. Depressing of the motor bar will close the motor bar contacts MB (Fig. 50*m*) and thereby energize the pick up coil of the motor bar control relay R28, provided the column shift control relay R168 has been energized and closes its interlock contacts R168—4 in the energizing circuit for the relay R28. As shown, the relay R168 is in the order bank QNA and is energized along with the energizing of any of the digit representing relays R154 to R157, inclusive, which compose this order bank. Thus, if a digit has been stored, the relay R168 will be energized and its interlock contacts R168—4 will be closed and the subsequent closing of the motor bar contacts MB will provide the energizing circuit for the relay R28. R28 will then close its hold contacts R28—4 and will thereby establish the previously described hold circuit for R28 which extends across the power supply and includes the normally closed contacts R31—1 and R27—3. From the foregoing, it will be apparent that if, at the time the quantity number test relay R1 is energized, a quantity number has been stored, the relay R28 will be energized and its contacts R28—2 (Fig. 50L) will be open and the previously described hold circuit for the relay R1 cannot be established.

The relay R1 also closes its contacts R1—3 (Fig. 50*k*) and thereby establishes an energizing circuit for the pick up coil of the main interlock control relay R14. As shown, this circuit extends across the power supply and includes normally closed contacts R28—3 of the motor bar control relay R28. Thus, if the quantity number has been previously stored, relay R28 will be energized and R28—3 will be open and thereby prevent the establishing of the energizing circuit for the pick up coil relay R14. If the number has not been stored, then R28—3 are closed and the main interlock relay R14 is thus energized and through the contacts of R14 the normal tape and card sensing and feeding circuits are broken and further operation of the illustrated embodiment is prevented until the quantity number is stored and the motor bar control relay R28 is energized as explained and opens its contacts R28—3 in the pick up circuit for R14 and opens its contacts R28—2 (Fig. 50L) in the energizing circuit for the hold coil relay R1.

*Storing the quantity number.*—The quantity number of ordered parts is stored in the order banks QNA, QNB, and QNC, by manual operation of the keys 303, 304, and motor bar 305 of the auxiliary keyboard 302 (Fig. 20). With the card DC—4 being read, the quantity number for the part represented by this card may be stored at any time after the last quantity number clear operation in section B of the program tape. As explained, the latter operation took place as a result of sensing the 1-2-3-4 designation in column #110 of section B of the tape 15. As a result of this operation, the storage conditioning relay R178 (Fig. 50L) was energized and closed its contacts R178—1 (Fig. 50*m*) to condition a circuit path for entering the first digit. The storage shift relay R169 (Fig. 50*m*) was also energized and shifted its contacts from the position shown so that all entering impulses are now routed to the order banks QNA, QNB, and QNC.

As explained, each of the three order banks QNA, QNB, and QNC, of the quantity number section comprises four digit-representing relays of the group R154 to R165, inclusive, and one of the column-shift control relays of the group R168 to R168, inclusive. Thus, provision is made for storing any quantity number having as many as three order positions. In the majority of instances, the quantity number of ordered parts comprises only one or two order positions. The third order bank is provided to take care of exceptional cases. It is, of course, highly desirable in the interest of order and neatness, that the quantity numbers be typed on the invoice in preselected character space positions with the corresponding order positions of all quantity numbers occupying the same character space positions in their respective lines of typing. As was previously described, in order that the customer's order number and invoice page number be typed in the preselected character space positions when the numbers have fewer order positions than the storage capacity provided, the operator in storing each number depresses the space key once for each order position of the storage capacity not used by the number stored.

This procedure is acceptable in storing the order and page numbers as they are only stored once for each page of the invoice. However, as there is a different quantity number stored for each detail card and as the number usually contains only one or two order positions, considerable time would be consumed if the operator is required to depress the space key once for each order position not used. Because of the column-shift control relays R166 to R168, inclusive, and their contacts in the networks QNPA to QNPC, inclusive, in Figs. 50*r* and 50*s*, the operator is not required, in storing the quantity number, to depress the space key 304 once for each order position not used; and, when the stored quantity numbers are read out as described hereinafter under the heading "Storage readout—Quantity number," these relays provide for automatically spacing the carriages of the two typewriters so that the digits of each order are typed in their preselected character space positions. Thus, the highest order of the quantity number is always stored in the order bank QNA, the next highest in order bank QNB, etc.

The quantity number is stored in the following manner. As shown in Figs. 43 and 44, the number of "generators" ordered by the customer and represented by the card DC—4, is indicated on the invoice 11—1 and picker tag 14 as being "10." The operator, of course, obtains this information from the order received from the dealer customer to which the invoice is addressed and which is represented by the heading card HC—1. The tens digit "1" of this quantity number is first entered in order bank QNA by depressing the digit key 311—1 of the auxiliary keyboard 302 (Fig. 20) which will close its corresponding key contacts K1 (Fig. 50L) and thereby establish an energizing circuit for the storage unit code set up relay R170. R170 will then shift its contacts in Figs. 50*m* and 50*o* and including its contacts R170—9 and thereby conditions an energizing circuit for the storage relay R154 of the order bank QNA. The manner of energizing the storage relay for storing the quantity number, is the same as described hereinabove when storing the customer's order number and invoice page number; that is, the bail contacts BC (Fig. 50L) are also closed by the depression of the key 311—1 for the tens digit of the quantity number, and the contacts BC thereby energize the first entry control relay R175 through the normally closed points of contacts R171—1 and the normally closed interlock contacts R175—5. R175 then closes its contacts R175—6 to establish a hold circuit for the coil of relay R175 through the bail contacts BC which remain closed as long as the operator holds down the key. The contacts R175—6 also establish an energizing circuit for the pick up coil of control relay R177 and the latter will remain energized by its hold contacts R177—4 and through the normally closed points of R3—3, R4—3, and R27—3 and the normally closed contacts R176—1. Relay R175 also opens its interlock contacts R175—5 so that when the relay R177 is energized and transfers its contacts R177—1 to condition an energizing circuit for the second entry control relay R174, such circuit cannot be established through the bail contacts BC during this storing operation. The relay R175 also closes its entry control contacts R175—1 (Fig. 50*m*); and as the contacts R178—1 have already been closed and the storage shift contacts R169—1 have been transferred, an entering circuit will be established through the bail contacts BC and including the contacts R170—9 previously closed and the pick up coil of storage set up relay R154. A branch parallel circuit will also be established for the pick up coil of column shift control relay R168, which extends from R169—1 through a wire 1030, the pick up coil of R168, and the wire 1031 to the negative conductor 901. R154 will close its hold contacts R154—4 and thereby establishes a hold circuit therefor including the normally closed contacts R3—1 of the quantity number clear relay R3, the normally closed contacts R27—3 of the reset relay R27, and the wire 945. R154 also shifts its contacts in the pyramid relay network QNPA (Fig. 50*r*) corresponding to the order bank QNA.

Simultaneously, with the energizing of R154, the first sequence control relay R179 is energized by a branch parallel circuit path extending from the contacts R178—1 and including the pick up coil of R179. R179 then closes its hold contacts R179—4 and thereby establishes an energizing circuit for its hold coil including the normally closed contacts R3—1 and R27—3, the wire 946, and the normally closed contacts R181—2. R179 then closes its control contacts R179—1 which condition the order bank QNB for receiving the next digit of the quantity number to be stored. With the releasing of the key 311—1, the bail contacts BC (Fig. 50L) open and thereby drop out the first entry control relay R175 which recloses its interlock contacts 175—5 and thereby conditions an energizing circuit for the pick up coil of the second entry control relay R174 through the now closed points of R177—1.

The units digit "0" of the quantity number "10" is now entered by depressing the key 311—0 of the auxiliary keyboard 302 (Fig. 20). 311—0 closes its contacts KO (Fig. 50L) and thereby picks up the set up relays R172 and R173 which shift their contacts R172—10 and R173—10 in order bank QNB (Fig. 50*m*). The key 311—0 also closes the bail contacts BC (Fig. 50L) and thereby energizes the pick up coil of R174 through R177—1, now transferred, and R175—5. R174 closes its hold contacts R174—6 to energize its hold coil by a circuit including the bail contacts BC and also to energize the relay R176 which opens its contacts R176—1 to break the hold circuit for R177. R174 opens its interlock contacts R174—5 and R177 returns its contacts R177—1 to their normal position shown. R174 closes its entry control contacts R174—1 (Fig. 50*m*) and thereby establishes a digit entering circuit for QNB which includes the bail contacts BC, the wire 941, the now closed contacts R174—1 and R179—1, the storage shift relay contacts R169—2 now transferred, and through the contacts R172—10 and R173—10, in parallel, and the pick up coils of R160 and R161 to the wire 1031 and negative conductor 901. R160 closes its hold contacts R160—4 and R161 closes its hold contacts R161—6 and thereby establishes hold circuits therefor including the wire 945 and contacts R27—3 and R3—1. The digit relays R160 and R161 shift their contacts in the pyramid translator network QNPB (Fig. 50*r*) and thereby condition a readout circuit path including the code wire CW10, as will be explained later. It is noted that the column shift control relay R167 (Fig. 50*m*) is also energized when the digit storage relays R160 and R161 are energized.

As the quantity number "10" to be stored only comprises the two digits, no further entering operations are required. However, if the quantity number to be stored had been a three position number, then the first digit stored would be the one in the hundreds order, the second would be the one in the tens order, and the auxiliary keyboard 302 would now be actuated a third time to store the units order digit of the number in the order bank QNC. In the manner explained in connection with storing the numbers in the other two sections of the relay storage unit, the sequencing relay R180 (Fig. 50*m*) is also energized at the same time the relays R160 and R161 are picked up as a part of the second digit entering operation, by a parallel circuit path extending from contacts R179—1. R180 then closes its contacts R180—1 (Fig. 50*n*) and thereby conditions the next order bank QNC for receiving the next and third digit of a quantity number. R180 (Fig. 50*m*) also closes its hold contacts R180—4 to establish an energizing circuit for the hold coil thereof extending through the normally closed column shift control relay contacts R166—8, the normally closed sequence relay control contacts R182—2, the wire 945 and the normally closed contacts R27—3 and R3—1.

When the third digit of a quantity number is entered in QNC, the column shift control relay R166 is also energized. R166 then opens its contacts R166—8 and drops out the hold coil for sequence relay R180. R180 then opens its contacts R180—2 (Fig. 50L) and drops out R178. R178 opens its contacts R178—1 to prevent the establishing of another entering circuit to QNA. As the relay R169 is now energized, its contacts R169—5 (Fig. 50*n*) are now open and the depressing of a key 303 of the auxiliary keyboard for the fourth time will therefore have no offset on the quantity number stored.

When the quantity number has been entered in the storage banks, which in the problem being described comprises the digit "1" in QNA and the digit "0" in QNB, the operator then depresses the motor bar 305 (Figs. 20 and 50*m*) and thereby closes its contacts MB. This establishes an energizing circuit for the motor bar control relay R28 which, as previously explained, includes the now closed contacts R168—4 of the column-shift control relay R168 of order bank QNA. The contacts R168—4 are interlock contacts and assure that at least one digit of the quantity number has been stored before the motor bar can be operated to terminate the storing operation of the quantity number. R28 closes its hold contacts R28—4 and thereby establishes an energizing circuit for the hold coil thereof extending through the wire 946, the normally closed contacts R181—2, the normally closed reset relay contacts R27—3 and the quantity number clear contacts R3—1. R28 also closes its contacts R28—1 (Fig. 50L) and thereby energizes the key lock solenoid 378 which locks up the auxiliary keyboard to prevent further operation thereof, as described hereinabove under "The auxiliary keyboard." R28 opens its contacts R28—2 (Fig. 50L) and thereby deenergizes the hold coil of quantity test relay R1. R28 opens its contacts R28—3 (Fig. 50*k*) and thereby drops out the pick up coil of interlock relay R14 which, as explained above under "Quantity number test," is energized when column #54, section A, is read and the quantity number is not then stored. When R28—3 open, the interlock relay R14 returns its contacts to their normal positions shown on the drawings and thereby permits the normal operation of the illustrated embodiment to continue as before.

*Storage readout—Quantity number.*—After storing the quantity number, normal operations of the illustrated embodiment are resumed as explained above. The punch 500 is turned on by program designation 2-3-4-5 in section A, column #55 of the tape 15, when the card being sensed is either a DC—4, DC—5 or DC—8 and in the same manner as previously described. The #2 typewriter is turned on by a program designation 1-4-5-6 in column #56, section A, when the card being read is either a DC—4, DC—5 or DC—8, the same as described previously under "#2 typewriter on."

Before describing in detail the operations which take place when reading out the particular quantity number "10" which has been stored in the order banks QNA, QNB and QNC, attention is directed to the three corresponding pyramid networks QNPA, QNPB and QNPC in Figs. 50*r* and 50*s*. It is noted that these translator pyramids are connected to the circuit wire 1006, which is controlled by CR2, by a network including the contacts of the column shift control relays R166, R167 and R168 and through the contacts of readout control relays R209, R210 and R211. It is also noted that in the upper part of Fig. 50*d* the wire 961 is connected by a network including contacts of the column shift control relays R166 and R167 and contacts of the readout control relays R209 and R210 to the cam contacts CR—7. As described previously, the wire 961 is connected to the negative conductor 991, through the pick up coil of the space control relay R113 (Fig. 50*f*). In reading out a quantity number, the relays R209, R210 and R211 are energized in succession as a part of three readout operations occurring respectively during successive machine cycles of the illustrated embodiment.

As explained in the above description under the heading "Storing the quantity number," the column shift control relays R168, R167 and R166 are energized, respectively, with the storing of digits in the order banks QNA, QNB and QNC and the highest order digit of the quantity number is always stored in order bank QNA. When a stored quantity number comprises two digit positions the units digit is stored in order bank QNB; and when the stored number comprises three digits, the tens digit is stored in QNB and the units digit in QNC. The networks of Figs. 50*r*, 50*s* and 50*d* are substantially the same as those disclosed in our copending application referred to hereinabove at the outset. The networks can best be understood by following a description of storage readout operations in connection with the particular quantity number "10" which is now stored in the quantity number section.

The first storage readout operation attempts to read out the hundreds order of a quantity number. The 1-6 program designation in column 57, section A, of the tape 15 provides, when sensed, a translator circuit path through the pyramid of Figs 50*e* to 50*i*, inclusive, and including the pyramid outlet hub PRH11 (Fig. 50*g*). As shown, this outlet hub is connected by a plug connector 1031 to function hub FH18 and the latter is wired to the negative contactor through the pick up coil of readout control relay R209. R209 closes its hold contacts R209—4 (Fig. 50*a*) and thereby establishes a hold circuit therefor under the control of cam contacts CR6. R209 also closes contacts R209—2 (Fig. 50*d*) and its contacts R209—1 (Fig. 50*r*). As the stored quantity number "10" does not comprise a digit in the hundreds order position, the column shift relay R166 of order bank QNC is not energized and its contacts remain in the position shown in Figs. 50*r*, 50*s* and 50*d*. Thus, when R209—1 close, a readout circuit path, extending from CR2 and wire 1006, is not established thereby because of the now open contacts R166—1. However, the relay contacts R209—2 (Fig. 50*d*) in closed position provide, when CR7 close, an energizing circuit including the normally closed points of R166—5, the wire 961, and the pick up coil of space control relay R113 (Fig. 50*f*). R113 will then close its contacts R113—1, R113—2 and R113—3 in Fig. 50*p* and thereby connect the code wires CW3, CW4 and CW6, respectively, to the wire 1006 and cam contacts CR2. When the latter close, the corresponding translator selector magnets of both the #1 translator and the #2 translator (Fig. 50*s*) will be energized in the manner previously explained and the space bar on both the #1 and #2 typewriters will be pulled down and the carriages thereof spaced one position, the #1 typewriter spacing to its #46 character space position and the #2 typewriter to its #12 character space position.

It will be appreciated from an examination of Figs. 50*r* and 50*s* that, when a quantity number is stored which contains a hundreds order digit, then all three of the column shift control relays will be energized and their contacts R166—1, R167—1 and R168—1 will be closed. In such a case the storage readout control contacts R209—1 will then provide a circuit path including the pyramid QNPA and a code wire corresponding to the stored digit; and, when cam contacts CR2 close, such circuit path would be established and the corresponding selector magnets of the #1 and #2 translators would be energized and operate the #1 and #2 typewriters accordingly. Also, when the stored quantity number has three order positions, the contacts R166—5 will be transferred and R167—5 (Fig. 50*d*) will be open and the contacts R209—2 cannot then establish a circuit path between the cam contacts CR—7 and the pick up coil of the space control relay R113 in Fig. 50*f*.

The second storage readout operation is effected under the control of the 2–3 program designation in column 58 of section A of the tape. This designation, when sensed, provides a translator circuit path including the program outlet hub PRH12 (Fig. 50*h*). As shown, this hub is connected by a plug connector 1032 to the function hub FH23 and the latter is wired to the negative conductor through the pick up coil of the readout control relay R210. R210 then closes its hold contacts R210—4 (Fig. 50*a*) and thereby establishes a hold circuit therefor under the control of cam contacts CR6. R210 also closes its contacts R210—2 (Fig. 50*d*) and its contacts R210—1 (Fig. 50*r*). As the stored quantity number "10" contains a digit in both the tens and units positions, the column shift control relays R167 and R168 are energized and the column shift control relay R166 is not energized. As shown in Fig. 50*d*, the closing of readout control contacts R210—2 cannot now establish a circuit path between the cam contacts CR7 and the space control relay R113 (Fig. 50*f*), because of the now open contacts R167—5.

As shown in Fig. 50*r*, the closing of the readout control contacts R210—1 will now establish a readout circuit path through the pyramid QNPA. This readout circuit path comprises the cam contacts CR2 (Fig. 50*p*), the circuit wire 1006, the now closed contacts R210—1 (Fig. 50*r*), the normally closed points of R166—2, the now closed contacts R167—1 and the now closed contacts R1658—1. As the tens order digit "1" is stored in order bank QNA (Fig. 50*m*), the relay R154 is now energized and its contacts in QNPA (Fig. 50*r*) are now shifted, and the circuit path just traced is, therefore, now completed through the pyramid QNPA and includes the code wire CW1, and the selector magnets TSM1 of the #1 translator and 2TSM1 of the #2 translator. Thus, when the cam contacts CR2 close, the circuit including these selector magnets will be energized and the key 311—1 (Fig. 20) on the #1 typewriter and the corresponding key on the #2 typewriter (Fig. 1) are both pulled down and the digit "1" thereby typed in character space position #46 in invoice 11—1 and in character space position #12 in the picker tag 14.

It will be appreciated that when the stored quantity number contains only a digit in the units order position, then the column shift control relay R167 will not be energized and the readout circuit path just traced would then be open at the contacts R167—1 (Fig. 50*r*). Also, if R167 is not energized and R166 is not energized, the closed contacts R210—2 (Fig. 50*d*) will establish a circuit path from the cam contacts CR7 and including the pickup coil of the space control relay R113. In such case, the relay R113 will again become energized in the second quantity number readout operation, and the carriages of both typewriters will be spaced in the same manner as previously described.

The third quantity number readout operation is effected under the control of the 2–4 program designation in column #59 of section A of tape 15. The sensing of the 2–4 designation provides a circuit path through the pyramid translator terminating in pyramid outlet hub PRH13 (Fig. 50*h*). As shown, this hub is connected by a plug connector 1033 to function hub FH26, and the latter is wired to the negative conductor through the pick up coil of readout control relay R211. R211 will then close its hold contacts R211—4 (Fig. 50*a*) and thereby establish a hold circuit therefor under control of cam contacts CR6. R211 then closes its readout control contacts R211—1 (Fig. 50*s*), thereby providing a readout circuit path extending from cam contacts CR2 (Fig. 50*p*) and including the circuit wire 1006, the now closed contacts R211—1 (Fig. 50*s*), the normally closed points of R166—3, the now closed points of contacts R167—2, and the now closed contacts R168—2. The stored units digit "0" in order bank QNB (Fig. 50*m*) is represented by the now energized storage relays R160 and R161. With the contacts of these relays closed in the pyramid QNPB, a circuit path extends through the pyramid and includes the code wire CW10. Consequently, when R211—1 close and when the cam contacts CR2 later close, the readout circuit path just traced is completed through the pyramid QNPB and includes the code wire CW10 and the translator selector magnets TSM10 and 2TSM10 of Fig. 50*s*. In the manner previously explained, this will provide for operations of the #1 and #2 typewriters during which the key 311—0 in the #1 typewriter is pulled down and the corresponding key in the #2 typewriter is pulled down, and, as a result, the digit "0" is printed in character space position #47 of invoice 11—1 and in character space position #13 of picker tag 14.

It will be appreciated that when the stored quantity number comprises only a units digit, then the circuit path provided by the closing of the contacts R211—1 (Fig. 50s) will comprise the column shift control contacts R166—3 in the position shown, the contacts R167—2 (Fig. 50r) in the position shown, and the closed contacts R168—1 and from there the circuit path would extend through the pyramid QNPA to the code wire corresponding to the stored units digit.

From the foregoing, it will be apparent that the operations previously described are substantially the same when either the card DC—4, DC—5, or DC—8 is in the passage 154 (Fig. 4b). Comparing these cards with the invoice 11—1 (Fig. 43) and the picker tag 14 (Fig. 44), it will be apparent how the data recorded in these cards is printed on the invoice 11—1 and picker tag 14. It is noted that there is no data recorded in the record field designated as "Location" which comprises columns #2 to #6, inclusive, in the card DC—5. This is because the part represented by this card is a part purchased from some other manufacturer and is resold by the seller and such part is not carried in large quantities at the warehouse where the invoice is being prepared. The record columns #2 to #6, inclusive, of this field are sensed in succession the same as in the cards DC—4 and DC—8; but, as there is no data recorded therein, the #2 typewriter simply spaces over the corresponding area in the picker tag 14 in the manner described hereinabove under "Character spacing."

The operations which take place when the card DC—6 is in the passage 154 (Fig. 4b) differ from those which take place when the cards DC—4, DC—5, and DC—8 are sensed, in that none of the data recorded in the columns of card DC—6 is printed by the #2 typewriter and the punch 500 is not operated, such data being printed on the invoice 11—1, as shown, and including the printing of a quantity number.

Consequently, when the last digit of the quantity number is read out in the manner described above, the 2-3-5-6 program designation in column #60, section A, of the program tape provides, when a card DC—4, DC—5, or DC—8 is being sensed, for turning on the punch 500 and for pulling down the key 318 (Fig. 20) on the #1 typewriter which effects only a punching operation and not a typing operation in a manner not disclosed herein but which is fully disclosed in our copending application referred to hereinabove at the outset. The 2-3-5-6 designation provides a translator circuit path including the hub PRH54 (Fig. 50h) and the circuit from the latter hub includes the contacts R53—3 which are transferred only when a card DC—4, DC—5, or DC—8 is classified (Fig. 50j). Thus, when DC—6 card is being sensed, the 2-3-5-6 designation does not perform any operation.

In column #61, section A, the 2-4-6 program designation will provide, by a circuit including PRH36 (Fig. 50h) and distributor relay R252, a quantity number clear operation and a punch off operation when cards DC—4, DC—5, DC—6 and DC—8 are being sensed. It is noted that the punch off operation is superfluous when the card DC—6 is being sensed because the punch is only turned on in column #60 when cards DC—4, DC—5, and DC—8 are being sensed.

In column #62, section A, the 1-4-6 program designation will provide a space operation and a card feed on operation in the manner previously explained. With cards DC—4, DC—5, and DC—8 being sensed, this will provide for spacing both the #1 and #2 typewriters as they are both turned on at this time. With card DC—6 being sensed, only the #1 typewriter will be spaced.

As shown, the columns #35 of cards DC—4, DC—5, and DC—8 contain a skip code designation; and, in response to the sensing of this designation, the field in these cards composed of card columns #36 to #39, inclusive, will be skipped over. The card skipping will be stopped by a #2 skip off designation in column #67, section C. The program tape will also skip from column #63 and the program skipping will be stopped by a #4 skip off designation in column #69, section C of the tape. This was also described above under the heading "Differential skip off of card and tape." During this skipping operation with the cards DC—4, DC—5, and DC—8 being sensed, the carriages 310 and 2310 of the #1 typewriter and the #2 typewriter, respectively, are tabulated as explained hereinabove under the heading "Skipping initiated by detail card." The #1 typewriter carriage will be stopped in character space position #57 by a preset tab stop 332 and by a control stop CS2. The #2 typewriter carriage will be stopped in character space position #35 by a preset regular tab stop (not shown) and by a control stop 2CS2.

As explained previously under the heading "Differential skip off of card and tape," the data contained in columns #35 to #39, inclusive, of the direct order card DC—6 is sensed and such data is printed in character space positions #49 to #53, inclusive, of the invoice 11—1. Also, after these columns of the card DC—6 are sensed, the program designations in columns #68 and #69 of section A of the program tape are read and they provide for a carriage return operation of the #1 typewriter and for an eject operation, during which the card DC—6 is ejected from the read unit 100.

With the cards DC—4, DC—5, or DC—8 in sensing position, the #1 typewriter is turned off in response to the sensing of the 2-4-5 program designation in column #70, section A, of the tape and the highest position of the order number stored in the relay storage unit is read out in the manner previously explained and the digit stored therein is printed by the #2 typewriter in character space position #35 of the picker tag. In a similar manner the five remaining order banks of the customer's order section and the two remaining order banks of the invoice page number section of the storage unit are read out and the stored numbers printed by the #2 typewriter, as indicated, in the picker tag 14. The manner in which these latter readout operations are effected is explained in detail hereinabove under "Storage readout—Order and page numbers." The carriage of the #2 typewriter is then returned to its left-hand margin in response to the sensing of the 1-4 program designation in column #80, section A.

It is noted that at this point in the operation of the illustrated embodiment when a card DC—4, DC—5, or DC—8 is being sensed, the card feed is off, with card column #40 ready to be read and the tape column #81, section A, is next read.

*Operations when sensing columns #1 to #39 of card DC—9.*—With the card DC—9 (Fig. 41) in sensing position in the passage 154 (Fig. 4b), record columns #2 to #6, inclusive, are skipped over in response to the skip designation in column #2 thereof. The program tape will also be skipped. The card skipping will be stopped by a #2 skip off designation in section C column #11 of the program tape, and the tape skipping will be stopped in response to the sensing of #3 skip designation in column #12, section C. The card feed will then be turned on by the 1-4-6 program designation in column #13, section A, and the #1 typewriter will be turned on by the #5 program designation in column #14, section A. Column #7 of the card DC—9 will be read and the skip designation therein will provide for skipping the card field composed of columns #7 to #11, inclusive. The #1 typewriter carriage will also be tabulated as the card being sensed is a detail card. The card skipping operation will be terminated by the #2 skip off designation in section C, column #18, with the card DC—9 in position to have its column #12 sensed. The program tape will also be skipped and the skipping thereof terminated in response to the sensing of a #3 skip off designation in column #20, section C. The #1 typewriter carriage will be tabulated to its #17 character space position where movement thereof will be stopped by a preset regular tab stop 332 (Fig. 18) and a control stop CS2, in the same manner as explained hereinabove. The card feed will be turned on again in response to the #3 program designation in column #21, section A, of the tape and the data designations recorded in card columns #12 to #27, inclusive, of card DC—9, will be sensed during successive machine cycles and such data printed as shown in the invoice 11—1. The manner in which these operations are effected will be apparent from the previous description.

A skip designation in column #28 of the card DC—9 provides for skipping over columns #28 to #32, inclusive, of the card and columns #39 to #43, inclusive, of the tape 15, and the skipping operation will be terminated by a #3 skip off designation in column #43, section C, of the tape. The #1 typewriter carriage will tabulate as a part of this skipping operation and the movement of the carriage will be stopped in position to print in character space position #41. The program data recorded in columns #44 and #45, section A, of the tape will be sensed, but no control will be effected thereby because the card being sensed is the card DC—9 and not a card DC—7. The #1 typewriter will be turned off by the designation in column #46, section A, of the program tape and will be turned on by the program designation in column #48, section A, of the tape, the latter designation also turning on the card feed. Column #33 of the card DC—9 will next be sensed and the skip designation recorded therein will provide for skipping over columns #33 to #39, inclusive, of the card, movement of the card being stopped by the #2 skip off designation in section C, column #55, of the tape 15. The typewriter carriage will be tabulated and will stop in position to print in character space position #57. A skipping operation of the program tape will also be effected along with that of the tape 15, in the manner previously explained, and skipping movement of the tape will be terminated in response to the sensing of a #3 skip off designation in column #80, section C, thereof. As shown in Fig. 50*b* and as previously described, the #1 skip off signal in column #65, section C, will be ignored during this operation, because the card being skipped is not a heading card. The #4 skip off designation in column #69, section C, will be ignored because the card being skipped is not a detail card DC—4, DC—5, or DC—8. It will be recalled that each of these last named detail cards provides for energizing the activating relay R63 for selector #15 when such cards are classified and this selector is not activated when a card DC—9 is classified. Consequently, the contacts R63—1 (Fig. 50*b*) are in the position shown in the drawings and the skip off circuit provided by the sensing of a #4 skip off signal cannot be established.

With a card DC—9 in sensing position, the 1-2-4-5-6 program designation in column #81, section A, of the program tape will be sensed and will provide for a quantity number clear operation. It is noted that no quantity number has been stored as part of the operations of the illustrated embodiment when card DC—9 is being sensed. However, should the operator make a mistake and store a quantity number, such number will now be wiped out by the program designation 1-2-4-5-6 in the same manner as previously described under the sub heading "Quantity number clear." The program designation 1-2-4-5-6 provides this quantity number clear operation by a circuit including the hub PRH60 (Fig. 50*e*) and the contacts R63—3 in their normal position shown. As previously explained, R63 is energized to activate selector #15 when either a card DC—4, DC—5, or DC—8 is classified. Consequently, when the 1-2-4-5-6 designation in column #81 is sensed, with a card DC—4, DC—5, or DC—8 in passage 154, the contacts R63—3 are transferred and the energizing circuit for the quantity number clear operation cannot be established.

As explained above under "Selective carriage-return and eject of detail cards," the card DC—7 is ejected in response to the sensing of the 1-2-3-5-6 program designation in column #45, section A. Also, as explained under "Differential skip off of card and tape," a card DC—6 is ejected in response to the sensing of the 1-2-3 program designation in column #69 of section A. Consequently, at the time when column #81, section A, of tape 15, is sensed, only a card DC—4, DC—5, DC—8, or DC—9 can be in the passage 154 (Fig. 4*b*). At this point of the program of section A and with card DC—9 in the passage, the card feed is turned off due to the last skipping operation, the card is in its column #40 sensing position, the #1 typewriter is turned on with the carriage in character space position #57, the #2 typewriter has not been turned on, and the punch 500 has not been turned on. With either a card DC—4, DC—5, or DC—8 in sensing position, the card feed is turned off and the card is in its column #40 sensing position, the #1 typewriter is turned off with its carriage in its #57 character space position, the #2 typewriter is turned on and is in its #11 character space position, and the punch 500 is turned off.

The column #82, section A, of tape 15 is next read and the 1-2-3-5 program designation therein provides for turning on the #1 typewriter and for turning off the #2 typewriter. These operations are effected with a card DC—4, DC—5, or DC—8 being in sensing position, and are not performed with a card DC—9 in sensing position because these conditions of the #1 typewriter and #2 typewriter already exist.

*Selective printing of price data as controlled by card classification*

As explained hereinabove, the heading cards HC—1, HC—2, and HC—3 contain recorded data representing three different classes of customers, and the detail cards DC—4 to DC—9, inclusive, contain recorded data relating to different ordered items or parts which are sold by the seller. As also explained, the cards DC—4*a* and DC—4*b* are the same in classification as the card DC—4, and will be treated herein the same as a DC—4 card. The invoice 11—1 of Fig. 43 is prepared by the illustrated embodiment when the heading card HC—1 and the detail cards DC—4, DC—5, DC—6, DC—7, DC—4*a*, DC—8, DC—4*b*, and DC—9 are read in succession by the read unit 100. The invoice 11—2 (Fig. 45) is prepared by the illustrated embodiment when the heading card HC—2 is read and the same detail cards just mentioned are read in succession after the heading card HC—2. The invoice 11—3 (Fig. 46) is prepared when the heading card HC—3 is read and the same detail cards mentioned are read in succession thereafter. The picker tag 14 of Fig. 44 is prepared when the illustrated embodiment is operated to prepare either the invoice 11—1, 11—2, or 11—3.

Upon examining the invoices 11—1, 11—2, and 11—3 along with the heading and detail cards shown herein, it will be apparent that the printed matter in the body of the invoices differs in the printed prices of the parts represented by the detail cards and the columns in which the prices are printed. The selective printing of the price data is effected automatically herein under the combined control of the program designations in section A of the program tape, columns #83 to #117, inclusive, and of the adjusted condition of the class controlling means which is adjusted as a part of the classifying of the card as explained hereinabove under the heading "Card classifying."

The heading card HC—1 contains data identifying a dealer class customer who is entitled to the most favorable prices for the ordered parts. Consequently, the invoice 11—1 which is addressed to the dealer customer of HC—1 should show the prices recorded in the record fields identified in the detail cards as "Net price," and these prices should appear in the column identified as "Net."

The heading card HC—2 contains data representing a wholesale class of customer and he is entitled to a price discount on parts manufactured by the seller, but is not entitled to as great a discount as the dealer customer. The invoice 11—2, addressed to the wholesale customer, contains price data from the record fields identified as "Wholesale net" in detail cards DC—4, DC—4*a*, DC—4*b*, DC—8, and DC—9 and this price data is printed under the column "Net" in invoice 11—2. The wholesale customer does not receive a discount on parts made by other manufacturers and stocked for resale by the seller. The latter type of part is represented by the card DC—5 and, as shown, the list price therein is printed in the list price column of invoice 11—2.

The heading card HC—3 contains data representing a retail customer who is not entitled to a discount. The invoice 11—3 addressed to the retail customer contains the list prices of the detail cards which are all printed under the list price of column of invoice 11—3, except in the case of the exchange charge price card DC—9 and the list charge of the latter is printed in the net price column of invoice 11—3.

It is noted in the case of the lot price card DC—8, that the price data in the "Net price" field is printed in the "Net" column in invoice 11—1 and invoice 11—2 and the "Wholesale net" price is printed in a column to the right of the "Net" column. The net price in card DC—8 represents the unit price when the part is bought in lots of two hundred and fifty units and the wholesale net price is the unit price charged for units less than this amount. The straight unit list price is charged the retail customer of invoice 11—3.

It is believed that the selective price printing on the invoices 11—1, 11—2, and 11—3, can best be understood by following the operations which take place when each detail card DC—4, DC—5, DC—8, and DC—9, is in sensing position and when it follows the three different classes of heading cards. The previous description covered operations up to the sensing of card column #40 and tape column #83 of section A and it will be assumed at the beginning of each operation under the control of one of these detail cards that such card is in its column #40 sensing position and the tape is in its column #83 sensing position, and that the #1 typewriter is turned on and is now in its character space position #57.

*Selective price printing controlled by card DC—4.*—With column #40 of the card DC—4 in sensing position and when such card follows a heading card HC—1 in preparing the invoice 11—1, the 1-3-4-6 program designation in column #83, section A, of the tape 15, provides for a card and tape skipping operation and simultaneously therewith the #1 typewriter is tabulated. The sensing of this program designation provides a program translator circuit path including a program outlet hub PRH49 (Fig. 50*f*). As shown, this hub is connected by a plug connector 1035 with the inlet hub C of selector relay contacts R39—1. The normal outlet hub N of these contacts is connected by a plug connector 1036 with the inlet hub C of selector contacts R51—1. The normal outlet hub N of R51—1 is connected by a plug connector 1037 with the inlet hub which is wired to the negative conductor 901 through the distributor relay R241. The transferred outlet hub T of R51—1 is connected by a plug connector 1038 to the inlet hub C of selector relay contacts R37—1.

Referring to Fig. 50*j* it is noted that the relay R39 is the activating relay for selector #3, and, as previously explained, that the pick up hub PU of this selector is connected by a plug connector with the transferred outlet hub T of selector relay contacts R47—1, and that the inlet hub C of the latter contacts is connected by a plug connector to the outlet hub of distributor relay contacts R231—1, and that the inlet hub for energizing the distributor relay R231 is connected to the card classifying hub CH5 by means of a plug connector 935. It is also noted that the relay R47 is the activating relay for selector #7 and that this relay is energized in response to the sensing of a heading card HC—2. Thus, the activating relay R39 for selector #3 is energized by the classifying of card DC—5 when such card follows a heading card HC—2, the latter card energizing the activating relay R47 which transfers its points R47—1 and establishes the energizing circuit for relay R39, as just explained. From this it is evident that the contacts R39—1 (Fig. 50*f*) remain in the position shown in the drawings until a card DC—5 follows a heading card HC—2. In the case of the card DC—4 following a heading card HC—1, now being described, the contacts R39—1 will therefore be in the position shown.

It will also be recalled that the relay R51 (Fig. 50*j*) is the activating relay for the selector #9 and that this selector is only activated by the classifying of a heading card HC—3. As also explained, the relay R37 is the activating relay for selector #2 and this selector is activated only when a card DC—9 is classified.

Consequently, when the card DC—4 follows a heading card HC—1 in printing the invoice 11—1, the relay contacts R51—1 and R37—1 both remain in the position shown in Fig. 50f of the drawings and the energizing circuit for the distributor relay R241 will be thus energized by the circuit traced when cam contacts CR3 (Fig. 50e) close to establish the translator circuit including outlet hub PRH49. As previously explained, the distributing contacts R241—1 are connected by the plug connector 976 with the function hub FH17 (Fig. 50g) and the latter hub is wired to the negative conductor through the pick up coil of the relay R115 which effects a tabulating operation of the typewriter. Also, the distributing relay contacts R241—2 are connected by a plug connector 977 to the function hub FH11 and the latter is wired to the negative conductor 901 through the card skip on relay R222. Thus, when a card DC—4 follows a heading card HC—1 in the passage 154 (Fig. 4b), the card skip on relay R222 and the tabulating control relay R115 are both energized. As previously explained, this provides for simultaneously moving the card and program tape at skipping speed and for tabulating the #1 typewriter. The card columns #40 to #46 comprising the "List price" field of the card DC—4 will be skipped and movement of the card is stopped in response to the sensing of the #2 skip off designation in section C, column #90, and the card will then be in position to have its card column #47 sensed. The program tape will skip from column #83 and the skipping operation will be terminated in response to the sensing of a #3 skip off designation in section C of column #94.

Continuing the description of the case where a detail card DC—4 follows a heading card HC—1 in preparing the invoice 11—1, it is noted that the 2–3–4–5–6 program designation in section A, column #95 of the tape is sensed, and this designation provides a pyramid translator circuit path including the outlet hub PRH62 (Fig. 50h). As shown, this hub is connected by a plug connector 1039 with the inlet hub C of selector relay contacts R35—1. The normal outlet hub N of the latter contacts is connected by a plug connector 1040 with the inlet hub C of selector relay contacts R49—1 and the normal outlet hub N of the latter contacts is connected by a plug connector 1041 to the function hub FH11 (Fig. 50f) which is wired to the negative conductor 901 through the pick up coil of the card skip on relay R222. Referring to Fig. 50j, it is noted that the relay R35 is the activating relay for selector #1 which is energized when a detail card DC—8 is classified and that the relay R49 is the activating relay for selector #8 which is energized when a heading card HC—1 is classified. Consequently, the contacts R49—1 (Fig. 50h) are now transferred and the previously traced circuit path therethrough and including the pick up coil of the relay R222 cannot now be established. Column #97, section A, of the program tape will be sensed and the card feed turned on in repsonse to the #3 program designation therein. Card columns #47 to #54, inclusive, will then be read under the control of program designation contained in columns #98 to #106, inclusive, section A, and as a result the data contained in the "Net price" field of the card DC—4 will be typed in the column entitled "Net" in the invoice 11—1.

The 3–4–5–6 program designation in column #107, section A, of the tape will then be read. This designation provides a translator circuit path including program outlet hub PRH56 (Fig. 50i). As shown, this hub is connected by a plug connector 1042 to the inlet hub C of selector relay contacts R35—3. The outlet hub N of these contacts is connected by a plug connector 1044 with function hub FH16 (Fig. 50g) which, as previously explained, is wired to the negative conductor through the pick up coil of the carriage return control relay R117. The outlet hub T of contacts R35—3 (Fig. 50i) is connected by a plug connector 1045 with function hub FH13 (Fig. 50f) and, as explained, the latter hub is wired to the negative conductor through the pick up coil of the space control relay R113. As previously explained, the relay R35 (Fig. 50j) is the activating relay for selector #1 and the latter is activated only when a card DC—8 is classified. Consequently, the contacts R35—3 (Fig. 50i) are in the position shown and the circuit path from outlet hub PRH56 is therefore completed to the carriage return control relay R117 (Fig. 50g). In the manner previously explained, this will provide for returning the carriage and line spacing the platen of the #1 typewriter so that the invoice 11—1 will be positioned to print the next line of the body thereof.

The 2–4–5–6 designation in column #108, section A, of the program tape will be sensed and will provide a pyramid translator circuit path including the outlet hub PRH55 (Fig. 50h). As shown, this outlet hub is connected by a plug connector 1046 with the inlet hub C of selector relay contacts R35—2 and the outlet hub N of these contacts is connected by a plug connector 1047 with function hub FH4 (Fig. 50e). As explained previously, this latter hub is wired to the negative conductor 901 through the pick up coil of the eject control relay R220. As the relay R35 is the activating relay for selector #1 and as selector #1 is activated only when a card DC—8 is classified, the just traced circuit including the pick up coil of the eject control relay R220 will be completed and this relay will then provide for an eject operation during which the card DC—4 will be removed from the read unit 100 and the next card in the hopper 104 fed downward into the passage 154 (Fig. 4b) and into its column #1 sensing position. Also, the tape 15 will be homed to its #2 column sensing position in the same manner as fully described hereinabove under the subheadings "Skipping of the program tape only" and "Skip off of tape—homing control."

Considering the case now where the card DC—4 follows a heading card HC—2 in the printing of the invoice 11—2, it is noted that with the card DC—4 in its column #40 sensing position and the program tape in its column #83, section A, sensing position, the program designation 1–3–4–6 will again be sensed and provide a program translator circuit path which includes the outlet hub PRH49 (Fig. 50f). As the card being sensed follows a heading card HC—2 and is not a detail card DC—5, then the circuit path through the contacts of the selector relays including the distributing relay R241 will be again established in the same manner as when the card DC—4 follows a heading card HC—1. As a result, the card skip on relay R222 (Fig. 50f) and the tabulating control relay R115 (Fig. 50*g*) will be energized and the "List price" field of card DC—4 will be skipped and tape columns #85 to #94, inclusive, will also be skipped and the typewriter carriage will be tabulated to its character space position #66. The skipping operation of the card is terminated by a #2 skip off designation in column #90, section C, and the tape skipping is stopped by the #3 skip off designation in column #94, section C, of the tape.

With the card DC—4 following a heading card HC—2 the 2-3-4-5-6 program designation in column #95, section A, of the tape will again be sensed and the circuit path from the outlet hub PRH62 (Fig. 50*h*) to the card skip on relay R222 (Fig. 50*f*) will now be established because relay R35 which is energized only when a card DC—8 is classified, and the relay R49 which is energized only when a card HC—1 is classified, are both now deenergized and their contacts R35—1 and R49—1 are in the position shown in Fig. 50*h*. The card skip on relay R222, when thus energized, will provide a skipping operation of the card and tape in the same manner as previously described. The skipping movement of the card will be terminated in response to a #2 skip off designation in column #103, section C, of the tape and the skipping movement of the tape will be terminated in response to a #3 skip off designation in column #108, section C, of the tape.

With the card DC—4 following the card HC—2, column #109, section A, of the tape will be read and the card feed turned on and the "Wholesale net" price field of the card DC—4, will be read under the control of the program designations in columns #110 to #117, inclusive, of section A of the tape, and the price data contained in such field in the card will be printed in the column entitled "Net" in the invoice 11—2.

The 1-4 program designation in column #118 of section A of the program tape will provide a carriage return operation of the #1 typewriter in the manner previously explained and the 1-2-3 program designation in column #119, section A, of the program tape will provide an eject operation, also in the manner explained. As a result, the card DC—4 will be ejected from the read unit 100 and the next card from the hopper 104 will be fed downward into the passage 154 (Fig. 4*b*) and into its #1 column sensing position.

Considering now the case where the detail card DC—4 follows the heading card HC—3 in preparing the invoice 11—3 of Fig. 46, it is noted that with the card DC—4 in its column #40 sensing position and upon sensing tape column #83, section A, the translator circuit path provided by the 1-3-4-6 program designation and including the outlet hub PRH49 (Fig. 50*f*), cannot now be established because the relay contacts R51—1 are in their transferred position and the relay contacts R37—1 are in their normal position shown. As previously explained, the relay R51 is the activating relay for selector #9 and this selector is activated upon the classifying of a heading card HC—3. The relay R37 is the activating relay for selector #2 and this selector is activated by the classifying of a detail card DC—9. As the skipping and tabulating operation cannot now be effected by the 1-3-4-6 program designation, the program tape is spaced and the #3 program designation in column #84, section A, is read and the card feed turned on in response thereto. The "List price" field of card DC—4 is read under the control of columns #85 to #92, inclusive, of the program tape, section A, and the data contained therein is typed under the column "List" in the invoice 11—3, as shown. The 1-4 designation in column #93, section A, of the tape will provide a carriage-return operation and the 1-2-3 program designation in column #94, of section A of the tape, will provide an eject operation in the same manner as previously explained, and, as a result, the card DC—4 will be ejected from the read unit and the next detail card fed into the passage 154 and to its #1 column sensing position.

*Selective price printing controlled by card DC—5.*—Considering first the case where the card DC—5 follows a heading card HC—1 to print the second line in the body of the invoice 11—1 of Fig. 43, it will be noted that the pyramid translator circuit path provided by the sensing of the 1-3-4-6 program designation in column #83, section A, of the program tape can now be established through the program outlet hub PRH49 (Fig. 50*f*) and including the distributor relay R241. This is because the card DC—5 does not follow a heading card DC—2 and the relay contacts R39—1 are therefore now in their normal position shown. The relay contacts R51—1 are also in their position shown because its selector #9 is only energized when a heading card HC—3 is classified. Consequently, the circuits including the distributor relay contacts R241—1 and R241—2 and also including the tabulating control relay R115 (Fig. 50*g*) and the card skip on relay R222, respectively, are therefore established by the closing of the cam contacts CR4 (Fig. 50*e*) in the same manner as previously explained. As a result, a card and tape skipping operation and a typewriter tabulating operation will be simultaneously effected. The skipping of the card will be terminated by the #2 skip off designation in section C, column #90, of the tape and the skipping of the tape will be terminated by a #3 skip off designation, column #94, section C, of the tape. The typewriter will tabulate to its character space position #66 of the invoice 11—1.

With the card DC—5 following a heading card HC—1, the pyramid circuit path provided by the sensing of the 2-3-4-5-6 program designation in column #95, section A, of the tape and including the outlet hub PRH62 (Fig. 50*h*) cannot now be established because the relay contacts R49—1 are now transferred. As previously explained, the relay R49 is the activating relay for selector #8 which is activated when a heading card HC—1 is classified.

Thus, with the card DC—5 following the card HC—1, the "Net price" data recorded in columns #47 to #54, inclusive, of the card DC—5 is read under the control of columns #97 to #106, inclusive, of section A of the program tape, and the recorded data is printed in the column entitled "Net" in the second line of the body of the invoice 11—1.

The 3-4-5-6 program designation in column #107, section A, of the tape provides, as before, a pyramid translator circuit path including the pyramid outlet hub PRH56 (Fig. 50*i*) and, as the relay contacts R35—3 are in their normal position shown in drawings, the circuit path is completed to the carriage return control relay R117 (Fig. 50*g*). It is noted that the relay R35 is only energized when a detail card DC—8 is classified. Also, the 2-4-5-6 program designation in column

#108, section A, of the tape is sensed and provides a corresponding translator circuit path including the program outlet hub PRH55 (Fig. 50*h*). This circuit path provides for energizing the eject control relay R229 (Fig. 50*e*) in the same manner as explained above when a card DC—4 follows a heading card HC—1. The card DC—5 is thereby ejected from the unit 100 and the next card fed downward from the hopper and into its #1 column sensing position in the passage 154 (Fig. 4*b*).

Considering next the case where the card DC—5 follows a heading card HC—2, it is noted that with the sensing of the 1–3–4–6 program designation in column #83, section A, of the tape, the translator circuit path provided by the sensing of this designation cannot now be completed from the program outlet hub PRH49 (Fig.50*f*) because the selector relay R39 is now energized and its contacts R39—1 are in their transferred position. As previously explained, the card DC—5 represents a part which is purchased by the seller for resale and consequently the wholesale customer, represented by the heading card HC—2, is charged the list price for the part. As also explained above, when a heading card HC—2 is classified, the activating relay R47 (Fig. 50*j*) is energized and transfers its contacts R47—1 so that upon the subsequent classifying of a card DC—5 the relay R39, which is the activating relay for selector #3, can be energized by a circuit path including the contacts R47—1 in their transferred position. Consequently, the relay contacts R39—1 of Fig. 50*f* are now transferred and thereby prevent the establishing of a circuit path from the hub PRH 49. As a result, the column #84, section A, of the program tape will be read and the card feed turned on in response to the sensing of the program designation therein. The data recorded in the "List price" field of the card DC—5 will be read under the control of the program designations in columns #85 to #92, inclusive, of section A, and such data will be printed in the column entitled "List" in the invoice 11—2. The designations in columns #93 and #94 of section A will be read and, as a result, the carriage of the #1 typewriter is returned and the card DC—5 is ejected from the read unit 100 in the same manner as previously explained.

Considering now the case where the card DC—5 follows the heading card HC—3 to print the data in invoice 11—3 of Fig. 46, it is noted that the 1–3–4–6 program designation in column #83, section A, of the tape cannot establish a circuit path from outlet hub PRH49 (Fig. 50*f*) because the relay contacts R37—1 remain in the position shown. R39—1 are in the position shown because the card DC—5 now follows a heading card HC—3. The relay contacts R51—1 are now transferred as a heading card HC—3, when previously classified activated the selector #9. However, the contacts R37—1 are not now transferred because such condition only exists when the relay R37 is energized as a result of the classifying of the card DC—9. Consequently, the "List price" data in card DC—5 is printed in the "List" column in invoice 11—3, the #1 typewriter is then operated to return its carriage and the card DC—5 is ejected from the unit 100 in the same manner as when the card DC—4 follows the heading card HC—3.

*Selective price printing controlled by card DC—8.*—Considering now the detail card DC—8 when it follows a heading card HC—1 in printing the invoice 11—1, it is noted that the circuit path provided by the sensing of the 1–3–4–6 program designation in column #83 of section A of the tape and including the outlet hub PRH49 (Fig. 50*f*) and the distributor relay R241, is now established. The relay contacts R39—1 and R51—1 remain in the position shown for the reasons previously explained. Consequently, the card skip on relay R222 and the tabulating control relay R115 (Fig. 50*g*) are energized when CR4 close, and simultaneous skipping of the card and tape and tabulating of the carriage of the #1 typewriter are effected. As before, the "List price" field of the card DC—8 and columns #84 to #94, inclusive, of section A of the program tape are skipped, the skipping of the card being terminated by a #2 skip off designation in column #90, section C, and the skipping of the program tape being terminated by a #3 skip off designation in column #94, section C.

As the card DC—8 is in the passage 154 (Fig. 4*b*) the sensing of the 2–3–4–5–6 program designation in column #95, section A, of the tape cannot establish an energizing circuit from the program outlet hub PRH62 (Fig. 50*h*). As previously explained, the relay R35 is energized when the card DC—8 is classified and consequently its contacts R35—1 are now transferred and break the circuit path from the hub PRH62.

With the card DC—8 following the heading card HC—1, the net price data in columns #47 to #54, inclusive, of the card is printed in the column "Net" of invoice 11—1 under the control of the program designation contained in columns #97 to #106, section A, of the program tape in the same manner as previously explained.

The 3–4–5–6 program designation in column #107, section A, is sensed and provides a pyramid translator circuit path including the outlet hub PRH56 (Fig. 50*i*) in the same manner as previously described. As the card being sensed is a card DC—8, the relay R35 is now energized and its contacts R35—3 are in their transferred position. As a result, the circuit path from the outlet hub PRH56 is completed through the plug connector 1045 to energize the space control relay R113 (Fig. 50*f*). This will space the #1 typewriter carriage to character space position #76 of invoice 11—2. It is noted that column #54 of card DC—8 is provided for recording a digit representing thousands of cents of the net price. This column being blank, the typewriter carriage is spaced in response to the sensing of such column, to its character space position #75. So, the present spacing operation in response to the sensing of the 3–4–5–6 program designation in column #107, section A, of the tape, provides for spacing the carriage again to its #76 character space position.

The 2–4–5–6 program designation in column #108, section A, of the tape cannot provide for energizing the eject control relay because, as shown in Fig. 50*h*, the circuit path extending from PRH55 is now open because of the open selector control contacts R35—2, the relay R35 being energized as a part of the classifying operation of the card DC—8. The data designations contained in card columns #55 to #61, inclusive, of the card DC—8 are sensed in response to the program designations in columns #109 to #117, inclusive, of section A, of the program tape and the corresponding data is printed as shown in Fig. 43 in a column to the right of the "Net" column. The price printed as a result of this operation indicates the unit net price of the part represented by the card DC—8 when the number of parts ordered is less than the two hundred and fifty units provided for in the lot card.

After printing this unit net price in the same line as the lot net price, the #1 typewriter carriage is returned and the card DC—8 is ejected as a result of the sensing of the program designations in columns #118 and #119, section A, of the program tape in the same manner as previously explained.

Considering next the case where the lot price card DC—8 follows a heading card HC—2 in preparing the invoice 11—2 of Fig. 45, it is noted that the data printed in the invoice from the card DC—8 is the same as that printed in the invoice 11—1. The operations in printing this data in invoice 11—2 are the same as those just described and it is believed unnecessary to explain them more in detail at this point.

Considering next the case where the card DC—8 follows the heading card HC—3 in preparing the invoice 11—3 of Fig. 46, it is noted that the 1-3-4-6 program designation in column #83, section A, of the tape cannot provide an energizing circuit from the program outlet hub PRH49 (Fig. 50*f*) because under these conditions the relay contacts R51—1 are transferred and the relay contacts R37—1 remain in the position shown. As previously explained, the relay R51 is energized when a heading card HC—3 is classified and the relay R37 is energized when a detail card DC—9 is classified. As a result, the data designations recorded in columns #40 to #46, inclusive, of the card DC—8 are read under the control of columns #84 to #92, inclusive, of section A, of the program tape and such data is printed in the column entitled "List" in the invoice 11—3. Also, the carriage of the #1 typewriter is returned and the card DC—8 ejected from the unit 100 in response to the sensing of the code designation in columns #93 and #94 of section A of the program tape in the same manner as previously explained.

*Selective price printing controlled by card DC—9.*—With the card DC—9 following the heading card HC—1, the 1-3-4-6 program designation in column #83, section A, of the tape 15 provides a corresponding program translator circuit path including the outlet hub PRH49 (Fig. 50*f*) in the same manner as in previously described operations when this program designation was sensed. The circuit path from hub PRH49 is now completed through the coil of the distributor relay R241 because the selector relay contacts R39—1 and R51—1 are in their normal positions shown in the drawings, the relay R39 being energized when a detail card DC—5 follows a heading card HC—2 and the relay R51 being energized when the heading card HC—3 is classified. Thus, when CR4 (Fig. 50*e*) close, the circuits are established through distributor relay contacts R241—1 and R241—2 and including the tabulating control relay R115 (Fig. 50*g*) and the card skip on control relay R222 (Fig. 50*f*). As a result, skipping operation of the card and the tape and a tabulating operation of the carriage of the #1 typewriter are simultaneously effected.

The skipping of the card is terminated in response to the sensing of a #2 skip off designation in column #90, section C, and the skipping of the tape is terminated in response to the sensing of a #3 skip off designation in column 94, section C, of the tape. The card is stopped in position to have its column #47 read and the tape is stopped in position to have its column #95, section A, read. The tabulating operation of the typewriter carriage is terminated in character space position #66.

With the card DC—9 following the card HC—1, the 2-3-4-5-6 program designation in column #95, section A, of the tape is sensed and provides a translator circuit path including the program outlet hub PRH32( Fig. 50*h*), as previously described, but the circuit from the latter hub is broken by the now open selector relay contacts R49—1, the relay R49 being energized when the card HC—1 was classified. The data designations contained in columns #47 to #54, inclusive, of the card DC—9 are now sensed under the control of program designations contained in columns #97 to #106, inclusive, section A, and the corresponding data is typed under the "Net" column in invoice 11—1 of Fig. 43. The program designations in columns #107 and #108, section A, of the program tape provide for returning the carriage of the #1 typewriter and for ejecting the card DC—9 from the read unit in the same manner as previously described.

When the card DC—9 follows a heading card HC—2, the 1-3-4-6 program designation in column #83, section A, of the tape provides for skip ping the card and tape and for tabulating the typewriter carriage in a manner which will be obvious from the previous description. The skipping of the card DC—9 is terminated by the #2 skip off designation in column #90, section C, of the tape and the skipping of the tape is terminated by the #3 skip off designation in column #94, section C, of the tape. The 2-3-4-5-6 program designation in column #95, section A, of the tape provides an energizing circuit for the card skip on relay R222 (Fig. 50*f*) which extends from the program outlet hub PRH32 (Fig. 50*h*), because neither selector relay R35 nor relay R49 are energized at this time. The relay R222 provides a simultaneous card and tape skipping operation in the same manner as previously described, and the skipping of the card is terminated by the sensing of a #2 skip off designation in column #103, section C, of the tape and the skipping of the tape is terminated by a #3 skip off designation in column #108, section C, of the tape. The price data contained in card columns #55 to #61, inclusive, is then printed in the "Net" column of an invoice 11—2 of Fig. 45 and under the control of program designations contained in columns #109 to #117, inclusive, section A, of the tape. The program designations in columns #118 and #119, section A, of the tape then provide for a carriage return operation of the #1 typewriter and for ejecting the card DC—9 from the unit 100.

When the card DC—9 follows heading card HC—3 and when the program designation 1-3-4-6 in column #83, section A, of the tape is sensed, a translator circuit path is provided thereby in the same manner as previously described and the circuit path includes the program outlet hub PRH49. As the previous heading card was HC—3, the relay R51 is now energized and its contacts R51—1 are in their transferred position. As the detail card being read is DC—9, the relay R37 is energized and the contacts R37—1 are now in their transferred position. As shown, the outlet hub T of the latter contacts is connected by the plug connector 976 with the function hub FH17 (Fig. 50*g*) and the latter is wired to the negative conductor 901, through the pick up coil of the tabulating control relay R115. Consequently, when the cam contacts CR3 (Fig. 50*e*) close, this program translator circuit path including the program outlet hub PRH49 is completed to energize the tabulating control relay R115. This relay provides for a tabulating operation of the #1 typewriter carriage which is terminated with the carriage in its character space position #66. As the card and tape were not skipped, the code designations in the list price field of the card DC—9 are read under the control of the program designations in columns #84 to #93, inclusive, section A, of the program tape, and the price data in this field of the card is typed in the "Net" column of the invoice 11—3. Afterwards, the program designations in columns #93 to #94 of the program tape, section A, are read and, as a result, the carriage of the #1 typewriter is returned and the card DC—9 is ejected from the unit 100 in the same manner as previously described.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In apparatus for preparing statements, or the like, containing heading and detail data in different areas thereof and under the control of heading source records containing, respectively, in record columns thereof, data designations representing different classes of heading data, and under the control of detail source records containing, respectively, in record columns thereof, data designations representing detail data, and wherein each heading source record also contains a class signifying designation in a record column thereof, and wherein certain of the columns of each detail record contain designations representing first and second kinds of detail data and the columns containing said first and second kinds of data are grouped to provide, respectively, first and second record fields, the combination of initial record feeding means operable to feed the source records individually to a first column sensing position and beginning with a selected heading source record and followed in succession by selected detail source records; record sensing means operable, when activated, to sense successively the record columns of each source record; recording means operable, when activated, and in response to the sensing of data designations in each source record to record the heading data in a first area of a statement sheet and to record detail data in a second area of said statement sheet and said recording means including means for positioning the statement sheet in different recording positions; class controlling means adjustable to different controlling conditions which correspond, respectively, to the different classes of heading data; record classifying means operable, when activated, and in response to the sensing of the class designation in a heading source record to adjust said class controlling means to the controlling condition corresponding to the sensed heading record; program means providing a sequence of operations of the apparatus according to a predetermined plan when each source record is in position to be sensed and including the activating and deactivating of said record sensing means, said recording means, and said record classifying means; and means controlled by said program means and by the adjusted condition of said class controlling means corresponding to a first class of heading record, for controlling the operation of said sensing and recording means so as to record in said statement sheet detail data including said first kind of detail data and so as to prevent the recording of said second kind of detail data, and controlled by said program means and the adjusted condition of said controlling means corresponding to a second class of heading record, for controlling operations of said sensing and recording means so as to record in said sheet detail data including said second kind of detail data and so as to prevent recording of said first kind of detail data.

2. In apparatus for preparing statements, or the like, containing heading and detail data in different areas thereof and under the control of heading source records containing, respectively, in record columns thereof, data designations representing different classes of heading data, and under the control of detail source records each of which contains, in record columns thereof, data designations representing different kinds of detail data, and wherein each heading source record also contains a class signifying designation in a record column thereof, and wherein the columns of each detail record containing designations representing the same kind of detail data are grouped to provide a separate record field, the combination of initial record feeding means operable to feed the source records individually to a first column sensing position and beginning with a selected heading source record and followed in succession by selected detail source records; record sensing means operable, when activated, to sense successively the record columns of each source record; recording means operable, when activated, and in response to the sensing of data designations in each source record to record the heading data in a first area of a statement sheet and to record detail data in columns in a second area of said statement sheet and said recording means including means for positioning the statement sheet in different recording positions; class controlling means adjustable to different controlling conditions which correspond, respectively, to the different classes of heading data; record classifying means operable, when activated, and in response to the sensing of the class designation in a heading source record to adjust said class controlling means to the controlling condition corresponding to the sensed heading record; program means providing a sequence of operations of the apparatus according to a predetermined plan when each source record is in position to be sensed and including the activating and deactivating of said record sensing means, said recording means, and said record classifying means; and means controlled by said program means and by the adjusted condition of said controlling means corresponding to a first class of heading record, for controlling the operation of said sensing and recording means so as to sense the record columns of each detail record containing a first kind of detail data and to record such data in one column of said statement sheet, and controlled by said program means and the adjusted condition of said controlling means corresponding to a second class of heading record, for controlling operations of said sensing and recording means so as to sense the record columns of each detail record containing a second kind of detail data and to record the latter data in said one column of said sheet.

3. In apparatus for preparing statements, or the like, containing heading and detail data in different areas thereof and under the control of heading source records containing, respectively, in record columns thereof, data designations representing different classes of heading data, and under the control of detail source records each of which contains, in record columns thereof, data designations representing different kinds of detail data, and wherein each heading source record also contains a class signifying designation in a record column thereof, and wherein the columns of each detail record containing designations representing the same kinds of detail data are grouped to provide a separate record field, the combination of initial record feeding means operable to feed the source records individually to a first column sensing position and beginning with a selected heading source record and followed in succession by selected detail source records; record sensing means operable, when activated, to sense successively the record columns of each source record; recording means operable, when activated, and in response to the sensing of data designations in each source record to record the heading data in a first area of a statement sheet and to record detail data in columns in a second area of said statement sheet and said recording means including means for positioning the statement sheet in different recording positions; class controlling means adjustable to different controlling conditions which correspond, respectively, to the different classes of heading data; record classifying means operable, when activated, and in response to the sensing of the class designation in a heading source record to adjust said class controlling means to the controlling condition corresponding to the sensed heading record; program means providing a sequence of operations of the apparatus according to a predetermined plan when each source record is in position to be sensed and including the activating and deactivating of said record sensing means, said recording means, and said record classifying means; and means controlled by said program means and by the adjusted condition of said controlling means corresponding to a first class of heading record, for controlling the operation of said sensing and recording means so as to sense the record columns of each detail record containing a first kind of detail data and to record such data in one column of said statement sheet, and controlled by said program means and the adjusted condition of said controlling means corresponding to a second class of heading record, for controlling operations of said sensing and recording means so as to sense the record columns of each detail record containing a second kind of detail data and to record the latter data in said one column of said sheet, and controlled by said program means and the adjusted condition of said controlling means corresponding to a third class of heading record, for controlling operations of said sensing and recording means to sense the record columns of each detail record containing a third kind of detail data and to record the latter data in a different column of said sheet.

4. In apparatus of the type wherein different classes of character data contained, respectively, in different source records, are recorded in a selected manner in a sheet under the combined control of character representing designations and class signifying designations recorded in record columns of the source records, the combination of record holding means adapted to receive the source records, one at a time, and operable to hold each received record in a sensing position; record sensing means operable to sense successively the record columns of the source record in sensing position; recording means operable in response to the sensing of character designations in the source record to record such characters in a sheet; class controlling means adjustable to different controlling conditions which correspond, respectively, to the classes of character data recorded in the different source records; record classifying means operable in response to the sensing of a class designation in each source record in sensing position to adjust said class controlling means to its controlling condition which corresponds to the class of character data recorded in said each source record; source record ejecting means operable, when activated, to remove the source record in sensing position from said holding means; and means controlled by the adjusted conditions of said class controlling means for activating said ejecting means at one point in the operation of said apparatus when one class of source record is in sensing position and for activating said ejecting means at a different point in the operation of said apparatus when a different class of source record is in sensing position.

5. Record controlled recording apparatus comprising, in combination, record holding means adapted to receive source records of different classifications and operable to hold each such record in a position to be sensed, each such record being composed of columns bearing significant designations representing their respective classes and designations representing selected character data to be recorded; normal record sensing means operable, when activated, to sense successively the columns of the source record held in sensing position; ejecting means operable, when activated, to remove the source record in sensing position from said holding means; recording means operable, when activated, and in response to the sensing of character representing designations in the records for recording such characters on a sheet; class controlling means adjustable to different controlling conditions which correspond, respectively, to the several classes of records; classifying means operable, when activated, and in response to the sensing of a significant class designation in each record, for adjusting said class controlling means to the controlling condition corresponding to the class of the sensed record; and program means for controlling the sequence of operations of said apparatus according to a predetermined plan and comprising means for selectively activating and deactivating said classifying means, said normal record sensing means, and said recording means; and said program means also comprising means operable when a record of a first class is in sensing position, and in conjunction with an adjusted controlling condition of such class controlling means corresponding to said first class, to activate said ejecting means at a predetermined point in the program, and means operable when a second class of record is in sensing position, and in conjunction with an adjusted controlling condition corresponding to said second class, for activating said ejecting means at a different predetermined point in the program.

6. Record controlled recording apparatus comprising, in combination, means defining a passage in which records belonging to different classifications may be held in a position to be sensed and through which the records may be moved one at a time, each such record being composed of columns bearing significant designations representing their respective classes and designations representing selected character data to be recorded; normal record sensing and feeding means operable, when activated, to sense successively the columns of a record occupying a sensing position within said passage; ejecting means operable, when activated, to remove a record from said passage; recording means operable, when activated, and in response to the sensing of character representing designations in the records for recording such characters on a sheet; class controlling means adjustable to different controlling conditions which correspond, respectively, to the several classes of records; classifying means operable, when activated, and in response to the sensing of a significant class designation in each record, for adjusting said class controlling means to the controlling condition corresponding to the class of the sensed record; and program means for controlling the sequence of operations of said apparatus according to a predetermined plan and comprising means for selectively activating and deactivating said classifying means, said normal record sensing and feeding means, and said recording means, and also including means operable when a record of a first class is in sensing position and in conjunction with an adjusted controlling condition of such class controlling means corresponding to said first class, to activate said ejecting means at a predetermined point in the program, and means operable when a second class of record is in sensing position and in conjunction with an adjusted controlling condition corresponding to said second class, for activating said ejecting means at a different predetermined point in the program.

7. Record controlled recording apparatus comprising, in combination, means defining a passage in which source records belonging to different classifications may be held in a position to be sensed and through which the records may be moved one at a time, each such record being composed of columns bearing significant designations representing their respective classes and designations representing selected character data to be recorded; source record moving means adapted to engage the record in sensing position in said passage and operable to move such record along the passage; normal record sensing and feeding means operable, when activated, to sense successively the columns of a record occupying a sensing position within said passage and effective to operate said moving means to move the record in sensing position a distance of one column for each sensing operation; ejecting means operable, when activated, to operate said moving means to remove a record from said passage; recording means operable, when activated, and in response to the sensing of character representing designations in the records for recording such characters on a sheet; class controlling means adjustable to different controlling conditions which correspond, respectively, to the several classes of records; classifying means operable, when activated, and in response to the sensing of a significant class designation in each record, for adjusting said class controlling means to the controlling condition corresponding to the class of the sensed record; and program means for controlling the sequence of operations of said apparatus according to a predetermined plan and comprising means for selectively activating and deactivating said classifying means, said normal record sensing and feeding means, and said recording means; and said program means also comprising means operable when a record of a first class is in sensing position, and in conjunction with an adjusted controlling condition of such class controlling means corresponding to said first class, to activate said ejecting means at a predetermined point in the program, and means operable when a second class of record is in sensing position, and in conjunction with an adjusted controlling condition corresponding to said second class, for activating said ejecting means at a different predetermined point in the program.

8. In apparatus of the type wherein different classes of character data contained, respectively, in different source records, are recorded in a selected manner in a sheet under the combined control of character representing designations and class signifying designations recorded in record columns of the source records and of program designations recorded in columns of a program strip according to a predetermined plan, the combination of record holding means adapted to receive the source records, one at a time, and operable to hold each received record in a sensing position; program strip sensing means operable to sense successively the columns of said program strip; record sensing means activated and deactivated in response to the sensing of significant program designations in said program strip, and operable when so activated to sense successively the record columns of the source record in sensing position; recording means activated and deactivated in response to the sensing of significant program designations in said strip, and operable, when so activated, and in response to the sensing of character designations in the source record to record such characters in a sheet; class controlling means adjustable to different controlling conditions which correspond, respectively, to the classes of character data recorded in the different source records; record classifying means activated and deactivated in response to the sensing of a significant program designation in said program strip, and operable, when so activated, and in response to the sensing of a class designation in each source record in sensing position to adjust said class controlling means to its controlling condition which corresponds to the class of character data recorded in said source record; source record ejecting means operable, when activated, to remove the source record in sensing position from said holding means; and means controlled jointly by the adjusted conditions of said class controlling means and by the sensing of significant program designations in said program strip, for activating said ejecting means at one point in the program when one class of source record is in sensing position and for activating said ejecting means at a different point in the program when a different class of source record is in sensing position.

9. Apparatus according to claim 8, and comprising, in addition thereto, initial record feeding means operable, when activated, to feed a source record into initial record sensing position where it is held by said holding means; and means operated by said source record ejecting means for activating said initial record feeding means.

10. Apparatus according to claim 8, and comprising, in addition thereto, interlock means operable, when activated, to disable said strip sensing means and said record sensing means, and means effective upon the activation of the source record ejecting means for activating said interlock means and effective upon completion of the operation of said ejecting means for deactivating said interlock means.

11. In apparatus of the type wherein different classes of character data contained, respectively, in different source records, are recorded in a selected manner in a sheet under the combined control of character representing designations and class signifying designations recorded in record columns of the source records and of program designations recorded in successive columns of a program strip according to a predetermined plan, the combination of record holding means adapted to receive the source records, one at a time, and operable to hold each received record in a sensing position; program strip sensing means operable to sense successively the columns of said program strip beginning at an initial or home position; record sensing means activated and deactivated in response to the sensing of significant program designations in said program strip, and operable, when so activated, to sense successively the record columns of the source record in sensing position; recording means activated and deactivated in response to the sensing of significant program designations in said strip, and operable, when so activated, and in response to the sensing of character designations in the source record to record such characters in a sheet; class controlling means adjustable to different controlling conditions which correspond, respectively, to the classes of character data recorded in the different source records; record classifying means activated and deactivated in response to the sensing of a significant program designation in said program strip, and operable, when so activated, and in response to the sensing of a class designation in each source record in sensing position to adjust said class controlling means to its controlling condition which corresponds to the class of character data recorded in said each source record; source record ejecting means operable, when activated, to remove the source record in sensing position from said holding means; means controlled jointly by the adjusted conditions of said class controlling means and by the sensing of significant program designations in said program strip, for activating said ejecting means at one point in the program when one class of source record is in sensing position and for activating said ejecting means at a different point in the program when a different class of source record is in sensing position; and means operable, upon activation of said source record ejecting means, for moving the program strip into its home position where the first column thereof to be sensed is in sensing position.

12. Apparatus according to claim 11 and comprising further, interlock means operable upon the activation of the source record ejecting means for disabling said strip sensing means and said record sensing means and operable upon the deactivation of said ejecting means for restoring said strip sensing means to normal sensing condition.

13. In apparatus for selectively recording different classes of character data on a sheet under the control of designations in record columns of a plurality of source records, wherein columns of each record contain designations representing character data and functional operations of the apparatus and at least one column of each record contains a class designation signifying the class of character data recorded therein, the combination of record holding means adapted to receive the source records, one at a time and operable to hold each received record in a position where a column thereof can be sensed; means for sensing successively the record columns of each source record in sensing position; recording means for recording character data on a sheet and comprising positioning means for moving the sheet to different recording positions, character actuating means for recording the characters, and functional actuating means for performing different functional operations of said recording means and including the operation of said positioning means; class controlling means adjustable to different controlling conditions which correspond, respectively, to the classes of character data recorded in the source records; record classifying means responsive to the sensing of the class designation of the source record in sensing position for adjusting said class controlling means to a controlling condition corresponding to the class of the sensed record; and means responsive to the sensing of designations in the source record in sensing position for operating the actuating means of said recording means to record the data on said sheet and including means operable upon sensing one particular designation and controlled by the adjusted condition of said class controlling means to effect one operation of said recording means when one class of source record is in sensing position and to effect a different operation of said recording means when another class of source record is in sensing position.

14. In apparatus for selectively recording different classes of character data on a sheet under the control of designations in record columns of a plurality of source records, wherein columns of each record contain designations representing character data and functional operations of the apparatus and at least one column of each record contains a class designation signifying the class of character data recorded therein, the combination of record holding means adapted to receive the source records, one at a time, and operable to hold each received record in a position where a column thereof can be sensed; means for sensing successively the record columns of each source record in sensing position; recording means for recording character data on a sheet and comprising positioning means for moving the sheet to different recording positions, character actuating means for recording the characters, and functional actuating means for performing different functional operations of said recording means and including the operation of said positioning means; class controlling means adjustable to different controlling conditions which correspond, respectively, to the classes of character data recorded in the source records; record classifying means responsive to the sensing of the class designation of the source record in sensing position for adjusting said class controlling means to a controlling condition corresponding to the class of the sensed record; and means responsive to the sensing of designations in the source record in sensing position for operating the actuating means of said recording means to record the data on a said sheet and including means operable upon sensing one particular designation and controlled by the adjusted condition of said class controlling means to effect operation of said positioning means to position a different area of said sheet in recording position when one class of record is in sensing position and to effect a character recording operation of said recording means when another class of source record is in sensing position.

15. In apparatus for selectively recording different classes of character data on a sheet under the control of designations in record columns of a plurality of source records, wherein columns of each record contain designations representing character data and functional operations of the apparatus and at least one column of each record contains a class designation signifying the class of character data recorded therein, the combination of record holding means adapted to receive the source records, one at a time, and operable to hold each received record in a position where a column thereof can be sensed; means for sensing successively the record columns of each source record in sensing position; recording means for recording character data on a sheet and comprising positioning means for moving the sheet to different recording positions, character actuating means for recording the characters, and functional actuating means for performing different functional operations of said recording means and including the operation of said positioning means; skipping means operable to prevent sensing of predetermined columns of the record in sensing position; class controlling means adjustable to different controlling conditions which correspond, respectively, to the classes of character data recorded in the source records; record classifying means responsive to the sensing of the class designation of the source record in sensing position for adjusting said class controlling means to a controlling condition corresponding to the class of the sensed record; and means responsive to the sensing designations in the source record in sensing position for operating said actuating means of said recording means and said skipping means to selectively record the data on said sheet and including means operable upon sensing one particular designation and controlled by the adjusted condition of said class controlling means to effect operation of said skipping means when one class of record is in sensing position and to effect both operation of said skipping means and operation of said positioning means to position a different area of said sheet in recording position when another class of source record is in sensing position.

16. In apparatus wherein different classes of character data contained, respectively, in different source records are recorded in a selected manner in a sheet and under the control of character representing designations and class signifying designations recorded in record columns of the source records, the combination of record holding means adapted to receive the source records, one at a time, and operable to hold each received record in a sensing position; normally operable means for sensing successively the record columns of each source record in sensing position and including a sensing station and means providing relative spacing movement between each such record and the sensing station so that for each normal sensing operation a new record column is brought to the sensing station; recording means responsive to sensed character designations for recording the corresponding characters on a sheet; class controlling means adjustable to different controlling conditions which correspond, respectively, to the classes of character data recorded in the different source records; record classifying means operable in response to the sensing of a class designation in each source record in sensing position, to adjust said class controlling means to the controlling condition corresponding to the class of character data recorded in such record; skipping means operable to prevent operation of said normally operable record sensing means and to provide relative movement of said sensing station and each source record at a rate substantially greater than that provided by the relative spacing movement of said normally operable sensing means; and skip off means activated upon operation of said skipping means and controlled by the adjusted condition of said class controlling means to disable said skipping means at one predetermined record sensing position when one class of record is being sensed and at a second predetermined record sensing position when a second class of record is being sensed.

17. In apparatus for selectively recording character data on a sheet under the control of character representing designations in record columns of source records, the combination of record holding means adapted to receive the source records, one at a time, and operable to hold each received record in a position to be sensed; program means comprising a control strip having a main control section and a skip off section, said main section being composed of columns of index point positions containing program designations for controlling the sequence of operations of said apparatus according to a predetermined plan, said skip off section being disposed alongside said main section and being composed of columns of index point positions corresponding, respectively, to the columns of said main section and containing different skip off designations for stopping skipping operations according to said plan; normal strip sensing means operable to sense successively at a strip sensing station the columns of said main control section; skip off strip sensing means operable to sense successively at the strip sensing station the columns of said skip off section; normal record sensing means activated and deactivated in response to the sensing of significant program designations and operable, when so activated, to sense successively at a record sensing station the columns of the record in sensing position; recording means activated and deactivated in response to the sensing of significant program designations, and operable, when so activated, and in response to the sensing of character designations in each said source record to record the corresponding characters on a sheet; skipping means operable in response to the sensing of a significant designation by one of said normal sensing means, to move both the record in sensing position and the control strip at a fast or skipping rate past their respective sensing stations; means operable upon operation of said skipping means, to prevent operation of both said normal sensing means, and to effect operation of said skip off sensing means; and means responsive to the sensing of skip off designations in said skip off section for stopping the operation of said skipping means with predetermined columns of said record and main control section at their respective sensing stations.

18. In apparatus for selectively recording character data on a sheet under the control of designations in record columns of a plurality of source records, wherein columns of each record contain designations representing different character data to be recorded and functional designations for effecting selected functional operations of the apparatus and wherein the first column to be sensed of each record contains a class signifying designation identifying the character data recorded in such record as belonging to one of a plurality of classes, the combination of means defining a passage for holding each source record in position to be sensed; program means comprising a control strip having a main control section and a skip off section, said main section being composed of columns of index point positions containing program designations for controlling the sequence of operations of said apparatus according to a predetermined plan, said skip off section being disposed alongside said main section and being composed of columns of index point positions corresponding, respectively, to the columns of said main section and containing different skip off designations for stopping skipping operations according to said plan; normal strip sensing means operable to sense successively at a strip sensing station the columns of said main control section; skip off strip sensing means operable to sense successively at the strip sensing station the columns of said skip off section; normal record sensing means activated and deactivated in response to the sensing of significant program designations in said control strip and operable, when so activated, to sense successively at a record sensing station the columns of the record in said passage; recording means activated and deactivated in response to the sensing of significant program designations, and operable, when so activated, and in response to the sensing of character designations in each said source record to record the corresponding characters on a sheet; class controlling means adjustable to different controlling conditions which correspond, respectively, to the different classes of data to which the source records belong; record classifying means activated in response to the sensing of a program designation in said main control section and operable, when so activated, and in response to the sensing of a class signifying designation in the first column of each record, to adjust said class controlling means to the controlling condition corresponding to the class of the record in sensing position; skipping means operable in response to the sensing of a significant designation by one of said normal sensing means, to move both the record in said passage and the control strip at a fast or skipping rate past their respective sensing stations; means operable upon operation of said skipping means, to prevent operation of both said normal sensing means, and to effect operation of said skip off sensing means; and means controlled by the adjusted condition of said class controlling means and responsive to the sensing of one skip off designation for stopping the operation of said skipping means when a record of one of said classes is in said passage, and controlled by a different adjusted condition of said class controlling means and responsive to the sensing of a second skip off designation for stopping operation of said skipping means when a record of a second of said classes is in said passage.

19. In apparatus for recording character data on a sheet under the control of designations recorded in record columns of source records and representing characters to be recorded and functional operations of said apparatus, the combination of means defining a passage for holding each record in position to be sensed; initial card feeding means operable to feed the records individually to a first column sensing position in said passage; program means comprising a control strip including a main control section extending lengthwise of the strip and having columns containing program designations for controlling the sequence of operations of said apparatus while a record is in position to be sensed and having a skip off section extending alongside said main section and having columns corresponding, respectively, to the columns of said main section and containing skip off designations for controlling skip off operations; normal strip feeding and sensing means initially activated by operation of said initial card feeding means and operable, when so activated, to feed the control strip lengthwise column-by-column at a normal rate and to sense the columns thereof in succession; normal record sensing and feeding means activated and deactivated by the sensing of significant program designations in said main control section, and operable when so activated, to feed the record at a normal rate and to sense the columns of the record in succession and so that as long as the record sensing means is activated, a column of said record is sensed for each column sensing and feeding operation of the normal strip sensing and feeding means; recording means activated and deactivated by the sensing of significant program designations in said main section of the program strip and operable, when so activated, and in response to the sensing of designations in said record and certain designations in the strip, for recording the character data of said source record on said sheet in a predetermined manner; record skipping means operable in response to the sensing of a significant designation by one of said normal sensing and feeding means for feeding said record at a fast or skipping rate; strip skipping means operable upon the operation of said record skipping means to feed said strip at a skipping rate and column-by-column with said record; skip off sensing means operable upon operation of said strip skipping means, to sense the columns of said skip off section as the strip is fed at its skipping rate; interlock means operable upon the operation of either skipping means to prevent operation of both said normal sensing and feeding means while skipping operations are being effected; means responsive to the sensing of one skip off designation to stop skipping movement of said record at a predetermined column sensing position; means responsive to subsequent sensing of a second skip off designation to stop skipping movement of said strip at a predetermined column sensing position; and means operable upon the stopping of skipping operations of both said record and strip to disable said interlock means and said skip off sensing means.

20. In apparatus for selectively recording character data on a sheet under the control of designations recorded in record columns of source records and representing characters to be recorded and functional operations of said apparatus, the combination of record holding means adapted to receive the source records, one at a time, and operable to hold each received record in position to be sensed; program means comprising a control strip including a main control section extending lengthwise of the strip and having columns containing program designations for controlling the sequence of operations of said apparatus while a record is in position to be sensed and including a skip off section extending alongside said main section and having columns corresponding, respectively, to the columns of said main section and containing different skip off designations for controlling skip off operations; normal strip sensing means operable to sense successively at a strip sensing station the columns of said main control section; skip off strip sensing means operable to sense successively at the strip sensing station the columns of said skip off section; normal record sensing means activated and deactivated in response to the sensing of significant program designations and operable, when so activated, to sense successively at a record sensing station the columns of the record in sensing position; recording means activated and deactivated in response to the sensing of significant program designations and operable, when so activated, and in response to the sensing of character designations in each said source record to record the corresponding characters on a sheet; skipping means operable in response to the sensing of a significant designation by one of said normal sensing means, to move both the record in sensing position and the control strip at a fast or skipping rate past their respective sensing stations; means operable upon operation of said skipping means to prevent operation of both said normal sensing means, and to effect operation of said skip off sensing means; means responsive to the sensing of one skip off designation to stop skipping movement of said record at a predetermined column sensing position; means responsive to subsequent sensing of a second skip off designation to stop skipping movement of said strip at a predetermined column sensing position; and means operable upon the stopping of skipping operations of both said record and said strip to disable operation of said skip off sensing means and to restore said normal strip sensing means to its normal operating condition.

21. In apparatus for selectively recording character data on a sheet under the control of designations recorded in columns of a plurality of source records, wherein columns of each such record are grouped to form fields of data and contain designations representing different character data to be recorded and functional designations for effecting selected functional operations of the apparatus and wherein the first column to be sensed of each such record contains a classifying designation identifying the character data recorded in such record as belonging to either a first class or a second class, the combination of means defining a passage in which a source record is held in position to be sensed; initial record feeding means operable, when activated, to feed the source records individually in a predetermined order into a first column sensing position in said passage; programming means for controlling the sequence of operations of said apparatus according to a predetermined plan and comprising a control strip including an initial control section having one or more record columns containing program designations for controlling the operations of said apparatus while each source record is in its said first column sensing position, a first main control section having record columns containing program designations for controlling the sequence of operations while the record columns of each record of said first class are being sensed, a second main control section having record columns containing program designations for controlling the sequence of operations of said apparatus while the record columns of each record of said second class are being read, and a skip off control section having record columns containing different types of skip off designations for controlling skip off operations while records of both said classes are in sensing position in said passage, and said first and second main control sections and said skip off control section being arranged in side-by-side relation and extending lengthwise of the control strip; normal program strip sensing and feeding means operable first to sense successively the record columns of said initial control section and selectively adjustable afterwards to one of two adjusted conditions in a first of which the record columns of said first main control section are sensed successively and in the second of which the record columns of said second main control section are successively sensed; skip off sensing means operable, when activated, to sense successively the record columns of said skip off section; normal record sensing and feeding means selectively activated and deactivated in response to the sensing of significant program designations in said control strip and operable, when so activated, to sense successively the record columns of the source record in sensing position; class controlling means adjustable to different controlling conditions which correspond, respectively, to the classes to which the source records belong; record classifying means activated in response to the sensing of a significant control designation in the initial control section of the program strip and operable, when so activated, and in response to the sensing of a class designation in each record in first-column sensing position, to adjust said class controlling means to the controlling condition corresponding to the class of the sensed record; means operable after said record classifying means and responsive jointly to the sensing of a significant designation in the initial control section of the tape and to the adjusted condition of said class controlling means, and providing for said normal strip sensing means occupying its said first adjusted condition when the sensed record belongs to said first class and occupying its said second adjusted condition when the sensed record belongs to said second class; skipping means operable in response to the sensing of a significant designation by one of said normal sensing and feeding means to move both the source record in sensing position and the control strip at a fast or skipping speed; means effective upon the operation of said skipping means to prevent operation of said normal strip sensing means and said normal record sensing means and to activate said skip off sensing means; and means controlled by the adjusted condition of said class controlling means and responsive to the sensing of one skip off designation for deactivating said skipping means when said first class of record is in said passage and controlled by a different adjusted condition of said class controlling means and responsive to the sensing of a second skip off designation for deactivating said skipping means when said second class of record is in said passage.

22. In apparatus for selectively recording character data on a sheet under the control of designations in record columns of a plurality of source records, wherein columns of each record contain designations representing different character data to be recorded and functional designations for effecting selected functional operations of the apparatus and wherein the first column to be sensed of each record contains a classifying designation identifying the character data recorded in such record as belonging to either a first or a second class, the combination of means defining a passage for holding each source record in position to be sensed; program means comprising a control strip having an initial section, first and second main sections, and a skip off section and each said section being composed of columns of index point positions containing program designations for controlling the sequence of operations of said apparatus, the designations of said initial section controlling operations while a record of either class is in sensing position, the designations of said first and second main sections controlling, respectively, operations while said first and second class records are in sensing position and after control by said initial section, the designations of said skip off section being for stopping skipping operations while either record is being sensed, and said skip off section, and said first and second main sections being arranged side-by-side lengthwise of the strip; normal strip sensing means operable first, and when each record is in its first column sensing position, to sense successively the columns of said initial section and then being selectively adjustable to one of two adjusted conditions, and being operable when in a first of said adjusted conditions to sense successively the columns of said first main section and operable when in the second of said adjusted conditions to sense successively the columns of said second main section; skip off strip sensing means operable to sense successively the columns of said skip off section; normal record sensing means activated and deactivated in response to the sensing of program designations in said control strip and operable, when so activated, to sense successively the columns of the record in sensing position; recording means operable in response to the sensing of character designations in each record to record the corresponding characters on a sheet; class controlling means adjustable to different controlling conditions which correspond, respectively, to the class to which each record belongs; record classifying means activated in response to the sensing of a program designation in said initial section and operable, when so activated, and in response to the sensing of a designation in the first column of each record, to adjust said class controlling means to the controlling condition corresponding to the class of the sensed record; means operable subsequent to the operation of said classifying means and controlled jointly by the sensing of a program designation in said initial section and by the adjusted condition of said class controlling means, to provide for said normal strip sensing means occupying its said first adjusted condition when the sensed record belongs to said first class and occupying its said second adjusted condition when the sensed record belongs to said second class; skipping means operable in response to the sensing of a significant designation by one of said normal sensing means to move both the record in sensing position and the control strip at a fast or skipping rate; means operable upon operation of said skipping means, to prevent operation of both of said normal sensing means, and to effect operation of said skip off sensing means; and means controlled by the adjusted condition of said class controlling means and responsive to the sensing of one skip off designation for deactivating said skipping means when a record of said first class is in sensing position, and controlled by a different adjusted condition of said class controlling means and responsive to the sensing of a second skip off designation for deactivating said skipping means when a record of said second class is in sensing position.

FRANCIS E. HAMILTON.
MAXWELL F. HAYES.
JOHN D. WOLFE.

REFERENCES CITED

The following references are of record in the file of this patent:

UNITED STATES PATENTS

| Number | Name | Date |
|---|---|---|
| 2,240,562 | Lake et al. | May 6, 1941 |
| 2,255,011 | Lake et al. | Sept. 2, 1941 |

Certificate of Correction

Patent No. 2,540,030

January 30, 1951

FRANCIS E. HAMILTON ET AL.

It is hereby certified that error appears in the printed specification of the above numbered patent requiring correction as follows:

Column 11, line 22, in the table, first column thereof, for "1-2-4-5" read *1-3-4-5*; column 157, line 41, after "sensing" insert *of*;

and that the said Letters Patent should be read as corrected above, so that the same may conform to the record of the case in the Patent Office.

Signed and sealed this 3rd day of April, A. D. 1951.

[SEAL]

THOMAS F. MURPHY,
*Assistant Commissioner of Patents.*